United States Patent
Idan

(10) Patent No.: US 11,593,728 B2
(45) Date of Patent: Feb. 28, 2023

(54) SYSTEMS AND METHODS FOR SCHEDULING TASKS

(71) Applicant: ClickSoftware, Inc., Burlington, MA (US)

(72) Inventor: Sassi Idan, Hod-Hasharon (IL)

(73) Assignee: CLICKSOFTWARE, INC., Burlington, MA (US)

( * ) Notice: Subject to any disclaimer, the term of this patent is extended or adjusted under 35 U.S.C. 154(b) by 0 days.

(21) Appl. No.: 16/724,972

(22) Filed: Dec. 23, 2019

(65) Prior Publication Data

US 2020/0210931 A1 Jul. 2, 2020

Related U.S. Application Data

(60) Provisional application No. 62/871,397, filed on Jul. 8, 2019, provisional application No. 62/785,423, filed on Dec. 27, 2018.

(51) Int. Cl.
*G06Q 10/06* (2012.01)
*G06Q 10/0631* (2023.01)
(Continued)

(52) U.S. Cl.
CPC ....... *G06Q 10/063116* (2013.01); *G06N 5/04* (2013.01); *G06N 20/00* (2019.01); *G06Q 10/02* (2013.01); *G06Q 10/04* (2013.01); *G06Q 10/0633* (2013.01); *G06Q 10/06311* (2013.01); *G06Q 10/06312* (2013.01); *G06Q 10/06315* (2013.01); *G06Q 10/06316* (2013.01);
(Continued)

(58) Field of Classification Search
CPC ... G06Q 10/063116; G06Q 10/063112; G06Q 10/063118; G06Q 10/06315; G06Q 30/0205
USPC ........................................................ 705/7.14
See application file for complete search history.

(56) References Cited

U.S. PATENT DOCUMENTS

| 5,093,813 A | 3/1992 | Levine |
| 5,467,268 A | 11/1995 | Sisley et al. |

(Continued)

FOREIGN PATENT DOCUMENTS

| EP | 3211548 A1 | 8/2017 |
| KR | 20010082104 A | 8/2001 |

(Continued)

OTHER PUBLICATIONS

ServiceMax Announces New AI Capability with Remote Triage Offering M2 Presswire [Coventry] Apr. 24, 2019. (Year: 2019).*

(Continued)

*Primary Examiner* — Folashade Anderson
(74) *Attorney, Agent, or Firm* — Kwan & Olynick LLP

(57) ABSTRACT

Methods, apparatuses, and systems for scheduling tasks to field professionals include: storing, in a database, a plurality of records reflecting characteristics associated with completing a set of technical services, wherein information in each record is derived from historical experience of completing each of the technical services; receiving a request for a new technical service associated with a location; and assigning a field professional to perform the new service having determined from information in the database a likelihood that the field professional will complete the new technical service in a single on-site visit at the location.

20 Claims, 59 Drawing Sheets

(51) Int. Cl.

| | |
|---|---|
| *G06Q 10/0633* | (2023.01) |
| *G06Q 10/02* | (2012.01) |
| *G06Q 10/1093* | (2023.01) |
| *G06N 20/00* | (2019.01) |
| *G06N 5/04* | (2023.01) |
| *G06Q 30/0204* | (2023.01) |
| *G06Q 10/0835* | (2023.01) |
| *G06Q 10/0836* | (2023.01) |
| *G06Q 10/087* | (2023.01) |
| *G06Q 10/20* | (2023.01) |
| *G06Q 10/04* | (2023.01) |
| *G01C 21/34* | (2006.01) |
| *G06Q 50/10* | (2012.01) |

(52) U.S. Cl.
CPC .......... *G06Q 10/063112* (2013.01); *G06Q 10/063114* (2013.01); *G06Q 10/063118* (2013.01); *G06Q 10/087* (2013.01); *G06Q 10/0836* (2013.01); *G06Q 10/08355* (2013.01); *G06Q 10/1093* (2013.01); *G06Q 10/1095* (2013.01); *G06Q 10/1097* (2013.01); *G06Q 10/20* (2013.01); *G06Q 30/0205* (2013.01); *G01C 21/3492* (2013.01); *G06Q 50/10* (2013.01)

(56) References Cited

U.S. PATENT DOCUMENTS

| | | | |
|---|---|---|---|
| 5,848,395 A | 12/1998 | Edgar et al. | |
| 5,945,919 A | 8/1999 | Trask | |
| 6,006,251 A * | 12/1999 | Toyouchi | G06F 16/957 709/203 |
| 6,049,776 A | 4/2000 | Donnelly et al. | |
| 6,430,562 B1 | 8/2002 | Kardos et al. | |
| 6,578,005 B1 | 6/2003 | Lesaint et al. | |
| 6,985,872 B2 | 1/2006 | Benbassat et al. | |
| 7,210,119 B2 | 4/2007 | Pothos | |
| 7,565,338 B2 | 7/2009 | Beniaminy et al. | |
| 8,219,436 B2 | 7/2012 | Henry et al. | |
| 8,370,244 B1 | 2/2013 | Daly | |
| 8,606,611 B1 | 12/2013 | Fedorov | |
| 8,612,276 B1 | 12/2013 | Nielsen et al. | |
| 8,812,339 B1 | 8/2014 | Stone, Jr. | |
| 8,849,688 B2 | 9/2014 | Cash, Jr. | |
| 8,930,233 B2 | 1/2015 | Johnson | |
| 9,282,430 B1 | 3/2016 | Brandmaier | |
| 9,378,476 B1 | 6/2016 | Schwartz et al. | |
| 9,595,019 B1 | 3/2017 | Marlow et al. | |
| 10,032,181 B1 | 7/2018 | Madhow et al. | |
| 10,275,535 B1 | 4/2019 | Trauth | |
| 10,552,773 B1 | 2/2020 | Shah et al. | |
| 10,775,806 B2 | 9/2020 | Abari et al. | |
| 10,937,004 B2 | 3/2021 | Comerford et al. | |
| 11,354,610 B2 * | 6/2022 | Brand | G06N 5/04 |
| 2001/0037229 A1 | 11/2001 | Jacobs | |
| 2002/0007300 A1 | 1/2002 | Slatter | |
| 2002/0010615 A1 | 1/2002 | Jacobs | |
| 2002/0016645 A1 * | 2/2002 | Jacobs | G06Q 10/06 700/99 |
| 2002/0194047 A1 | 12/2002 | Edinger | |
| 2003/0033184 A1 | 2/2003 | Benbassat | |
| 2003/0130820 A1 | 7/2003 | Lane | |
| 2004/0030611 A1 | 2/2004 | Byrne | |
| 2004/0133889 A1 | 7/2004 | Colle et al. | |
| 2004/0158568 A1 | 8/2004 | Colle et al. | |
| 2004/0165580 A1 | 8/2004 | Stillman et al. | |
| 2004/0261022 A1 | 12/2004 | Deutesfeld | |
| 2005/0119927 A1 | 6/2005 | Patel | |
| 2005/0177409 A1 | 8/2005 | Barni | |
| 2006/0017954 A1 | 1/2006 | Ly et al. | |
| 2006/0235739 A1 * | 10/2006 | Levis | G06Q 10/08 705/1.1 |
| 2006/0242154 A1 | 10/2006 | Rawat | |
| 2007/0038498 A1 | 2/2007 | Powell et al. | |
| 2007/0149184 A1 | 6/2007 | Viegers et al. | |
| 2007/0192157 A1 | 8/2007 | Gooch | |
| 2007/0208604 A1 | 9/2007 | Purohit et al. | |
| 2007/0250377 A1 | 10/2007 | Hill et al. | |
| 2007/0282656 A1 | 12/2007 | Battcher | |
| 2008/0040190 A1 * | 2/2008 | Khosla | G06Q 10/06312 705/7.22 |
| 2008/0052346 A1 | 2/2008 | Bassat et al. | |
| 2008/0066072 A1 | 3/2008 | Yurekli et al. | |
| 2008/0114638 A1 * | 5/2008 | Colliau | G06Q 10/06375 705/7.19 |
| 2008/0313005 A1 | 12/2008 | Nessland et al. | |
| 2009/0006169 A1 | 1/2009 | Wetzer | |
| 2009/0006173 A1 | 1/2009 | Farrell et al. | |
| 2009/0018890 A1 | 1/2009 | Werth | |
| 2009/0077376 A1 | 3/2009 | Montagut | |
| 2009/0150209 A1 | 6/2009 | Levine | |
| 2009/0177518 A1 | 7/2009 | Adams et al. | |
| 2009/0234689 A1 | 9/2009 | Simon et al. | |
| 2009/0281826 A1 | 11/2009 | Zak | |
| 2009/0312052 A1 | 12/2009 | Barbosa et al. | |
| 2010/0169133 A1 | 7/2010 | Ben Bassat | |
| 2010/0241481 A1 | 9/2010 | Apostolides | |
| 2010/0257015 A1 | 10/2010 | Molander | |
| 2010/0287025 A1 | 11/2010 | Fletcher | |
| 2010/0312604 A1 | 12/2010 | Mitchell et al. | |
| 2010/0312605 A1 | 12/2010 | Mitchell et al. | |
| 2011/0015963 A1 | 1/2011 | Chafle et al. | |
| 2011/0022433 A1 | 1/2011 | Nielsen et al. | |
| 2011/0022441 A1 | 1/2011 | Robertson et al. | |
| 2011/0022653 A1 | 1/2011 | Werth | |
| 2011/0112943 A1 | 5/2011 | Dietz et al. | |
| 2011/0119604 A1 | 5/2011 | Lo et al. | |
| 2011/0171938 A1 | 7/2011 | Daugherty et al. | |
| 2011/0175927 A1 | 7/2011 | Urashima | |
| 2012/0113582 A1 | 5/2012 | Hirano | |
| 2012/0203457 A1 | 8/2012 | Casey | |
| 2012/0253551 A1 | 10/2012 | Halimi | |
| 2012/0254258 A1 | 10/2012 | Gao | |
| 2012/0290428 A1 | 11/2012 | Ben-Bassat et al. | |
| 2012/0330710 A1 | 12/2012 | Hauser et al. | |
| 2013/0041783 A1 | 2/2013 | Jyoti et al. | |
| 2013/0090965 A1 | 4/2013 | Rivere | |
| 2013/0090968 A1 | 4/2013 | Borza | |
| 2013/0103749 A1 | 4/2013 | Werth et al. | |
| 2013/0138461 A1 | 5/2013 | Shahraray et al. | |
| 2013/0215213 A1 | 8/2013 | Power | |
| 2013/0238641 A1 | 9/2013 | Mandelstein | |
| 2013/0253971 A1 | 9/2013 | Nudd | |
| 2013/0275166 A1 | 10/2013 | Diao et al. | |
| 2013/0304533 A1 | 11/2013 | Nudd et al. | |
| 2013/0339980 A1 | 12/2013 | Meshar et al. | |
| 2014/0032261 A1 | 1/2014 | Kotak | |
| 2014/0095241 A1 | 4/2014 | Loring | |
| 2014/0114717 A1 | 4/2014 | Davis et al. | |
| 2014/0122143 A1 | 5/2014 | Fletcher et al. | |
| 2014/0164042 A1 | 6/2014 | Halvorson et al. | |
| 2014/0172482 A1 * | 6/2014 | Mitchell | G06Q 10/06311 705/7.15 |
| 2014/0195295 A1 | 7/2014 | Whitley et al. | |
| 2014/0229560 A1 | 8/2014 | Gray | |
| 2014/0236663 A1 | 8/2014 | Smith | |
| 2014/0249877 A1 | 9/2014 | Hull et al. | |
| 2014/0257900 A1 | 9/2014 | Jacobs et al. | |
| 2014/0278690 A1 | 9/2014 | Agarwal | |
| 2014/0279081 A1 | 9/2014 | Marx et al. | |
| 2014/0330605 A1 | 11/2014 | Connolly et al. | |
| 2014/0337479 A1 | 11/2014 | Stangas | |
| 2014/0372160 A1 | 12/2014 | Nath et al. | |
| 2015/0066782 A1 | 3/2015 | Vainberg | |
| 2015/0073874 A1 | 3/2015 | Ellis | |
| 2015/0134386 A1 | 5/2015 | Jogalekar et al. | |
| 2015/0134388 A1 | 5/2015 | Yoo et al. | |
| 2015/0161555 A1 | 6/2015 | Cui | |
| 2015/0161564 A1 | 6/2015 | Sweeney et al. | |
| 2015/0235161 A1 | 8/2015 | Azar et al. | |
| 2015/0302346 A1 | 10/2015 | Kishore et al. | |

(56) References Cited

U.S. PATENT DOCUMENTS

| | | |
|---|---|---|
| 2015/0317582 A1 | 11/2015 | Nath et al. |
| 2015/0339607 A1 | 11/2015 | Nielsen et al. |
| 2015/0348046 A1 | 12/2015 | Battle |
| 2016/0034560 A1 | 2/2016 | Setayesh |
| 2016/0132816 A1 | 5/2016 | Lush |
| 2016/0140507 A1 | 5/2016 | Stevens et al. |
| 2016/0209220 A1 | 7/2016 | Laetz |
| 2016/0246271 A1 | 8/2016 | Shen |
| 2016/0299933 A1 | 10/2016 | Fillipi |
| 2016/0350595 A1 | 12/2016 | Solomin et al. |
| 2016/0357599 A1 | 12/2016 | Glatfelter et al. |
| 2017/0052034 A1 | 2/2017 | Magazinik et al. |
| 2017/0052814 A1 | 2/2017 | Aguiar et al. |
| 2017/0083841 A1 | 3/2017 | Syrichas et al. |
| 2017/0083873 A1 | 3/2017 | Syrichas et al. |
| 2017/0109704 A1 | 4/2017 | Lettieri |
| 2017/0140307 A1 | 5/2017 | Gottemukkala et al. |
| 2017/0140325 A1 | 5/2017 | Syrichas et al. |
| 2017/0147985 A1 | 5/2017 | Sampath |
| 2017/0178259 A1 | 6/2017 | Goldstein |
| 2017/0186126 A1 | 6/2017 | Marco et al. |
| 2017/0191841 A1 | 7/2017 | Marueli et al. |
| 2017/0192778 A1 | 7/2017 | Srivastava et al. |
| 2017/0193459 A1 | 7/2017 | Crasso |
| 2017/0200220 A1 | 7/2017 | Nicholson |
| 2017/0213181 A1 | 7/2017 | Katz et al. |
| 2017/0357914 A1 | 12/2017 | Tulabandhula |
| 2017/0372268 A1 | 12/2017 | Ilan |
| 2018/0005197 A1 | 1/2018 | Kesler |
| 2018/0034921 A1* | 2/2018 | Gopalan ............... G06N 20/00 |
| 2018/0060738 A1 | 3/2018 | Achin |
| 2018/0060785 A1 | 3/2018 | Carnevale et al. |
| 2018/0101809 A1 | 4/2018 | Bnayahu et al. |
| 2018/0106639 A1 | 4/2018 | Funase et al. |
| 2018/0107965 A1 | 4/2018 | Namboothiri |
| 2018/0113780 A1 | 4/2018 | Kim |
| 2018/0137594 A1 | 5/2018 | Marco |
| 2018/0165623 A1 | 6/2018 | Lee |
| 2018/0204171 A1 | 7/2018 | Cao et al. |
| 2018/0240038 A1 | 8/2018 | Adibowo |
| 2018/0247207 A1 | 8/2018 | Ristovski |
| 2018/0253680 A1 | 9/2018 | Jahani |
| 2018/0285831 A1 | 10/2018 | Meruva et al. |
| 2018/0322420 A1 | 11/2018 | Marco et al. |
| 2018/0349829 A1 | 12/2018 | Peterson et al. |
| 2018/0349844 A1 | 12/2018 | Bounasser |
| 2018/0365621 A1* | 12/2018 | Merg ..................... G09B 7/02 |
| 2018/0365624 A1 | 12/2018 | Pati et al. |
| 2019/0045013 A1 | 2/2019 | Wu |
| 2019/0050786 A1 | 2/2019 | Muser et al. |
| 2019/0066011 A1 | 2/2019 | Portnoy et al. |
| 2019/0095888 A1 | 3/2019 | Monaghan |
| 2019/0122178 A1 | 4/2019 | Kempf |
| 2019/0180218 A1 | 6/2019 | Vigneswaran |
| 2019/0180229 A1 | 6/2019 | Phillips |
| 2019/0180399 A1 | 6/2019 | Tajammul |
| 2019/0180868 A1 | 6/2019 | Makram |
| 2019/0199733 A1 | 6/2019 | Aaltonen et al. |
| 2019/0213561 A1 | 7/2019 | Bhutani |
| 2019/0220828 A1 | 7/2019 | Murali et al. |
| 2019/0279131 A1 | 9/2019 | Gao et al. |
| 2019/0325089 A1 | 10/2019 | Golparvar-Fard |
| 2019/0353494 A1 | 11/2019 | Lin et al. |
| 2019/0362294 A1 | 11/2019 | Vishny |
| 2019/0385105 A1* | 12/2019 | Luo ................ G06Q 10/063112 |
| 2019/0385125 A1* | 12/2019 | Blakely .............. G06Q 10/1053 |
| 2020/0005222 A1 | 1/2020 | Bittmann |
| 2020/0082412 A1 | 3/2020 | Bansal |
| 2020/0090107 A1 | 3/2020 | McKeeman |
| 2020/0097920 A1 | 3/2020 | Doctor |
| 2020/0117508 A1 | 4/2020 | Subramanian |
| 2020/0134529 A1 | 4/2020 | Dhaliwal |
| 2020/0160242 A1 | 5/2020 | Johnson et al. |
| 2020/0160252 A1* | 5/2020 | Sahni ............. G06Q 10/06398 |
| 2020/0160253 A1 | 5/2020 | Johnson et al. |
| 2020/0184405 A1* | 6/2020 | Mappus .................. G06N 5/02 |
| 2020/0184407 A1 | 6/2020 | Mappus et al. |
| 2020/0184494 A1 | 6/2020 | Joseph |
| 2020/0184580 A1 | 6/2020 | Ye |
| 2020/0210918 A1 | 7/2020 | Brand et al. |
| 2020/0210919 A1 | 7/2020 | Monovich et al. |
| 2020/0210921 A1 | 7/2020 | Gibrekhterman et al. |
| 2020/0210932 A1 | 7/2020 | Monovich et al. |
| 2020/0210933 A1 | 7/2020 | Kolodner et al. |
| 2020/0210936 A1 | 7/2020 | Brand |
| 2020/0210937 A1 | 7/2020 | Monovich et al. |
| 2020/0210938 A1 | 7/2020 | Monovich et al. |
| 2020/0210939 A1 | 7/2020 | Kolodner et al. |
| 2020/0210943 A1 | 7/2020 | Monovich et al. |
| 2020/0210959 A1 | 7/2020 | Kolodner et al. |
| 2020/0210961 A1 | 7/2020 | Rosental et al. |
| 2020/0210962 A1 | 7/2020 | Monovich et al. |
| 2020/0210963 A1 | 7/2020 | Parash et al. |
| 2020/0210964 A1 | 7/2020 | Monovich et al. |
| 2020/0210965 A1* | 7/2020 | Garber .................... G06N 5/04 |
| 2020/0249047 A1 | 8/2020 | Balva |
| 2020/0265387 A1 | 8/2020 | Ave et al. |
| 2020/0334585 A1 | 10/2020 | Petroulas |
| 2020/0342421 A1 | 10/2020 | Ramer |
| 2020/0372431 A1 | 11/2020 | Okimoto |
| 2021/0065259 A1* | 3/2021 | Luong ................ G06Q 30/016 |
| 2022/0036320 A1* | 2/2022 | Anshul .............. G06Q 10/0837 |

FOREIGN PATENT DOCUMENTS

| | | |
|---|---|---|
| WO | 0034908 A1 | 6/2000 |
| WO | 2001069488 A1 | 9/2001 |
| WO | 2017058932 A1 | 4/2017 |
| WO | 2020110131 A1 | 6/2020 |

OTHER PUBLICATIONS

International Search Report, International Application No. PCT/US2019/068748, dated Feb. 27, 2020, 11 pages.
U.S. Appl. No. 16/724,616, filed Dec. 23, 2019.
U.S. Appl. No. 16/724,670, filed Dec. 23, 2019.
U.S. Appl. No. 16/724,905, filed Dec. 23, 2019.
U.S. Appl. No. 16/725,063, filed Dec. 23, 2019.
U.S. Appl. No. 16/725,164, filed Dec. 23, 2019.
U.S. Appl. No. 16/725,333, filed Dec. 23, 2019.
U.S. Appl. No. 16/725,412, filed Dec. 23, 2019.
U.S. Appl. No. 16/725,508, filed Dec. 23, 2019.
U.S. Appl. No. 16/725,676, filed Dec. 23, 2019.
U.S. Appl. No. 16/725,759, filed Dec. 23, 2019.
U.S. Appl. No. 16/725,823, filed Dec. 23, 2019.
U.S. Appl. No. 16/725,904, filed Dec. 23, 2019.
U.S. Appl. No. 16/725,984, filed Dec. 23, 2019.
U.S. Appl. No. 16/726,019, filed Dec. 23, 2019.
U.S. Appl. No. 16/726,068, filed Dec. 23, 2019.
U.S. Appl. No. 16/726,095, filed Dec. 23, 2019.
U.S. Appl. No. 16/724,616, Non-Final Office Action dated Jun. 23, 2021, 28 pgs.
U.S. Appl. No. 16/724,905, Non-Final Office Action dated Jun. 21, 2021, 34 pgs.
U.S. Appl. No. 16/725,164, Non-Final Office Action dated Apr. 28, 2021, 21 pgs.
U.S. Appl. No. 16/725,412, Examiner Interview Summary dated Apr. 30, 2021, 3 pgs.
U.S. Appl. No. 16/725,412, Non-Final Office Action dated Feb. 10, 2021, 34 pgs.
U.S. Appl. No. 16/725,508, Non-Final Office Action dated May 12, 2021, 19 pgs.
U.S. Appl. No. 16/725,676, Examiner Interview Summary dated, Jun. 18, 2021, 2 pgs.
U.S. Appl. No. 16/725,676, Non-Final Office Action dated Apr. 2, 2021, 37 pgs.
U.S. Appl. No. 16/725,759, Examiner Interview Summary dated May 24, 2021, 3 pgs.
U.S. Appl. No. 16/725,759, Non-Final Office Action dated Mar. 9, 2021, 24 pgs.

(56) References Cited

OTHER PUBLICATIONS

U.S. Appl. No. 16/725,823, Non-Final Office Action dated Jun. 25, 2021, 26 pgs.
U.S. Appl. No. 16/725,904, Examiner Interview Summary dated Apr. 16, 2021, 2 pgs.
U.S. Appl. No. 16/725,904, Non-Final Office Action dated Jan. 25, 2021, 30 pgs.
U.S. Appl. No. 16/725,984, Examiner Interview Summary dated Apr. 28, 2021, 2 pgs.
U.S. Appl. No. 16/725,984, Non-Final Office Action dated Feb. 4, 2021, 12 pgs.
U.S. Appl. No. 16/726,019, Examiner Interview Summary dated Jun. 18, 2021, 2 pgs.
U.S. Appl. No. 16/726,019, Non-Final Office Action dated Apr. 1, 2021, 24 pgs.
U.S. Appl. No. 16/726,068, Restriction Requirement dated Jun. 8, 2021, 7 pgs.
U.S. Appl. No. 16/726,095, Examiner Interview Summary dated May 6, 2021, 2 pgs.
U.S. Appl. No. 16/726,095, Non-Final Office Action dated Feb. 17, 2021, 23 pgs.
Atlila A. Kovacs et al, Adaptive large neighborhood search for service technician routing and scheduling problems, Journal of Scheduling vol. 15, pp. 579-600 (2012) (Year: 2012).
ClickSoftware and Syclo Announce Partnership to Deliver Rapid Deployment Scheduling Solution for Asset ManagementApplications. PR Newswire [New York]Sep. 12, 2005: 1.
ERP Software helps optimize mobile workforce management. Product News Network: NA. Thomas Industrial Network, Inc. (Oct. 29, 2014).
Haugen, D. L., & Hill, A. V. (1999). Scheduling to improve field service qaulity. Decision Sciences, 30(3), 783-804. Retrieved from https://www.proquest.com/scholarly-journals/scheduling-improve-field-service-qaulity/docview/198108295/se-2?accountid = 14753 (Year: 1999).
U.S. Appl. No. 16/724,905, Examiner Interview Summary dated Sep. 3, 2021, 2 pgs.
U.S. Appl. No. 16/725,063, Examiner Interview Summary dated Aug. 3, 2021, 2 pgs.
U.S. Appl. No. 16/725,164, Examiner Interview Summary dated Jul. 16, 2021, 3 pgs.
U.S. Appl. No. 16/725,333 Restriction Requirement dated Sep. 20, 2021, 5 pgs.
U.S. Appl. No. 16/725,412, Final Office Action dated Aug. 26, 2021, 35 pgs.
U.S. Appl. No. 16/725,759, Final Office Action dated Sep. 20, 2021, 34 pgs.
U.S. Appl. No. 16/725,904, Final Office Action dated Aug. 11, 2021, 32 pgs.
U.S. Appl. No. 16/725,984, Final Office Action dated Aug. 19, 2021, 21 pgs.
U.S. Appl. No. 16/726,068, Non-Final Office Action dated Sep. 9, 2021, 25 pgs.
U.S. Appl. No. 16/726,095, Final Office Action dated Aug. 27, 2021, 24 pgs.
F. Pop, C. Dobre, C. Stratan, A. Costan and V. Cristea, Dynamic Meta-Scheduling Architecture Based on Monitoring in Distributed Systems, 2009 International Conference on Complex, Intelligent and Software Intensive Systems, 2009, pp. 388-395, doi: 10.1109/CISIS.2009.11 (Year: 2009).
U.S. Appl. No. 16/724,616, Examiner Interview Summary dated Sep. 15, 2021, 3 pgs.
Application Serial No. SFDCP513, Examiner Interview Summary dated Jul. 16, 2021, 3 pgs.
Office Action (Final Rejection) dated Dec. 29, 2021 for U.S. Appl. No. 16/724,905 (pp. 1-21).
U.S. Appl. No. 16/725,412, Examiner Interview Summary dated Nov. 22, 2021, 3 pgs.
U.S. Appl. No. 16/725,508, Final Office Action dated Nov. 12, 2021, 11 pgs.
U.S. Appl. No. 16/725,823, Examiner Interview Summary dated Sep. 29, 2021, 2 pgs.
U.S. Appl. No. 16/726,019, Final Office Action dated Oct. 8, 2021, 21 pgs.
U.S. Appl. No. 16/726,095, Examiner Interview Summary dated Nov. 22, 2021, 2 pgs.
Bruce Golden, S. Raghavan, and Edward Wasil et al. (The Vehicle Routing Problem: Latest Advances and New Challenges, ISBN: 978-0-387-77777-1, 2008 Springer Science). (Year: 2008).
Duygu Yengin et al. (Characterizing the Shapley value in fixed-route traveling salesman problems with appointments, Int J Game Theory (2012) 41:271-299). (Year: 2012).
Duygu Yengin et al. (Appointment Games in Fixed-Route Traveling Salesman Problems and the Shapley Value, Sep. 14, 2009). (Year: 2009).
Peter M. Vanden Bosch and Dennis C. Dietz et al. (Scheduling and Sequencing Arrivals to an Appointment System, Journal of Service Research, vol. 4, No. 1, Aug. 2001). (Year: 2001).
Arthur V. Hill (An Experimental Comparison of Human Schedulers and Heuristic Algorithms for the Traveling Salesman Problem, 1982). (Year: 1982).
U.S. Appl. No. 16/725,508 Examiner Interview Summary dated Aug. 3, 2021, 2 pgs.
U.S. Appl. No. 16/725,759, Examiner Interview Summary dated Nov. 23, 2021, 2 pgs.
Office Action (Final Rejection) dated Dec. 24, 2021 for U.S. Appl. No. 16/725,823 (pp. 1-34).
Office Action (Non-Final Rejection) dated Dec. 29, 2021 for U.S. Appl. No. 16/726,095 (pp. 1-27).
Office Action (Final Rejection) dated Jan. 21, 2022 for U.S. Appl. No. 16/724,616 (pp. 1-33).
Office Action (Final Rejection) dated Mar. 22, 2022 for U.S. Appl. No. 16/725,759 (pp. 1-31).
Office Action (Final Rejection) dated Apr. 20, 2022 for U.S. Appl. No. 16/726,068 (pp. 1-27).
Office Action (Final Rejection) dated Jun. 7, 2022 for U.S. Appl. No. 16/725,412 (pp. 1-14).
Office Action (Final Rejection) dated Jul. 1, 2022 for U.S. Appl. No. 16/725,904 (pp. 1-35).
Office Action (Final Rejection) dated Jul. 13, 2022 for U.S. Appl. No. 16/726,095 (pp. 1-29).
Office Action (Non-Final Rejection) dated Jan. 21, 2022 for U.S. Appl. No. 16/725,904 (pp. 1-28).
Office Action (Non-Final Rejection) dated Feb. 15, 2022 for U.S. Appl. No. 16/725,412 (pp. 1-37).
Office Action (Non-Final Rejection) dated Feb. 16, 2022 for U.S. Appl. No. 16/724,670 (pp. 1-32).
Office Action (Non-Final Rejection) dated Mar. 29, 2022 for U.S. Appl. No. 16/725,063 (pp. 1-12).
Office Action (Non-Final Rejection) dated Apr. 20, 2022 for U.S. Appl. No. 16/725,823 (pp. 1-31).
Office Action (Non-Final Rejection) dated May 27, 2022 for U.S. Appl. No. 16/724,905 (pp. 1-25).
Office Action (Non-Final Rejection) dated Jun. 6, 2022 for U.S. Appl. No. 16/724,616 (pp. 1-37).
Office Action (Notice of Allowance and Fees Due (PTOL-85)) dated Feb. 1, 2022 for U.S. Appl. No. 16/725,164 (pp. 1-8).
Simeunovic, N., Kamenko, I., Bugarski, V., Jovanovic, M., & Lalic, B. (2017). "Improving workforce scheduling using artificial neural networks model". Advances in Production Engineering & Management, 12(4), 337-352. (Year: 2017).
Office Action (Non-Final Rejection) dated Aug. 16, 2022 for U.S. Appl. No. 16/726,068 (pp. 1-26).
Office Action (Notice of Allowance and Fees Due (PTOL-85)) dated Aug. 31, 2022 for U.S. Appl. No. 16/725,759 (pp. 1-10).
Office Action (Final Rejection) dated Sep. 1, 2022 for U.S. Appl. No. 16/724,670 (pp. 1-36).
Office Action (Notice of Allowance and Fees Due (PTOL-85)) dated Sep. 14, 2022 for U.S. Appl. No. 16/725,759 (pp. 1-3).
Office Action (Final Rejection) dated Sep. 29, 2022 for U.S. Appl. No. 16/725,823 (pp. 1-33).

(56) References Cited

OTHER PUBLICATIONS

Office Action (Notice of Allowance and Fees Due (PTOL-85)) dated Nov. 3, 2022 for U.S. Appl. No. 16/725,412 (pp. 1-19).

* cited by examiner

Planned Tasks Assignment

Updated Tasks Assignment

2700

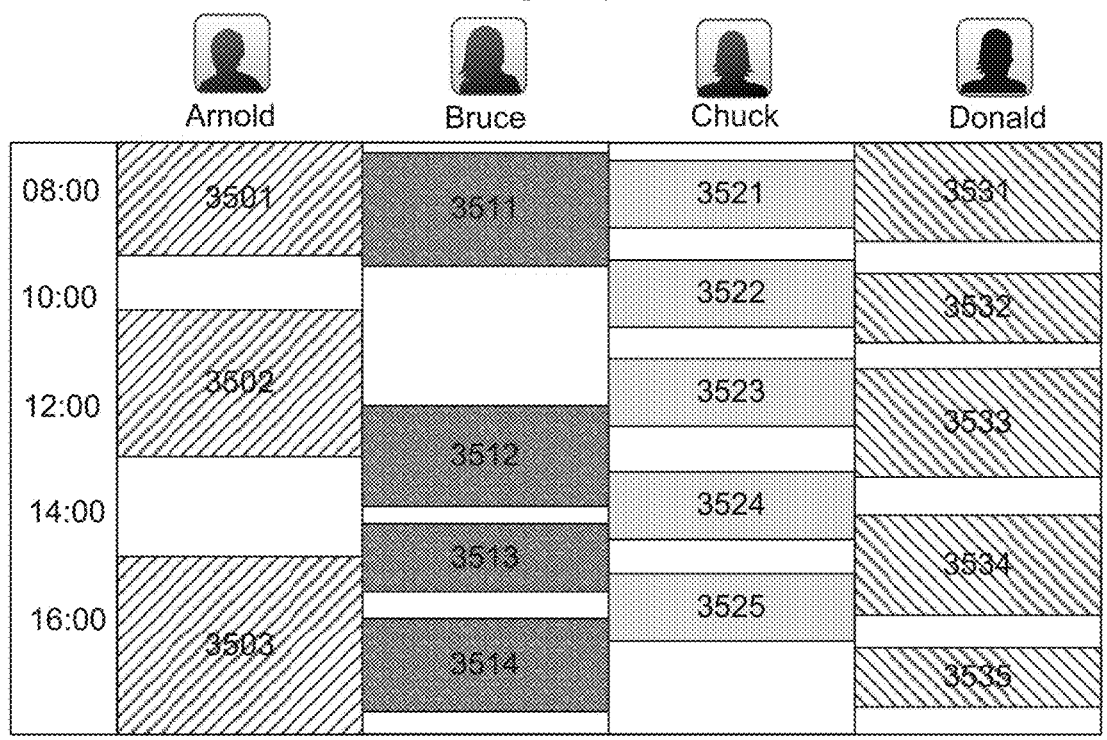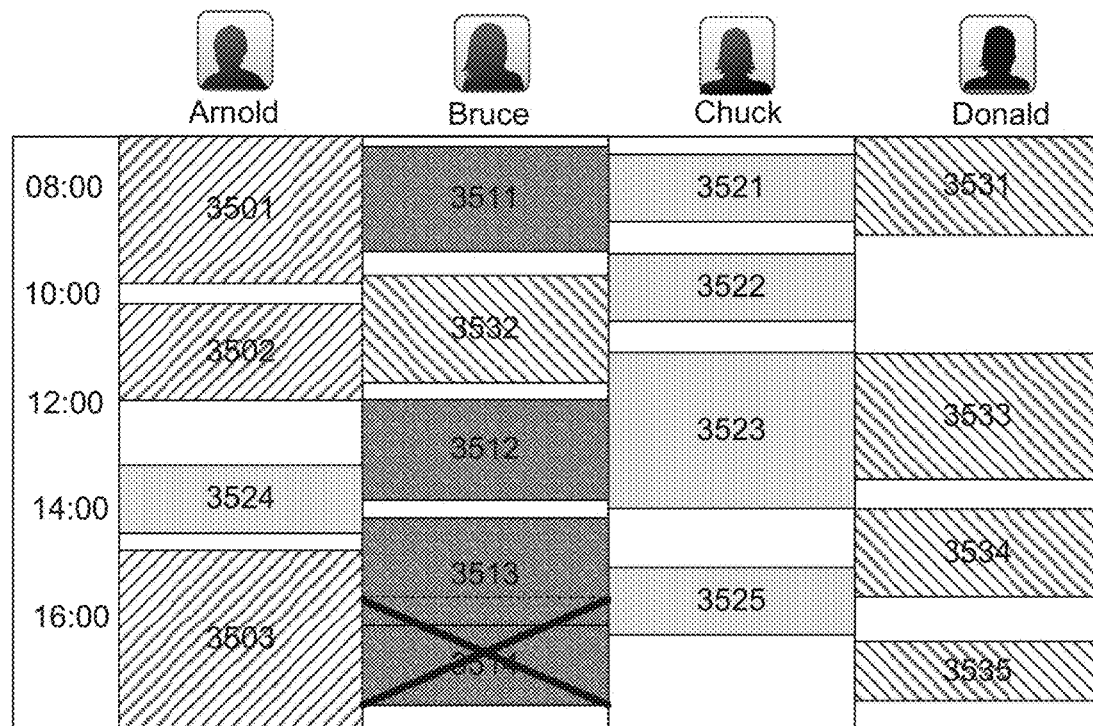
FIG. 35

| Request date | June 3 |
|---|---|
| Task duration | 20 minutes |
| Task date | June 14 |
| Field professional | Arnold |
| Customer type | Human |

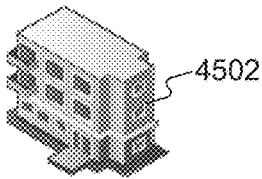

| Request date | June 2 |
|---|---|
| Task duration | 55 minutes |
| Task date | June 8 |
| Field professional | Bruce |
| Customer type | Human |

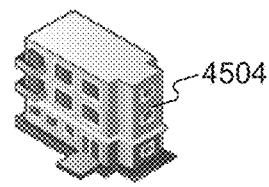

| Request date | June 6 |
|---|---|
| Task duration | 20 minutes |
| Task date | |
| Field professional | |
| Customer type | IoT Device |

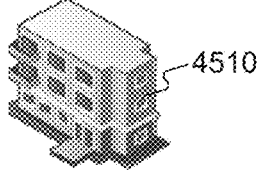

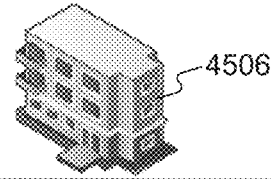

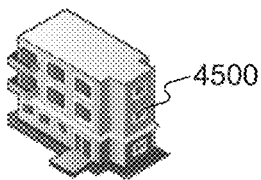

| Request date | June 5 |
|---|---|
| Task duration | 30 minutes |
| Task date | June 9 |
| Field professional | Chuck |
| Customer type | IoT Device |

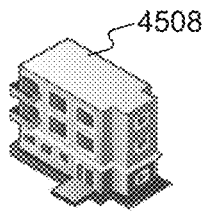

| Request date | June 5 |
|---|---|
| Task duration | 30 minutes |
| Task date | June 9 |
| Field professional | Chuck |
| Customer type | Human |

| Request date | June 3 |
|---|---|
| Task duration | 30 minutes |
| Task date | June 12 |
| Field professional | Donald |
| Customer type | IoT Device |

*FIG. 45*

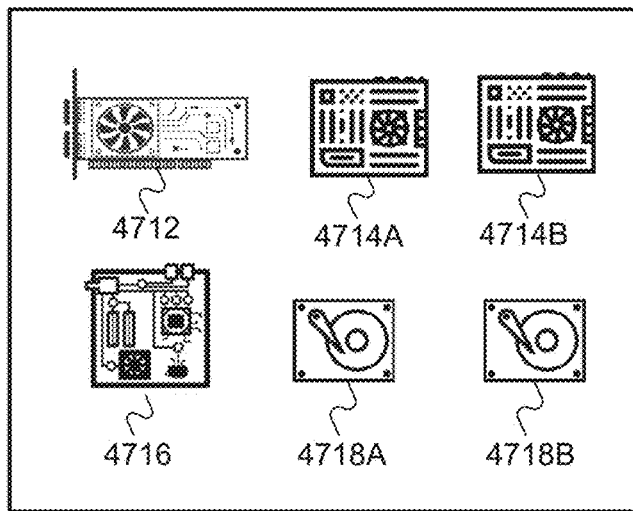
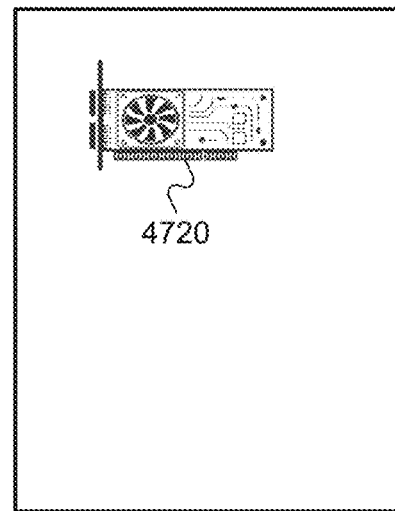
FIG. 47

4900

```
┌─────────────────────────────────────────────────────────────┐
│ Receiving a set of requests for on-site service, wherein the on- │ ⟵ 4902
│  site service of at least some of the requests require parts  │
└─────────────────────────────────────────────────────────────┘
                              │
                              ▼
┌─────────────────────────────────────────────────────────────┐
│ Scheduling a set of tasks corresponding with the set of requests │ ⟵ 4904
│                  to a field professional                     │
└─────────────────────────────────────────────────────────────┘
                              │
                              ▼
┌─────────────────────────────────────────────────────────────┐
│  Determining a set of parts the field professional is likely to  │ ⟵ 4906
│              require to complete the set of tasks            │
└─────────────────────────────────────────────────────────────┘
                              │
                              ▼
┌─────────────────────────────────────────────────────────────┐
│  Determining that the field professional needs an additional  │ ⟵ 4908
│  part not currently in the professional's assigned inventory to │
│                  complete the set of tasks                   │
└─────────────────────────────────────────────────────────────┘
                              │
                              ▼
┌─────────────────────────────────────────────────────────────┐
│ Scheduling a task for delivery in the field of the at least one │ ⟵ 4910
│            additional part to the field professional         │
└─────────────────────────────────────────────────────────────┘
```

```
┌─────────────────────────────────────────────────────────┐
│ Receiving a set of requests for on-site service,       │─ 4952
│ wherein the on-site service of at least some of the    │
│ requests require parts                                  │
└─────────────────────────────────────────────────────────┘
                            ▼
┌─────────────────────────────────────────────────────────┐
│ Scheduling a set of tasks corresponding with the set    │─ 4954
│ of requests to a field professional                     │
└─────────────────────────────────────────────────────────┘
                            ▼
┌─────────────────────────────────────────────────────────┐
│ Providing data indicative of expected parts that the    │─ 4956
│ field professional would need for completion of the     │
│ set of tasks                                            │
└─────────────────────────────────────────────────────────┘
                            ▼
┌─────────────────────────────────────────────────────────┐
│ Receiving from the field professional, while the field  │─ 4958
│ professional is at a location associated with a current │
│ task, a request for at least one additional part        │
└─────────────────────────────────────────────────────────┘
                            ▼
┌─────────────────────────────────────────────────────────┐
│ Scheduling a task for delivery in the field of the      │─ 4960
│ requested at least one additional part to the field     │
│ professional                                            │
└─────────────────────────────────────────────────────────┘
```

*FIG. 49B*

SYSTEMS AND METHODS FOR SCHEDULING TASKS

CROSS REFERENCES TO RELATED APPLICATIONS

This application claims the benefit of priority of U.S. Provisional Patent Application No. 62/785,423, filed on Dec. 27, 2018; and U.S. Provisional Patent Application No. 62/871,397, filed Jul. 8, 2019. All of the foregoing applications are incorporated herein by reference in their entirety.

BACKGROUND

I. Technical Field

The present disclosure relates generally to the field of managing service organizations. More specifically, the present disclosure relates to systems, methods, and devices for providing services such as services provided by professionals or experts in the field.

II. Background Information

One aspect of process management involves matching available resources to the tasks to be performed by or within an organization. In the service providers industry, for example, the main resources are the service professionals (such as field technicians, help desk or customer service operators, insurance assessors, business consultants, etc.) and their available work hours. Other resources may include vehicles, tools and equipment, spare parts, office space (e.g., meeting rooms), etc. The service tasks are usually initiated by customer requests, and typically cannot be precisely predicted on the micro-level, as there is no way to know when a customer will call and request assistance.

Service providers thus face the challenge of accurately managing the size, mix of skills, and regional allocation of their resources. Erring by allocating too few resources results in failing to meet customer expectations, risking losing customers, and sometimes requiring the service organization to pay contract-specified penalties. Erring by allocating too many resources results in spending excessive money on resources that are not fully utilized. Optimizing the schedule of tasks can increase productivity and revenue for the service provider.

The disclosed embodiments are directed to providing new and improved ways for scheduling tasks to field professionals that overcome problems and inefficiencies in existing systems.

SUMMARY

Consistent with disclosed embodiments, systems, methods, and computer readable media enable scheduling tasks to field professionals based on real-time conditions. For example, consistent with one aspect a disclosed system includes a network interface and a processor connectable to the network interface. The processor determines real-time schedule information for a set of field professionals independent from any schedule update received from the field professionals via the network interface. The processor also determines, from the real-time schedule information associated with a first field professional, existence of a delay associated with one or more tasks assigned to the first field professional. The processor further determines a likelihood that the delay will interfere with the first field professional arriving to an identified location associated with an assigned task at a scheduled time, and determines from real-time schedule information associated with a second field professional whether the second field professional can arrive to the identified location associated with the task assigned to the first field professional at the scheduled time. Thereafter, the processor reassigns the task assigned to the first field professional based on the real-time schedule information associated with the first field professional and the real-time schedule information associated with the second field professional. The processor also provides to at least one of the first field professional and the second field professional, using the network interface, information reflecting the reassignment of the task.

In another aspect, an additional system for scheduling tasks to field professionals based on real-time conditions is provided. The system includes a network interface and a processor connectable to the network interface. The processor is configured to: receive, from the network interface, progress information for a set of field professionals; determine a delay associated with one or more tasks assigned to a first field professional; determine a likelihood that the delay will interfere with the first field professional arriving to an identified location associated with an assigned task at a scheduled time; reassign the assigned task to a second field professional based on the determined likelihood that the delay will interfere with the first field professional arriving to the identified location associated with the assigned task at the scheduled time; and provide the second field professional, using the network interface, information reflecting the reassignment.

Consistent with disclosed embodiments, systems, methods, and computer readable media enable scheduling tasks to field professionals. For example, consistent with one aspect a disclosed system includes a network interface and a processor connectable to the network interface. The processor receives a set of requests reflecting demand for on-site services, wherein the set of requests is associated with a number of task types. The processor also receives availability data indicative of an availability of a plurality of field professionals to perform on-site services and skills data indicative of capabilities of each of the plurality of field professionals with respect to the task types. The processor further obtains at least one desired scheduling weight for the number of task types, and generates a schedule for the plurality of field professionals based on the demand for on-site services, the availability data, and the skills data. In one embodiment, generating the schedule for the plurality of field professionals comprises including a first task in the schedule when the first task conforms with the at least one desired scheduling weight and excluding a second task from the schedule when the second task does not conform with the at least one desired scheduling weight.

In another aspect, a method for scheduling tasks to field professionals is provided. The method includes: receiving a set of requests reflecting demand for on-site services, wherein the set of requests is associated with a number of task types; receiving availability data indicative of an availability of a plurality of field professionals to perform on-site services; receiving skills data indicative of capabilities of each of the plurality of field professionals with respect to the task types; obtaining at least one desired scheduling weight for the number of task types; generating a schedule for the plurality of field professionals based on the demand for on-site services, the availability data, and the skills data; and wherein generating the schedule for the plurality of field professionals comprises including a first task in the schedule when the first task conforms with the at least one desired scheduling weight and excluding a second task from the schedule when the second task does not conform with the at least one desired scheduling weight.

Consistent with disclosed embodiments, systems, methods, and computer readable media enable using predicted demand to optimize task scheduling. For example, consistent with one aspect a disclosed system includes a memory configured to store historical data associated with past demand for field professionals, a network interface, and a processor connectable to the network interface. The processor is receives a set of requests reflecting a current demand for on-site services, predicts imminent demand for on-site services based on the historical data, generates a schedule for a set of field professionals based on the current demand for on-site services, and reserves in the schedule availability based on the predicted imminent demand for on-site services.

In another aspect, an additional system for using predicted demand to optimize task scheduling is provided. The system includes a memory configured to store historical data associated with past demand for field professionals, a network interface, and a processor connectable to the network interface. The processor receives a set of requests for on-site service, wherein the set of requests are associated with a number of task types and each request is associated with a different location. The processor also uses the historical data to identify service zones in the geographical area associated with predicted demand for specific task types. The processor further determines, based on the requests, a set of daily schedules of tasks for a set of field professionals, and, for a certain daily schedule with a task associated with a location in proximity to an identified service zone, reserve capacity to account for predicted demand. Thereafter, the processor provides, using the network interface, directional instructions to a field professional assigned to the certain daily schedule to a location in proximity to a service zone.

Consistent with disclosed embodiments, systems, methods, and computer readable media enable scheduling technical services to be completed in a single visit. For example, consistent with one aspect a method includes: storing in a database a plurality of records reflecting characteristics associated with completing a set of technical services, wherein information in each record is derived from historical experience of completing each of the technical services; receiving a request for a new technical service associated with a location; and assigning a field professional to perform the new service having determined from information in the database a likelihood that the field professional will complete the new technical service in a single on-site visit at the location.

In another aspect, an additional system for scheduling technical services to be completed in a single visit is provided. The system includes a memory configured to store information including details of previously completed tasks, a network interface, and a processor connectable to the network interface. The processor receives a request for an on-site service at a selected location. The processor also identifies a set of attributes associated with the requested on-site service; and uses the stored information and the set of attributes to identify at least one requirement for completing the on-site service in a single visit. The processor further assigns a field professional to a task of providing the on-site service, wherein the assignment satisfies the identified at least one requirement. Thereafter, the processor may provide, using the network interface, information for directing the field professional to the selected location.

Consistent with disclosed embodiments, systems, methods, and computer readable media enable identifying causes for unscheduled tasks. For example, consistent with one aspect a disclosed system includes a network interface, a memory, and a processor connectable to the network interface. The memory is configured to store details of previously received requests for services. The processor receives, from the network interface, a set of requests for services; and schedule a set of tasks based on scheduling constraints, wherein each task is expected to be completed within a period of time from when a corresponding request was received. The processor also determines a common cause why at least two requests were not scheduled with tasks expected to be completed within the period of time, wherein the common cause is associated with at least one of the scheduling constraints; and enable reducing the number of future unscheduled tasks based on the determination.

In another aspect, an additional system for identifying causes for unscheduled tasks is provided. The system includes system that may include a network interface, a memory, and a processor connectable to the network interface. The memory is configured to store details of previously received requests for services. The processor may be configured to access the memory and to receive, from the network interface, a set of requests for services; schedule a set of tasks based on scheduling constraints. If the number of requests that were not scheduled with tasks expected to be completed within the period of time is greater than a predetermined threshold, the system may initiate an action, such as issuing a warning or automatically changing a scheduling constraint.

Consistent with disclosed embodiments, systems, methods, and computer readable media enable task scheduling for location-based and location-agnostic tasks. For example, consistent with one aspect a disclosed system includes a memory, network interface, and a processor connectable to the network interface. The processor receives a set of first requests for on-site assistance from a first set of users and receives a set of second requests for remote assistance from a second set of users. After receiving the first and second sets of requests, the processor assigns a plurality of location-based tasks associated with first requests to one or more field professional. The processor may then receive real-time information associated with the one or more field professional including current location and determine based on the real-time information whether the one or more field professional can complete a location-agnostic task associated with a second request after completing a first location-based task and before starting a second location-based task. Subsequently, the processor assigns the location-agnostic task to the one or more field professional.

In another aspect, an additional system for scheduling for location-based and location-agnostic tasks is provided. The system includes a memory, network interface, and a processor connectable to the network interface. The processor receives an urgency level of a location-agnostic task associated with a second request and to obtain information identifying one or more field professional as more suitable to provide the location-agnostic task than one or more second field professional. The information may consist of skills data, past experience, and ranking. After assigning the location-agnostic task, the processor instructs the one or more field professional to initiate the location-agnostic task before or after driving to a location associated with a location-based task.

Consistent with disclosed embodiments, systems, methods, and computer readable media enable a multi-route process for appointment booking. For example, consistent with one aspect a disclosed system includes a memory, network interface, and a processor connectable to the network interface. The processor receives a request to book a new appointment for a service. After receiving the request, the processor outputs a first booking response for the request, wherein the first booking response is determined using a multi-route model. The multi-route model is configured to determine booking responses in different ways. The processor verifies the first booking response based on a second booking response determined using the multi-route model.

In another aspect, an additional system for enabling a multi-route process for appointment booking is provided. The system includes a memory, network interface, and a processor connectable to the network interface. The processor receives a user refusal of a first offered appointment time. The processor then contacts the user and offers a first alternative appointment time determined by a first scheduling model, or a second alternative appointment time determined by a second schedule model. The processor may also be configured to attempt to change an existing assignment of a field professional to meet the first proposed time.

Consistent with disclosed embodiments, systems, methods, and computer readable media enable the scheduling of tasks to field professionals. For example, consistent with one aspect a disclosed method includes receiving a request to book a new appointment for a service, the service being expected to be completed within a time period; identifying a first possible time slot and a subsequent second possible time slot for the new appointment within the time period; calculating a first scheduling cost associated with the first possible time slot and a second scheduling cost associated with the second possible time slot and enabling selection of the second possible time slot when it is determined that both the first scheduling cost and the second scheduling cost are below a scheduling cost threshold; and outputting a no-available-time-slot notification when is determined that both the first scheduling cost and the second scheduling cost are above the scheduling cost threshold.

In another aspect, a system for scheduling of tasks to field professionals is provided. The system includes a network interface, a memory, and a processor connectable to the network interface. The processor estimates driving durations necessary to conduct an appointment. The processor also offers a proposed time associated with a second possible time slot later than the first possible time slot if the second driving duration is smaller than the first driving duration. The processor may also be configured to output a no-available-time-slot notification if the first driving duration and the second driving duration are greater than a driving duration threshold.

Consistent with disclosed embodiments, systems, methods, and computer readable media enable the scheduling of tasks for field professionals based on users' profile. For example, consistent with one aspect a disclosed system includes a network interface, a memory, and a processor connectable to the network interface. The processor receives a request from a user for an on-site service. The processor also identifies a set of possible time slots for providing the on-site service based on a schedule of a set of field professionals. Additionally, the processor retrieves information indicative of an availability of the user to accept the on-site service. The processor also determines a subset of possible time slots for providing the on-site service based on the retrieved information indicative of an availability of the user. Further, the processor may propose a time for providing the on-site service based on a time slot selected form the subset of possible time slots.

In another aspect, an additional system for scheduling of tasks for field professionals based on users' profile is provided. The system includes a network interface, a memory, and a processor connectable to the network interface. The processor receives from a user a request for a service. The processor also identifies a first possible time slot for providing the service associated with a first field professional and a second possible time slot later than the first possible time slot, wherein the second possible time slot is associated with a second field professional. The processor may also retrieve information indicative of the availability of the user to accept the service, Finally, the processor proposes a time associated with the second possible time slot later than the first possible time slot when the retrieved information suggests that the user will not be able to accept the service during the first time slot.

Consistent with disclosed embodiments, systems, methods, and computer readable media enable the scheduling of appointments from the customer's location. For example, consistent with one aspect a disclosed system includes a network interface, a memory, and a processor connectable to the network interface. The processor receives a request from a user for an on-site service associated with a location. Information reflecting an assignment is transmitted to a field professional. While the field professional is at the location, the field professional may, using a mobile device for example, send an indication that an additional visit is required to complete the on-site service. After receiving the indication, a schedule of the field professional is accessed to identify an available time slot in the future. A proposed time for the additional visit associated with the identified time slot is then provided.

In another aspect, a system for scheduling of additional appointments when a user declines a first time slot. The system includes a network interface, a memory, and a processor connectable to the network interface. The processor receives a request from a user for an on-site service associated with a location and identify a plurality of available time slots. If, after the plurality of available time slots are provided to the user, the user does not select one of the plurality of available time slots, additional information is retrieved indicative of an availability of the user. A subset of the plurality of time slots is determined based on the availability of the user. This subset is then provided to the user.

Consistent with disclosed embodiments, systems, methods, and computer readable media enable assigning a field professional to perform additional service based on customer feedback. For example, consistent with one aspect a disclosed system includes a network interface, a memory, and a processor connectable to the network interface. The processor receives a request from a user for an on-site service associated with a location. At least one field professional is assigned to at least one task of providing the at least one on-site service at the location. After the service is performed, data is obtained associated with the service, including user feedback. If another request is received from the user for an additional service associated, the processor retrieves information including data associated with the earlier service from memory. A field professional is then assigned to perform the additional service based on the retrieved information.

In another aspect, a system for assigning a field professional to perform additional service based on data associated with a prior service. The system includes a network interface, a memory, and a processor connectable to the network interface. The processor is configured to receive data associated with a service. The data may include recorded interactions between an employee and a user, feedback from a user after service is performed, metadata indicating service time associated with a field professional, social network posts by a user, and data from field professionals. The data may then be evaluated to determine a level of satisfaction.

Consistent with disclosed embodiments, systems, methods, and computer readable media enabling updating a scheduling engine that schedules tasks to field professionals. For example, consistent with one aspect a disclosed system includes at least one memory configured to store data associated with an optimization engine, a network interface, and a processor. The processor periodically receives from a remote server data associated with a native scheduling engine. Then, the processor processes in a stateless manner the data received periodically from the remote server using the optimization engine to update a prediction model. Thereafter, the processor transmits information associated with the updated prediction model to the remote server for enabling improvement of the native scheduling engine.

Consistent with disclosed embodiments, systems, methods, and computer readable media enabling scheduling tasks to field professionals using a remote optimization engine are disclosed. For example, consistent with one aspect a disclosed system includes at least one memory configured to store data associated with scheduled tasks, a network interface, and a processor. The processor receives a plurality of requests for on-site service from a plurality of users, wherein the requests are associated with a plurality of locations. The processor also schedules a set of tasks from the plurality of requests using a native scheduling engine. Then, the processor updates the native scheduling engine based on information received from a remote server, and uses the native scheduling engine on the previously scheduled set of tasks to identify a task scheduled in an unoptimized manner. Thereafter, the processor causes a schedule change associated with the identified task.

Consistent with disclosed embodiments, systems, methods, and computer-readable media enable assigning tasks based on real-time conditions. For example, consistent with one aspect a disclosed system includes a network interface and a processor. The processor provides a field professional with information about a daily schedule of assigned tasks associated with a set of requests for on-site services. The processor also receives real-time information reflecting a likelihood the field professional will complete the daily schedule of assigned tasks. The processor may determine, from the real-time information, existence of an unplanned event likely to interfere with the field professional completing at least one task from the daily schedule. Thereafter, the processor also presents a plurality of optional tasks to the field professional based on the determination. Upon detecting a selection of one of the plurality of optional tasks, the processor assigns the field professional to the selected task and unassign the at least one task.

Consistent with disclosed embodiments, systems, methods, and computer-readable media enable assigning tasks based on real-time conditions. For example, consistent with one aspect a disclosed system includes memory configured to store historical data associated with assignments of tasks for a plurality of field professionals when windows of opportunity are identified, a network interface, and a processor. The processor receives a set of requests for on-site service from a plurality of users, wherein each request is associated with a different location. The processor also receives real-time information about a progress of a field professional assigned to a set of tasks associated with a subset of requests. The processor may dynamically determine a window of opportunity to assign an additional task to the field professional and may identify a plurality of optional tasks that the field professional is determined to be able to complete during the window of opportunity. Thereafter, the processor automatically selects one of the optional tasks for assignment to the field professional based on the historical data; and assigns the field professional to the selected task.

Consistent with disclosed embodiments, systems, methods, and computer readable media enabling scheduling services to customers and connected devices. For example, consistent with one aspect a disclosed system includes a processor connectable to a network interface. The processor receives a first request for an on-site service; the first request includes information identifying a location associated with a customer. The processor also schedules a task associated with the first request to be performed by a field professional on a first scheduled date. After scheduling the task associated with the first request, for example, the processor may receive a second request from a connected device for an on-site service. The second request may have an associated urgency level determined from information received from the connected device. The processor may further determine a time period that corresponds with the associated urgency level of the on-site service for the connected device and schedule a task associated with the second request to be performed by the field professional or another field profession on a second scheduled date based on the associated urgency level. The first scheduled date and the second scheduled date may be the same date or different dates. The processor may also receive confirmation that the task associated with the first request and the task associated with the second request have been completed.

In another aspect, an additional system for scheduling services to customers and connected devices is provided. The system includes a network interface and a processor connectable to the network interface. The processor receives a first request for an on-site service; the first request includes information identifying a location associated with a customer. The processor schedules a task associated with the first request to be performed by a field professional on a first scheduled date. The processor may also receive a second request from a connected device for an on-site service at a second location in proximity to the first location. The on-site service for the connected device may have an associated urgency level. The processor may determine a time period that corresponds with the associated urgency level of the on-site service for the connected device, and determine, based on the time period, that the on-site service for the connected device can be scheduled at the certain date. Thereafter, the processor assigns a single field professional to provide the on-site services in the first location and in the second location at the certain date.

Consistent with disclosed embodiments, systems, methods, and computer readable media enabling scheduling parts delivery. For example, consistent with one aspect a disclosed system includes a network interface and a processor connectable to the network interface. The processor receives a set of requests for on-site services, wherein the on-site services of at least some of the requests require parts, for example replacement parts. The processor also assigns a set of tasks corresponding with the set of requests to a field professional. In addition, the processor determines a set of parts the field professional is likely to require to complete the assigned set of tasks, and determines that the field professional needs an additional part not currently in the field professional's inventory to complete the set of tasks. Thereafter, the processor may schedule a task for delivery in the field of the at least one additional part to the field professional.

In another aspect, an additional system for scheduling parts delivery is provided. The system includes a network interface and a processor connectable to the network interface. The processor receives a set of requests for on-site services, wherein the on-site services of at least some of the requests require parts. The processor further schedules a set of tasks corresponding with the set of requests to a field professional. The processor may also provide data indicative of expected parts that the field professional would need for completion of the set of tasks. In addition, the processor receives from the field professional, while the field professional is at a location associated with a current task, a request for at least one additional part. Thereafter, the processor schedules a task for delivery in the field of the requested at least one additional part to the field professional.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 35 is a diagram showing two schedules of field professionals scheduled using different versions of scheduling engines, consistent with the present disclosure.

FIG. 45 is a schematic map showing locations of scheduled on-site services for connected devices and locations of scheduled on-site services for human customers, consistent with the present disclosure;

FIG. 47 is a diagram showing a field professional's usage of parts throughout a workday, consistent with the present disclosure;

FIG. 49A is a flowchart showing an exemplary process for scheduling parts delivery, consistent with a disclosed embodiment; and FIG. 49B is a flowchart showing another exemplary process for scheduling parts delivery, consistent with a disclosed embodiment.

DETAILED DESCRIPTION

Introduction

Figure 1:
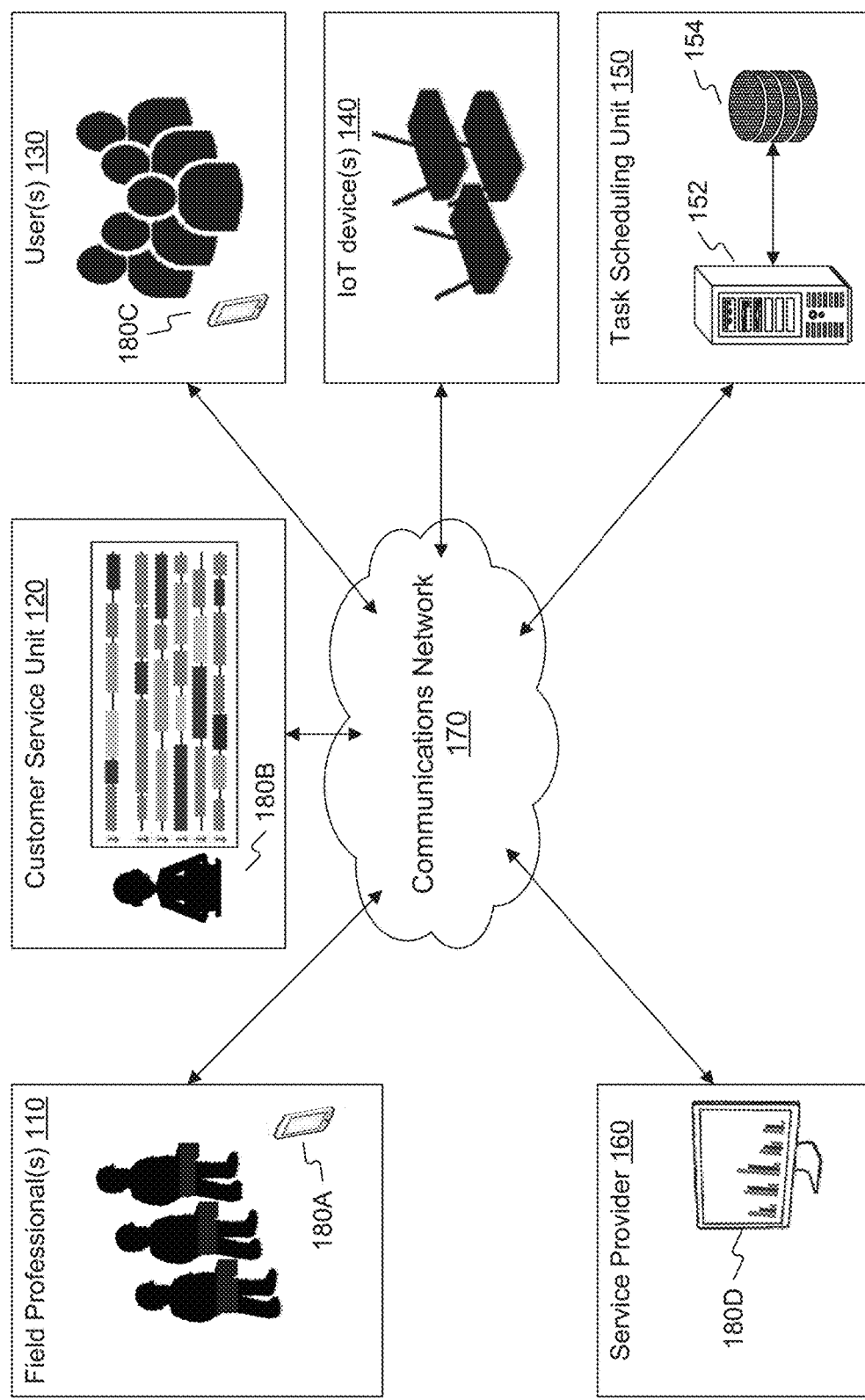
FIG. 1 is a schematic illustration of an example system for scheduling tasks to field professionals, consistent with the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for distributing resources in the field, including professionals, engineers, agents, and the like. The term "field professional" refers, for example, to a trained and/or qualified individual who provides services (often, expert) at a location or worksite. For example, in the home utilities industry, field professionals may be certified technicians who are trained to install, replace, or repair electrical equipment. In the telecommunications and cable industry, field professionals may be individuals who install cable or run telephone lines into residences or business establishments. In heavy engineering, mining, industrial and manufacturing, field professionals may be individuals who are dispatched for preventative maintenance and repair. In property maintenance, field professionals may be individuals who are dispatched for landscaping, irrigation, and home and office cleaning. In the HVAC industry, field professionals may be individuals who have the expertise and equipment to investigate units in residential, commercial and industrial environments. In healthcare, field professionals may be individuals who provide in-home care for elderly or disabled. In gas utilities, field professionals may be individuals who are dispatched to investigate and repair suspected leaks. As used herein, the term "and/or" refers to and encompasses any and all possible combinations of one or more of the associated listed items, as well as the lack of combinations when interpreted in the alternative ("or").

In embodiments consistent with this disclosure, systems and methods are used to schedule tasks to one or more field professionals. The term "scheduling tasks" is used herein to refer, for example, to a process for determining an order (e.g., chronological order) for a set of tasks a field professional performs. The tasks may be associated with requested services and require a field professional to travel to different locations. There are different types of scheduled tasks, for example, installing, replacing, or repairing objects, and each task type may require a different skill set. In addition, some scheduled tasks may be location-based tasks that require the field professional to visit a customer's location, for example, business or residence, and some tasks may be location-agnostic tasks that do not require the field professional to visit a customer's location. Location-agnostic tasks may be viewed as support sessions that a technician can perform remote from the customer place.

A system consistent with the present disclosure is configured to manage a number of field professionals (e.g., more than 50 field professionals, more than 250 field professionals, more than 750 field professionals), and the term "scheduling tasks" may also include selecting which field professional will be assigned to each task. In some embodiments, scheduling tasks may include generating a daily schedule for each field professional.

In one embodiment, the system may receive one or more requests for technical services. The term "request" includes, for example, an indication that a service (for example, a technical service) is needed. In one embodiment, the request may be initiated by a customer and received via a telephone call, an email, a support chat, a text message, or any form of communication. In another embodiment, the request may be initiated by device (for example, a connected device that can sense the need for a service and communicate that need to a service provider, sometimes referred to as an "IoT device"). The request may include information identifying the location where the technical service is requested (e.g., an address).

Reference is now made to FIG. 1, which shows an example of a system 100 for scheduling tasks to field professionals 110. In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may include a customer service unit 120 configured to receive a set of requests for on-site technical assistance from users 130 and/or directly from IoT devices 140. Customer service unit 120 may also schedule appointments with field professionals 110 for providing the on-site service based on the availability of with field professionals 110 and system constraints. In another embodiment, system 100 may include a task scheduling unit 150 for processing the received requests in view of the existing schedule of tasks and provide recommendations for appointments that enable greater optimization of scheduling all the field professionals as a whole. In another embodiment, system 100 may provide service provider 160 statistics based on an analysis of information reflective of the service performances. Network 170 may facilitate communications and data exchange between different system components and the different entities associated with system 100.

Consistent with the present disclosure, task scheduling unit 150 may include a server 152 and a database 154. In one example configuration, server 152 may be a cloud server that processes request received directly (or indirectly) from one or more users 130 and determine, based on the requests, a set of daily schedules of tasks for field professionals 110. The term "cloud server" refers to a computer platform that provides services via a network, such as the Internet. In this example configuration, server 152 may use virtual machines that may not correspond to individual hardware. For example, computational and/or storage capabilities may be implemented by allocating appropriate portions of desirable computation/storage power from a scalable repository, such as a data center or a distributed computing environment. In one example, server 152 may implement the methods described herein using customized hard-wired logic, one or more Application Specific Integrated Circuits (ASICs) or Field Programmable Gate Arrays (FPGAs), firmware, and/or program logic which, in combination with the computer system, cause server 152 to be a special-purpose machine.

As depicted in FIG. 1, server 152 may be coupled to one or more physical or virtual storage devices such as database 154. Server 152 may access database 154 to determine, for example, the availability of field professionals 110 and to use historical data to predict factors that may affect the completion of tasks. Database 154 may utilize a volatile or non-volatile, magnetic, semiconductor, tape, optical, removable, non-removable, or other type of storage device or tangible or non-transitory computer-readable medium. Database 154 may also be part of server 152 or separate from server 152 as shown. When database 154 is not part of server 152, for example, server 152 may exchange data with database 154 via a communication link as shown. Database 154 may include one or more memory devices that store data and instructions used to perform one or more features of the disclosed embodiments. In one embodiment, database 154 may include any suitable databases, ranging from small databases hosted on a workstation to large databases distributed among data centers. Database 154 may also include any combination of one or more databases controlled by memory controller devices (e.g., server(s), etc.) or software. For example, database 154 may include document management systems, Microsoft SQL databases, Share Point databases, Oracle™ databases, Sybase™ databases, other relational databases, or non-relational databases, such as mongoDB™ and others.

Consistent with the present disclosure, task scheduling unit 150 may exchange data with a variety of communication devices 180 associated with the different entities associated with system 100. The term "communication device" is intended to include all possible types of devices capable of exchanging data using communications network 170. In some examples, the communication device may include a smartphone, a tablet, a mobile station, a personal digital assistant, a desktop, a laptop, an IoT device (e.g., IoT device 140), a dedicated terminal, and any other device that enables data communication. In one embodiment, task scheduling unit 150 may provide to a field professional communication device 180A information reflecting the assignment of tasks and receive progress information derived at least partially from a location circuit of communication device 180A. In another embodiment, task scheduling unit 150 may present to a customer service communication device 180B possible time slots for scheduling new technical services and receive a selection of appointments. In another embodiment, task scheduling unit 150 may transmit to a user communication device 180C updates about an oncoming technical service and receive feedback about previously completed tasks. In another embodiment, task scheduling unit 150 may present a service provider communication device 180D a recommendation for reducing the number of future unscheduled tasks and receive a desired scheduling weight for different task types.

Consistent with the present disclosure, communications network 170 may be any type of network (including infrastructure) that supports communications, exchanges information, and/or facilitates the exchange of information between the components of system 100. For example, communications network 170 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

The components and arrangements shown in FIG. 1 are not intended to limit the disclosed embodiments, as the system components used to implement the disclosed processes and features may vary. In one embodiment, task scheduling unit 150 may include a set of servers 152, with each server 152 hosting a certain type of service. For example, a first server may host a native scheduling engine for scheduling, and a second server may compare in a stateless manner the data associated with the scheduled tasks using an optimization engine to detect if the native scheduling engine scheduled tasks in an unoptimized manner.

Figure 2:
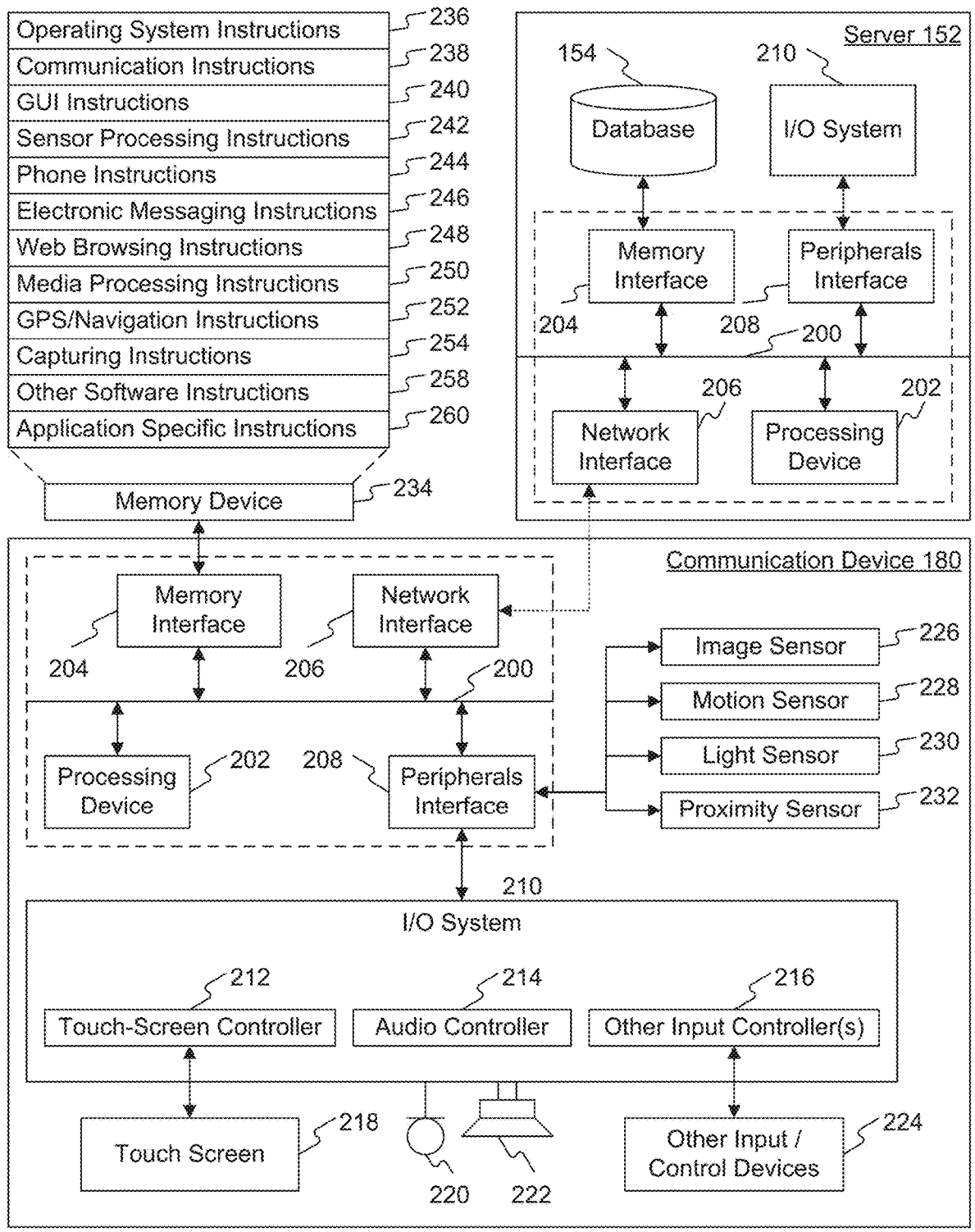
FIG. 2 is a block diagram that illustrates some of the components the system of FIG. 1, consistent with the present disclosure.

FIG. 2 is a block diagram of example configurations of server 152 and communication device 180. In one embodiment, both server 152 and communication device 180 includes a bus 200 (or other communication mechanism) that interconnects subsystems and components for transferring information within server 152 and/or communication device 180. For example, bus 200 may interconnect a processing device 202, a memory interface 204, a network interface 206, and a peripherals interface 208 connected to I/O system 210.

Processing device 202, shown in FIG. 2, may include at least one processor configured to execute computer programs, applications, methods, processes, or other software to perform embodiments described in the present disclosure. For example, the processing device may include one or more integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The processing device may include at least one processor configured to perform functions of the disclosed methods such as a microprocessor manufactured by Intel™. The processing device may include a single core or multiple core processors executing parallel processes simultaneously. In one example, the processing device may be a single core processor configured with virtual processing technologies. The processing device may implement virtual machine technologies or other technologies to provide the ability to execute, control, run, manipulate, store, etc., multiple software processes, applications, programs, etc. In another example, the processing device may include a multiple-core processor arrangement (e.g., dual, quad core, etc.) configured to provide parallel processing functionalities to allow a device associated with the processing device to execute multiple processes simultaneously. It is appreciated that other types of processor arrangements could be implemented to provide the capabilities disclosed herein.

In some embodiments, processing device 202 may use memory interface 204 to access data and a software product stored on a memory device or a non-transitory computer-readable medium. For example, server 152 may use memory interface 204 to access database 154. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within communication device 180, server 152, or at a remote location. Additionally, one or more computer-readable storage mediums can be utilized in implementing a computer-implemented method. The term "computer-readable storage medium" should be understood to include tangible items and exclude carrier waves and transient signals.

Both communication device 180 and server 152 may include network interface 206 coupled to bus 200. Network interface 206 may provide a two-way data communication to a network, such as network 170. In FIG. 2, the communication between communication device 180 and server 152 is represented by a dashed arrow. In one embodiment, network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which communication device 180 and server 152 are intended to operate. For example, in some embodiments, communication device 180 may include network interface 206 designed to operate over a GSM network, a GPRS network, an EDGE network, a Wi-Fi or WiMax network, and a Bluetooth® network. In any such implementation, network interface 206 may be configured to send and receive electrical, electromagnetic or optical signals that carry digital data streams representing various types of information.

Both communication device 180 and server 152 may also include peripherals interface 208 coupled to bus 200. Peripherals interface 208 be connected to sensors, devices, and subsystems to facilitate multiple functionalities. In one embodiment, peripherals interface 208 may be connected to I/O system 210 configured to receive signals or input from devices and providing signals or output to one or more devices that allow data to be received and/or transmitted by communication device 180 and server 152. In one example, I/O system 210 may include a touch screen controller 212, audio controller 214, and/or other input controller(s) 216. Touch screen controller 212 may be coupled to a touch screen 218. Touch screen 218 and touch screen controller 212 can, for example, detect contact, movement or break thereof using any of a plurality of touch sensitivity technologies, including but not limited to capacitive, resistive, infrared, and surface acoustic wave technologies as well as other proximity sensor arrays or other elements for determining one or more points of contact with the touch screen 218. Touch screen 218 can also, for example, be used to implement virtual or soft buttons and/or a keyboard. While a touch screen 218 is shown in FIG. 2, I/O system 210 may include a display screen (e.g., CRT or LCD) in place of touch screen 218. Audio controller 214 may be coupled to a microphone 220 and a speaker 222 to facilitate voice-enabled functions, such as voice recognition, voice replication, digital recording, and telephony functions. The other input controller(s) 216 may be coupled to other input/control devices 224, such as one or more buttons, rocker switches, thumbwheel, infrared port, USB port, and/or a pointer device such as a stylus.

With regards to communication device 180, peripherals interface 208 may also be connected to an image sensor 226 for capturing image data. The term "image sensor" refers to a device capable of detecting and converting optical signals in the near-infrared, infrared, visible, and ultraviolet spectrums into electrical signals. The electrical signals may be used to form an image or a video stream (i.e., image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 226 may be part of a camera included in communication device 180. According to some embodiments, peripherals interface 208 may also be connected to a motion sensor 228, a light sensor 230, and a proximity sensor 232 to facilitate orientation, lighting, and proximity functions. Other sensors (not shown) can also be connected to the peripherals interface 208, such as a temperature sensor, a biometric sensor, or other sensing devices to facilitate related functionalities. In addition, a GPS receiver can also be integrated with, or connected to, communication device 180. For example, a GPS receiver can be built into mobile telephones, such as smartphone devices. GPS software allows mobile telephones to use an internal or external GPS receiver (e.g., connecting via a serial port or Bluetooth).

Consistent with the present disclosure, communication device 180 may use memory interface 204 to access memory device 234. Memory device 234 may include high-speed random-access memory and/or non-volatile memory such as one or more magnetic disk storage devices, one or more optical storage devices, and/or flash memory (e.g., NAND, NOR). Memory device 234 may store an operating system 236, such as DARWIN, RTXC, LINUX, iOS, UNIX, OSX, WINDOWS, or an embedded operating system such as VXWorkS. The operating system 236 can include instructions for handling basic system services and for performing hardware-dependent tasks. In some implementations, the operating system 236 can be a kernel (e.g., UNIX kernel).

Memory device 234 may also store communication instructions 238 to facilitate communicating with one or more additional devices, one or more computers and/or one or more servers. Memory device 234 can include graphical user interface instructions 240 to facilitate graphic user interface processing; sensor processing instructions 242 to facilitate sensor-related processing and functions; phone instructions 244 to facilitate phone-related processes and functions; electronic messaging instructions 246 to facilitate electronic-messaging related processes and functions; web browsing instructions 248 to facilitate web browsing-related processes and functions; media processing instructions 250 to facilitate media processing-related processes and functions; GPS/navigation instructions 252 to facilitate GPS and navigation-related processes and instructions; capturing instructions 254 to facilitate processes and functions related to image sensor 226; and/or other software instructions 258 to facilitate other processes and functions. Memory device 234 may also include application specific instructions 260 to facilitate a process for providing real-time information about a progress of a field professional assigned to a number of tasks associated with a subset of requests.

Each of the above identified instructions and applications may correspond to a set of instructions for performing one or more functions described above. These instructions need not be implemented as separate software programs, procedures, or modules. Memory device 234 may include additional instructions or fewer instructions. Furthermore, various functions of communication device 180 may be implemented in hardware and/or in software, including in one or more signal processing and/or application specific integrated circuits. For example, communication device 180 may execute an image processing algorithm to identify objects in a received image. In addition, the components and arrangements shown in FIG. 2 are not intended to limit the disclosed embodiments. As will be appreciated by a person skilled in the art having the benefit of this disclosure, numerous variations and/or modifications may be made to the depicted configuration of server 152. For example, not all components may be essential for the operation of server 152 in all cases. Any component may be located in any appropriate part of server 152, and the components may be rearranged into a variety of configurations while providing the functionality of the disclosed embodiments. For example, some servers may not include some of the elements shown in I/O system 210.

Figure 3A:
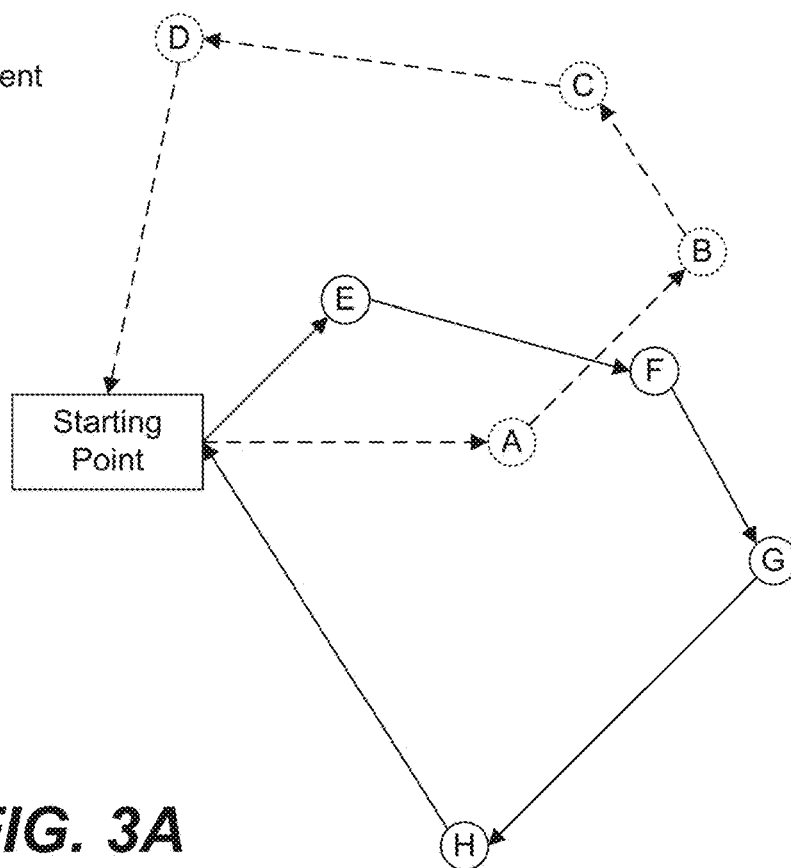
FIG. 3A and FIG. 3B are schematic maps used to illustrate an example of the daily schedule of tasks of two field professionals, consistent with the present disclosure.
Figure 3B:
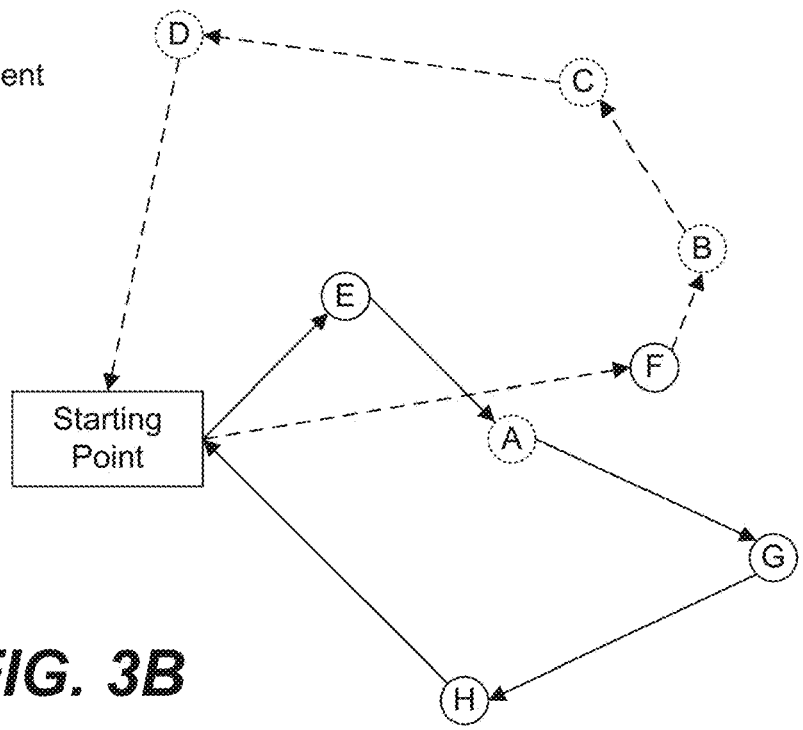

FIGS. 3A and 3B depict two schematic maps illustrating the planned daily schedule of two field professionals and the updated daily schedule of the two field professionals. As shown in FIG. 3A, the first field professional was assigned to tasks for providing technical service at locations A, B, C, D; and the second field professional was assigned to tasks for providing technical service at locations E, F, G, H. The planned route of the first field professional is illustrated in a dashed line and the planned route of the second field professional is illustrated in a solid line. Assuming that the first field professional was scheduled to be at location "A" at 10:36 and at location "B" at 11:39; and the second field professional was scheduled to be at location "E" at 10:15 and at location "F" at 11:09. In the illustrated example, server 152 received at 9:15, from network interface 206, real-time information for the first and second field professionals. In one embodiment, the real-time information may include current location information derived at least partially from location circuits of field professionals' communication devices 180A. For example, the real-time information may indicate that first field professional is stuck on the road to location "A." In another embodiment, the real-time information may include task status updates transmitted from field professionals' communication devices 180A. For example, the real-time information may indicate that the second field professional had finished the assignment earlier than the estimated time for the completion of the task associated with location "E." Based on the real-time progress information, and as shown in FIG. 3B, server 152 may reassign the first field professional to a task associated location "F," and reassign the second field professional to a task associated location "A." Thus, the updated schedule of first field professional includes tasks associated with locations F, B, C, and D and the updated schedule of second field professional includes tasks associated with locations E, A, G, H.

Consistent with the present disclosure, server 152 may determine from real-time information a delay associated with one or more tasks assigned to a first field professional, and that there is a likelihood that the delay will interfere with the first field professional arriving at an identified location associated with an assigned task at a scheduled time. For example, at 9:15, server 152 may determine that the first field professional cannot make it to location "A" before 9:40. Therefore, server 152 may reassign the assigned task to a second field professional based on the real-time information and the determined likelihood that the delay will interfere with the first field professional arriving at location "A" at 10:36. Server 152 may provide the second field professional, using network interface 206, information reflecting the assignment of the task associated with location "A." In one embodiment, the information reflecting the assignment of the first task includes directional instructions to location "A" (e.g., a location, an address, a driving route). In another embodiment, the information reflecting the assignment of the first task includes details about a customer associated location "A" (e.g., a name, a phone number). In another embodiment, the information reflecting the assignment of the first task includes a description of the first task (e.g., tools, spare parts, existing infrastructure).

Figure 4:
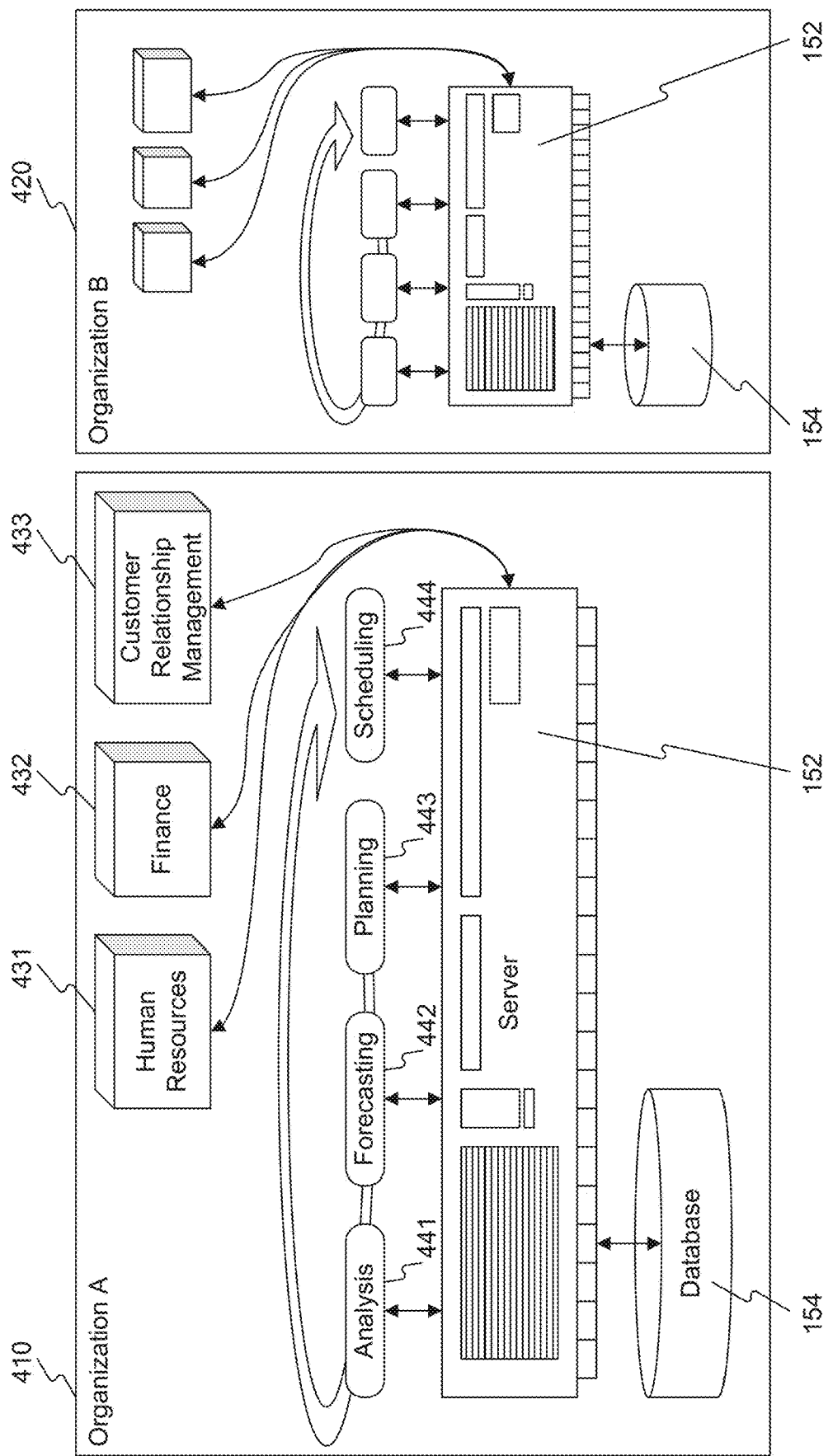
FIG. 4 is a schematic illustration of an example system, consistent with the present disclosure.

FIG. 4 provides a high-level illustration of system 100, according to embodiments of the disclosure. It illustrates the integrated access, management and analysis to service operations data within one organization, and the interaction with other organizations. Also shown is the interaction with other corporate Management Information Systems (MIS). The figure shows server 152, using database 154 (which may be a set of synchronized databases) to support a client software operated by users concerned with some combination of the basic service management tasks. System 100 may include an analysis module 441, a forecasting module 442, a planning module 443, a scheduling module 444, and a database access module (not shown). Modules 441, 442, 443, and 444 may contain software instructions for execution by at least one processing device, e.g., processing device 202. The function of the modules is described in detail below.

Consistent with the present disclosure, server 152 may extract information, and convey management decisions, to other units, including: human resources 431 for interacting with information about available staff, their calendars (i.e., vacation, training, overtime, etc.) and their mix of skills (which may be affected by changes in training plans); finance 432 for examining, and reporting, the implications of decisions such as authorizing overtime or subcontracting some work; and customer relationship management 433 for interacting with past and current data of detailed and aggregated customer demands. FIG. 4 also shows how two or more organizations using the same system may make their operations and cooperation much more effective by automatically transmitting relevant information between their servers. One example is outsourcing, in which a planning decision in organization A (marked as 410) to outsource work to organization B (marked as 420) may be conveyed to organization B, and appears there as a change in forecast demand, requiring re-iteration of the planning process. Such an arrangement may enable a large service organization to form customer-facing portals and subcontractor-facing portals to streamline and optimize its operations. This subcontractor-facing portal is also known as B2B (Business-to-Business) application, as well as "private marketplace" or "public marketplace" depending on their openness.

According to the present disclosure, analysis module 441, forecasting module 442, planning module 443, scheduling module 444, database access module, and database 154 may cooperate to perform multiple operations associated with the assignment of field professionals. For example, forecasting module 442 may include macro-level forecasting software, which analyzes past demand and actual service operations performance, together with expected future events (e.g., new product launch) to predict demands aggregated or separated along the different types of decisions that characterize customer demand and the decision inherent in answering a customer demand. While some of the data used comes from analysis module 441, forecasting module 442 may be used as a decision-making tool letting managers define their expectations (out of the different possible predictions and scenarios) and commit to the decision that planning should proceed in a manner consistent with these decisions.

Planning module 443 may include macro-level planning software for analyzing demands at various aggregation levels and rough allocation of resources to meet these demands. This module supports the analysis of expected demands side-by-side with allocated resources, checking the impact of various resource-management decisions on the organization's capability to meet demands (including "what-if" analysis" and managing different alternative scenarios concurrently), and communicating the planning decisions so that they are used in further operations—scheduling, work-force management, training etc.

Scheduling module 444 may include micro-level planning software for assigning specific values to the different characteristic of each task, including resource assignments, time scheduling and geographic routing. Analysis module 441 may include reporting and querying tool for data analysis and datamining at all levels, from most general to most specific, across any dimension. The analysis may support both human-initiated drill-down and ad-hoc querying and comparison operations, as well as intelligent software-directed data mining tools. This module may be concerned mostly with analysis of existing data, and not with any decision-making.

According to some embodiments, server 152 may distinguish between three types of aggregated demands: group A: aggregated demands originating from a projected forecast; group B: aggregated demand originating from customers who present their demand in an aggregated way only, for example "I need 5000 hours of telephone installation in August"; and group C: individualized, itemized known demand that is aggregated into a group B demand, because a temporary concern is made only to a rough capacity assessment question, or to a rough resource allocation. At any given point of time and for a certain time duration, a manager of service provider 160 may be interested in the aggregated answers for the entire demand (A+B+C) for that time duration. Yet for the more immediate horizon, and for the part of group C individualized demand required in this time duration, the manager of service provider 160 may need to have the micro-level scheduling plan from scheduling module 444.

The integrated nature of system 100 enables service provider 160 to take the most appropriate path between the options described below, mixing and integrating between work flows, hierarchical levels, and hierarchies along any dimension (i.e., hierarchies of time scales, intra-organizational and inter-organizational structures, geographical regions, demand types, skill sets etc.). For example, in some embodiments, server 152 may use the forecasting module 442 to collect historical information as well as future-event information (e.g., new product launch) in order to generate and refine group A demands; use planning module 443 for macro-level planning on group A+B+C; run scheduling module 444 on itemized group C; run analysis module 441 on the schedule of itemized group C to obtain information.

The obtained information may include: for a user-specified time period, what are the total number of service calls delivered in each of the geographic regions; for any given service professional, for a user-specified time period, what customers did he work for, how many hours for each one, and the total for that professional; for any given customer, for a user-specified time period, which field professionals worked for him, and the total work and costs; division of work time between actual on-site work, travel, region, service field professional's seniority or skills, and other general or specific data associated with a time of year, etc. (e.g., training, vacation, and absences). In addition, server 152 may use the information from analysis module 441 to modify and refine forecasting module 442 and planning module 443 decisions. For instance, the average time duration of tasks.

In other embodiments, server 152 may exploit the capabilities of supporting multiple hierarchies, aggregations, and discrepancy detection, to support the process of conciliating downward-flowing management decisions with upward-flowing information from the workforce as well as from existing and potential customers. In one example, server 152 may use forecasting module 442 (assisted by analysis module 441) to generate demand predictions on a detailed level (e.g., per each region and/or per each demand type) and propagate the sums upwards to present higher-level aggregations (also referred to herewith as "bottom-up" forecasting). In another example, server 152 may use forecasting module 442 (assisted by analysis module 441) to generate high-level aggregated demand predictions, combine them with management guidelines (e.g., ratios between demand types, training quotas, ratio of travel time to on-site time) and propagate these forecasts downwards (also referred to herewith as "top-down" forecasting). In another example, server 152 may use forecasting module 442 to detect and resolve discrepancies between high-level and low-level forecast numbers, and between divisions across different dimensions (e.g., size of demand isolated across regional, temporal, and demand-type dimensions). In another example, server 152 may use planning module 443 to allocate resources on a detailed level (e.g., per each region and/or per each demand type) and propagate the sums upwards to present higher-level aggregations (also referred to herewith as "bottom-up" planning). In another example, server 152 may use planning module 443 to generate higher-level aggregated resource allocations, combined with management guidelines (e.g., budget, overtime policies) and propagate these plans downwards (also referred to herewith as "top-down" planning). In another example, server 152 may use planning module 443 to detect and resolve discrepancies between high-level and low-level resource allocation numbers, and between divisions across different dimensions (e.g., size of demand separated across regional, temporal and demand-type dimensions).

In other embodiments, server 152 may have the capability to iteratively go back to decisions and commitments made in any prior step and change them. When such a change is made, system 100 may propagate the effects of the change across all the affected data, hierarchies, and decisions. When such a propagation results in a discrepancy, the problem may be automatically highlighted and service provider 160 may be optionally presented with a list of possible decisions that may resolve the problem.

The following is one example illustrating this capability: using the forecasting module 442, Jane, an organization's service manager, generates a top-level resource allocation plan for the coming quarter (e.g., Q4). David, a manager for region A, now needs to refine the details of Jane's top-level plan for the coming quarter. Jane has allocated for region A enough resources to satisfy the projected demands for that region. However, using planning module 443 to assess region-specific needs and forecasting, as reflected by forecasting module 442. David finds that there will not be enough resources in his region to cover an expected demand for a specific task type (e.g., not enough service engineers are qualified for network installation). Optionally, planning module 443 may suggest several possible resolutions, such as outsourcing, transferring resources from another region, and allowing more overtime. David chooses to resolve the discrepancy by transferring resources from another region. He contacts Joe, a manager of neighboring region B, to check whether Joe has a surplus of resources for network installation. If so, David and Joe need to check the extra costs and mileage involved in the additional travel (optionally this may be another feature of planning module 443), and record their agreement using planning module 443 so that Jane can see it in detail and in aggregation. If Joe cannot help David, and after David has tried some other solutions (e.g., outsourcing, adding overtime), David will need to ask Jane for additional resources to be allocated in the plan for region A. Jane then records the extra allocation, and David's planning module view shows that his region should be ready to meet the demands. This is an example of modifying an earlier message made in the same module (Planning), with automatic propagation which removes the discrepancy-report for region A, and optionally also updates information in the human resources, finance, and other systems. Mary, who is in charge of training in the human resources department, uses her own views of analysis module 441, forecasting module 442 and planning module 443 to identify the problem in region A. If the analysis module 441 and forecasting module 442 show that this problem is expected to persist, she modifies training plans and quotas to ensure that the skill distribution—at least in region A—would have a better fit to the demand distribution. This is an example of automatic propagation to systems outside of those described in the disclosure. In the meantime, region C's manager has solved that region's lack of resources by negotiating an outsourcing agreement with Alice, who owns a smaller local service business. Alice enters this as a demand in her own forecasts and uses planning module 443 to make sure that she has enough resources to fulfill the expected demands, together with this new obligation. This is an example of supporting the coordination of planning and decision-making across organizational boundaries.

Time has passed and it is now Monday evening at the beginning of Q4. David (the manager of region A) has received a list of demands for service to be completed the next day. He uses scheduling module 444 to optimize the dispatch—which service engineer will handle which demand or tasks at which time, according to various factors, including customer's service level agreement, customer location, service engineer's skills, and spare parts inventory. Scheduling module 444 automatically takes into account the rough allocations made in planning module 443, including decisions such as "reserve engineers with network-installation skills, as many as possible for network-installation demands"; and "if possible, keep spare time for service professionals who are based near the boundary with region B, since the plan lets region B's manager handle expected demands by requesting assignment of region A resources." After more time has passed, in the middle of Q4, it turned out that some of the predictions were not substantially accurate. Joe, the manager of region B, uses analysis module 441 to determine why he experienced difficulties in scheduling day-to-day calls, and discovers that the distribution between the north part of his region and the south part has somewhat deviated from expectations, with the south region having large demands and necessitating too much travel in the north. Using forecasting module 442, he updates the aggregate intra-regional demand expectations which automatically highlights a discrepancy in planning module 443 versus the existing resource allocation. Joe can now resolve this discrepancy using his own resources, using outsourcing; or by using analysis module 441 to check whether any for the neighboring regions to his south has unexpected surplus resources, and then negotiate with that region's manager; or by addressing the problem to the manager for the whole organization. These interactions are supported by a shared access to the data, features, and views provided by analysis module 441, forecasting module 442, planning module 443 and scheduling module 444. This illustrates the capability to propagate the effects of new data and new decisions across several different modules, planning horizons, and hierarchy structures, as well as preventing the repeated occurrence of micro-level problems (e.g., difficulty in servicing a specific request on a specific day) by feedback via analysis and forecasting into modified planning and allocation.

In other embodiments, server 152 may have the capability to bring in simulation tools as a well-integrated part of the performance tracking process to predict problems and check possible solutions as soon as possible. Allocating enough resources to meet the expected demand may be not enough, even after taking account of various times not used for actual service—e.g., training, vacations, health problems—and for time spent in travel between tasks. To achieve more accurate predictions, a following simulation may be made, according to the present disclosure. A statistical demand characteristic obtained from historical data collected by scheduling module 444 and aggregated using analysis module 441. These characteristics will describe demand as divided along the different dimensions and their related hierarchies, e.g., region and type of demand. Forecasting module 442 may be used to project these characteristics into the future period of interest. Planning module 443 may be used to allocate resources matching the forecasted demands. A stochastic method may be used to generate a number of hypothetical samples of a typical day's demands, randomly drawn according to the statistical distributions generated in the previous step. Scheduling module 444 may be used to schedule each of these sets of demands, using the resources assigned by the planning module 443. Analysis module 441 may be used to aggregate the detailed results obtained by scheduling module 444, and to check whether the resources indeed matched the demand under simulated fully detailed operation. A resource allocation utility at planning module 443 may be used to modify resource allocation at the appropriate level (e.g., it may be revealed that the only need may be to change allocation between sub-divisions of one region). The simulation may be repeated if necessary, to reveal conditions that may create problems in the future.

In other embodiments, server 152 may have the capability to facilitate the integration of decision processes and management levels, different users (or the same users in different steps of their work). To do so, server 152 may use different ways of analyzing, viewing, aggregating, or dis-aggregating ("drilling down") data. For example, server 152 may have access to data with at least one field that includes work hours, tools, spare parts, overtime allotments. The source for each field may come from the forecasting (prediction of required resources), allocation (decisions on resources made available to operations), or actual data (for times prior to present). Optionally, there may be different subtypes of each source, as when there are several forecasts for August—one from the forecast made in January, one from the forecast made in April, etc., the system is set to display one or more sources for the same field, each with its own values, and optionally highlight discrepancies between the sources. In addition, some values may propagate from a previous stage, as when the expected work hours across the whole organization are derived by summing of the expected work hours as reported by each division manager. Other values are propagated from a later stage, as when an Operations Manager has set the work-hour budget for the whole organization, which needs to be divided between the regions. Both directions may—and often do—coexist, and the system may be set to display either of them, or both, and optionally highlight discrepancies between the directions.

In other embodiments, server 152 may have the capability to support scenarios for decision-support and "what if" tools. A scenario comprises a set of data, which is inserted into the system (e.g., forecasts, staff size) and a set of decisions (e.g., extended overtime, outsourcing, constraining the allocation of some resources so that they may be used only—or preferentially—for demands of specific type or region). Each scenario may generate its own set of data, viewable and editable through the system. As the decision process evolves, some scenarios are modified, some are split to compare different "decision forks," and some are deleted, until a preferred scenario remains and becomes the basis for an actual decision.

As mentioned above, the actions performed by the manager of service provider 160 while using one view automatically propagated by the software across other views, hierarchy levels, and planning periods. They may also be propagated across organization boundaries, as when a planning-decision in organization A to outsource work to organization B is conveyed to organization B and appears there as a change in forecast demand, requiring re-iteration of the planning process. According to some embodiments, when propagating these actions, the system automatically monitors for discrepancies. The discrepancies may include: (1) Discrepancies between a forecast demand and allocated resources. (2) Discrepancies between different sources of the same information (e.g., forward-looking simulation vs. extrapolation of data using statistical trends analysis). (3) Discrepancies between different propagation directions, as when the planned resources are both dictated by higher management, propagating downwards, and also reported by regional management, propagating upwards. (4) Discrepancies between commitments made to customers and actual ability to deliver: For example, a customer may call with a problem and be told "someone will be with you tomorrow between 13:00 and 17:00," because there appeared to be enough free resources during that time window, and without committing specific resources. Later there will be more calls are received and the software determines that there will be difficulty meeting this commitment, alerting the manager early enough to act, e.g., by diverting resources from another region. Another example for an even shorter planning-period: identifying the situation in which the service engineer is delayed in traffic or in an earlier task and will probably fail to arrive on time to the next task.

The system may provide alerts to draw the user's attention to discrepancies. Optionally, the alerts consist of color-coding of areas in the view (e.g., cells in a displayed table) according to the presence and severity of discrepancies. Optionally, the alerts may include presenting to the user a list of alerts, possibly ranked and color-coded by their severity. Optionally, the alerts may include messages transmitted to users defined as being in charge of reacting and/or resolving each type of alert. Messages may be transmitted by phone, cellular messaging, e-mail, fax, and instant messaging. In addition, the alerts may include of any combination of the above mechanisms, configurable according to the user's personal preferences, user type, alert type, and organizational procedures.

Figure 5:
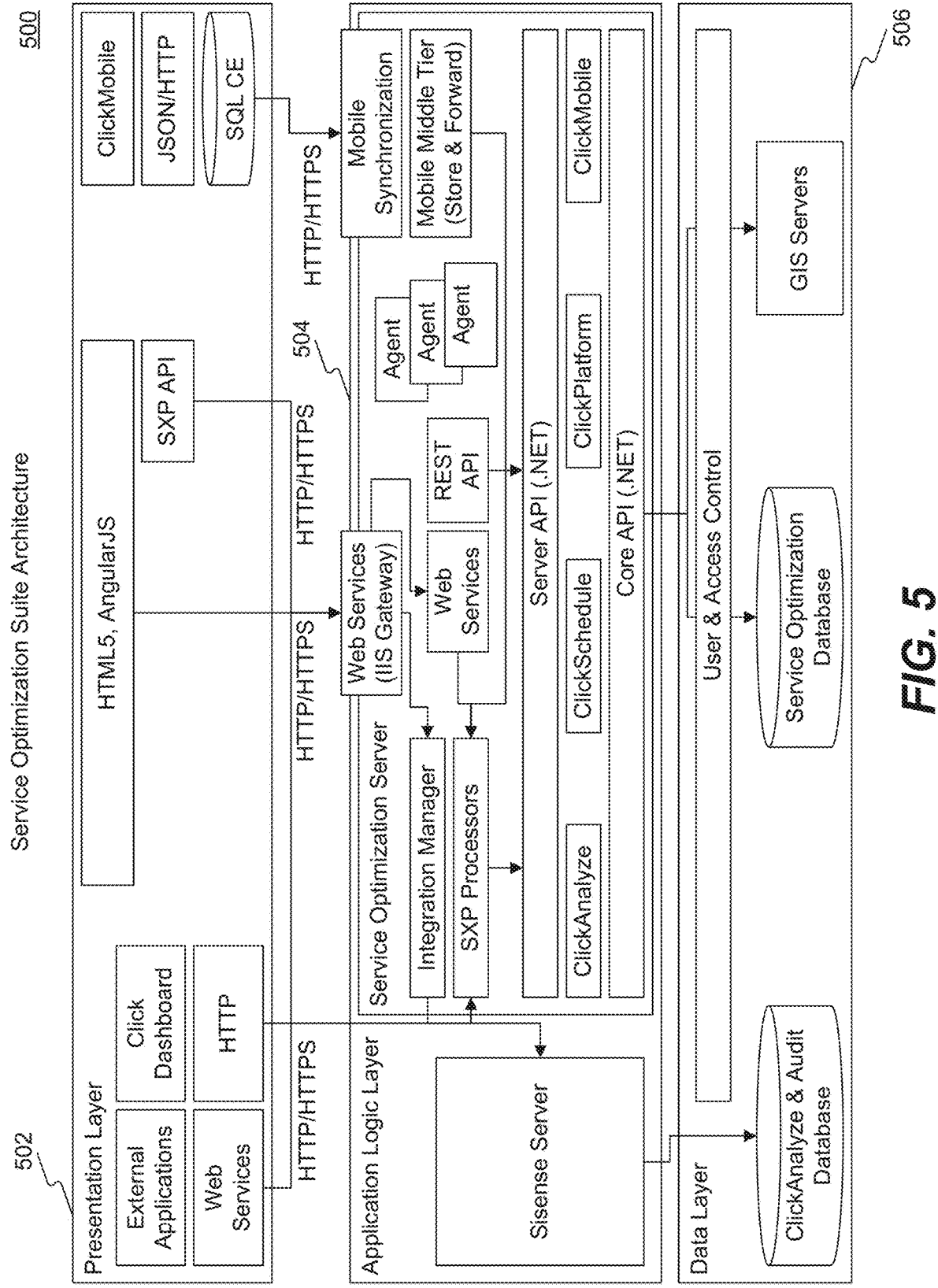
FIG. 5 is a schematic illustration of an example logical architectural model for implementing embodiments of the present disclosure.

FIG. 5 is a conceptual illustration of a three-tier architectural model 500 for managing data retrieval within an information system is shown in accordance with embodiments of the present disclosure. The three-tier architectural model 500 includes a presentation layer 502, an application layer 504, and a data layer. Each of these layers (502, 504, and 506) may be software modules designed to interact with one another to provide a logical framework for managing retrieval of stored data for various other software modules in the information system. As a person skilled in the art would recognize, even though not explicitly stated when describing specific embodiments, any of the computer-implemented operations performed by these layers (502, 504, and 506) may also include interaction with one or more hardware modules in the information system.

Generally, presentation layer 502 may be responsible for manipulating data for the performance of an action. Such an action may include, for example, rendering the data for display on a graphical user interface (GUI). Data layer 506 stores the data that is to be manipulated by presentation layer 502. Application layer 504 may be an "intermediate" layer that serves as a communication liaison between presentation layer 502 and data layer 506. That is, presentation layer 502 may issue requests for retrieval of specified data stored in data layer 506 to application layer 504 rather than communicating directly with data layer 506. In response to such a request, application layer 504 may retrieve the specified data from data layer 506 and provide a view of the retrieved data to presentation layer 502. The view presents the specified data to presentation layer 502 in a manner such that presentation layer 502 may manipulate the data to perform a specific task. For example, presentation layer 502 may display data presented through a view on a display element of a graphical user interface. Prior to retrieving the specified data, application layer 504 may apply one or more rules to the request in furtherance of managing retrieval of the data for presentation layer 502. As described in more detail below, these rules relate to conditions that are designed to effectuate the transfer of data between data layer 506 and presentation layer 502.

In one embodiment, each of these layers (502, 504, and 506) may reside on a single computing system. In another embodiment, at least one of these layers may reside on a computing system separate from the other two layers. For example, presentation layer 502 may reside on a client computer system and application 504 and data layer 506 may both reside on a server computer system. Even further, each layer may reside on a separate computing system from the other. In either of these latter embodiments, a communications network may be employed for communications between the layers residing on separate computer systems. It should be appreciated that each of the layers operate regardless of whether the layers reside on a single computing system or multiple computing systems.

Presentation layer 502 may include software modules and processes (collectively, "components") of application programs that use data stored in data layer 506 to perform actions. Example actions may include, without limitation, rendering information for display on a GUI presented to users through a display monitor. It should be appreciated that these actions may relate to any form of data manipulation or processing, and therefore are not limited to rendering data for display on a GUI. Indeed, many components of application programs manipulate data during "background" operations that are not noticeable to users of the computing system. These types of actions may be performed either randomly or following scheduled, periodic time periods. For illustrative purposes, however, presentation layer 502 may be described as a component requesting data from data layer 506 for use in manipulating the data to render a display for a GUI. In one embodiment, presentation layer 502 may be built on top of AngularJS framework and utilize single page application (SPA) architecture. Using modular approach, presentation layer 502 may provide unified visual design language and user experience. The different services described in the disclosure may be implemented as modules within this layer. For mobile access, the presentation layer may include applications for most popular mobile operating systems, such as iOS, Android, and Windows, and deployed from corresponding application stores.

Data layer 506 is configured to store data in the form of file structures, each having a standard identifier, e.g., path and file name, recognizable to application layer 504 and data layer 506. In order to request specific data stored in data layer 506, a request by a component of presentation layer 502 includes, i.e., specifies, the standard identifier for the data. Upon receiving a request from the component, application layer 504 manages retrieval of the specified data from data layer 506 based on the standard identifier and thereafter provides a view of the retrieved data to the requesting component. The view presents the specified data to the presentation layer in a manner such that the data may be manipulated to perform a specific action. Consistent with the present disclosure, data layer 506 may have a pure multitenant architecture, providing both security and privacy to customers and unity to the system development and deployment. For example, the infrastructure may include a relational database, which may be used dynamically to obtain high integrity control while maintaining a customizable schema for each customer. In one embodiment, a plurality of customers may share the same type of database, as well as the same type of tables. Each table may be partitioned according to the customer identity which enables the system to protect the security and privacy of the customer data. Although the same type of tables is used by a plurality of customers, the system includes a mechanism which enables providing different schema per customer, without the need to execute Data Definition Language (DDL) commands and simply using references to the relevant column as the customer defined. This ability enables us to perform online schema changes efficiently and safely without any downtime to the customers, and without any code change. This flexibility allows each customer to customize the product according to their specific business needs, while using a software product on the cloud. This flexibility also enables the system to provide fully localizable product to the customers, which enables international companies to use the same product in multiple languages. In one embodiment, updating objects may be performed using optimistic locking which ensures that, if parallel requests arrive, isolation of the transaction may be kept while still keeping data integrity.

In accordance with the architectural model 500, the responsibilities and/or operations of application layer 504 may be performed by various software modules into which application layer 504 is divided. In accordance with one embodiment, application layer 504 may be responsible for receiving requests from components of presentation layer 502 for data stored in data layer 506 and providing the requesting components with a view of the specified data. In another embodiment, application layer 504 may be responsible for the actual retrieval, and subsequent caching, of the specified data. Consistent with the present disclosure, application layer 504 may include implementation for a highly customizable object manipulation framework allowing it to utilize all of the benefits of data layer 506 and provide for the developer's generic ability to work with business data objects. For example, application layer 504 may enable object definition, CRUD operations, advanced search capabilities, and object serialization for web access, including RESTful, SOA, and XML over HTTP methods. In one embodiment, on top of the abilities of data layer 506, this layer provides memory caching mechanism, which allows high performance for infrequently updated objects and dramatically reduces the number of queries for the data layer. For example, application layer 504 may have search capabilities for objects included in memory by indexing and grouping mechanisms implementing proprietary object query language allowing a sophisticated mix of SQL executed queries within memory validated conditions. In one embodiment, application layer 504 may utilize a stateless architectural approach and may not maintain any state data between sequential calls. For example, all state data may be serializing in the database by the end of each call, and during a next call requesting some data, the most updated state data is then obtained from the database. As an implementation for the multi-tenant paradigm, application layer 504 may ensure high data and access isolation on the tenant and user level and allow a highly configurable ability to define, set data, and access controls on a user, group of users, role, and tenant level.

Consistent with the present disclosure, the services on the cloud environment architectural model 500 may be highly available and may simultaneously work on multiple availability zones. Production and staging environments are isolated on virtual cloud network level. As a scalability model, the system may utilize POD approach when multi-tenant deployments segmented and isolated in completely independent parts. In order to reduce latency and comply with laws of different countries, such as the General Data Protection Regulation (GDPR) in Europe and more.

A. Task Scheduling Based on Real-Time Conditions

Disclosed and claimed is a system that receives real-time reports (e.g., traffic updates, weather conditions), predicts that a field professional will not be able reach the customer at the scheduled time, and reassigns the customer to a different field professional. In one example, the system predicts that the field professional will miss a future task in his daily schedule. In another example, the system predicts that a delay would cause one or more tasks to be completed after a shift of a field professional is about to end.

Figure 6A:
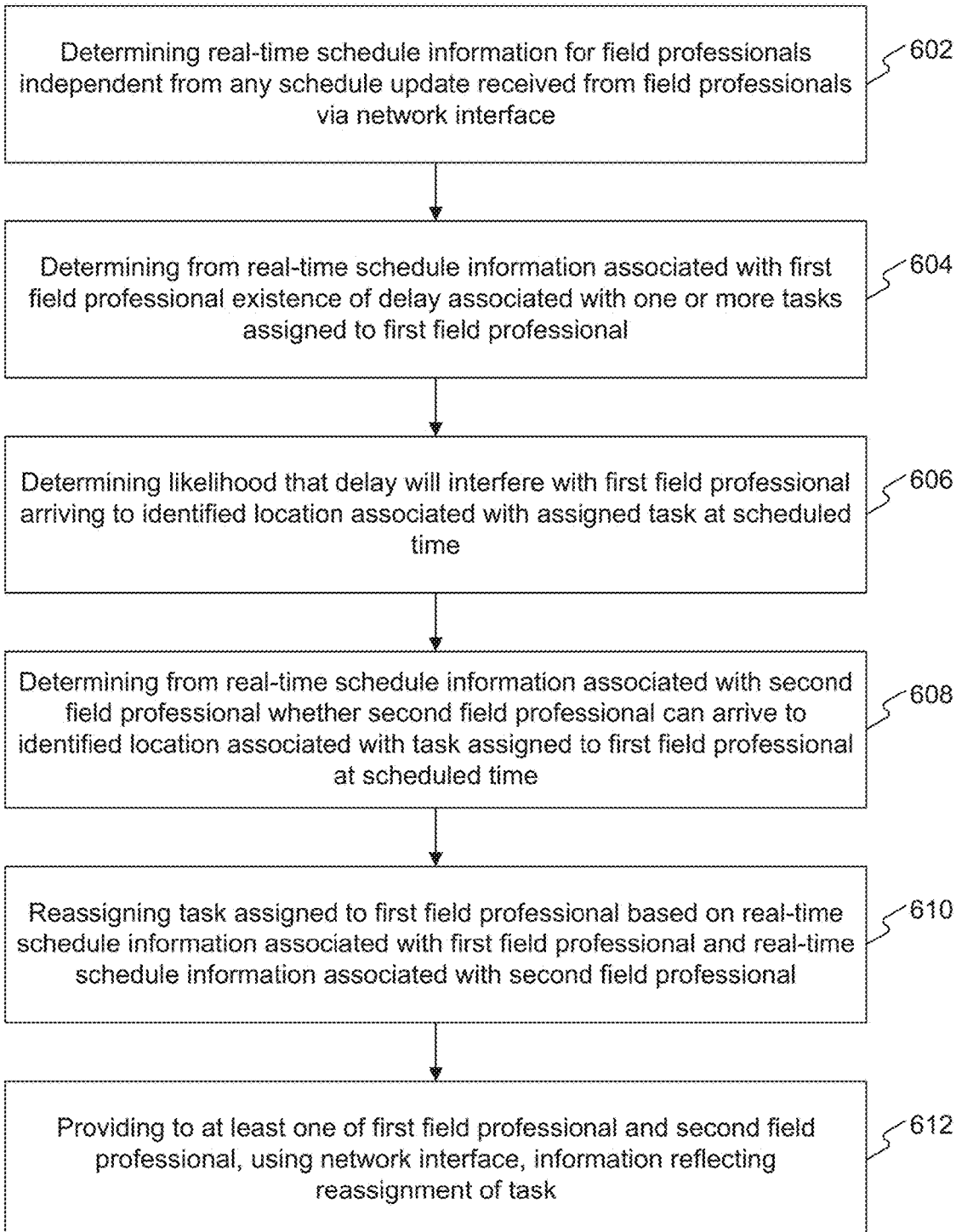
FIG. 6A is a flowchart of an example process for task scheduling based on real-time conditions, consistent with the present disclosure.

FIG. 6A is a flowchart of an example process 600 for task scheduling based on real-time conditions, consistent with the present disclosure. In some embodiments, server 152 may implement process 600. For example, processing device 202 may receive data from I/O system 210 or network interface 206, and then execute instructions or program codes stored in memory interface 204 or database 154, in which the instructions or program codes implement algorithms of process 600. The algorithms of process 600 may be implemented as one or more of analysis module 441, forecasting module 442, planning module 443, or scheduling module 444. Process 600 includes the following steps or operations.

At step 602, processing device 202 determines real-time schedule information for field professionals 110 independent from any schedule update received from field professionals 110 via network interface 206. The real-time schedule information may include any information or data associated with task schedules of the field professionals 110 updated or received in real time. In some embodiments, processing device 202 may determine real-time schedule information from communication device 180A. In some embodiments, the real-time information may be determined by processing device 202 without intervention of field professionals 110, such as in predetermined intervals or triggered by predetermined events.

In some embodiments, the real-time schedule information may reflect a field professional's progress in attending, performing or completing tasks. For example, the real-time schedule information may reflect location information associated with the professional. Based on the location information, system 100 (alone or with reference to other internal or external systems) may determine if a field professional is at a location associated with one of the tasks in the schedule or en route to a scheduled task. For another example, the real-time schedule information may reflect task updates (e.g., field professionals 110 may use a dedicated communication device or a dedicated application to provides real-time updates, such as, "arrived at destination," "task completed," "set out for next destination," etc.). For another example, the real-time schedule information may include updates from different data sources outside system 100 that may affect the progress of field professionals 110 (e.g., traffic updates, weather updates, user's social profiles, etc.).

In some embodiments, the real-time schedule information may reflect required changes to a schedule of a field professional. For example, system 100 may determine that a schedule of field professionals 110 needs to be changed and provide real-time schedule information reflecting the schedule change with optionally varying degrees of specificity (e.g., as in FIGS. 3A-3B, after completing the task at point A, go to point F and not to point B). For another example, a client may directly inform a field professional that he/she is running late for a location of a scheduled task.

In some embodiments, the real-time schedule information may include current location information derived at least partially from location circuits of communication devices of field professionals 110 without intervention of field professionals 110. In some embodiments, the communication devices may include mobile devices (e.g., a smartphone) or vehicles that is associated with field professionals 110. For example, the communication devices may include communication device 180A. The location circuit may be, for example, a global positioning system (GPS) circuit module. In some embodiments, the current location information may be derived from the location circuits without intervention of field professionals 110, such as in predetermined intervals.

In some embodiments, the real-time information may include real-time weather conditions associated with field professionals 110. For example, the weather conditions may be associated with regions that covers current locations of field professionals 110. In some embodiments, the weather conditions may be received from a third-party service provider, such as an Internet server of a weather forecast service provider. In some embodiments, the weather conditions may be received from the third-party service provider without intervention of field professionals 110, such as in predetermined intervals.

In some embodiments, the real-time schedule information may be received from communications network 170. In some embodiments, field professionals 110 may initiate sending schedule update via communication device 180, but such schedule update is independent from the real-time schedule information determined by processing device 202. In other words, processing device 202 may receive the real-time schedule information automatically without affirmatively reporting of field professionals 110. For example, processing device 202 may send a request at a predetermined time interval to communication device 180A to obtain the real-time schedule information.

In some embodiments, processing device 202 may receive progress information for field professionals 110 from network interface 206. The progress information may include any number of any combination of the real-time schedule information that is determined by processing device 202 without intervention of field professionals 110 and the schedule update sent by field professionals 110. In some embodiments, the schedule update may include task updates initiated by field professionals 110 (e.g., field professionals 110 may use a dedicated communication device or a dedicated application to provides updates, such as, "arrived at destination," "task completed," "set out for next destination," etc.) or shift updates initiated by field professionals 110 (e.g., field professionals 110 may use a dedicated communication device or a dedicated application to provides real-time updates, such as, "shift stated," "shift completed," "shift interrupted," etc.).

In some embodiments, the progress information may include task status updates transmitted from communication devices of field professionals 110. For example, the task status updates may be transmitted in a form of text messages. For another example, the task status updates may be transmitted in a form of application data inputted by field professionals 110 through a user interface to a dedicated application installed in the communication devices (e.g., a smartphone).

Referring back to FIG. 6A, at step 604, processing device 202 determines, from the real-time schedule information associated with a first field professional, existence of a delay associated with one or more tasks assigned to the first field professional. The first field professional may be one of field professionals 110. The first field professional may have one of more tasks assigned thereto. For example, as shown in FIGS. 3A-3B, the first field professional was assigned to tasks for providing technical service at locations A, B, C, D. The delay may be represented as a time difference between a current time and the scheduled arrival time of a location associated with a task assigned to the first field professional to perform at the location. Consistent with the present disclosure, the delay may be associated with a difficulty for completing a scheduled task, no matter the cause of the difficulty. For example, the delay may result from traffic conditions due severe weather conditions. Alternatively, the delay may result from a failure of the field professional to complete an earlier task within an allocated time frame. Alternatively, the delay may result from a customer not being present at the location.

Figure 6B:
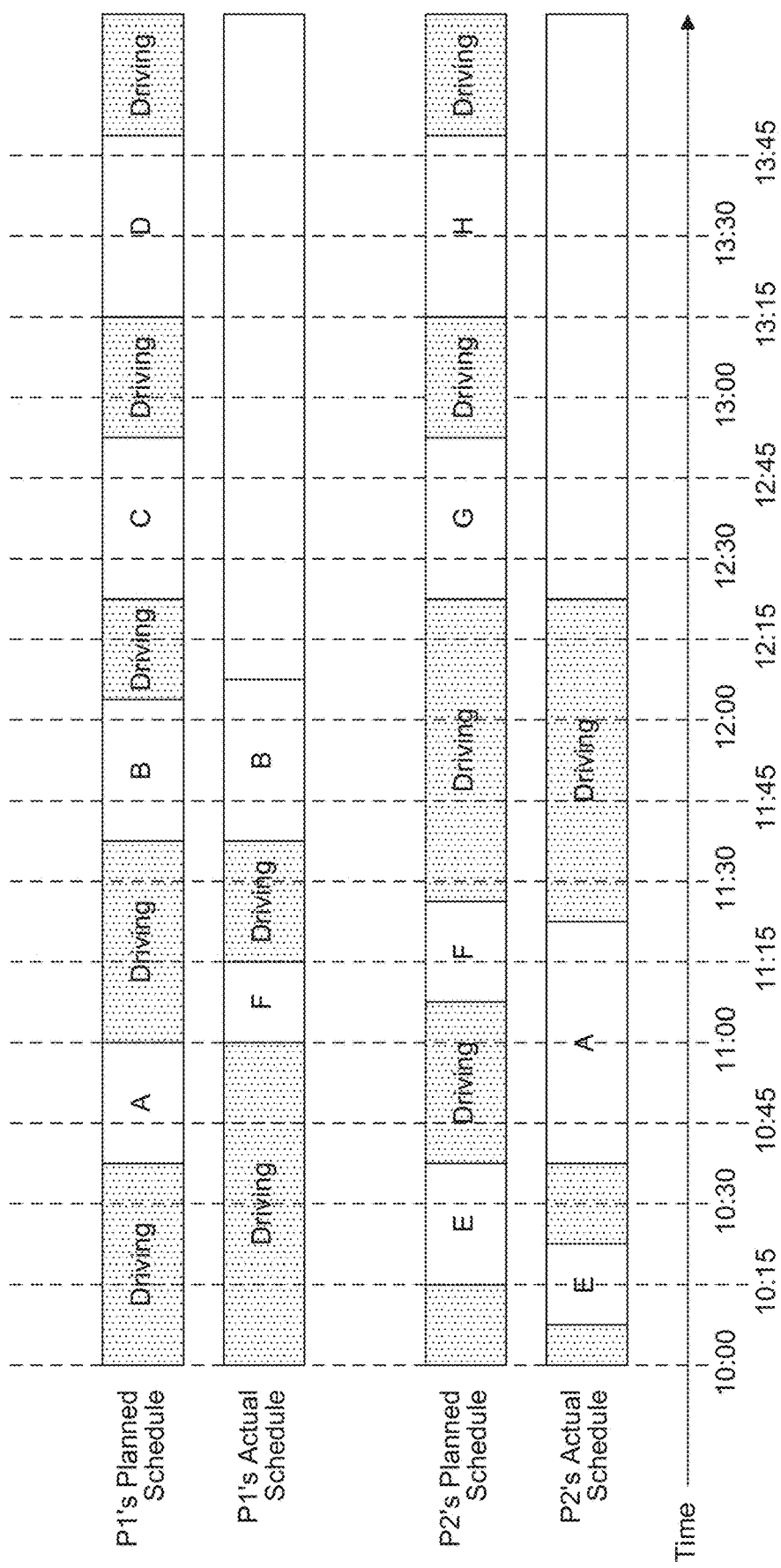
FIG. 6B is a diagram of example planned and actual schedules of field professionals, consistent with the present disclosure.

FIG. 6B is a diagram of example planned and actual schedules of field professionals, consistent with the present disclosure. In FIG. 6B, the first field professional P1 corresponds to the first field professional in FIG. 3A, and each of locations A-D may have a specified or scheduled arrival time for P1. Each row of blocks represents a schedule associated with a field professional in FIG. 6B. White blocks represent the field professional's time durations when performing a task at a specified location or when the field professional is available. Dotted blocks represent the field professional's time durations when driving between the specified locations. A timeline is shown below the blocks, and dash lines are shown to indicate aligned time points of the schedules in the timeline.

For the first field professional P1, two schedules are shown: one for P1's planned schedule, and one for P1's actual schedule. In P1's planned schedule, P1's scheduled arrival times for locations A-D are 10:36, 11:39, 12:20, and 13:15. The delay associated with the one or more tasks may occur when the first field professional arrives at the locations later than the scheduled times. For example, in P1's actual schedule, P1 misses the scheduled arrival time of 10:36 for location A. In other words, at the scheduled arrival time 10:36, P1 is still driving. In this example, the delay may be represented as a time difference between a current time and the scheduled arrival time 10:36.

In some embodiments, the real-time schedule information may include a current time and a current location of the first field professional. By comparing the current time and location of the first field professional with expected time and location thereof, processing device 202 may determine the existence of the delay. For example, assuming the scheduled arrival time is 10:36 for location A and the first field professional leaves the starting point (FIG. 3A) at 10:00, if the current time is 10:18 but the current location of the field professional is at ¼ of the total distance from the starting point to location A, processing device 202 may determine the existence of the delay.

In some embodiments, the real-time schedule information may include the real-time weather conditions. The scheduled arrival times at task locations may be determined based on a first assumed weather condition, such as a sunny weather. When the real-time weather condition is different from the assumed weather condition, the arrival times may be delayed. For example, if the real-time weather condition is raining, the road conditions may become worse and the traffic may become slower, by which the first field professional may delay arriving at schedule times. If that is the case, processing device 202 may determine the existence of the delay.

In some embodiments, if processing device 202 receives the progress information from network interface 206 at step 602, processing device 202 may determine a delay associated with one or more tasks assigned to the first field professional. In some embodiments, processing device 202 may determine the delay from the progress information.

At step 606, processing device 202 determines a likelihood that the delay will interfere with the first field professional arriving at an identified location associated with an assigned task at a scheduled time. The scheduled time may be a time specified by processing device 202 for the first field professional to arrive at the identified location. For example, the identified location may be any of locations A-D in FIG. 3A. Though processing device 202 determines the existence of the delay at step 604, the delay may not necessarily cause an actual delay of the arrival time at the identified location. For example, the first field professional may find means (e.g., find a shorter route or increase moving speed) to make up for the delay.

In some embodiments, processing device 202 may apply a traffic route model reflecting one or more possible routes for the first field professional to travel to the identified location for determining the likelihood that the delay will interfere with the first field professional arriving at the identified location at the scheduled time. Traffic conditions may affect driving durations between locations assigned to the first field professional.

In some embodiments, the traffic route model may include a model that assigns different weights to different segments of routes. A weight may have a value proportional to a likelihood that a delay would occur when a field professional travels through it. The weight may be assigned in accordance to historical data, such as statistics of traffic conditions and speed limits. In some embodiments, the total weight of a route may be a sum of the weights of its segments. To apply the traffic route model, processing device 202 may select the one or more possible routes for the first field professional from all routes to travel to the identified location. Processing device 202 may then determine the total weights for each of the possible routes. In some embodiments, if the first field professional is on the way to the identified location and all of the possible routes have a total weight corresponding to a likelihood greater than a predetermined threshold (e.g., 50%), processing device 202 may determine that the delay will interfere with the first field professional arriving at the identified location at the scheduled time.

In some embodiments, processing device 202 may apply a task performance model for determining the likelihood that the delay will interfere with the first field professional arriving at the identified location at the scheduled time. In some embodiments, the task performance model may include a model that assigns different weights to different tasks. A weight may have a value proportional to a likelihood that a delay would occur when a field professional performs a specific task. The weight may be assigned in accordance to historical data, such as statistics of task performances. The weight may also be assigned in accordance to difficulty level of the tasks, such as complexity and time duration to perform it. To apply the task performance model, processing device 202 may determine the type of task the first field professional is performing, such as from task information. Processing device 202 may then determine the weight for the task. In some embodiments, if the task being performed by the first field professional has a total weight corresponding to a likelihood greater than a predetermined threshold (e.g., 50%), processing device 202 may determine that the delay will interfere with the first field professional arriving at the identified location (e.g., the next location for a future task) at the scheduled time.

In some embodiments, processing device 202 may determine a likelihood that the delay will interfere with a future assigned task. The future assigned task may be a task scheduled later than the current task. For example, in FIG. 3A, if the first field professional is currently working at location A for a first task, a second task at location B is the future assigned task. In some embodiments, processing device 202 may determine a likelihood that the delay in the current task will interfere with the future assigned task using a delay-statistics model. In some embodiments, the delay-statistics model may collect and compile historical delay data and generate correlations between a time duration of the delay at the current task and a likelihood of such delay causing a time duration of a delay at the future task. For example, statistics may show that that a five-minute delay at 10:00 for a first task will cause an 80% likelihood that the first field professional will be 30 minutes late to a second task scheduled at 15:00. The delay-statistics model may establish a corresponding relationship between the 5-minute delay and the 30-minute delay for the two tasks. When the first field professional actually delay for 5 minutes at the first task, by using the delay-statistics model, processing device 202 may determine that the likelihood is 80% for the first field professional to arrive 30 minutes late for the second task.

In some embodiments, to determine a likelihood that the delay will interfere with a future assigned task, processing device 202 may obtain weather conditions associated with locations of tasks assigned to the first field professional and adjusting time estimations for completion of the tasks based on the weather conditions. When the task is performed outdoor, the weather condition may affect the task completion time. The weather condition may also affect travel durations between locations assigned to the first field professional. In some embodiments, processing device 202 may obtain the weather conditions from a third-party service provider. To determine a likelihood that a weather condition will cause delay for the completion time, processing device 202 may also use a weather-statistics model. The weather-statistics model may collect and compile historical weather condition data and generate correlations between a weather condition at a location of a task and a likelihood of such weather condition causing a delay for the completion time. When the first field professional is performing the current task and the weather condition changes, by using the weather-statistics model, processing device 202 may determine that there is a specific likelihood for the first field professional to delay the completion time of the current task. Based on the likelihood, processing device 200 may adjust time estimation for completion of the current task.

In some embodiments, to determine a likelihood that the delay will interfere with a future assigned task, processing device 202 may obtain traffic conditions associated with locations of tasks assigned to the first field professional and predicting times that the first field professional would arrive these locations based on the traffic conditions. In some embodiments, processing device 202 may predict the arrival times of the first field professional use the traffic route model and the delay-statistics model. For example, by obtaining the traffic conditions and inputting it into the traffic route model and the delay-statistics model, processing device 202 may determine likelihoods that the traffic conditions will cause the first field professional to delay for different time durations to arrive the different locations. Based on those likelihoods, processing device 202 may determine the predicted arrival times. As an example, Table 1 shows originally estimated driving duration between the starting point and location A in FIG. 3 and corresponding predicted driving durations updated using real-time traffic conditions at different times of a day. In Table 1, each row represents a time of the day.

TABLE 1

| Time | Estimated driving duration | Updated driving duration |
| --- | --- | --- |
| 10:00 | 25 minutes | 55 minutes |
| 10:15 | 25 minutes | 55 minutes |
| 10:30 | 27 minutes | 52 minutes |
| 10:45 | 27 minutes | 45 minutes |
| 11:00 | 30 minutes | 40 minutes |
| 11:15 | 30 minutes | 35 minutes |
| 11:30 | 35 minutes | 35 minutes |
| 11:45 | 35 minutes | 35 minutes |
| 12:00 | 30 minutes | 30 minutes |

In some embodiments, processing device 202 may determine a likelihood that the delay will interfere with the first field professional completing all assigned tasks prior to a predesignated shift completion time. In some embodiments, to determine the likelihood, processing device may use a statistics model that is modified based on any combination of the traffic route model, the task performance model, the delay-statistics model, and the weather-statistics model. The statistics model may collect and compile historical data and generate correlations between a time duration of the delay and a likelihood of such delay causing an overtime for the first field professional. For example, statistics may show that that a one-hour delay at 10:00 for a first task will cause an 90% likelihood that the first field professional will be unable to completing all assigned tasks prior to a predesignated shift completion time at 18:00. The statistics model may establish a corresponding relationship between the one-hour delay and the 90% of overtime likelihood. When the first field professional actually delay for one hour, by using the statistics model, processing device 202 may determine that the likelihood is 90% that the first field professional will be unable to completing all assigned tasks prior to the predesignated shift completion time.

Referring back to FIG. 6A, at step 608, processing device 202 determines from real-time schedule information associated with a second field professional whether the second field professional can arrive to the identified location associated with the task assigned to the first field professional at the scheduled time. The second field professional may be one of field professionals 110. For example, the second field professional may be the field professional assigned to tasks for providing technical service at locations E, F, G, H in FIGS. 3A-3B. In some embodiments, processing device 202 may determine whether the second field professional can arrive at the identified location at the schedule time based on any combination of the traffic conditions, weather conditions, or task performances associated with the second field professional.

For example, as shown in FIG. 6B, processing device 202 may determine from real-time schedule information that the first field professional P1 will delay arriving at location A at scheduled time 10:36, and the second field professional P2 has finished a task at location E at 10:12, sooner than expected completion time at 10:39. Based on the traffic condition from location E to location A, weather conditions at locations E and A, or the type of the task to be performed at location A, processing device 202 may determine that the second field professional can arrive to location A at 10:36.

At step 610, processing device 202 reassigns the task assigned to the first field professional based on the real-time schedule information associated with the first field professional and the real-time schedule information associated with the second field professional.

In some embodiments, processing device 202 may reassign the task assigned to the first field professional by assigning it to the second field professional. For example, as shown in FIG. 6B, processing device 202 may reassign the task associated with P1 at location A to P2. In other words, P2 will go to location A after finishing task at location E rather than location F as originally scheduled. In some embodiments, processing device 202 may reassign the task associated with P2 at location F to P1. In other words, P1 will go to location F rather than location A as originally scheduled.

In some embodiments, prior to reassigning the task to the second field professional, processing device 202 may determine whether the second field professional has required skills and parts to complete the task. If the second field professional has the required skills and parts to complete the task, processing device 202 may reassign it to the second field professional. For example, as shown in FIG. 6B, processing device 202 may determine whether P2 has required skills and parts to complete the task at location A before reassigning the task associated with P1 at location A to P2.

In some embodiments, processing device 202 may reassign the assigned task to the second field professional based on the determined likelihood that the delay will interfere with the first field professional arriving at the identified location associated with the assigned task at the scheduled time. For example, if the determined likelihood exceeds a predetermined threshold (e.g., 50%), processing device 202 may reassign the task to the second field professional.

In some embodiments, to reassign the task assigned to the first field professional to the second field professional, processing device 202 may identify a number of second field professionals who can complete the task assigned to the first field professional, and select the second field professional based on current location information of the number of second field professionals and traffic conditions. In some embodiments, at step 608, processing device 202 may determine that there are multiple second field professionals who can arrive to the identified location associated with the task assigned to the first field professional at the scheduled time. Further, processing device 202 may select the second field professional based on the current location information of the second field professionals and the traffic conditions. For example, processing device 202 may determine the second field professional as the field professional having the shortest arrival time from the multiple second field professionals. In some embodiments, processing device 202 may determine the second field professional based on other criteria, such as skill levels, workload of the day, completed work of the day, future work scheduled, and so forth. For example, processing device 202 may assigned a weight and a score to each of the criteria. The weight represents the level of importance of that criterion in the determination of the second field professional. The score represents the degree, extent, or scale of the criterion. Processing device 202 may determine a weighted score for each of the multiple second field professionals and select one with its weighted score in a predetermined range.

In some embodiments, to reassign the task assigned to the first field professional to the second field professional, the second field professional may be selected based on estimated costs. The costs may include travel distances, wages, overtime pay, or the like. For example, processing device 202 may estimate a cost for each of the number of second field professionals who can complete the task assigned to the first field professional, and select the second field professional further based on estimated costs. In some embodiments, processing device 202 may select the second field professional as the one having the lowest cost among the multiple second field professionals. To determine the costs, in some embodiments, processing device 202 may also assign a weight and a score to each of the factors of the costs. The weight represents the level of importance of that cost factor in the determination of the second field professional. The score represents the value of the cost. Processing device 202 may determine a weighted score for each of the multiple second field professionals and select one with its weighted score in a predetermined range.

In some embodiments, if processing device 202 determines, at step 606, a likelihood that the delay will interfere with the first field professional completing all assigned tasks prior to the predesignated shift completion time, processing device 202 may reassign one or more tasks to the second field professional, thereby avoiding causing the first field professional to work overtime. For example, the second field professional may be associated with the same predesignated shift completion time. For another example, the second field professional may be associated with a later predesignated shift completion time.

In some embodiments, selecting the second field professional includes reassigning a task currently assigned to the second field professional to a third field professional. In some embodiments, the third field professional may actually be the best candidate for such reassignment (e.g., having the shortest traveling time or the lowest cost), but his or her availability may be unclear because he or she is in the middle of a task. If the likelihood is high that the third field professional can complete his or her current task soon, processing device 202 may conditionally reassign the task of the first field professional to the second field professional, on condition that the third field professional does not complete his or her current task in time. If the third field professional does complete his or her current task in time, processing device may reassign the task conditionally reassigned to the second field professional to the third field professional.

In some embodiments, processing device 202 may receive an indication from the first field professional about inability to complete all pending tasks in a daily schedule. Processing device 202 may then identify a plurality of second field professionals who can complete pending tasks in the daily schedule of the first field professional, and reassign the pending tasks to at least two second field professionals. Processing device 202 may further provide the at least two second field professionals, using network interface 206, information reflecting the reassignment. In some embodiments, the indication about inability to complete all pending tasks in a daily schedule may include an injury, a family emergency, or a sudden, personal event. The information reflecting the reassignment may be any information for indicating at least some contents of the reassignment. In some embodiments, the information reflecting the reassignment may include information about a plan of the reassignment, such as rescheduling the task to a new data and time for the first field professional, or reassigning the task to a second field professional to complete. For example, the information about the plan may include the new data and time if the task is rescheduled, or a name of the second field professional if the task is reassigned thereto. In some embodiments, the information reflecting the reassignment may include directional instructions to accessing task locations, such as an address or a driving route.

In some embodiments, processing device 202 may reassign the task by rescheduling the task to a date and time where the first field professional is available. In some embodiments, processing device 202 may reassign the task in accordance with company policies. The company policies may include different rules that specifies the way of reassignment under different conditions. For example, the company policies may specify that when the first field professional delay more than 10 minutes, the task assigned to the first field professional must be reassigned to the second field professional. The company policies may also specify that if the task is reassigned to the second field professional and would cause the second field professional to detour for a time longer than a predetermined threshold (e.g., 30 minutes), the task must be rescheduled to a date and time where the first field professional is available. In some embodiments, the company policies may be implemented as computer-readable instructions as conditions in algorithms, which may be stored in database 154 accessible via memory interface 204 and executed by processing device 202.

Referring back to FIG. 6A, at step 612, processing device 202 provides to at least one of the first field professional and the second field professional, using network interface 206, information reflecting the reassignment of the task. In some embodiments, processing device 202 may send the information to the communication devices associated with the first field professional and the second field professional, such as communication device 180A.

In some embodiments, processing device 202 may provide a customer associated with the assign task, using network interface 206, information indicative of the reassignment. The customer may be one of users 130. In some embodiments, processing device 202 may send the information to the communication device associated with the customer, such as communication device 180C. In some embodiments, the information indicative of the reassignment may include a name, an expected arrival time, and contact information (e.g., a phone number) of the second field professional.

B. Work Capacity Planning

Disclosed is a system that improves work capacity in task scheduling by assigning different types of tasks to field professionals based on real-time conditions. In some embodiments, the system may be implemented as task scheduling unit 150. The types of tasks may include product installation, product repair, product maintenance, product replacement, product diagnostics, customer consulting, or the like. The real-time conditions may be associated with specific demand categories, such that the system may change a ratio between the types of scheduled tasks by limiting the time windows that can be scheduled for a specific demand category. In one example, the system may limit the tasks for installing a first product to 70% of the available time windows (also known as time slots). This means that only 30% of the available time windows may be assigned to tasks associated with other products. By inputting such real-time conditions to the system, the system may optimize work capacity for task scheduling and increase throughput of task scheduling.

Figure 7A:
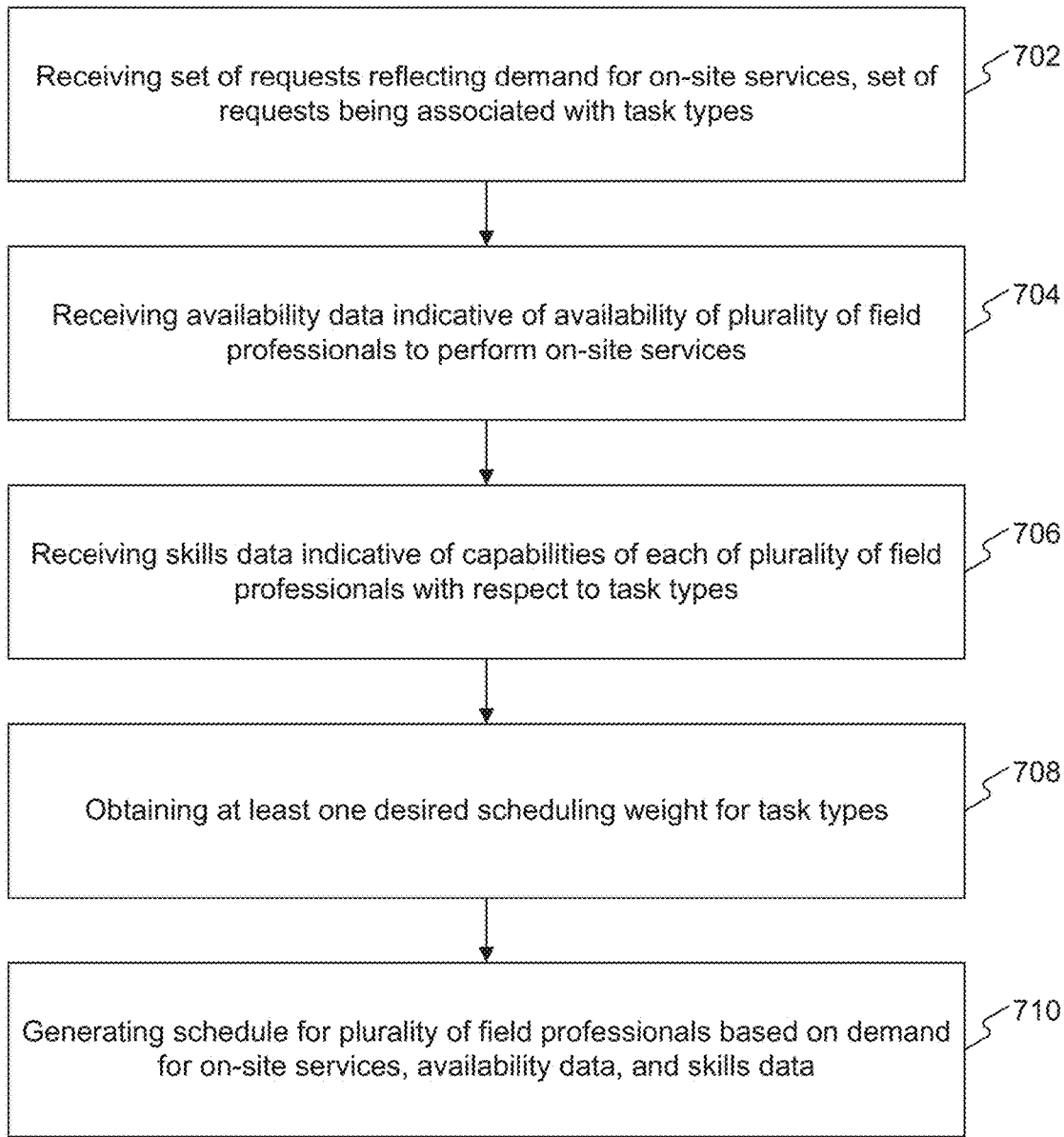
FIG. 7A is a flowchart of an example process for scheduling tasks to field professionals according to desired scheduling weights, consistent with the present disclosure.

FIG. 7A is a flowchart of an example process 700A for scheduling tasks to field professionals, consistent with the present disclosure. In some embodiments, server 152 may implement process 700A. For example, processing device 202 may receive data from I/O system 210 or network interface 206, and then execute instructions or program codes stored in memory interface 204 or database 154, in which the instructions or program codes implement algorithms of process 700A. The algorithms of process 700A may be implemented as one or more of analysis module 441, forecasting module 442, planning module 443, or scheduling module 444. Process 700A includes the following steps or operations.

At step 702, processing device 202 receives a set of requests reflecting demand for services. The set of requests may be associated with a number of task types. In some embodiments, the requests reflecting the demand for services may be data including instructions to request remote services. For example, the remote services may include marketing, surveys, business development, searches and other services that does not require the presence of the service providers. In other embodiments, the requests reflecting the demand for services may be data including instructions to request on-site services. For example, the on-site services may include installing Internet services, setting up utility services, repairing a telephonic device, replacing plumbing devices, or the like. In some embodiments, the set of requests may be sent by any of the customer service unit 120 (e.g., via communication device 180B), users 130 (e.g., via communication device 180C), or IoT devices 140. The services may be services requested to be performed by professionals on-site or by remote service providers. In some embodiments, the number of task types may include different types of service. For example, the task types may include product installation, product repair, product maintenance, product replacement, product diagnostics, customer consulting, or the like. In some embodiments, the number of task types may include different types of products. For example, the task types may correspond to different product categories, product models, product manufacturers, or the like. It is noted that the terms "task type," "task classification," and "demand category" may be used interchangeably herein and may refer to any distinguishable characteristic of a task for field professionals.

At step 704, processing device 202 receives availability data indicative of an availability of field professionals 110 or the remote service providers to perform the services. Available field professionals or remote service providers may be scheduled to perform the services. The availability data may be any data that indicates or represents the availability of field professionals 110. For example, the availability data may include any symbolic or numeric value that indicates a field professional is available or unavailable for a new task. In some embodiments, processing device 202 may receive the availability data from field professionals 110 (e.g., via communication device 180A). In some embodiments, processing device 202 may receive the availability data from database 154. In some embodiments, processing device 202 may determine the availability data from inputs from field professionals 110 associated with a period time. For example, a field professional may submit his or her personal schedule conflicts to server 152 via network interface 206. The submission may be performed daily, weekly, monthly, or in any appropriate interval. In some embodiments, processing device 202 may determine the availability data from personal records of field professionals 110. For example, the personal records may include scheduled holidays, vacations, leaves, or any off-duty time periods. In some embodiments, the personal records may be stored in database 154.

At step 706, processing device 202 receives skills data indicative of capabilities of each of field professionals 110 or remote service providers with respect to the task types. The skill data may include any classification of resource that indicates the capabilities of each of field professionals 110 or remote service providers to perform a work associated with a demand category. Field professionals capable of performing the task types may be scheduled to perform the on-site services. The skills data may be any form of data associated with a field professional or a remote service provider and indicative of the capabilities of the field professional. In some embodiments, the skills data may be stored as a database record. For example, the skills data may include data indicative of years of experience, categories of capabilities, certificates of the capabilities, levels of skills, past performance records, titles, team roles, or the like.

In some embodiments, processing device 202 may receive the skills data from field professionals 110 (e.g., via communication device 180A). In some embodiments, processing device 202 may receive the skills data from database 154. In some embodiments, processing device 202 may determine the skills data from personal records of field professionals 110. For example, the personal records may include information representing qualifications, seniority, skill levels, years of affiliation, or the like. In some embodiments, the personal records may be stored in database 154.

In some embodiments, processing device 202 may determine the skills data based on ranking associated with customers' feedback of field professionals 110. For example, the customers' feedback may include scores, stars, comments, answers to multiple-choice questions, emails, phone calls, letters, or the like. The ranking may be determined based on a number-based process (e.g., by ranking the scores) or an opinion-based process (e.g., by evaluating the comments). In some embodiments, the opinion-based process may be implemented using a machine learning model capable of natural language processing. In some embodiments, the ranking of a field professional may be performed for each of the task types the field professional is capable of performing.

Referring back to FIG. 7A, at step 708, processing device 202 obtains at least one desired scheduling weight for the number of task types. For example, for each of the task types, processing device 202 may obtain a desired scheduling weight. The desired scheduling weight may be a value (e.g., a numeric, textual, alphabetic, or symbolic value) that indicates a level of desirability of the task type by a customer. For example, if the desired scheduling weight is a numeric value, the numeric value may indicate the level of the desirability. In some embodiments, high desired scheduling weight may indicate high desirability of the task type, and processing device 202 may prioritize to schedule field professionals for such task type. For example, a task of installing devices may have a lower desirability than a task of repairing devices, and the desired scheduling weight for the task of installing devices may have lower values (e.g., a value of 0.3) than the task of repairing devices (e.g., a value of 0.8). It should be noted that the values of the desired scheduling weight may be set to be within any range and not limited to the examples described herein.

In some embodiments, to obtain the at least one desired scheduling weight, processing device 202 may receive an input indicative of the at least one desired scheduling weight. In some embodiments, the input may be adjusted according to circumstances. For example, processing device 202 may receive the input in real time. For another example, processing device 202 may receive the input in a predetermined interval. For another example, processing device 202 may receive the input on demand by a user of customer service unit 120. In some embodiments, the input may be received from a member of customer service unit 120 (e.g., a manager). For example, processing device 202 may receive a desired scheduling weight for repair as 0.4 (e.g., representing that the repair tasks take 40% of the available time slots for task scheduling), and a desired scheduling weight for installation as 0.6 (e.g., representing that the installation tasks take 60% of the total scheduled tasks). Processing device 202 may assign each task of repair with the weight 40% and each task of installation with the weight 60%. For another example, the member of customer service unit 120 may desire to allocate more resources to support a new product than to an old product. In this example, the input may include a first weight (e.g., 0.8) for the new product and a second weight (e.g., 0.2) for the old product, in which the first weight may be greater than the second weight. Consistent with the present disclosure, the desired scheduling weight may correspond with a scheduling limit, such that a scheduling restriction may be placed on a first task type without placing a restriction on a second task type. The scheduling limit may be indicative of the percentage of the available time windows that can be scheduled for the first task type. For example, the system may avoid from scheduling more than 10% of the available time windows to tasks for repairing a certain product.

In some embodiments, the scheduling weight may be set as correlated with a period of time, such as a month, a season, a year, or any length of any period of time. For example, a task of installing Internet devices may be highly demanded in a summer, and the scheduling weight for such a task may be set as higher than the scheduling weights in other times of the year. For another example, a task of repairing electrical apparatuses may be highly demanded after a heavy snowstorm, and the scheduling weight for such a task may be set as higher than the scheduling weights after normal weather conditions.

In some embodiments, the scheduling weight may be set as correlated with a geographic region, such as a city, a county, a community, or any size of any geographic region. For example, a task of installing telephonic devices may be highly demanded in an urban area, and the scheduling weight for such a task may be set as higher than the scheduling weights in other geographic regions. For another example, a task of maintaining electrical apparatuses may be highly demanded in a rural region, and the scheduling weight for such a task may be set as higher than the scheduling weights in other geographic regions.

In some embodiments, to obtain the at least one desired scheduling weight, processing device 202 may use artificial intelligence (AI) to determine the at least one desired scheduling weight for increasing throughput. In some embodiments, the AI may be implemented as a software module in task scheduling unit 150. For example, the AI may receive a marketing goal as input, and based on market data (e.g., stored in database 154), determine the desired scheduling weight to meet the marketing goals. The marketing goal may be, for example, increasing customer satisfaction on product maintenance in September. Based on such a marketing goal, the AI may increase the desired scheduling weight of the task type of product maintenance in September.

Referring back to FIG. 7A, at step 710, processing device 202 generates a schedule for field professionals 110 based on the demand for services, the availability data, and the skills data. Consistent with the present disclosure, processing device 202 may determine scheduling policies based on available resources and wherein generating the schedule is based on the scheduling policies. For example, when a certain tool is temporary disable, avoid scheduling certain tasks. In this embodiment, the available resources may include the field professionals themselves, working hours, vehicles, tools, equipment, spare parts, office space, and more. The schedule may be generated as any data that includes instructions for field professionals 110 to complete work at specified locations and time. For example, the schedule may include a promised arrival time communicated to a customer, a destination of the customer, a route to the destination, or an expected arrival time determined based on real-time information. Generating the schedule for field professionals 110 may include including a first task in the schedule when the first task conforms with the at least one desired scheduling weight and excluding a second task from the schedule when the second task does not conform with the at least one desired scheduling weight. For example, the first task may be installing a first product, and the second task may be repairing a second product. In some embodiments, conforming with the at least one desired scheduling weight may be implemented as requiring a scheduling weight associated with a task exceeding the desired scheduling weight. For example, the first and second tasks may be associated with a first and second scheduling weights, respectively. When the first scheduling weight is greater than or equal to the desired scheduling weight, the first task may conform with the at least one desired scheduling weight. When the second scheduling weight is smaller than the desired scheduling weight, the second task may not conform with the at least one desired scheduling weight. In some embodiments, the first scheduling weight may be higher than the second scheduling weight.

In some embodiments, the receipt order of the requests may be uncorrelated with generation of the schedule for field professionals 110. For example, processing device 202 may receive a first request associated with the first task may and a second request associated with the second task. For example, the first request may be received after the second request. The first and second requests may reflect demand for services of the first and second tasks.

In some embodiments, processing device 202 may receive historical data associated with past demand for the task types. For example, the historical data may be data associated with past performed services and may include statistics of numbers and types of demanded services (e.g., on-site services). In some embodiments, the historical data may be zone-specific, such as grouped by different geographic regions. Different regions may have different statistics of demanded services. For example, an urban zone may be dominated by requests of Internet installing or repair services, and a rural zone may be dominated by requests of electrical equipment maintenance services. In some embodiments, the historical data may be event-related, such as relating to an inclement weather condition (e.g., a storm). For example, demanded services of restoring utilities may spike after a big storm. In some embodiments, the historical data may be time-specific, such as grouped by certain days of a week, a month, or a year. Different days may have different statistics of demanded services. For example, Mondays may be dominated by requests of Internet repair services, and Tuesdays may be dominated by requests of installing Internet services.

In some embodiments, processing device 202 may generate the schedule for field professionals 110 based on a prediction of demand associated with the received historical data. The prediction of the demand may be generated based on the statistics of the numbers and types of the demanded on-site services. For example, a frequency of an on-site service may be used as a probability to predict the likelihood of its demand. A scheduling weight of the on-site service may be determined based on the its frequency in the historical data. Processing device 202 may then generate the schedule using its scheduling weight. For example, based on historical data, processing device 202 may predict a demand of installing new Internet services is low in March. Based on such prediction, processing device 202 may generate the March schedule with lower priority for field professionals 110 associated with Internet service installation. In some embodiments, the prediction of the demand may be determined using a machine learning model (e.g., implemented as a software model executable by processing device 202).

In some embodiments, processing device 202 may receive environmental data indicative of future events that affect completion of tasks. For example, the environmental data may include information reflecting a known future event, such as a scheduled power blackout, infrastructure maintenance (e.g., a road construction work), an atypical weather condition, a public event (e.g., a parade), or the like. Such future events may limit resources available to field professionals 110 or interfere with their ability to travel, thus affect the completion of the tasks. In some embodiments, processing device 202 may generate the schedule for field professionals 110 based on the environmental data. For example, processing device 202 may receive environmental data indicative of a schedule blackout in a zone. Based on such environmental data, processing device 202 may generate the schedule for field professionals 110 to avoid working in the zone during the scheduled blackout.

In some embodiments, task scheduling unit 150 may reserve schedule availability associated with the desired scheduling weight. In those embodiments, processing device 202 may further schedule tasks that do not conform with the desired scheduling weight when a daily schedule of field professionals 110 is not full. For example, the desired scheduling weights for repair and installation may be 40% and 60%, respectively. Percentages of the actual schedules of repair and installation in the daily schedules may be 20% and 60%, respectively. In other words, the daily schedule of field professionals 110 is not full. In this example, if no requests for repair are received, processing device 202 may schedule up to 60% of the tasks to installations and leaves only 40% room for repairs.

In some embodiments, processing device 202 may further provide, using network interface 206, to a field technician information reflecting an assignment of the first task. The field technician may be one of field professionals 110. The information reflecting the assignment of the first task may be provided as a text message, a website hyperlink, a push notification of a phone application, or the like. In some embodiments, processing device 202 may provide the information via network interface 206 to communication device 180A.

In some embodiments, the information reflecting the assignment of the first task may include details about a customer associated with the first task. For example, the details may include a name, an account number, or a phone number of the customer. In some embodiments, the information reflecting the assignment of the first task may include description of the first task. For example, the description may include a tool, a spare part, or an existing infrastructure, which may be needed by the first task. In some embodiments, the information reflecting the assignment of the first task may include directional instructions to an identified location associated with the first task. For example, the directional instructions may include a location, an address, or a driving route of the customer.

Figure 7B:
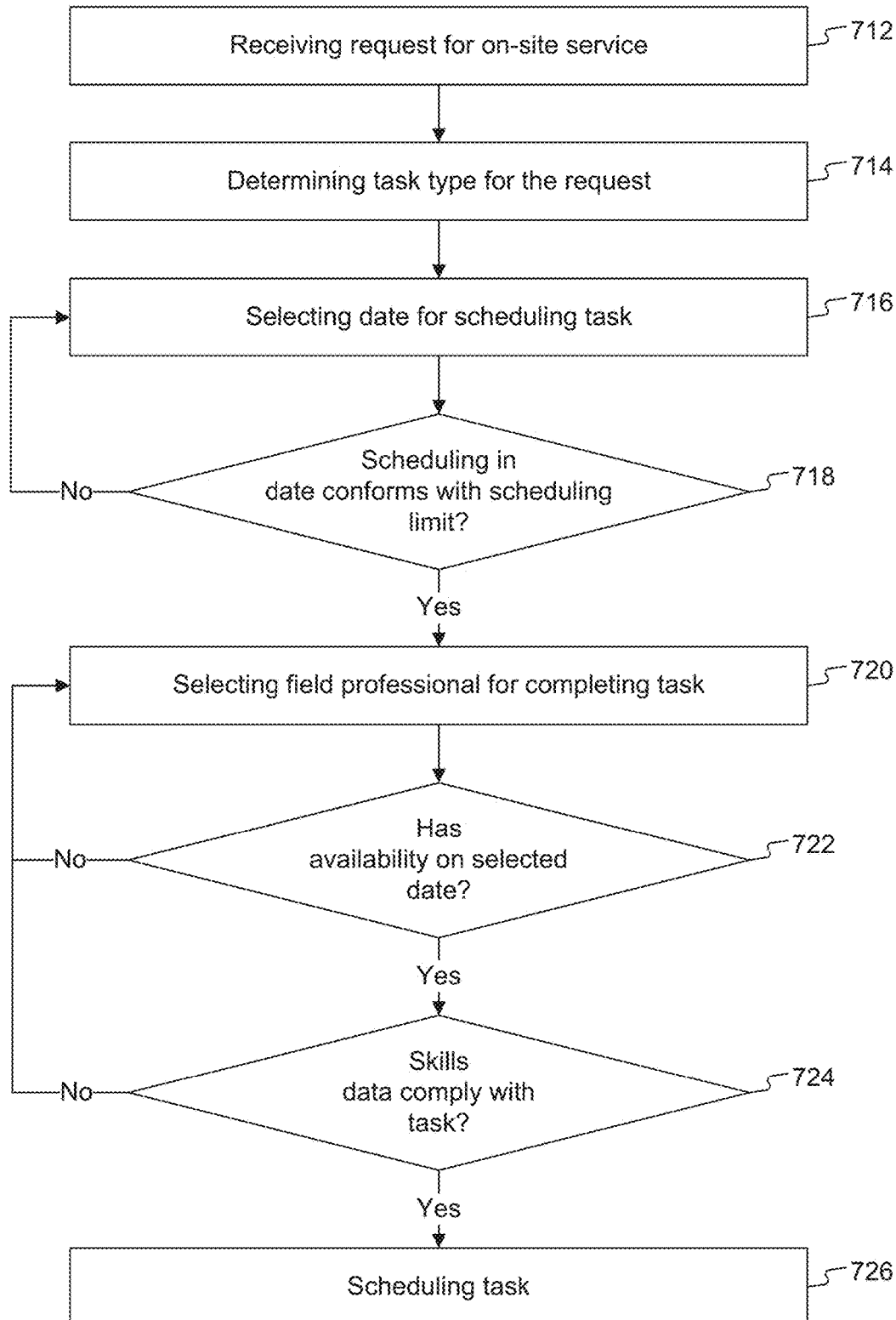
FIG. 7B is a flowchart of another example process for scheduling tasks to field professionals according to desired scheduling weights, consistent with the present disclosure.

FIG. 7B is a flowchart of another example process 700B for scheduling tasks to field professionals, consistent with the present disclosure. In some embodiments, server 152 may implement process 700B. For example, processing device 202 may receive data from I/O system 210 or network interface 206, and then execute instructions or program codes stored in memory interface 204 or database 154, in which the instructions or program codes implement algorithms of process 700B. The algorithms of process 700B may be implemented as one or more of analysis module 441, forecasting module 442, planning module 443, or scheduling module 444. Process 700B includes the following steps or operations.

Figure 7C:
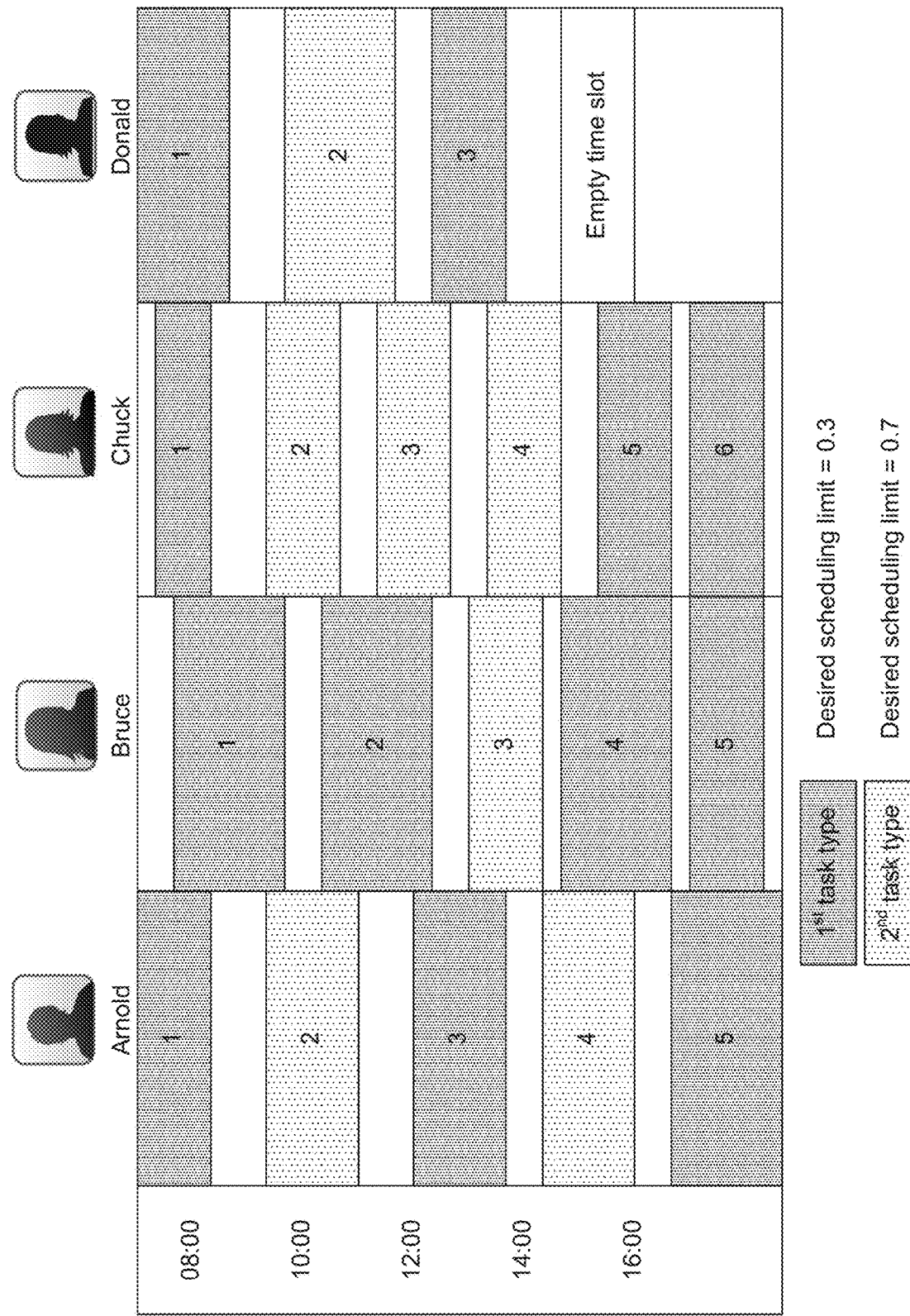
FIG. 7C is a diagram of an example schedule for several field professionals, consistent with the present disclosure.

At step 712, processing device 202 receives a request for on-site service. Step 712 may be implemented in a way similar to step 702 in process 700A. At step 714, processing device 202 may determine a task type for the request. In some embodiments, corresponding relationships between task types and on-site services may be stored in database 154, such as database record entries. Processing device 202 may inquire the database record entries to determine the task type for the received request. At step 716, processing device 202 selects a date for scheduling the task. In some embodiments, processing device 202 may select the date based on various factors, such as demand of the on-site service. For example, if the demand of the on-site service is not in an emergency (e.g., requested to be completed within five business days), processing device 202 may select a date not conflicting with the demand. FIG. 7C shows an example of selecting the date for scheduling the task.

FIG. 7C is a diagram of an example schedule for several field professionals, consistent with the present disclosure. The field professionals are Arnold, Bruce, Chuck, and Donald. The schedule shows assigned tasks and availability of each of the field professionals between 8:00 and 16:00 of a workday. The assigned tasks have two types, a first type of task (e.g., installing services) shown as dense-dotted blocks, and a second type of task (e.g., repairing services) shown as sparse-dotted blocks. Each of the field professionals are assigned with different numbers of the two types of tasks in different times of day. For example, Arnold is assigned with 5 tasks in the workday, with the first, third, and fifth tasks of the first type and the second and fourth tasks of the second type. In FIG. 7C, Arnold, Bruce, and Chuck have a full schedule for the workday, and Donald has an empty time slot after his third task.

Processing device 202 may select this workday for scheduling the received task based on the demand of the on-site service. The demand may include a time requirement of completion within five business days. For example, the on-site service may be of the second type, and scheduling the on-site service does not conflict with the time requirement of the demand of the on-site service (e.g., the workday in FIG. 7C is within the five-business day after receiving the request). Accordingly, processing device 202 may select the workday in FIG. 7C as the selected date.

At step 718, processing device 202 determines whether scheduling the task in the selected date conforms with a scheduling limit associated with the task type. If scheduling the task in the selected date conforms with the scheduling limit associated with the task type, process 700B proceeds to step 720. Otherwise, process 700B goes back to step 716, at which processing device 202 may select another date for scheduling the task. Consistent with the present disclosure, process 700B may be adapted to be used in other implementations of system 100. For example, process 700B may be adapted to be used when optimizing task schedules. As discussed below, system 100 may review the schedule and provided schedule change recommendations to enable greater optimization of scheduling all the field professionals as a whole. Before system 100 provides a schedule changes recommendation, it may determine whether scheduling the task in a recommended date conforms with the scheduling limit associated with the task type. In one embodiment, system 100 may use a multi-route model to determine appointment availability. In one example, part of the routes may use a version of process 700B to confirm that the scheduling limit associated with the task type is met. For example, in FIG. 7C, the first type of task has a desired scheduling limit of 0.3, and the second type of task has a desired scheduling limit of 0.7. The desired scheduling limits of the first and second types of tasks may be obtained in a way similar to step 708 of process 700A. Such desired scheduling limit may reflect that the second type of tasks has higher desirability higher than the first type of tasks. In this example, the condition of conforming with the scheduling limit associated with the task type may be that, if a desired scheduling limit is smaller than 0.6, processing device 202 may schedule the first type of tasks to the workday in FIG. 7C. That is, the received request of on-site service will not be scheduled to the workday in FIG. 7C. Otherwise, if the desired scheduling limit is greater than or equal to 0.6, processing device 202 may schedule the second type of tasks to the workday in FIG. 7C. That is, the received request of on-site service will be scheduled to the workday in FIG. 7C. The description of the desired scheduling limit has been set forth in descriptions corresponding to step 708 of process 700A and will not be detailed hereinafter.

In the above example, at step 718, processing device 202 may determine that scheduling the task in the selected date conforms with the scheduling limit associated with the task type because the task is of the second type and has a desired scheduling limit of 0.7, such that the received request of on-site service may be scheduled on the work day in FIG. 7C.

At step 720, processing device 202 selects a field professional for completing the task. For example, the workday of FIG. 7C is the selected date, and processing device 202 may select any of Arnold, Bruce, Chuck, and Donald as the selected field professional for completing the task. Processing device 202 may select the date based on various factors, such as availability of the field professional and skills data of the field professional.

At step 722, processing device 202 determines whether the selected field processional has availability on the selected date. If the selected field processional has availability on the selected date, process 700B proceeds to step 724. Otherwise, process 700B goes back to step 720, in which processing device 202 may select another field professional. As shown in FIG. 7C, only Donald has availability (i.e., the empty time slot) on the selected date. Processing device 202 may select Donald as the selected field professional. In some other embodiments, if no field professional is available on the selected date, process 700B may goes back to step 720.

At step 724, processing device 202 determines whether skills of the selected field professional comply with the task. If the skills of the selected field professional comply with the task, process 700B proceeds to step 726. Otherwise, process 700B goes back to step 720, in which processing device 202 may select another field professional. In some embodiments, the skills required for completing the on-site service may involve certifications, past experience, past performance, customer satisfaction levels, years of experience, or any other indicators reflecting likelihood of successfully completing the requested on-site service of the selected field professional. Such skills may be stored as data entries associated with the field professional in database 154, for example. In some embodiments, processing device 202 may retrieve such data entries after selecting the field professional at step 722, and determine whether the field professional has required skills for completing the on-site service by comparing values of the data entries to predetermined criteria. For example, if the requested on-site service involves repairing a device, processing device 202 may determine whether Donald has a certificate to repair the device. At step 726, processing device 202 may schedule the task on the selected date to the selected field professional. For example, in FIG. 7C, processing device 202 may schedule the task to Donald's empty time slot.

C. Using Predicted Demand to Optimize Task Scheduling

Disclosed and claimed is a system that implements predictive task scheduling for field professionals by predicting service demand based on historical data and schedule field professionals under full availability thereof based on the predicted service demand. The system may reserve some availability of field professionals as redundancy for a time period in a service schedule in case of emergencies that is likely to occur (but not yet occur when scheduling the field professionals) predicted by historical data. The predicated demand may include certain locations or certain types of task. The system may also determine where to send specific field professionals with specific skill sets. In some embodiments, the system may be implemented as task scheduling unit 150.

Figure 8A:
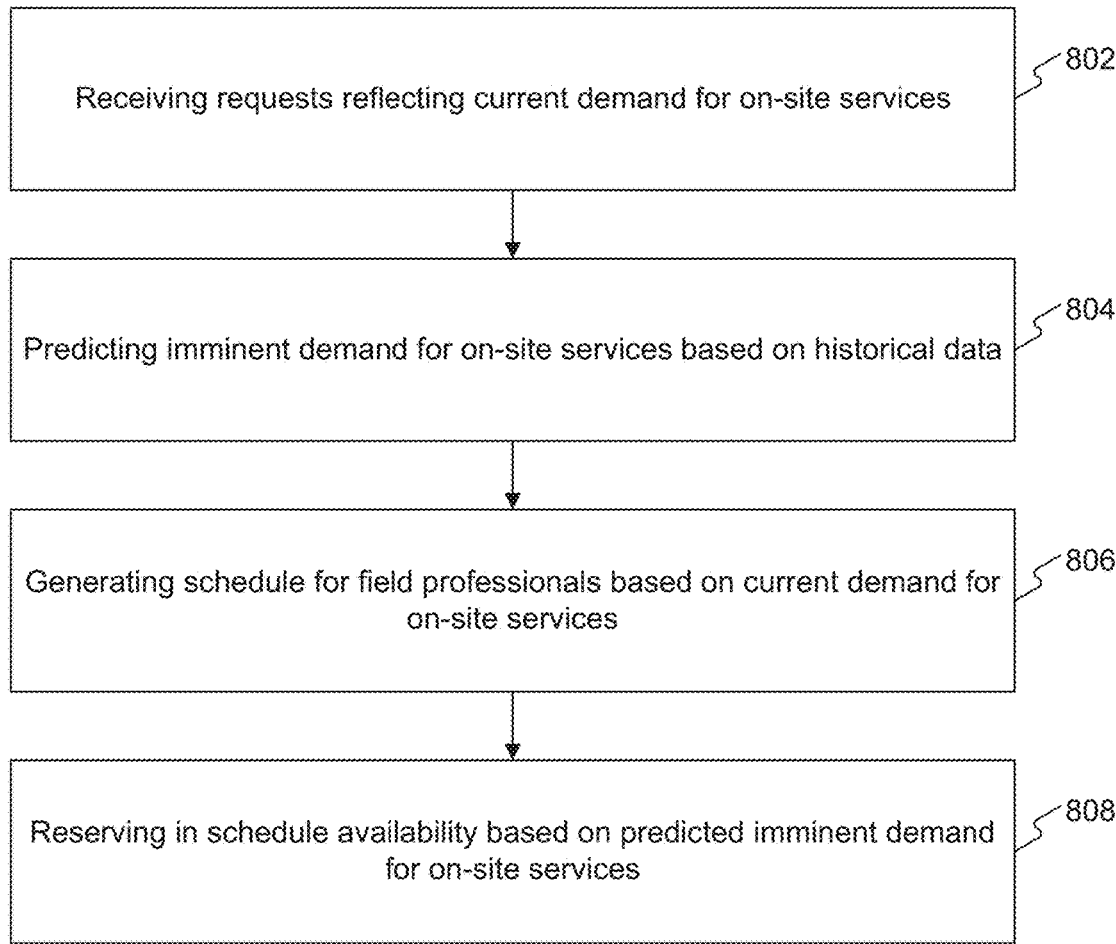
FIG. 8A is a flowchart of an example process for scheduling tasks to field professionals based on predicted demand, consistent with the present disclosure.

FIG. 8A is a flowchart of an example process 800A for scheduling tasks to field professionals, consistent with the present disclosure. In some embodiments, server 152 may implement process 800A. For example, processing device 202 may receive data from I/O system 210 or network interface 206, and then execute instructions or program codes stored in memory interface 204 or database 154, in which the instructions or program codes implement algorithms of process 800A. The algorithms of process 800A may be implemented as one or more of analysis module 441, forecasting module 442, planning module 443, or scheduling module 444. Process 800A includes the following steps or operations.

At step 802, processing device 202 receives a set of requests reflecting a current demand for on-site services. Database 154 may be configured to store historical data associated with past demand for field professionals. Processing device 202 is connectable to network interface 206 for access database 154. The current demand may be a demand for on-site services that occur at a current time. In some embodiments, the current demand may be an actual demand occurring at the current time, rather than a predicted demand. In some embodiments, the set of requests may be in a form of network data messages that may be received by processing device 202 via network interface 206. The historical data may include any data reflecting statistics, attributes, environments, or circumstances associated with past demands of on-site services. For example, the historical data may include statistical data reflecting frequencies and number of times of past demands for each of the on-site services. The statistical data may be associated with attributes of the past demands, such as a time period when such past demands were made, a location where such past demands were performed, a traffic condition when a field professional was reaching the location, a weather condition when the field professional was reaching the location, a number of dispatched field professionals, availability of field professionals during the time period, or any other related information.

In some embodiments, in addition to the set of requests, processing device 202 may further receive other data, such as traffic data indicative of current traffic conditions and historical traffic conditions, or weather data indicative of a current weather condition. For example, the traffic data may include data reflecting road conditions and level of traffic congestions of a region near the location of the on-site service or a route along with which a field professional may travel to reach the location of the on-site service. The traffic data may further include data reflecting past road conditions and level of traffic congestions of the region near the location of the on-site service around the time when the on-site service is scheduled.

At step 804, processing device 202 predicts imminent demand for on-site services based on the historical data. The imminent demand may be any demand that is likely to occur at a time close to a candidate schedule time for the requests reflecting the current demand. For example, the imminent demand may be any sudden, improvised, urgent, emergent, or last-minute demand made by customers (e.g., out of plan). Processing device 202 may predict the imminent demand using the historical data. For example, for a candidate schedule time for the requests reflecting the current demand, processing device 202 may select a time period before the candidate schedule time and retrieve statistical data reflecting frequencies and number of times of occurrence of such imminent demands. Based on the statistical data, processing device 202 may determine a likelihood reflecting a probability that a certain number of requests reflecting the imminent demands would be made within the time period before the candidate schedule time.

In some embodiments, when processing device 202 receives the traffic data indicative of the current traffic conditions and the historical traffic conditions, processing device 202 may predict imminent traffic conditions based on the received traffic data. For example, based on the historical traffic conditions, processing device 202 may determine an average traffic condition (e.g., an average road condition or an average level of traffic congestion) within the time period before the candidate schedule time as the predicted imminent traffic conditions.

In some embodiments, when processing device 202 further receives the weather data indicative of the current weather condition, processing device 202 may predict the imminent traffic conditions based on the weather data and the traffic data. For example, based on the weather data and average traffic condition as determined using the traffic data in the aforementioned embodiments, processing device 202 may adjust the average traffic condition in accordance with corresponding relationships between weather conditions and effects on traffic conditions (e.g., a raining condition may delay traffic speed for 20%, while a snow storm may delay traffic speed for 50%) to predict the imminent traffic conditions.

Referring back to FIG. 8A, at step 806, processing device 202 generates a schedule for a set of field professionals based on the current demand for on-site services. In some embodiments, the field professionals may be assigned with tasks to complete the on-site services. Processing device 202 may schedule the tasks in one or more time slots. For example, the current demand may include different numbers of requests in different types, and processing device 202 may select field professionals capable to complete the requested on-site services and schedule the tasks in their available times.

In some embodiments, processing device 202 may determine the schedule for the set of field professionals based on the predicted demand for on-site services and locations associated with the set of requests. For example, as shown in FIGS. 3A-3B, a type of on-site service is requested at locations A, B, C, and D and a field professional (the first field professional P1) may be assigned to a task to complete such on-site services in locations A-D. In this example, processing device 202 may determine a schedule to complete the tasks in a temporal order of D→C→B→A because a predicted demand of such on-site service at location A may rise later that day. By arranging P1 to visit location A around the time when predicted demand of such on-site service rises, P1 may be able to respond to imminent demand of the same type of service around location A around the scheduled time. By doing so, total traveling time may be saved and faster response to customer requests may be achieved.

In some embodiments, when processing device 202 receives the traffic data indicative of the current traffic conditions and the historical traffic conditions, processing device 202 may generate the schedule for the set of field professionals further based on the predicted traffic conditions. In the above example, processing device 202 may determine a schedule to complete the tasks in a temporal order of A→B→D→C after considering the traffic data because processing device 202 may determine that traffic conditions between C and D would be bad at a specific time of day and the determined temporal order may allow P1 to avoid travelling between C and D during that specific time. By doing so, a total driving duration of P1 may be minimized.

In some embodiments, when processing device 202 further receives the weather data indicative of the current weather conditions, processing device 202 may generating the schedule for the set of field professionals further based on the current weather conditions. In the above example, the current weather may be snowing, and processing device 202 may determine a schedule to complete the tasks in a temporal order of A→D→C→B after considering the traffic data and the weather data because the traveling between A and B would be very slow due to the snow weather if route A→B→D→C is adopted. By adopting route A→D→C→B, P1 may avoid the current snow and road conditions may improve for traveling later that day. By doing so, a total driving duration of P1 may be minimized.

Referring back to FIG. 8A, at step 808, processing device 202 reserves in the schedule availability based on the predicted imminent demand for on-site services. To reserve availability in the schedule, processing device 202 may arrange tasks in a first time slot under full availability of field professionals, such as up to a predetermined percentage. If the first time slot is insufficient to cover all requested on-site services, processing device 202 may arrange tasks in a second time slot, keeping the first time slot under full availability of the field professionals.

Figure 8B:
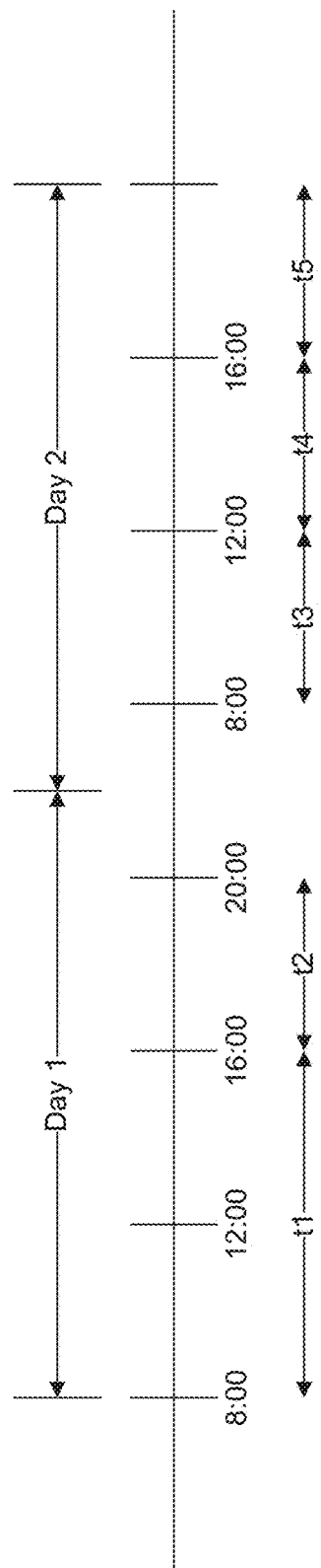
FIG. 8B is a diagram of a timeline reflecting an example schedule associated with tasks, consistent with the present disclosure.

FIG. 8B is a diagram of a timeline reflecting an example schedule associated with tasks, consistent with the present disclosure. In FIG. 8B, two days of schedule are shown in the timeline. Five time slots are shown in FIG. 8B, in which time slot t1 spans from 8:00 to 16:00 in day 1, time slot t2 spans from 16:00 to 20:00 in day 1, time slot t3 spans from 8:00 to 12:00 in day 2, time slot t4 spans from 12:00 to 16:00 in day 2, and time slot t5 spans from 16:00 to an undetermined time in day 2. In day 1, processing device 202 may receive the set or requests reflecting the current demand of the on-site service as described in step 802 in process 800A. Processing device 202 may predict imminent demand for the same type of on-site service may rise in t3 based on historical data, as described at step 804. For example, the prediction may show that during t3, some urgent requests of the same type of on-site services would be made by customers, and such urgent requests has high desirability to be completed soon (e.g., completed in t4). Processing device 202 may schedule a task associated with a field professional available to complete the on-site service in t4, as described at step 806. To cope with the potential rise of imminent demand, processing device 202 may reserve 20% of availability of field professionals in t4. That is, for all field professionals that may be assigned to complete the task in t4, the maximum percentage thereof to be assigned in t4 is 80%. If the current demand of the on-site service cannot be fully satisfied in t4, processing device 202 may start scheduling the task associated with field professionals available to complete the on-site service in t5. By doing so, if the urgent requests occur in t3, there would be 20% of field professionals available in t4 to complete the tasks.

In some embodiments, processing device 202 may reserve availability in the schedule for certain field professionals. In some embodiments, processing device 202 may reserve availability of field professionals with a specific skill set, field professionals performing a specific task type, field professionals having a specific experience level, or field professionals conforming to any predetermined criteria. For example, referencing to FIG. 8B, the requests received at step 802 reflecting the current demands may require a first skill and a second skill. Two types of field professionals having the respective skills may be assigned to complete the tasks. The imminent demands predicted at step 804 may show that another service demand requiting the first skill may rise in t3 but no service demand requiring the second skill would rise in t3, based on historical data. In this circumstance, processing device 202 may only reserve availability of field professionals having the first skill in t4, and impose no restriction on assigning field professionals having the second skill in t4.

In some embodiments, processing device 202 may reserve availability in a schedule for specific task types. For example, referencing to FIG. 8B, the requests received at step 802 reflecting the current demands may include a first type of on-site service and a second type of on-site service. The imminent demands predicted at step 804 may show that only the first type of on-site service may rise in t3 based on historical data. In this circumstance, processing device 202 may only reserve availability of field professionals performing the first type of on-site service in t4, and impose no restriction on assigning field professionals performing the second type of on-site service in t4. In some embodiments, the percentage (e.g., 80%) of the reserved availability may be determined based on a desired scheduling weight of the task, the details of which are described above.

In some embodiments, processing device 202 may identify service zones associated with the predicted demand. Processing device 202 may further reserve availability in a schedule of a field professional who travels to an area associated with the identified service zones. A service zone may be a geographic region where a field professional provides on-site service. The area associated with the service zone may be a geographic region that includes, overlaps with, borders on, or locates close to the service zone. In some embodiments, the service zone may be a zone that includes sites, buildings, or addresses that are easy to access in between, such as a university campus, a hospital campus, a residential community, or a business district. The service zone may be predetermined and recorded as a data entry in database 154. In some embodiments, one or more field professionals may be associated with a specific service zone and provide on-site service in that specific service zone. In some embodiments, a field professional may be associated with one or more service zones for providing on-site services. Such associations may also be recorded or stored as data entries in database 154. In some embodiments, when a demand is predicted, processing device 202 may use an address of the predicted demand to identify a service zone where the address is in.

Figure 8C:
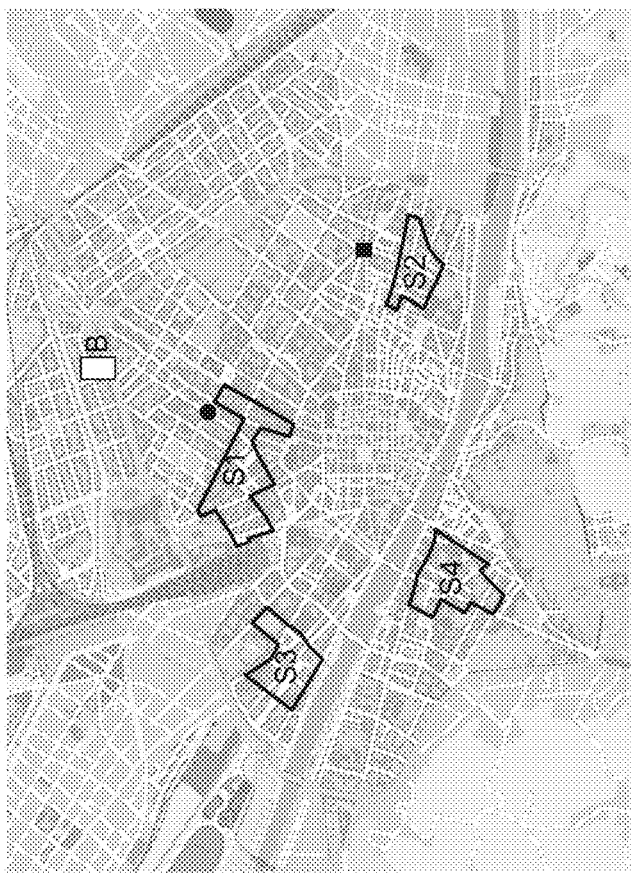
FIG. 8C is a diagram of a map showing example service zones associated with on-site services, consistent with the present disclosure.

FIG. 8C is a diagram of a map showing example service zones associated with on-site services, consistent with the present disclosure. FIG. 8C shows a base B of field professionals, four service zones S1-S4, a field professional P1 located near S1, illustrated as a round dot, and a field professional P2 located near S2, illustrated as a square dot. The base B may be the starting point (e.g., starting points in FIGS. 3A-3B) of routes of field professionals traveling to destinations for providing on-site services. For example, a demand is predicted to occur at an address in service zone S1. Processing device 202 may use the address to identify S1 as the service zone. Processing device 202 may determine that P1 is traveling to an area associated with S1. Processing device 202 may then reserve P1's availability in P1's schedule. For example, processing device 202 may determine a probability that a demand will occur in S1 and a distance from P1's current location to S1. Based on the probability and the distance, processing device 202 may determine how much availability would be reserved for P1. For example, the higher the probability, the higher availability may be reserved. For another example, the shorter the distance, the higher availability may be reserved.

In some embodiments, processing device 202 may identify a first service zone associated with a first predicted demand and a second service zone associated with a second predicted demand lower than the first predicted demand. For example, in FIG. 8C, processing device 202 may identify S1 associated with a first predicted demand (e.g., a repairing service) and S2 associated with a second predicted demand (e.g., an installing service). The second predicted demand may have a lower probability to occur than the first predicted demand.

In the above embodiments, when the second service zone is more remote than the first service zone, processing device 202 may determine a strategy for reserving availability of field professionals. In some embodiments, processing device 202 may avoid reserving availability in a schedule of a field professional traveling to an area associated with the first service zone, and reserve availability in a schedule of a field professional traveling to an area associated with the second service zone. For example, in FIG. 8C, for field professional P1, S2 is more remote than S1. Based on the distance between P1 and S1, the distance between P2 and S2, and the probabilities that a demand will occur in S1 and S2, respectively, processing device 202 may determine the strategy for reserving availability of P1 and P2. For example, it may take P1 10 minutes to travel to S1 and one hour to travel to S2. In this example, processing device 202 may avoid reserving P1's availability in P1's schedule, and reserve P2's availability in P2's schedule instead, even though the probability that a demand will occur in S2 is lower than the probability that a demand will occur in S1.

In some embodiments, after reserving in the schedule the availability based on the predicted demand for the on-site services, processing device 202 may further determine tools and spare parts required in tasks associated with predicted imminent demand. For example, in FIG. 8C, after reserving P1's availability in P1's schedule of t4 based on a prediction that an imminent demand (e.g., a repairing service) for on-site service in t4 might be requested in t3, processing device 202 may determine required tools and spare parts for the imminent demand. Corresponding relationships between services and tools and parts may be stored as data entries in database 154. In some embodiments, once the imminent demand is predicted, processing device 202 may inquire database 154 to determine the corresponding required tools and spare parts.

After determining tools and spare parts required in the tasks associated with the predicted imminent demand, processing device 202 may further confirm that the set of field professionals assigned to tasks associated with the current demand will have the tools and spare parts required in tasks associated with predicted imminent demand. For example, in FIG. 8D, when P1 is traveling in the area associated with S1 to perform on-site services requested in a current demand, processing device may determine that an imminent demand may occur in S1 and the required tools and spare parts needed for the imminent demand in S1. Processing device 202 may further confirm that P1 will have the required tools and spare parts for performing the imminent demand, in case P1 can be assigned to the imminent demand when it actually occurs. In some embodiments, to confirm so, processing device 202 may notify (e.g., by sending a message) P1 the imminent demand that P1 may be assigned to and the required tools and spare parts, and P1 may respond (e.g., by sending another message) to the notification to confirm whether P1 has those tools and spare parts.

Figure 8D:
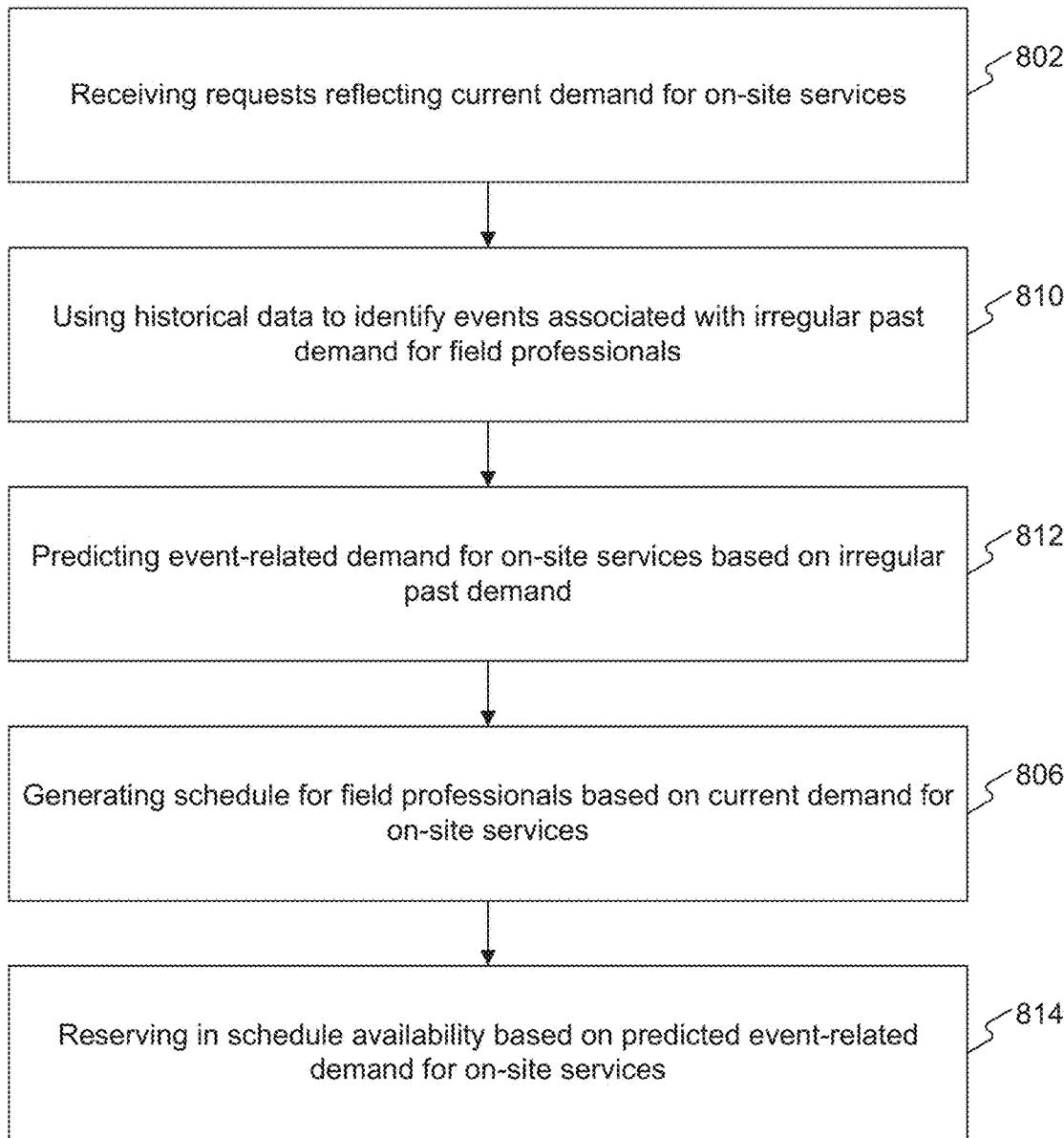
FIG. 8D and FIG. 8E are flowcharts of another example processes for scheduling tasks to field professionals based on predicted demand, consistent with the present disclosure.

FIG. 8D is a flowchart of an example process 800D for scheduling tasks to field professionals, consistent with the present disclosure. In some embodiments, server 152 may implement process 800D. For example, processing device 202 may receive data from I/O system 210 or network interface 206, and then execute instructions or program codes stored in memory interface 204 or database 154, in which the instructions or program codes implement algorithms of process 800D. The algorithms of process 800D may be implemented as one or more of analysis module 441, forecasting module 442, planning module 443, or scheduling module 444. Process 800D includes the following steps or operations.

Process 800D starts with step 802 as described in FIG. 8A. At step 810, processing device 202 uses the historical data to identify events associated with irregular past demand for field professionals. In some embodiments, the historical data may be data associated with past services and may include statistics of numbers and types of demanded on-site services. Based on frequencies of past demanded on-site services, processing device 202 may determine a frequency for each type of demanded on-site services, and such frequency may be used to determine a probability for each type of the on-site services to be demanded. Such frequencies may be zone-specific or period-specific. For example, the frequencies may be calculated for each service zone (e.g., as shown in FIG. 8C), for each hour of the day, or for each hour of the date in each service zone. Based on the statistics, processing device 202 may determine regular or irregular past demands. For example, if the probability of a type of on-site service is in a predetermined probability range (e.g., 40% to 60%), processing device 202 may determine that on-site service as regular. If the probability of a type of an on-site service is out of the predetermined probability range (e.g., lower than 40% or higher than 60%), processing device 202 may determine that on-site service as irregular.

In some embodiments, when processing device 202 identifies irregular past demands, it may further determine whether an event is associated with those irregular past demands. For example, processing device 202 may obtain from an information source to search for the event. The event may be a traffic condition, a weather condition, a specific time period, or a public event (e.g., a road construction, a road closure, a road opening, a holiday, a big sports event, a concert, a big conference, a product promotion, a sales marketing event, etc.). For example, processing device 202 may identify that after a big snowstorm, past demands of utility repairing services may be irregularly high. For another example, processing device 202 may identify that before a holiday, past demands of Internet installing services may be irregularly high.

At step 812, processing device 202 predicts event-related demand for on-site services based on the irregular past demand. For example, at step 810, processing device may identify that, for a specific service zone (e.g., S3 in FIG. 8D) in a specific time period of a day (e.g., t4 in FIG. 8C), a regular probability of a repairing service is 40%, but the probability thereof raises to 75% if a big snow storm happens before the specific time period. In this example, processing device 202 may predict the event-related demand (i.e., related to the big snowstorm) for the repairing service to be 35%. In other words, the difference between the regular probability and the irregular probability reflects the demands caused by the big snowstorm.

After step 812, process 800D proceeds to step 806 as described in FIG. 8A. At step 814, processing device 202 reserves in the schedule availability based on the predict event-related demand for on-site services. In the example set forth at step 810, when processing device 202 determines that the storm-related demand for the repairing service is 35% at step 812, it may reserve a percentage of availability for a field professional serving the specific service zone in the specific time period, if a big snow storm is predicted to happen before the specific time period. The percentage may be determined based on the event-related demand, such as 35%, 20%, or any other percentage that reflect the influence of the event.

Figure 8E:
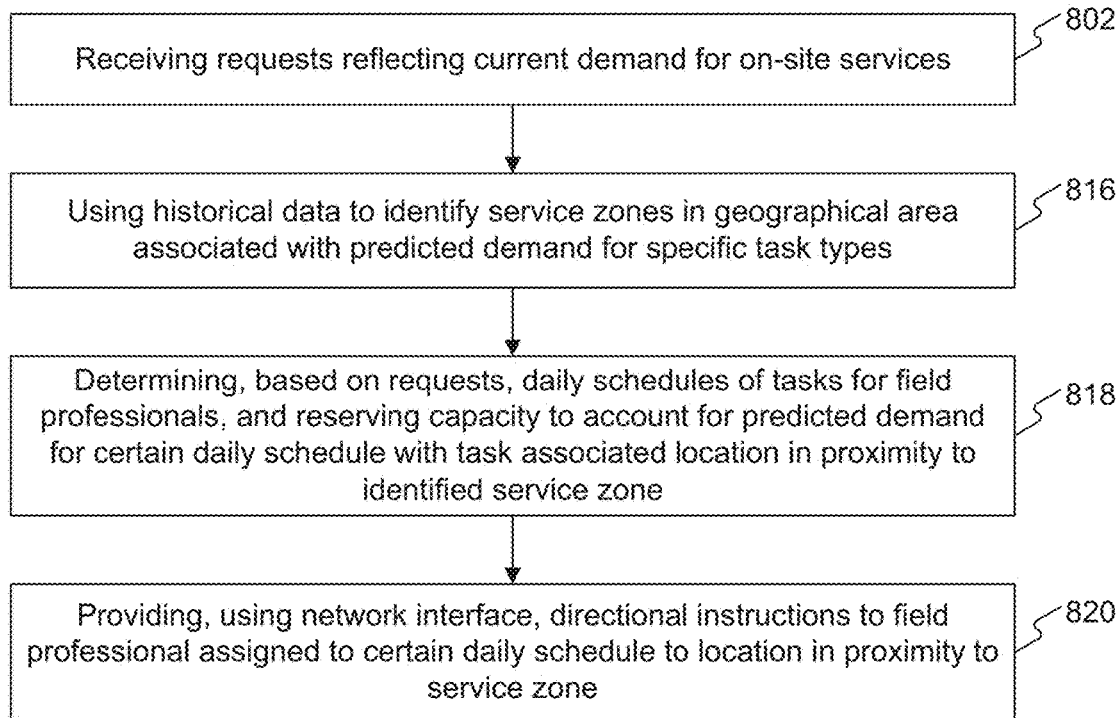

FIG. 8E is a flowchart of an example process 800E for scheduling tasks to field professionals, consistent with the present disclosure. In some embodiments, server 152 may implement process 800E. For example, processing device 202 may receive data from I/O system 210 or network interface 206, and then execute instructions or program codes stored in memory interface 204 or database 154, in which the instructions or program codes implement algorithms of process 800E. The algorithms of process 800E may be implemented as one or more of analysis module 441, forecasting module 442, planning module 443, or scheduling module 444. Process 800E includes the following steps or operations.

Process 800E starts with step 802 as described in FIG. 8A. In some embodiments, a memory (e.g., database 154 or memory interface 204) may be configured to store historical data associated with past demand for field professionals in a geographical area. The historical data may be data associated with past performed services and may reflect statistics of the past demand, the field professionals performing tasks associated with the past demands, and environments or circumstances when those tasks were performed. The geographical area may be a region where field professionals 110 provide their services, such as the map in FIG. 8C.

In some embodiments, the memory may be configured to store historical traffic data in a geographical area. The traffic data is set forth in description related to step 802 in FIG. 8A. The historical traffic data may be traffic data associated with past demands. For example, the historical traffic data of service zones S1-S4 as shown in FIG. 8C may be stored in database 154 and accessed via memory interface 204. In some embodiments, processing device 202 may be configured to determine daily schedules of tasks based on the historical traffic data. Processing device 202 may determine the daily schedules of tasks based on the historical traffic data in a way similar to some embodiments of step 806 as described.

In some embodiments, the memory may be further configured to store historical performance data of the field professionals. Performance data may be data reflecting performances of the field professionals, such as time spent on completing the services, time spent on traveling, numbers of completed tasks in a workday, number of total working hours, reviews from customers, efficiency of completing the tasks, etc. The historical performance data of the field professionals may be their performance data associated with past demands. Processing device 202 may be further configured to determine the daily schedules of tasks based on the historical performance data. For example, based on the historical performance data, processing device 202 may rank the field professionals according to customers' feedback on their past performances (e.g., by review scores). Based on the ranking, processing device 202 may determine daily schedules of tasks for the field professionals, such as assigning more tasks to field professionals with higher rankings than field professionals with lower rankings.

In some embodiments, the set of requests may be associated with a number of task types and each request may be associated with a different location. For example, processing device may receive multiple requests at step 802, each of which may be associated with a task type (e.g., repairing, installing, replacing, maintaining, inspecting, etc.). Each of the requests may also be associated with a different location (e.g., in service zones S1-S4 in FIG. 8C).

In some embodiments, processing device 202 may receive environmental data indicative of future events that can affect certain locations in the geographical area. For example, the environmental data may be received from different data sources outside system 100 that monitor the environmental conditions in areas associated with task locations. The environmental data may include information reflecting a known future event, such as a scheduled power blackout, infrastructure maintenance (e.g., a road construction work), an atypical weather condition, a public event (e.g., a parade), or the like. The future events may affect some locations in the geographical area where the historical data thereof is stored in the memory.

At step 816, processing device 202 uses the historical data to identify service zones in the geographical area associated with predicted demand for specific task types. In some embodiments, the predicted demand may be the imminent demand determined at step 804 in process 800A. The predicted demand may be associated with multiple task types (e.g., repairing, installing, replacing, maintaining, inspecting, etc.). The predicted demand may also be associated with on-site services at different locations. Processing device 202 may identify the service zones based on the locations. For example, the service zones may be S1-S4 in FIG. 8C.

In some embodiments, if processing device 202 receives the environmental data at step 802, processing device 202 may identify the service zones in the geographical area further based on the environmental data. For example, the environmental data may indicate that a snowstorm will occur in the geographical area and some service zones will be affected. The affected service zones may have higher demand of some task types (e.g., repairing). Based on such environmental data, processing device 202 may identify the service zones that might have higher demands due to the coming snowstorm.

At step 818, based on the requests, processing device 202 determines a set of daily schedules of tasks for a set of field professionals. Step 818 may be implemented in a way similar to step 806 in process 800A. In some embodiments, processing device 202 may reserve capacity to account for predicted demand for a certain daily schedule with a task associated with a location in proximity to an identified service zone. The capacity may reflect the capability and resources available to complete the requested on-site services. For example, the capacity may include availability of field professionals, tools, spare parts, vehicles, etc. In one embodiment, processing device 202 may predict that the likelihood of a task in that area is greater than a threshold, accordingly, a field professional may be sent to an identified service zone even if there is no pending task or a scheduled service in that area.

In some embodiments, processing device 202 may determine the schedule for the field professionals under full capacity. For example, referencing to FIG. 8C, service zones S3 and S4 may be identified at step 816 where some demands having the specific task types are predicted to occur. Processing device 202 may reserve availability of field professional P1 who has a schedule to complete a task in a location proximate to S1 to account for the predicted demand. In other words, in anticipation that predicted demand in S1 will be requested, processing device 202 may reserve P1's availability in case those predicted demands are actually requested in S1, in which processing device 202 may assign P1 to respond to the predicted demands. In some embodiments, besides availability of field professionals, processing device 202 may further reserve other capacity or resources in anticipation of responding to the predicted demands, such as extra tools, spare parts, vehicles, etc.

At step 820, using network interface 206, processing device 202 provides directional instructions to a field professional assigned to the certain daily schedule to a location in proximity to a service zone. For example, referencing to FIG. 8C, field professional P2 is assigned to a daily schedule to perform a task at a location proximate to S2 where demands in S2 are predicted to occur in the future. Processing device 202 may provide directional instructions to P2 using network interface 206. In some embodiments, P2 may receive the directional instructions via communication device 180A. In some embodiments, P2's vehicle (e.g., an autonomous vehicle) may receive the directional instructions automatically without P2's intervention. The directional instructions may be instructions that are informative for the field professional to complete tasks associated with the predicted demands.

In some embodiments, the directional instructions to the location in proximity to the service zone may include at least one of a waypoint, an address, and a driving route. For example, referencing to the example at step 820, the driving route may be a calculated route for P2 to drive to an address of a decimation in S2 where a predicted demand is actually requested, and the waypoint may be a location in the driving route.

In some embodiments, processing device 202 may assign a specific field professional to the certain daily schedule based on the predicted demand for specific task types in the identified service zone and known capabilities of the specific field professional. In some embodiments, the specific field professional may have a higher qualification or a wider range of skills than a normal field professional. For example, referencing to FIG. 8C, some demands having the specific task types (e.g., inspecting and installing) may be predicted to occur in S2 at step 816. P2 may be known to have capabilities to perform tasks of inspecting and installing. Another field professional P3 (not shown) who is near P2 may be known to have capabilities to perform tasks of installing only. Based on such information, processing device 202 may assign to P2 the daily schedule of completing tasks at a location proximate to S2 in case the predicted demands having inspecting and installing services are actually requested. Such assignment may achieve a goal that, when the predicted demands are actually requested, P2 may respond to a wider range of tasks than P3.

In some embodiments, processing device 202 may confirm that the field professional assigned to the certain daily schedule is capable to provide the specific task type in the identified service zone. In some embodiments, referencing to the previous example, processing device 202 may assign P2 daily schedule of completing tasks at a location proximate to S2. To confirm that P2 is capable to provide the inspecting and installing service types in S2, processing device 202 may inquire (e.g., by sending a message) P2 whether P2 has the capability to complete the inspecting and installing service in S2. In some embodiments, processing device 202 may further inquire P2 whether P2 has required tools and spare parts for the inspecting and installing service in S2. P2 may respond (e.g., by sending another message) to the inquiry to confirm.

In some embodiments, when a daily schedule of another field professional has unexpectedly become available, processing device 202 may be configured to direct the another field professional to an identified service zone even when no specific request from locations in proximity to the identified service zone has been received. For example, referencing to FIG. 8C, a third field professional P3 (not shown) may unexpectedly become available, such as due to canceled requested demands in P3's daily schedule. In this example, processing device 202 may have identify S1 and S2 as service zones that might have predicted demands at step 816. Processing device 202 may then direct P3 to S2 (or S1), even at a time when processing device 202 does not receive any specific request for on-site services at locations proximate to S2 (or S1). By doing so, when the predicted demands in S2 (or S1) are actually requested, more field professionals will be available to be assigned to the predicted demands, and the travel time for the assigned field professional (e.g., P3) may be shortened.

In some embodiments, processing device 202 may assign at least one location-agnostic task to the field professional to fill the reserved capacity when no additional on-site tasks are scheduled in the service zone. The location-agnostic task is a task that the field professional can perform remotely from a customer's place, such as a technical support session (e.g., a call, a video chat, an online chat, etc.). For example, referencing to FIG. 8C, when no additional on-site tasks are scheduled in S2 (e.g., the predicted demands in S2 are not actually requested), P2 may become idle because processing device 202 may previously reserve P2's availability. To fill P2's reserved availability, processing device 202 may assign the location-agnostic task to P2, such that P2 may be utilized.

D. Scheduling Tasks

Disclosed and claimed is a system that may implement task scheduling for field professionals to complete a service in a single visit (referred to as "first-time technical services") by determining requirements for completing the service based on comparison of attributes of services. The system may receive a request for a service, determine at least one attribute of the requested service, and compare the determined attribute to other services to determine a requirement for completing the service in a single visit. The at least one attribute may include, for example, information on the equipment, information on the infrastructure, information on the residence, information on environmental conditions, or any other information needed to perform the service. The requirement may include, for example, tools, spare parts, qualifications, vehicles, or any other physical object or precondition needed to perform the service. In some embodiments, the system may be implemented as task scheduling unit 150.

Figure 9A:
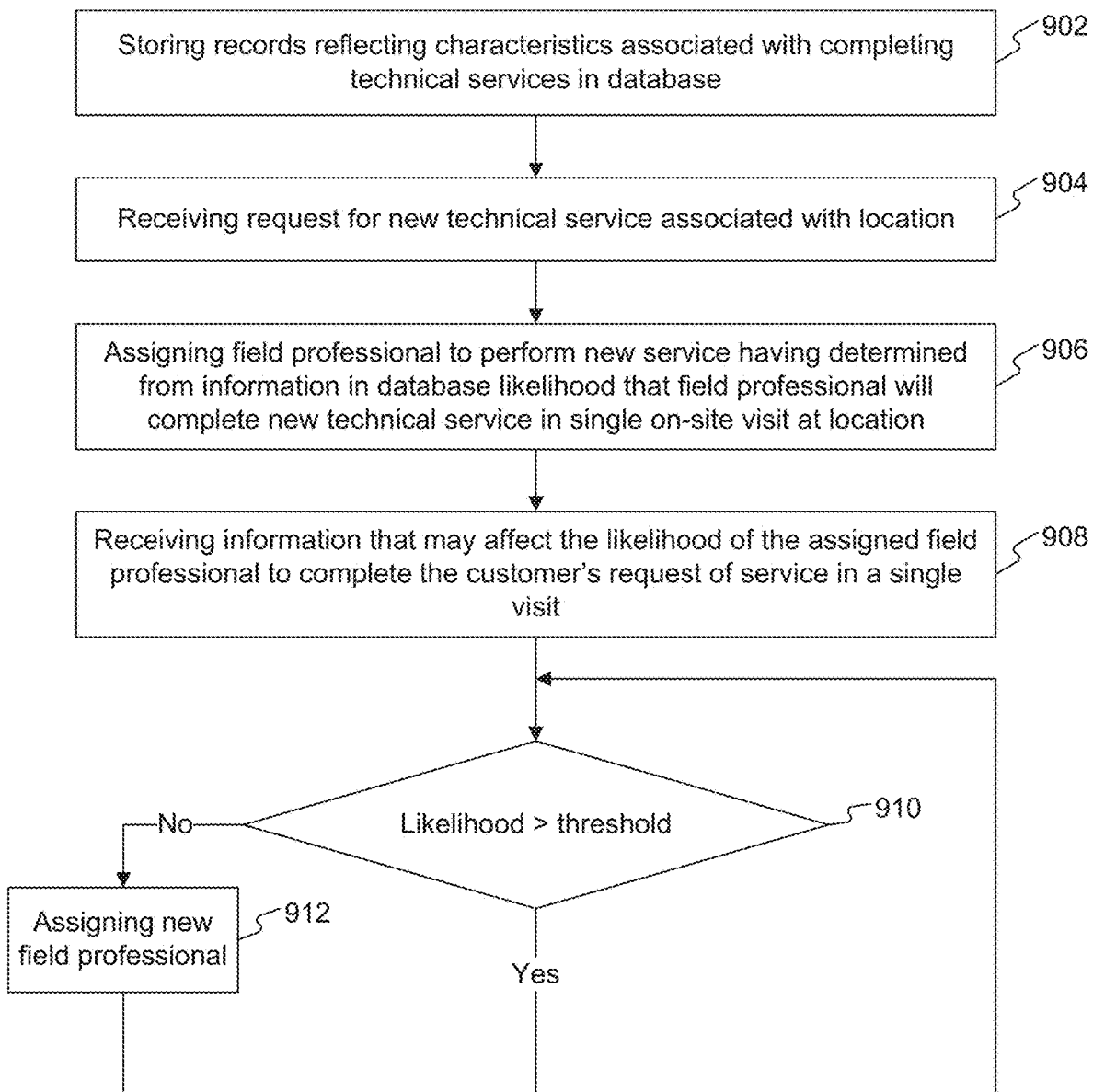
FIG. 9A is a flowchart of an example process for scheduling technical services to field professionals to be completed in a single visit, consistent with the present disclosure.

FIG. 9A is a flowchart of an example process 900A for scheduling first-time fix services, consistent with the present disclosure. In some embodiments, server 152 may implement process 900A. For example, processing device 202 may receive data from I/O system 210 or network interface 206, and then execute instructions or program codes stored in memory interface 204 or database 154, in which the instructions or program codes implement algorithms of process 900A. The algorithms of process 900A may be implemented as one or more of analysis module 441, forecasting module 442, planning module 443, or scheduling module 444. Process 900A includes the following steps or operations.

At step 902, processing device 202 stores a plurality of records reflecting characteristics associated with completing a set of technical services in database 154. The technical services may include any combination of any number of on-site services or remote services. For example, the on-site services may include any of installing, replacing, repairing, or inspecting products or services of any of water, sewage, electricity, gas, heat, Internet, telephone, mobile communications, or the like. The remote services may include any of telephone calls, video chats, text messages, mobile application communications, or any other technical or support services that may provide answers to a customer's questions or instructions to solve a problem.

In some embodiments, the characteristics may include any combination of any number of attributes, requirements, details, statistics, feedbacks, or any information that are associated with completing the set of the technical services. For example, the characteristics may include any combination of any number of a specific tool, a spare part, a vehicle, a qualification of a field professional, a specific back-end service (e.g., an internal communication line between the field professional and server 152), or any physical object or requirements associated with completing a service.

In some embodiments, the records may be implemented as database entries in database 154. For example, in those database entries, relationships between the characteristics and the technical services may be stored as relational database entries. In some embodiments, information in each record may be derived from historical experience of completing each of the technical services. The information in a record may be implemented as a portion of a database record, such as an attribute of a relational database record in database 154. The historical experience may include any data reflecting statistics, performance records, customer reviews, customer feedbacks, comments, scores, or any previously stored data related to completing the technical services. Consistent with the present disclosure, the information in each record may be derived by using machine learning algorithms that identify patterns in the records of completed tasks. For example, the patterns may be indicative of skill sets of field professionals that have completed certain tasks in a single visit. In some embodiments, each services may include data reflecting multiple services completed by multiple field professionals.

In some embodiments, the information in each record may be derived from the historical experience using a statistical technique. For example, when the historical experience includes quantified data (e.g., scores, statistics, or the like), the derived information may include a statistic value of the information, such as an average score, an average value, a standard error, or the like. For example, when the historical experience includes a customer review score, the derived information may be an average review score. For another example, when the historical experience includes multiple time periods for completing the service, the derived information may be an average completion time for the service and an estimated fluctuation range determined based on a standard error of the multiple time periods.

In some embodiments, when the historical experience includes non-quantified data, the information may be derived using a synthesis technique. For example, when the historical experience includes textual data (e.g., textual comments, summaries, memoranda, or the like), the information of the records may be key elements of the textual data derived using a natural language processing technique. For another example, when the historical experience includes textual data, the information may be derived as an aggregation of the textual data. The aggregation of the textual data may include, for example, simple aggregation (e.g., concatenating) of the textual data, or merging (e.g., by removing duplicate fields) of the textual data.

In some embodiments, the information in the records may be derived from feedback from a set of field professionals (such as field professionals 110). For example, when a field professional did not complete a service in a single visit, the field professional may provide feedback explaining one or more reasons why he or she could not complete the service in a single visit. The feedback may include quantized or non-quantized data. For example, the feedback may be textual comments drafted by the field professionals, such as via a graphical user interface (GUI) of communication device 180A. For another example, the field professional may be provided a list of selections to identify the reason why he or she could not complete the service in a single visit (e.g., via the GUI of communication device 180A), and the feedback may be the item selected by the field professional. For another example, each reason why the service cannot be completed in a single visit may be pre-assigned with a code, and the feedback may include the code provided by the field professional (e.g., via the GUI of communication device 180A).

In some embodiments, the derived information may also be stored as database entries in database 154. In some embodiments, the derived information may be stored as separate data entries from the plurality of records. In some embodiments, the derived information may be integrated into the plurality of records, such as additional attributes of the database entries of the records.

Referring back to FIG. 9A, at step 904, processing device 202 receives a request for a new technical service associated with a location. In some embodiments, processing device 202 may receive the request may via the network interface 206. The request may be sent from communication device 180C by a customer, or sent from customer service unit 120. The new technical service may be one of the set of the technical services at step 902.

At step 904, processing device 202 assigns a field professional to perform the new service when processing device 202 has determined from information in the database a likelihood that the field professional will complete the new technical service in a single on-site visit at the location. In some embodiments, processing device 202 may determine the likelihood from the derived information at step 902. The likelihood may be determined using multiple techniques.

In one embodiment, processing device 202 may determine the likelihood using a statistical technique. For example, by statistics of the characteristics associated with completing the new service and statistics of completing the same type of service under the same or similar characteristics by the field professional, processing device 202 may determine a likelihood based on a calculation of the two statistics. For example, when the statistics of the characteristics show that an average completion time for the type of the new service is 60 minutes, and the statistics of the field professional show that his or her an average time for the type of the new service is 50 minutes, processing device 202 may determine a likelihood that the field professional will complete the task within 60 minutes with a predetermined confidence level (e.g., 95%).

In another embodiment, processing device 202 may determine the likelihood using a machine learning mode. For example, a neural network model (e.g., a deep learning model) may be created and set with initial parameters. Based on statistics of the field professional completing the type of the new service, locations, and characteristics of the technical service under which the field professional completed the same type of the new service, the neural network model may be trained, and the initial parameters may be updated. Using the trained neural network model, by inputting the characteristics of the same type of the technical service, the location of the technical service, and the name of the field professional, the trained neural network may output a likelihood that the field professional will complete the technical service in a single on-site visit at the location.

In some embodiments, processing device 202 may prioritize customer satisfaction by assigning a field professional having a higher likelihood to complete the customer's request of service in a single visit. For example, processing device 202 may determine a first likelihood that a first field professional will complete the new technical service in a single on-site visit at the location. Processing device 202 may determine a second likelihood that a second field professional will complete the new technical service in a single on-site visit at the location, and the second likelihood is greater than the first likelihood. Processing device 202 may then assign the second field professional to perform the new service.

In some embodiments, the information derived from the plurality of records at step 902 may include information obtained from one or more details associated with completing the requested service. The details may include customer inputs, logistics information, reminders, practice tips, check lists, key instructions, guidelines, or any informative material that would assist completing the requested service or getting the field professional prepared. In some embodiments, if the field professional knows the detail prior to performing the service, his or her likelihood to complete the requested service in a single on-site visit may increase.

In some embodiments, processing device 202 may further identify at least one detail from the plurality of records. Upon receiving the request for the new technical service, processing device 202 may obtain information associated with the at least one detail. In some embodiments, the detail may be stored as separate data entries from the plurality of records. In some embodiments, the details may be integrated into the plurality of records, such as additional attributes of the database entries of the records.

In some embodiments, processing device 202 may obtain information associated with the at least one detail by retrieving information about the location associated with the new technical service from at least one database (e.g., database 154). For example, the information about the location may include the type of infrastructure in the area, such as water, sewage, electricity, gas, heat, Internet, telephone, mobile communications, or the like.

In some embodiments, processing device 202 may obtain information associated with the at least one detail by enquiring a user associated with the request. For example, if the technical service involves a problem with water supply, processing device 202 may send a request for detail to the user, asking the user if the location of the service has access to a water stopcock. For another example, if the technical service involves a problem with Internet connection, processing device 202 may send a request for detail to the user, asking the user if the user has a working modem. For another example, if the technical service involves a problem with electricity, processing device 202 may send a request for detail to the user, asking the user if the user has an active account with the utility provider.

At step 906, processing device 202 may assign field professional to perform the new service further based on the obtained information associated with the at least one detail. For example, the detail may include a type of infrastructure in the location of the service, and working on the type of infrastructure may require a specific qualification (e.g., a certificate of electrician). Processing device 202 may inquire database 154 to obtain only the field professionals with the specific qualification, and assign the field professional among them to perform the new service. In some embodiments, processing device 202 may further identify from the plurality of records a set of attributes for completing performance the new technical service in a single on-site visit. The set of attributes may include, for example, information on the equipment, information on the infrastructure, information on the residence, information on environmental conditions, or any other information needed to perform the service.

At step 908, processing device 202 may receive information that may affect the likelihood of the assigned field professional to complete the customer's request of service in a single visit. The information may include real-time information about a condition of object associated with the scheduled service, or the current status of parts (e.g., tools) that the field professional has currently available in his/her inventory. For example, the field professional may be a nurse scheduled to do a home visit to do dialysis and the information may include updates on a health condition of a patient. The information may be received in response to an enquiry triggered by processing device 202 or independently by the customer.

At step 910, processing device 202 may determine if, in view of the received information, the likelihood of the assigned field professional to complete the customer's request of service in a single visit is still greater from a threshold. Step 910 may take place after the field professional was assigned and before the date and time that the task is scheduled for. For example, the information may be received on the same day as the scheduled task. Alternatively, the information may be received one or more days before the scheduled task. When the likelihood is below the threshold, processing device 202 may assign a different field professional with higher likelihood to complete the customer's request of service in a single visit. When the likelihood is greater the threshold, processing device 202 may continue with the same field professional and wait for additional information that may change the likelihood.

Figure 9B:
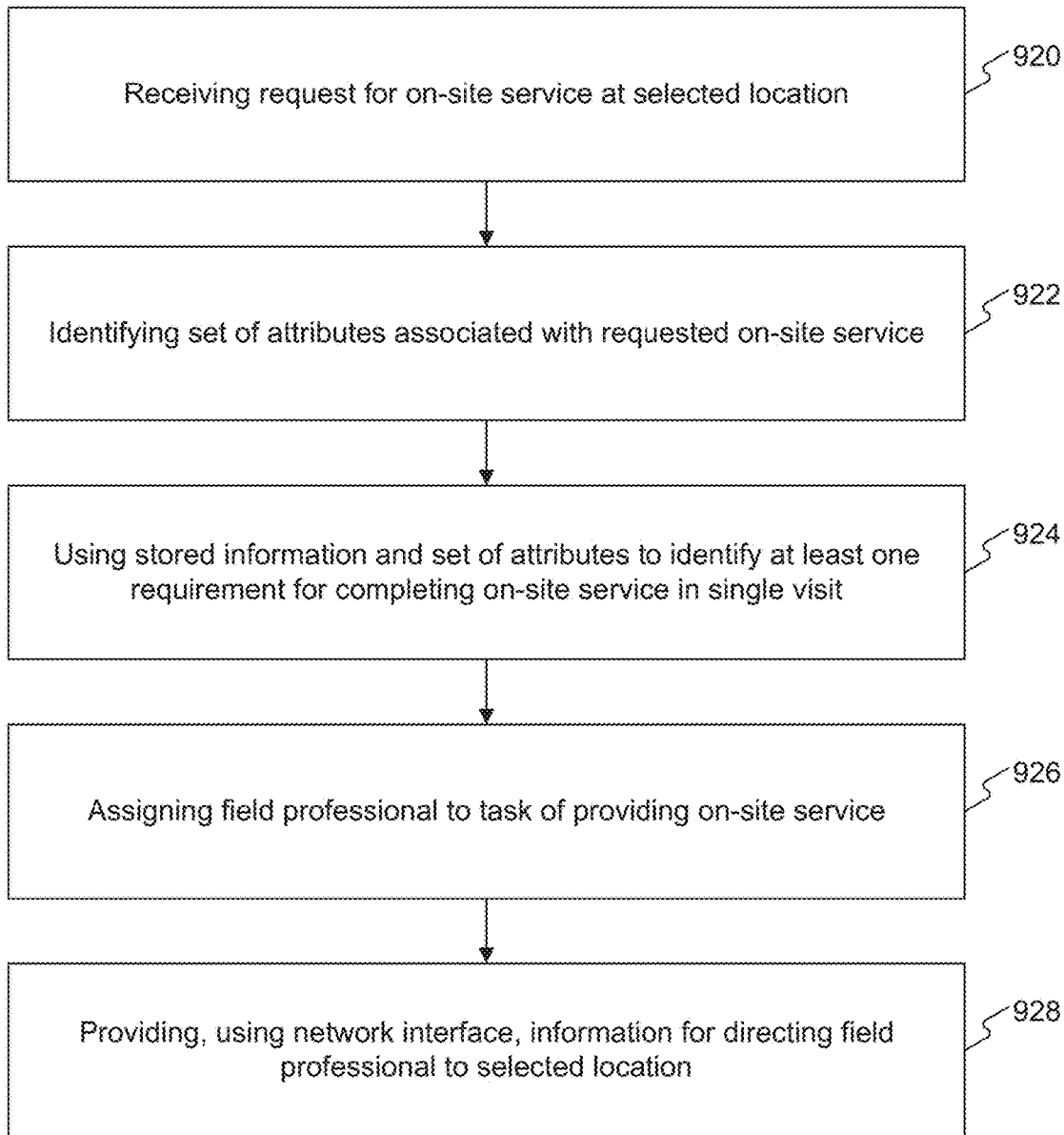
FIG. 9B is a flowchart of another example process for scheduling technical services to field professionals to be completed in a single visit, consistent with the present disclosure.

FIG. 9B is a flowchart of an example process 900B for scheduling first-time fix services, consistent with the present disclosure. In some embodiments, server 152 may implement process 900B. For example, processing device 202 may receive data from I/O system 210 or network interface 206, and then execute instructions or program codes stored in memory interface 204 or database 154, in which the instructions or program codes implement algorithms of process 900B. The algorithms of process 900B may be implemented as one or more of analysis module 441, forecasting module 442, planning module 443, or scheduling module 444. Process 900B includes the following steps or operations.

At step 920, processing device 202 receives a request for an on-site service at a selected location. Step 920 may be implemented in a similar way to step 904. At step 922, processing device 202 identifies a set of attributes associated with the requested on-site service. The set of attributes may include, for example, information on the equipment, information on the infrastructure, information on the residence, information on environmental conditions, or any other information needed to perform the service.

In some embodiments, processing device 202 may identify the set of attributes based on the location associated with the on-site technical service. For example, based on the location, processing device may inquire database 154 for any information about the address of the location, the infrastructure associated with the location, the current environmental conditions (e.g., weather conditions or traffic conditions) near the location, the equipment available to be used at the location, or the like. In some embodiments, the set of attributes may include information about a residence of a user associated with the request. For example, different residences may need different equipment to complete the requested services, and based on the residence of the user, processing device 202 may determine the information about the equipment available to be used at the residence.

In some embodiments, processing device 202 may determine the set of attributes based on retrieved information about a user associated with the request. In some embodiments, the information about the user may be stored in database 154 and retrievable using the received request. For example, the request may include a name, an address, a phone number, an email address, or any identification information of the user. Using that identification of the user, processing device 202 may retrieve the information about the user from database 154. The information about the user may be any informative data associated with the user, such as an age, a gender, a job title, a block-out on-site visit time, a block-out date, or any other data related to the person. In some embodiments, the set of attributes may include information about an age of the user. For example, when the requested service involves a problem with the Internet, a user in a specific age range (e.g., a very young age or a very old age) might have a higher likelihood of misdescribing the problem or misidentifying the cause of the problem. Based on the information about the age of the user, the field professional may have a warning to look for other possible problems or causes, which may help to complete the on-site service in a single visit.

In some embodiments, processing device 202 may determine the set of attributes based on a type of service requested. For example, the type of services requested may include installing, replacing, repairing, or inspecting products or services. In some embodiments, the set of attributes may include information about tools and spare parts needed to perform the type of service requested. For example, if the type of the service requested is installing a new device, the attributes may include information about the new device. If the type of the service requested is repairing a device, the attributes may include information about tools and spare parts for repairing the device.

In some embodiments, processing device 202 may determine the set of attributes based on environmental data. In some embodiments, the environmental data may be data representing a condition near the location of the requested device or along a route to the location. For example, the environmental data may include data representing a weather condition, a traffic condition, a public event (e.g., a scheduled road close), or any other condition that might affect the performing of the requested service. In some embodiments, the set of attributes may include information about predicted weather conditions at the time of providing the service. For example, when the requested service requires working outside, and if a storm is coming at the time of providing the service near the location of the service, processing device 202 may schedule the service to another time. For another example, when the requested service requires travelling to a remote residence during peak hours and is highly likely to miss the requested time, processing device 202 may suggest the user to schedule the service to another time. In some embodiments, the set of attributes may include information about predicted light conditions at the time of providing the service. For example, when the requested service requires working outside and the time of providing the service is after dawn, processing device 202 may indicate a field professional assigned at step 926 to bring additional tools for lighting.

Referring back to FIG. 9B, at step 924, processing device 202 uses the information stored in a memory (e.g., database 154) and the set of attributes to identify at least one requirement for completing the on-site service in a single visit. The requirement may include, for example, tools, spare parts, qualifications, vehicles, or any other physical object or precondition needed to perform the service. At step 926, processing device 202 assigns a field professional to a task of providing the on-site service. In some embodiments, the assignment may satisfy the identified at least one requirement. For example, when the attributes identified at step 922 include a required specific qualification to provide the on-site service, the assigned field professional may have the specific qualification. For another example, when the attributes identified at step 922 requires a specific equipment (e.g., a special lifter vehicle), the assigned field professional may be one that can operate the specific equipment.

At step 928, processing device 202 provides, using network interface 206, information for directing the field professional to the selected location. For example, when the attributes of the identified at step 922 include a residence that requires a specific equipment, the assigned field professional may be provided with information to bring the specific equipment. For another example, when the attributes of the identified at step 922 include an age of the user which falls into a specific range, the assigned field professional may be indicated to consider other possible problems or causes of problems. For another example, when the attributes of the identified at step 922 include a weather condition not suitable for outside work, the assigned field professional may be indicated to be rescheduled to another time.

E. Identifying Causes for Unscheduled Tasks

Services provided by field professionals often have required response times set by task urgency or customer priority. It may be difficult, however, to respond to the requests within the expected response time. This can occur, for instance, if a task must be completed within a week of a customer making a request, but the field professional who is capable of performing the task is on vacation for a month. The following disclosure describes methods and systems for implementing an optimization dashboard that determines causes of unscheduled tasks of field professionals, enabling a reduction in the number of future unscheduled tasks. The system includes a memory, a network interface, and a processor connectable to the network interface. When scheduling tasks to field professionals, each task may be associated with constraints, such as the duration of a task, work hours, travel distance, and field professional skillset. The system may identify a plurality of tasks that were not scheduled within a predefined period and determine a common cause for them not to be scheduled within the predefined period. Thereafter, the system may present a recommendation for reducing the number of future unscheduled tasks. The recommendation may include, for example, changing a task constraint or hiring additional field professionals.

Figure 10:
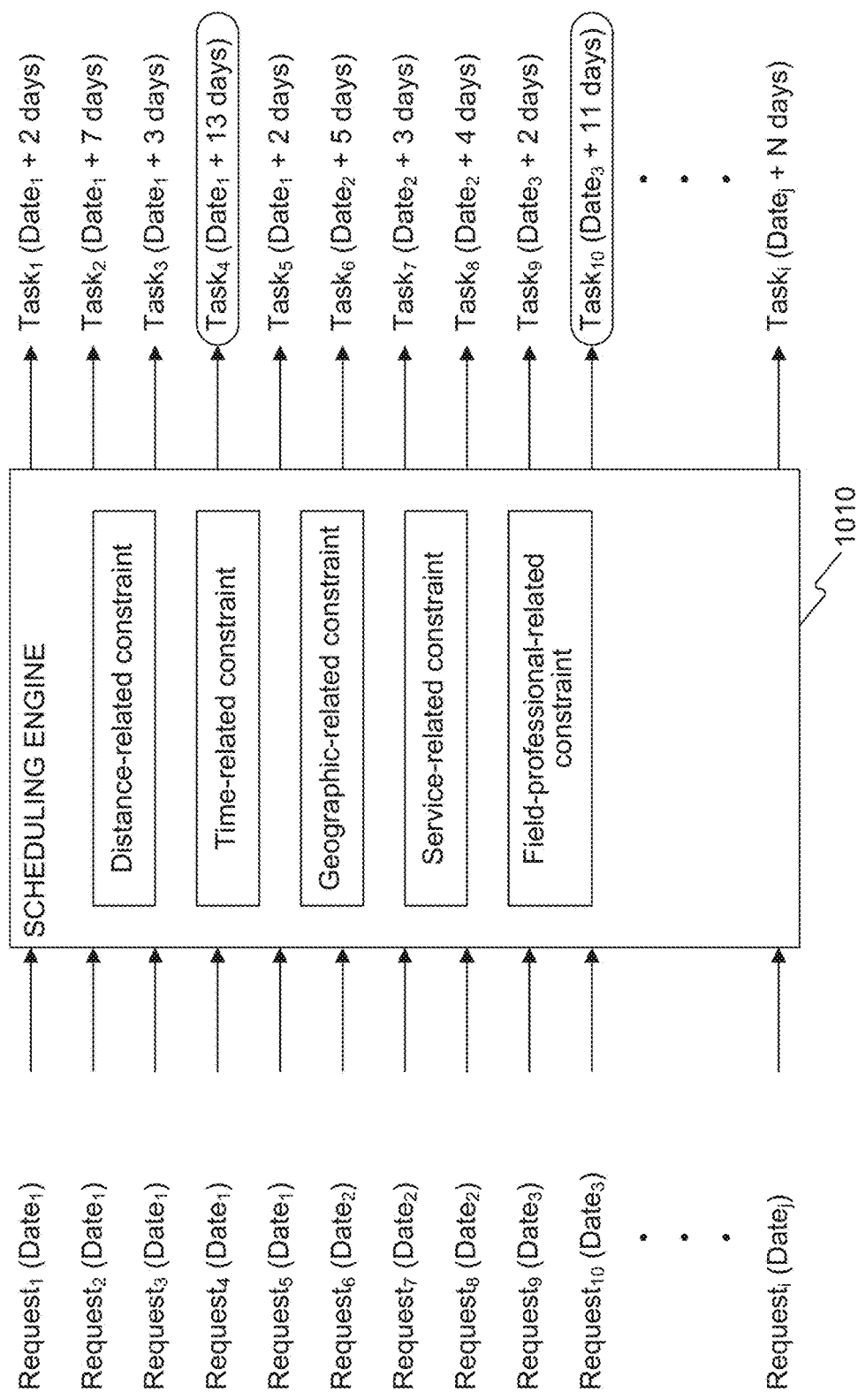
FIG. 10 is a diagram that illustrates a scheduling engine that receives requests, applies constraints, and schedules tasks, consistent with the present disclosure.

FIG. 10 is a diagram illustrating a scheduling engine 1010 that receives requests and schedules corresponding tasks. The scheduling engine 1010 may, for example, be implemented using the task scheduling unit 150. Scheduling engine 1010 may be implemented in hardware, software, or a combination of both. FIG. 10 illustrates a plurality of requests, Request 1-Request i. Some requests, such as Request 1-Request 5, are from Date 1. Similarly, Request 6-Request 8 are from Date 2, Request 9 and 10 are from Date 3, and Request i is from Date j. The scheduling engine 1010 processes the requests in relation to a variety of constraints, including distance, time, geographic, service, and field-professional related constraints. After processing the requests, the scheduling engine 1010 schedules tasks in response to each of the requests. The tasks may be schedule within the expected period of time or outside the expected period of time. For instance, Task 1-Task 3 and Task 5 are all expected to be completed within the period of time of seven days. However, due to the constraints, Task 4 is expected to be completed thirteen days after the request. Since this is longer than seven days, the scheduling engine 1010 may identify Task 4 as it is not scheduled to be completed within the expected period of time. Similarly, while Task 9 is scheduled within two days of the corresponding request, Task 10 is scheduled eleven days after the corresponding request. Therefore, since at least two requests were not scheduled with tasks expected to be completed within an expected period of time, a determination is made of a common cause of why the expected period of time was not satisfied. A person skilled in the art would recognize that the above example is simplified, and an actual scheduling engine may involve substantially more requests, constraints, and tasks.

Figure 11:
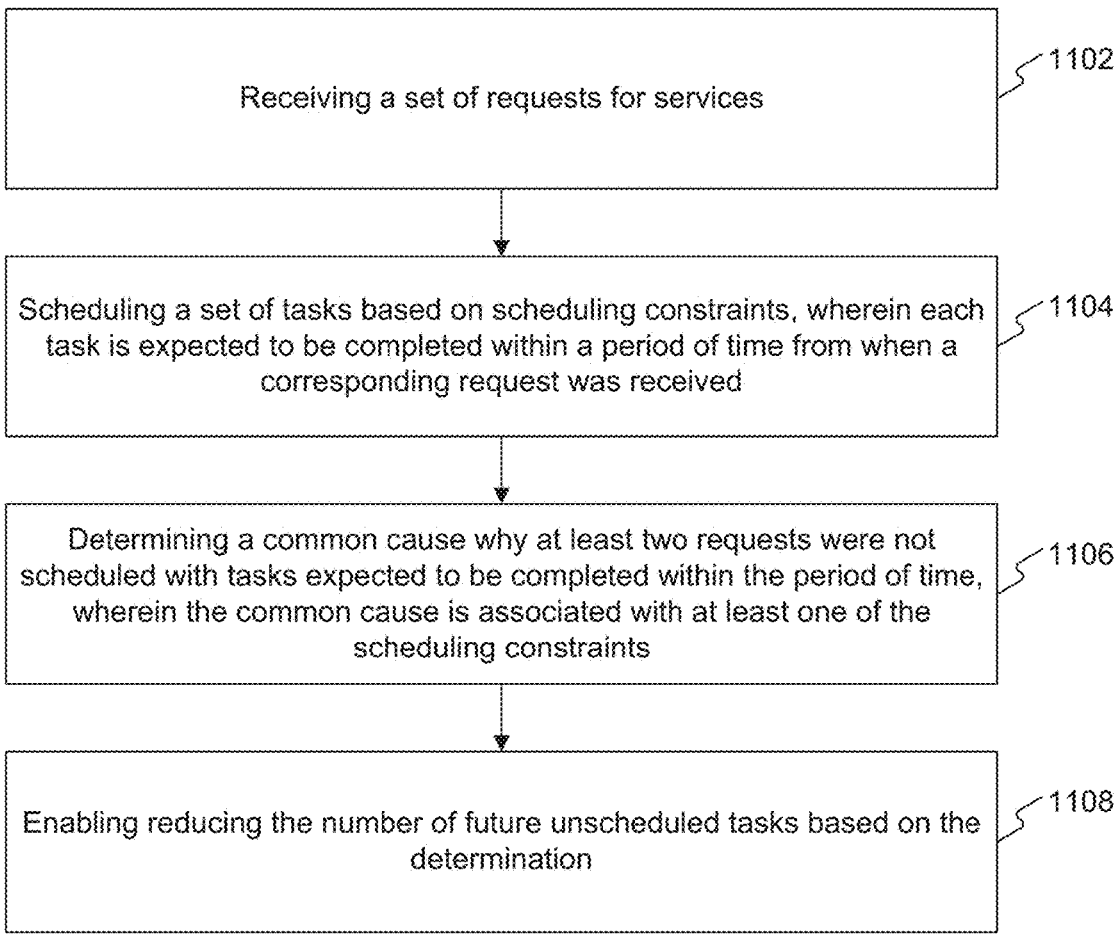
FIG. 11 is a flowchart showing an exemplary process for reducing the number of future unscheduled tasks, consistent with the present disclosure.

FIG. 11 is a flowchart of an example process 1100 for scheduling tasks to field professionals, consistent with the present disclosure. In some embodiments, server 152 may implement process 1100. For example, processing device 202 may receive data from I/O system 210 or network interface 206, and then execute instructions or program codes stored in memory interface 204 or database 154, in which the instructions or program codes implement algorithms of process 1100. The algorithms of process 1100 may be implemented as one or more of analysis module 441, forecasting module 442, planning module 443, or scheduling module 444. Process 1100 includes the following steps or operations.

At step 1102, processing device 202 receives, from the network interface 206, a set of requests for services. The set of requests may be any number of requests and may originate from clients, managers, field professionals, or from an automated system. The services may include any combination of any number of on-site services or remote services. For example, the on-site services may include any of installing, replacing, repairing, or inspecting products or services of any of water, sewage, electricity, gas, heat, Internet, telephone, mobile communications, or the like. The remote services may include any of telephone calls, video chats, text messages, mobile application communications, or any other technical or support services that may provide answers to a customer's questions or instructions to solve a problem.

At step 1104, processing device 202 schedules a set of tasks, in response to the set of requests for services. The processing device 202 may also establish a period of time within which the task must be accomplished. Some tasks may be expected to be completed within a period of time from when a corresponding request was received. In other words, some tasks may need fast or slow response times, such that they need to be completed quickly after receiving a request for service, or may be delayable. Management may set the expected completion period based on a variety of factors, such as urgency of the request, availability of resources, customer priority, or risk of additional damage. The period of time may be a set time, such as 9:00 on Friday the 23, or it may be a time limit, such as within two hours of request receipt. When scheduling, the processing device 202 may establish the schedule based on scheduling constraints. Scheduling constraints may be rules of when a task may or may not be scheduled. For instance, if a field professional having a necessary skillset is on vacation until the end of the month, the processing device 202 may avoid scheduling a particular task while the professional is away. Alternatively, the scheduling constraints may include work hours, holidays, part and equipment availability, travel time, task duration, and the like.

At step 1106, processing device 202 determines a common cause of why at least two requests were not scheduled within a corresponding expected period of time. A common cause may be a reason, shared among multiple requests, explaining why the requests were not scheduled within a certain period of time. For instance, if a request is received to repair a customer's cable television, and the task of repairing the cable television is not scheduled to occur within a company's expected period of time of two hours because all available field technicians were already performing or scheduled to perform other tasks, processing device 202 may record the first occurrence of the unscheduled task. Should a similar situation occur again based on a second request, processing device 202 may identify the common cause as being not enough field professionals. Similarly, processing device 202 may identify a common cause of insufficient replacement parts, database errors, vehicle maintenance, and the like. Alternatively, processing device 202 may identify that the constraint is too limiting, such that a strict scheduling constraint should be relaxed. By identifying common causes of tasks not being scheduled within a period of time, processing device 202 may, at step 1108, enable reducing the number of future unscheduled tasks.

In some embodiments, the set of requests may be received from a plurality of users. Furthermore, each of the requests may be associated with an on-site service to be provided in a different location. That is, many users 130 may make requests for field professional service by contacting the customer service unit 120. Thus, the set of requests may contain a service and a location where the service must be provided, enabling more accurate scheduling of tasks as well as knowledge of scheduling constraints.

Scheduling constraints may include distance, time, geography, service, or field professional related constraints. As an example of distance constraints, a company may have a policy that its field professionals will only travel to locations within three hours of travel during the morning hours, so as to reduce travel costs and burden on field professionals. Alternatively, scheduling may be constrained by time of day considerations, such that tasks that typically take three hours to complete or tasks with a wide range of durations will not be scheduled near the end of a day. Furthermore, a company may prohibit its field professionals from traveling to certain high crime areas during nighttime, thereby constraining the schedule. Services that require heavy outdoor labor may be constrained to early morning or late evening scheduling. Finally, a schedule may be limited by capabilities of specific field professionals. For instance, if a particular service requires a master plumber and Rob is the only master plumber employed by a company, scheduling of a service that requires a master plumber may be constrained by Rob's vacation and work schedule.

Scheduling constraints may also include at least two of a distance-related constraint, a time-related constraint, a geographic-related constraint, a service-related constraint, and a field-professional-related constraint. For instance, a scheduling constraint may be that certain field professional is only able to complete tasks within a two-hour travel radius of a main office. Alternatively, for example, a refinery requiring a pneumatic mechanic may only be shut down for maintenance at night. In such a case, there would be a time-related constraint as well as a service-related constraint of a certain skill set.

The scheduling constraints may be inputted by a user. The user may be an administrator of the system, who may use the I/O system 210 to input scheduling constraints. The scheduling constraints may be entered along with the set of requests. Alternatively, the scheduling constraints may be entered asynchronously from the set of requests, for example, being saved for use in scheduling a future set of tasks, or after receiving a set of requests for services.

Alternatively, scheduling constraints may be generated by an Artificial Intelligence (AI) module. The AI module may be part of the scheduling module 444, or in a different system. The AI module may, for instance, determine scheduling constraints from past schedules, sets of requests, sets of tasks, or scheduling constraints. For instance, if only one field professional is able to service elevators, and that one field professional is unable to work after noon on Fridays, the AI may determine that elevators may not be serviced on Friday afternoon. As another example, if no field professionals are able to keep appointments in the city after 4:00 due to traffic, the AI may create a scheduling constraint that tasks will not be scheduled in the city after 4:00.

The set of requests may be associated with different task types. In this case, the processor may be configured to determine a period of time for task completion for each request based on the associated task type. For example, in the case of a medical field professional, if a service request of taking a blood sample is made, the medical field professional may be expected to complete this task within three days. However, if a service request is made because a patient has the flu, the medical field professional may be expected to complete the task within one day. Thus, the processing device 202 would determine the period of time for task completion for each of the requests in the set of requests. Furthermore, the processor may be configured to determine a common cause why a first request associated with a first period of time and a second request associated with a second period of time longer than the first period of time, were not scheduled with tasks expected to be completed within their corresponding periods of time. For example, if the medical field professional was unable to draw blood within three days, and also was unable to treat the flu within one day, the system may determine that neither request was scheduled within the expected period of time because the medical field professional was ill or on vacation. This could help identify if more medical field professionals are needed.

The system may determine a plurality of causes for the set of requests. A common cause may be associated with at least two of the scheduling constraints. Each cause may be associated with a number of requests that were not scheduled with tasks expected to be completed within corresponding periods of time. For example, requests that were not scheduled with tasks expected to be completed within the period of time may have the same constraint that the requests require work done more than a three-hour drive away. Furthermore, the requests may also have the same constraint that work must be completed while a facility is shut down for maintenance. Thus, the common cause may be associated with at least two scheduling constraints. The processor may also identify a main cause of why some requests were not scheduled with tasks expected to be completed within corresponding periods of time, and also cause an issuance of a notification associated with the main cause. For example, a main cause may be a constraint that is too restrictive and prevents scheduling a set of tasks unnecessarily. For instance, a constraint may be that no tasks may be scheduled after 1:00, and no HVAC servicing may be done without Mackenzie. Both of these constraints may lead to a number of requests not having scheduled tasks expected to be completed within a corresponding expected period of time. The processor may therefore determine that the constraint on no tasks being scheduled after 1:00 is the main cause of why some requests were not scheduled with tasks expected to be completed within the corresponding period of time. The processor, therefore, may issue a notification alerting a user to the main cause. Alternatively, for example, the processor may determine that constraints inputted on January 7 are too restrictive, and notify a user of such a finding.

After determining a common cause of why at least two requests were not scheduled with tasks expected to be completed within the period of time, the processor may present a recommendation for reducing the number of future unscheduled tasks. This recommendation may be displayed, for instance, as part of the service optimization suite architecture shown in FIG. 5. The presentation layer 502 may display a recommendation. For instance, the presentation layer 502 may display a suggested schedule based on the determined recommendation that has less unscheduled tasks compared to an existing schedule. The suggested schedule may cover any period of time, such as a day, week, or month. This suggested schedule may have different scheduling constraints than the original schedule. For example, the recommendation may include a suggestion to change at least one of the scheduling constraints. That is, the recommendation may suggest removing limitations on the length of a workday, driving range, or geographic area. Alternatively, the recommendation may be to move constraints in time. For example, the recommendation may be to constrain tasks in a city to afternoon hours rather than morning hours, thus avoiding traffic. In some embodiments, the recommendation may include a suggestion to hire additional field professionals. If the system determines that a particular field professional is frequently needed at two facilities, many miles apart, and travel time causes constraints on the field professional's ability to serve both sites, the system may recommend hiring an additional professional. Furthermore, if a particular field professional has a unique skillset that others do not, the system may include a description of the qualifications needed for new field professionals.

Additionally, the processor may also be configured to determine how many of the requests would have been scheduled to tasks expected to be completed within the predefined period of time if the recommendation had been implemented before. When displayed, the recommendation may include a metric showing the reduction in unscheduled tasks. The number of requests that would have been scheduled to tasks may be calculated on past, present, or future schedules. Furthermore, the number of requests may be calculated for any defined period of time, such as a month.

Figure 12:
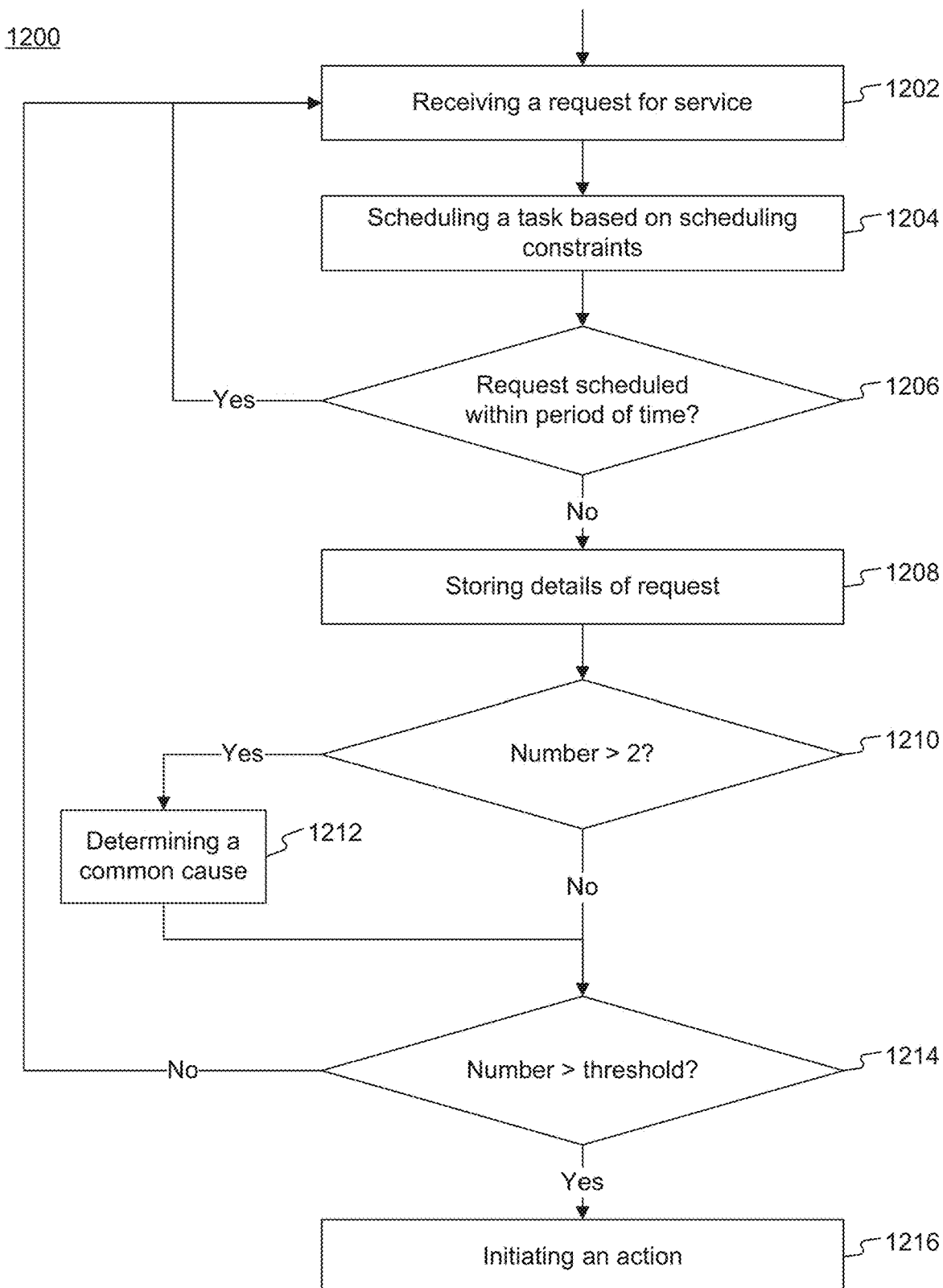
FIG. 12 is a flowchart showing a process for scheduling tasks and initiating an action based on the number of unscheduled tasks, consistent with the present disclosure.

FIG. 12 is a flowchart of a process 1200 for initiating an action due to unscheduled tasks. At step 1202, the system receives a request for a service and, at step 1204, the system schedules a task based on scheduling constraints. At step 1206, the system determines if the task was scheduled within the expected period of time. If step 1206 is Yes, the system waits to receive the next request for a service. If step 1206 is No, the system stores details of the request at step 1208. The system thereby determines the number of requests that were not scheduled with tasks expected to be completed within the period of time. At step 1210, the system determines if there are more than two unscheduled tasks. Data used in this determination may be stored in the database 154. The number of requests may cover any period of time. Furthermore, the period of time may be in the past, or the period of time may be in the future, such that the number of requests not scheduled may be analyzed and potentially corrected before the period of time elapses. For instance, if a schedule for the next week has already been set, the number of requests that were not scheduled with tasks expected to be completed may still be calculated, thus giving a manager the opportunity to reshape the schedule to avoid or reduce unscheduled tasks and better serve customers. If step 1210 is Yes, the system may proceed to step 1212 to determine a common cause of the unscheduled tasks. If step 1210 is No, the system may proceed to step 1214 without determining a common cause.

The system may also initiate an action when the determined number of requests is greater than a predetermined threshold. For example, a company may set a threshold of five unscheduled tasks for a month. At step 1214, the system determines if the number of unscheduled tasks is greater than the threshold. If step 1214 is No, the system returns to wait for the next request. However, if step 1214 is Yes, the system may initiate an action at step 1216. For example, the action may be initiated if there have been more than five unscheduled tasks in the past month. Alternatively, the action may be initiated if the schedule for the next month includes too many requests that were not scheduled with tasks expected to be completed within the period of time. The system may then return to step 1202 to receive a new request, or, the system may wait for a user interaction depending on the initiated action.

The initiated action may include issuance of a warning message. The warning may be displayed, for instance, as part of the service optimization suite architecture shown in FIG. 5. The warning may include data concerning how many requests were not scheduled with tasks expected to be completed within the period of time. Alternatively, the action may include automatically changing a scheduling constraint. For example, the method may result in a constraint on work hours to be changed automatically, such that field professionals work more hours each day in order to accommodate a surge in requests for services.

F. Scheduling Location-Based and Location-Agnostic Tasks

Sometimes, services performed by field professionals require the field professional to physically visit a site to complete a task such as replacing equipment. These types of tasks may be called location-based. Other times, a field professional task may be completed remotely, without the field professional visiting a site in person, such as remotely establishing an internet connection. These tasks may be called location-agnostic. Furthermore, in some situations, a field professional may lose valuable time traveling between sites, for instance, during high volume traffic times. Rather than this time being lost, the field professional could perform a remote task until the condition clears, maximizing productivity. The following disclosure describes methods and systems that enables users to assign location-based tasks and location-agnostic tasks to a field professional. The system includes a memory, a network interface, and a processor connectable to the network interface. The system may therefore schedule tasks that are location-agnostic and tasks that are location-based in such a way so as to optimize field professional time. For instance, the system may schedule a location-agnostic task chronologically between two location-based tasks, using predicted traffic delays, to reduce wasted time. In some embodiments, the system may be implemented as task scheduling unit 150.

Figure 13:
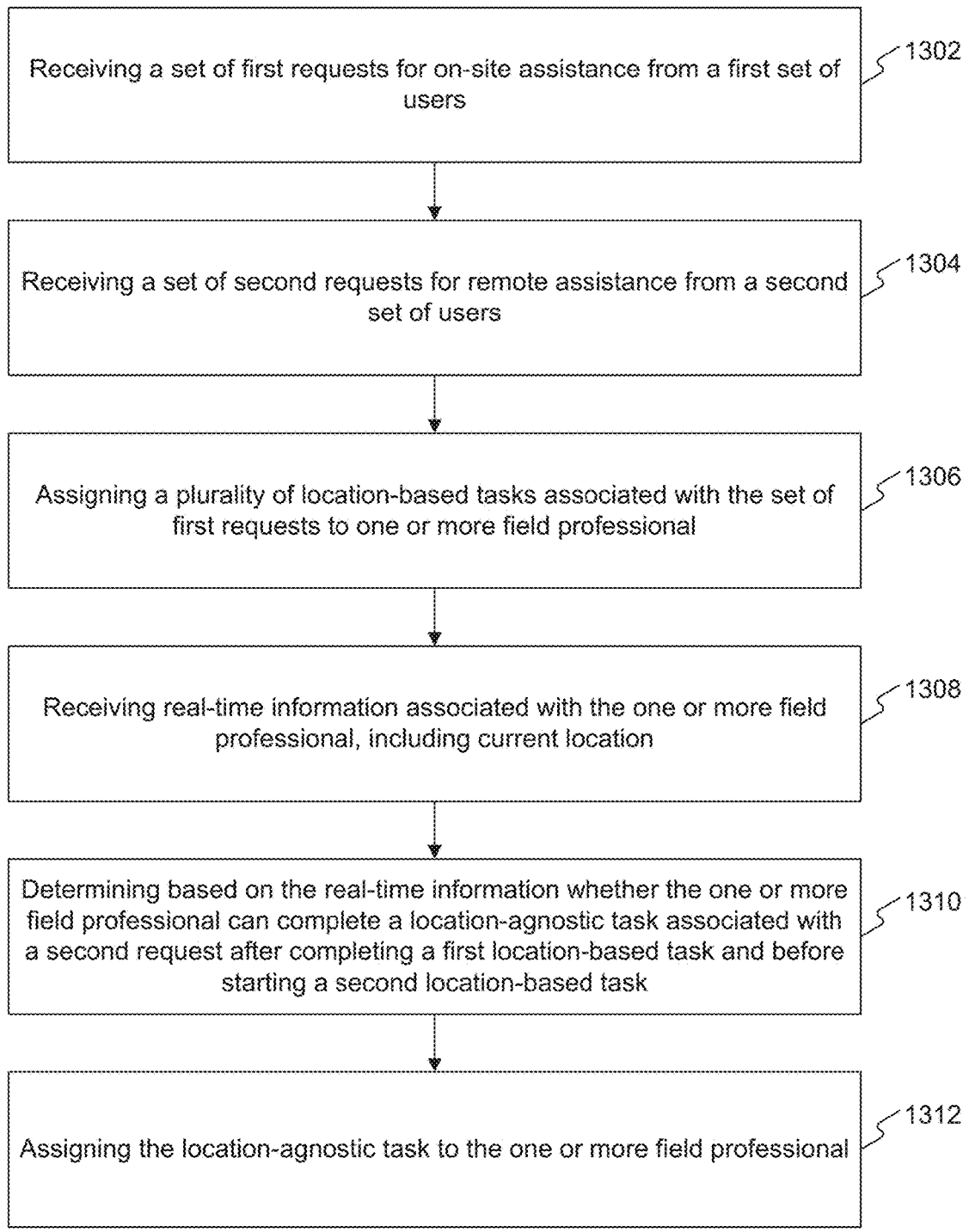
FIG. 13 is a flowchart showing an exemplary process for assigning location-agnostic task to one or more field professionals, consistent with the present disclosure.

FIG. 13 is a flowchart of an example process 1300 for a scheduling method for field professionals, consistent with the present disclosure. In some embodiments, server 152 may implement process 1300. For example, processing device 202 may receive data from I/O system 210 or network interface 206, and then execute instructions or program codes stored in memory interface 204 or database 154, in which the instructions or program codes implement algorithms of process 1300. The algorithms of process 1300 may be implemented as one or more of analysis module 441, forecasting module 442, planning module 443, or scheduling module 444. Process 1300 includes the following steps or operations.

At step 1302, a set of first requests for on-site assistance from a first set of users is received. The set of requests may be one or more requests, and may be received directly from users, for example, via an online request, telephone call, and the like. Alternatively, the requests may be entered by a customer service unit 120 on behalf of a user, or the requests may be entered directly by a manager, director, or field professional upon seeing a need for on-site assistance.

At step 1304, a second set of requests from a second set of users is received. The second set of users may be the same as or different from the first set of users. The second set of requests may be a single request or many requests, and may be received before, simultaneously, or after the first set of requests. The second set of requests may be for remote assistance, rather than on-site assistance.

Answering each of the set of first requests for on-site assistance may require one or more field professional to travel to a location associated with a user from the first set of users. That is, location-specific tasks may include tasks that require one or more field professional to travel to a location associated with a user. These tasks may only be completed with a visit to the user's location, and include tasks such as installing equipment, repairing equipment, connecting equipment, and the like. On the other hand, answering each of the set of second requests for remote assistance may require the one or more field professional to connect via a communication network with a user from the second set of users. In other words, location-agnostic tasks may require a field professional to connect via a communication network with a user or resource and may include services that may be accomplished virtually, such as setting parameters digitally, debugging internet connectivity, researching problems, troubleshooting, providing guidance over the phone or email to operators or users, ordering parts, or speaking with other field service professionals for guidance. Location-agnostic tasks may optionally be completed at the site of the user, but they also may be completed at any location so long as the field professional can connect via a communication network with a user or, if necessary, a resource.

At step 1306, a plurality of location-based tasks associated with the set of first requests is assigned to one or more field professional. Thus, one or more field professional is assigned responsibility for tasks that address the set of first requests. Field professionals may be notified of the assignments in person or remotely, for example, via the field professional communication device 180A.

At step 1308, the system receives real-time information including current location information of the one or more field professional. The real-time information may include information of if a task has been completed yet, or the location of the field professional.

At step 1310, it is determined, based on the real-time information, whether the one or more field professional can complete a location-agnostic task associated with a second request after completing a first location-based task and before starting a second location-based task. Real-time information may include locations of tasks, traffic conditions, unexpected delays, or changes in task status, for example, a task being completed early or a task being unable to be completed, resulting in the field professional being unobligated earlier than expected. Additionally, expected task duration information may be considered.

Finally, after making the determination at step 1310, the location-agnostic task may be assigned to the one or more field professional at step 1312. The assignment may be recorded in a database 154 of the task scheduling unit 150. Furthermore, the assignment may be communicated to the field professional automatically, via the field professional communication device 180A, or by a manager who receives a notification from the system and approves the assignment before notifying the field professional.

Figure 14:
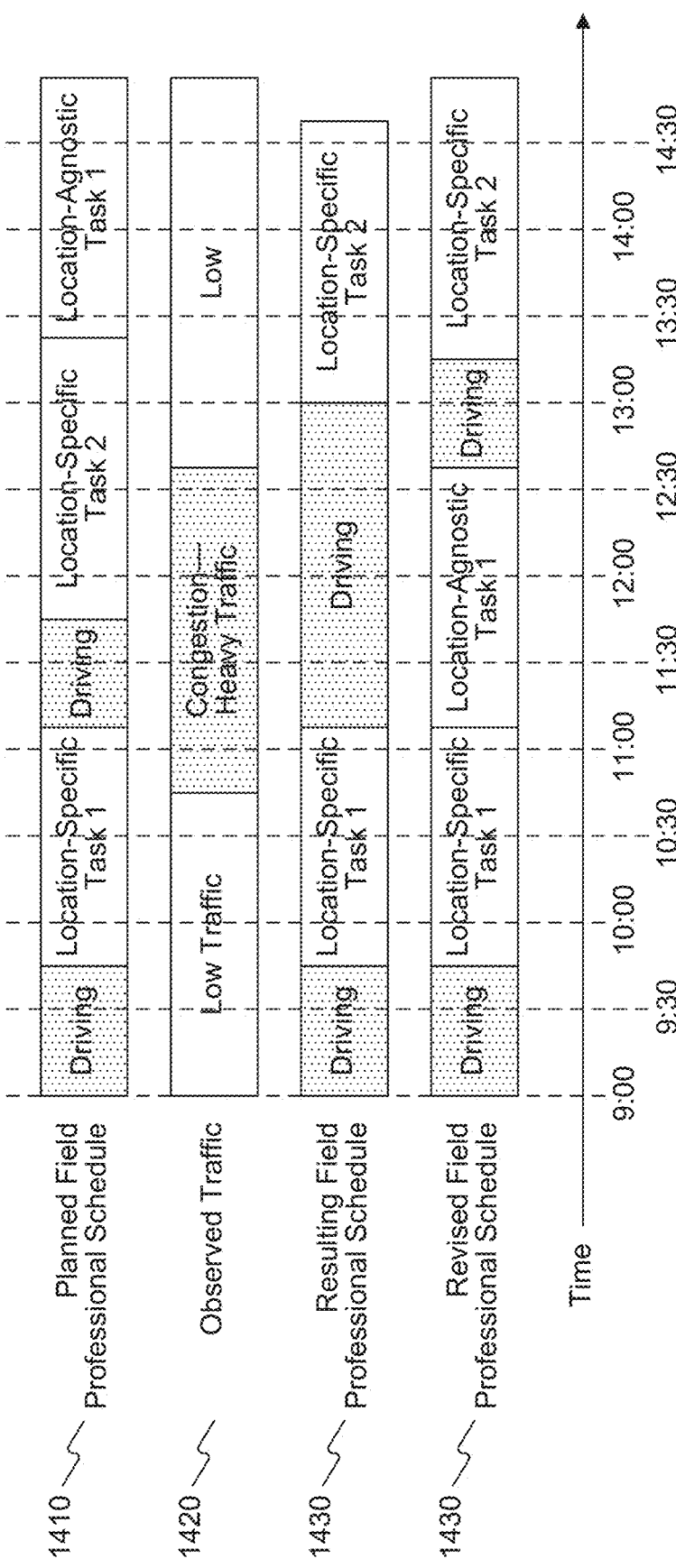
FIG. 14 is a diagram showing a planned field professional schedule modified by observed traffic delays, consistent with the present disclosure.

Further illustration of the steps of process 1300 may be understood by reference to FIG. 14. At the beginning of a day, one or more field professional may be provided a planned field professional schedule 1410. The schedule shown includes driving times between location-specific tasks 1 and 2, tasks 1 and 2, and a location agnostic task 1. As the day proceeds, the one or more field professional completes the scheduled activities of driving and location-specific task 1. However, as shown in the observed traffic 1420, shortly before 11:00, traffic on the route that the one or more field professional would travel to location-specific task 2 becomes unusually heavy, perhaps due to a car accident or roadway construction. If the one or more field professional continued on the previously-planned sequence of tasks, namely, starting to drive at approximately 11:10 and then completing location-specific task 2, the one or more field professional would not be able to start task 2 until 13:00 due to traffic, as shown in resulting field professional schedule 1430. As a result, the field professional's duty day may end before being able to accomplish location-agnostic task 1. If such a situation arose, process 1300 may be used to revise the schedule of the field professional. In this case, after having completed steps 1302, 1304, and 1306, at step 1308, real-time information may be received about the location of the field professional, as well as real-time information about traffic conditions. At step 1310, based on the real-time information of the traffic delay shown in the observed traffic 1420 of FIG. 14, it may be determined that location-agnostic task 1 should be completed in the time that the field professional would be stuck in traffic. The field professional's schedule may be revised, reassigning the field professional to complete location-agnostic task 1 before starting location-specific task 2, as shown in revised filed professional schedule 1440. In this example, the field professional is able to accomplish three tasks during a shift due to process 1300, whereas, without process 1300, the one or more field professional would have been able to complete only two tasks during the shift, with significant time spent being unproductive in traffic.

The determination of whether the one or more field professional can complete a location-agnostic task after completing a first location-based task and before starting a second location-based task may be based on field-location information. The field-location information may include information about the status of a site, such as weather conditions, or status of the one or more field professional, such as prior task completion time or field professional location, that could affect the field professional's ability to perform a later task. The field-location information may be received from a wireless communication device associated with the one or more field professional, such as the field professional communication device 180A, and may be derived by using a GPS signal or cell site location information, for instance. The field-location information may also be derived from other sensors or sources, both public, such as on the internet, and private, such as monitoring devices owned by the user or field professional company. In such a manner, the field-location information may be provided and received automatically, without intervention of the field professional. Alternatively, the field-location information may be derived with the intervention of the field professional, for example, by phone calls, text message, or other communications placed by the field professional.

Information about traffic conditions associated with a field-location for one or more field professional may also be used to determine whether the one or more field professional can complete a location-agnostic task after completing a first location-based task and before starting a second location-based task. For example, if traffic is unusually heavy, a field professional will have time to accomplish a location-agnostic task while waiting for traffic to clear. Alternatively, if traffic is light, the field professional should proceed to the next location-specific task. Information about traffic conditions may be derived from publicly available data, including traffic tracking websites or government websites that show construction or emergency closures. Alternatively, information about traffic conditions may be derived from field professionals themselves. For example, if many field professionals are dispatched, and one or more encounters traffic, a delay may occur in that field professional's arrival at a task and determine traffic conditions. This information may be used determine whether the field professional can complete a location-agnostic task.

Information about environmental conditions associated with a field-location for one or more field professional may be used to determine whether the one or more field professional can complete a location-agnostic task after completing a first location-based task and before starting a second location-based task. For example, some location-specific tasks may require working outdoors, and could be impaired by high winds or thunderstorms, such as working on electrical lines. The system may therefore obtain weather data from publicly provided sources or via reports from individual field professionals. If a severe thunderstorm is affecting the location of a location-specific task, a field professional may not be able to start the task. In such a case, the system may determine that the field professional can complete a location-agnostic task before starting a second location-based task. Environmental conditions may also be used to determine travel times, for instance, if snowstorms will cause delays in arriving at a location.

One or more field professional may be scheduled to perform an additional location-based task after completing a first location-based task and before starting a second location-based task. Additionally, the one or more field professional may be assigned a location-agnostic task instead of the additional location-based task based on the real-time information. For instance, a field professional may have a first location-based task of installing a new cable television system at Address 1 at 9:00, and a second location-based task of servicing a cable system at Address 2 at 13:00. The field professional may have an additional location-based task of installing a new modem at Address 3 at 10:30. The field professional may be assigned to complete a location-agnostic task of remotely configuring a virtual private network for a client at 10:30, rather than completing the additional location-based task of installing a new modem, due to heavy traffic. As such, the inability of the one or more field professional to reach a location associated with the additional location-based task at a scheduled time may be determined from real-time information. In the example case above, the system may determine the inability of the field professional to reach Address 3 by 10:30 due to real-time traffic conditions between Address 1 and Address 3. Alternatively, if the first location-based task of installing new cable television at Address 1 requires more time than expected, the system may determine from real-time information about the delay that the field professional is unable to reach Address 3 by 10:30, and instead assign a location-agnostic task to the field professional instead of the additional location-based task.

A notice of cancellation of the additional location-based task may be used to estimate a free time window in a daily schedule of one or more field professional. Based on the estimated free time window, it may be determined whether one or more field professional can complete the location-agnostic task after completing the first location-based task and before starting the second location-based task. For example, continuing the above example, if the user that requested the additional location-based task at Address 3 cancels the 10:30 appointment, the field professional may now have an unexpected free window in his schedule. Rather than this time going unused, it may be determined, based on the estimated free window, whether the field professional can complete a location-agnostic task after completing the first location-based task and before starting the second location-based task. The determination may be completed at any time. A notice of cancellation may originate in a user, for example, if the user is not able to be at the facility during the scheduled time, or the notice of cancellation may originate from an employee, such as a manager or another field professional.

To aid in the determination, there may be an indication of an urgency level of the location-agnostic task associated with the second request. Based on the urgency level of the location-agnostic task, the additional location-based task may be reassigned to one or more second field professional and the location-agnostic task may be assigned to the one or more field professional. The urgency notifications may have multiple levels, such as low, medium and high, and may be based on a variety of factors, including user importance, paying higher fees for higher priority service, and the like. The threshold at which the system reassigns tasks may be independent of other considerations, such that, for example, high urgency tasks always are reassigned, or may take into account other considerations, such as other delays that may be introduced by altering the planned schedule.

Furthermore, information identifying the one or more field professional as more suitable to provide the location-agnostic task than one or more second field professional may be obtained, and, based on this information, the additional location-based task may be reassigned to the one or more second field professional and the location-agnostic task may be assigned to the one or more field professional. The obtained information may be obtained from system memory. Alternatively, the information may be derived from a user, such as a user requesting a particular field professional who had previously serviced the facility. Also, information such as skills data, past experience, and ranking may be used in identifying one or more field professional as more suitable to provide the location-agnostic task than the one or more second field professional.

Figure 15A:
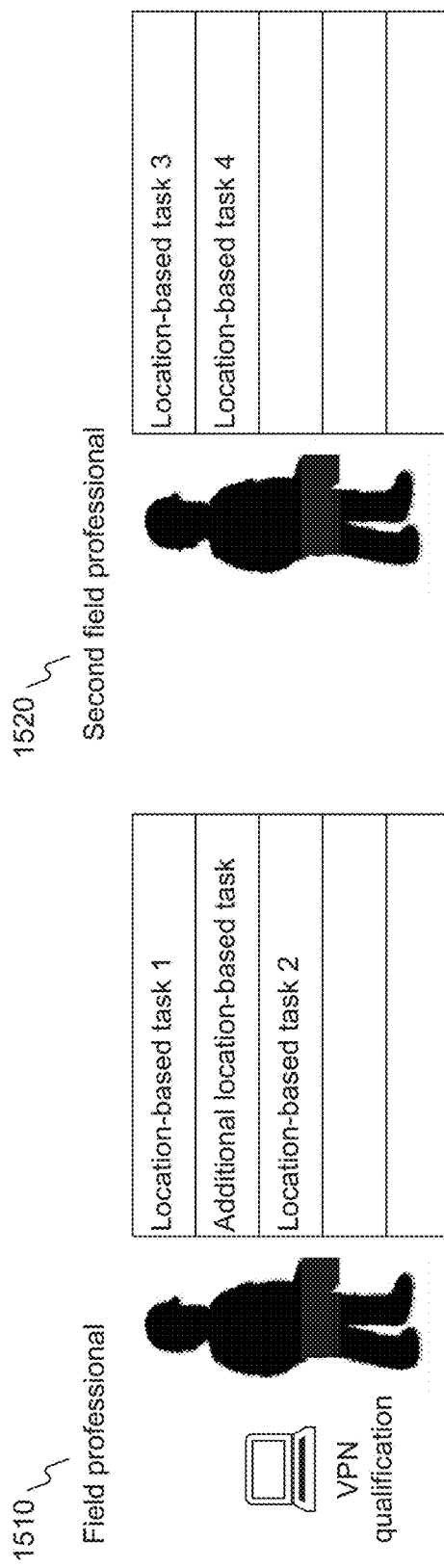
FIG. 15A and FIG. 15B are diagrams showing assignment of a location-agnostic task and reassignment of an additional location-based task between field professionals, consistent with the present disclosure.
Figure 15B:
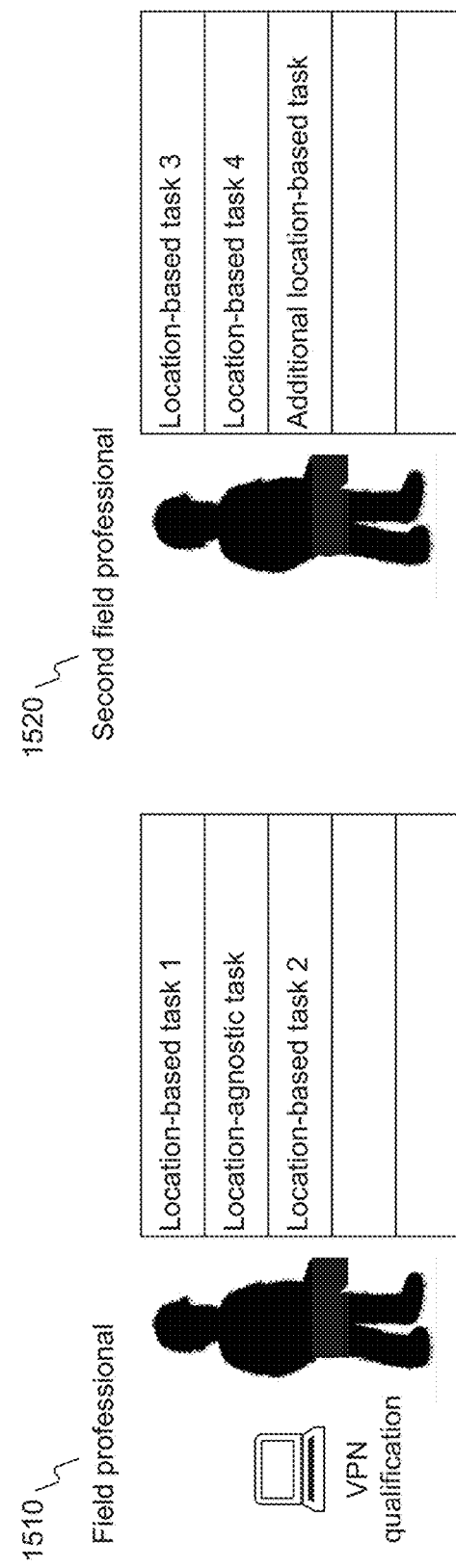

For example, as shown in FIG. 15A, there may be two field professionals, field professional 1510 and second field professional 1520. Both may be qualified to install modems, but only field professional 1510 is qualified to establish virtual private networks remotely. If a hospital emergency room's virtual private network fails, a high urgency notification may indicate a necessary location-agnostic task of repairing the network. Subsequently, as shown in FIG. 15B, the additional location-based task of a modem installation may be reassigned from field professional 1510 to second field professional 1520. Field professional 1510 may then be assigned the location-agnostic task of remotely repairing the emergency room's virtual private network. Alternatively, field professional 1510 may have past experience with the hospital's network or superior past rankings by customers. Any combination of these and other factors could be used to determine that field professional 1510 is more suitable to provide the location-agnostic task.

In another embodiment, one or more field professional may be instructed to initiate a location-agnostic task before driving to a location associated with a second location-based task. The instruction may be provided by a variety of means, including automatically to the field professional communication device 180A, or posted to a publicly viewable calendar. Alternatively, the instruction may cause a dispatch person to personally notify a field professional via a phone call, radio call, email, or text message. Notifying the field professional before driving to the location associated with the second location-based task reduces lost time and maximizes field professional utilization. Alternatively, the instruction may be provided to one or more field professional after driving at least part of the way to a location associated with the second location-based task. For instance, if an accident causes traffic to back up after a field professional departs for the second location-based task, the system may notify the field professional to stop driving and complete a location-agnostic task while waiting for traffic to clear. After completing the location-agnostic task, the field professional may be instructed to perform more location-agnostic tasks if the traffic still caused delays. Alternatively, the field professional may resume driving to the second location-based task upon completion of the location-agnostic task with or without further notification.

In another embodiment, historical traffic data may be used to determine a daily schedule of the one or more field professional. The daily schedule may include at least one or a plurality of location-agnostic tasks and a plurality of location-based tasks. Thus, in addition to location-agnostic tasks being scheduled on an ad hoc basis, they may also be scheduled in advance. For instance, if the historical traffic data indicates that highways near the city are always congested between 16:00 and 18:00, a daily schedule of a field professional may include location-agnostic tasks between 16:00 and 18:00 so that the field professional may be productive despite traffic delays. Historical traffic data may, for example, be derived from public sources, or from historical trends as recorded for other field professionals. If there are multiple times in a day when traffic is heavy, a field professional's schedule may include a plurality of location-agnostic tasks. These may all be for a single user, or for a single type of service, or for many users, or many services.

In some embodiments, a second request may be received after one or more field professional has started the first location-based task. That is, a schedule may be set prior to the start of the workday, but the schedule may also change throughout the day in response to other factors such as traffic, environment, schedule conflicts, field professional availability, and the like.

Assigning a location-agnostic task to one or more field professional may include sending a link to a remote assistance session to a mobile device associated with the field professional. The mobile device may be the field professional communication device 180A, or may be another device. The remote assistance session may be, for example, a remote desktop access tool, a virtual private network, or access to an administrator website. The link may enable the field professional to complete the location agnostic task. Alternatively, assigning a location-agnostic task to one or more field professional may include transferring a call to a mobile device associated with the one or more field professional. The video call may connect a field professional with a user, with another field professional, or with any other employee. The mobile device may be the field professional communication device 180A, or may be another device. The video call may enable a field professional to provide remote assistance or obtain further information and guidance related to the location-agnostic task.

G. Appointment Booking

Sometimes, services performed by field professionals are booked in advance of the service. Booking in advance allows predictability for users, managers, and field professionals. But coordinating many booking requests from many customers across an entire company's field professionals may be difficult. Furthermore, large companies with many field professionals and customers may have very complex schedules, making booking a single appointment that meets user and company needs very time consuming. Additionally, user experience is degraded, and manager time is lost when waiting on a system to book new appointments. The following disclosure describes automated methods and systems that enable fast booking of appointments for scheduling tasks to field professionals. The system includes a memory, a network interface, and a processor connectable to the network interface. The system may therefore provide booking responses for requests to book a new appointment using a multi-route model. The multi-route model may be configured to determine booking responses in different ways. For instance, a first method may provide fast response time, while a second method may provide high response accuracy. In this manner, a user or manager may be provided a quick booking response, improving user experience and reducing delays. In some embodiments, the disclosed methods may be implemented by task scheduling unit 150.

Figure 16:
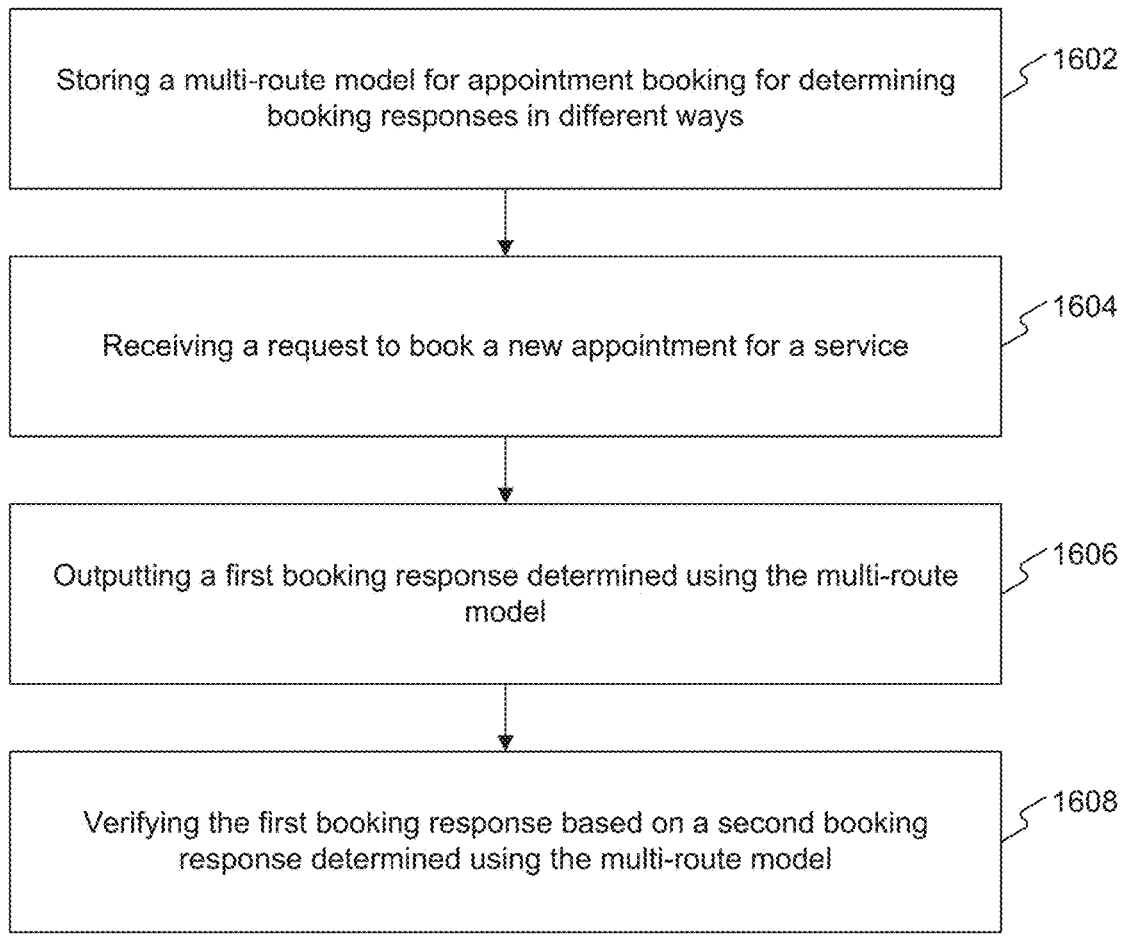
FIG. 16 is a flowchart showing an exemplary process for a multi-route model for appointment booking, consistent with the present disclosure.

FIG. 16 is a flowchart of an example process 1600 for a scheduling method for field professionals, consistent with the present disclosure. In some embodiments, server 152 may implement process 1600. For example, processing device 202 may receive data from I/O system 210 or network interface 206, and then execute instructions or program code stored in memory interface 204 or database 154, in which the instructions or program code implement algorithms of process 1600. The algorithms of process 1600 may be implemented as one or more of analysis module 441, forecasting module 442, planning module 443, or scheduling module 444. Process 1600 includes the following steps or operations.

At step 1602, a multi-route model for appointment booking for determining booking responses in different ways is stored. The model may be stored in memory interface 206 or in a non-transitory computer-readable storage medium. The model may include, for example, a machine learning model, an algorithm of checking actual assignment schedules to find schedule availability, and the like. The model may rely on external data, for example, data received from the network interface 206 or database 154 that show field professional availability, typical appointment durations, preferred appointment times, and other scheduling constraints. The multi-route model may include a plurality of models to determine appointment availability.

At step 1604, a request to book a new appointment for a service is received. This request may be entered directly by a user, for example, on a company website. Alternatively, the request may be entered by a member of the customer service unit 120, or by a manager. The appointment may be for an on-site, location-based visit by a field professional, such as, for example, performing veterinary procedures on a farm, or installing internet equipment at a house. The appointment may also be for performance of remote, location-agnostic services, such as configuring an internet connection, that may be performed at any location.

At step 1606, a first booking response for the request is output, wherein the first booking response is determined using the multi-route model. In one embodiment, the first booking response may be based on statistical measures and does not necessarily provide accurate results. The first booking response may be provided immediately, by a company website or a member of the customer service unit 120, or may be further analyzed or processed before being provided. The first booking response may be one of a plurality of results provided by one of the models of the multi-route model.

At step 1608, the first booking response is verified based on a second booking response determined using the multi-route model. That is, the multi-route model may provide a plurality of results. The results may be the same, or they may be different. Furthermore, each of the models in the multi-route model may each produce a plurality of results for output and verification. Thus, in step 1608, the response provided by one model of the multi-route model is verified by another response provided by another model of the multi-route model. Verification may occur by comparing the first booking response to the second booking response. If, for instance, the second booking response shows that the first booking response cannot be the basis of an appointment, perhaps due to a conflict in the schedule, step 1608 may identify that the first booking response is invalid.

Figure 17A:
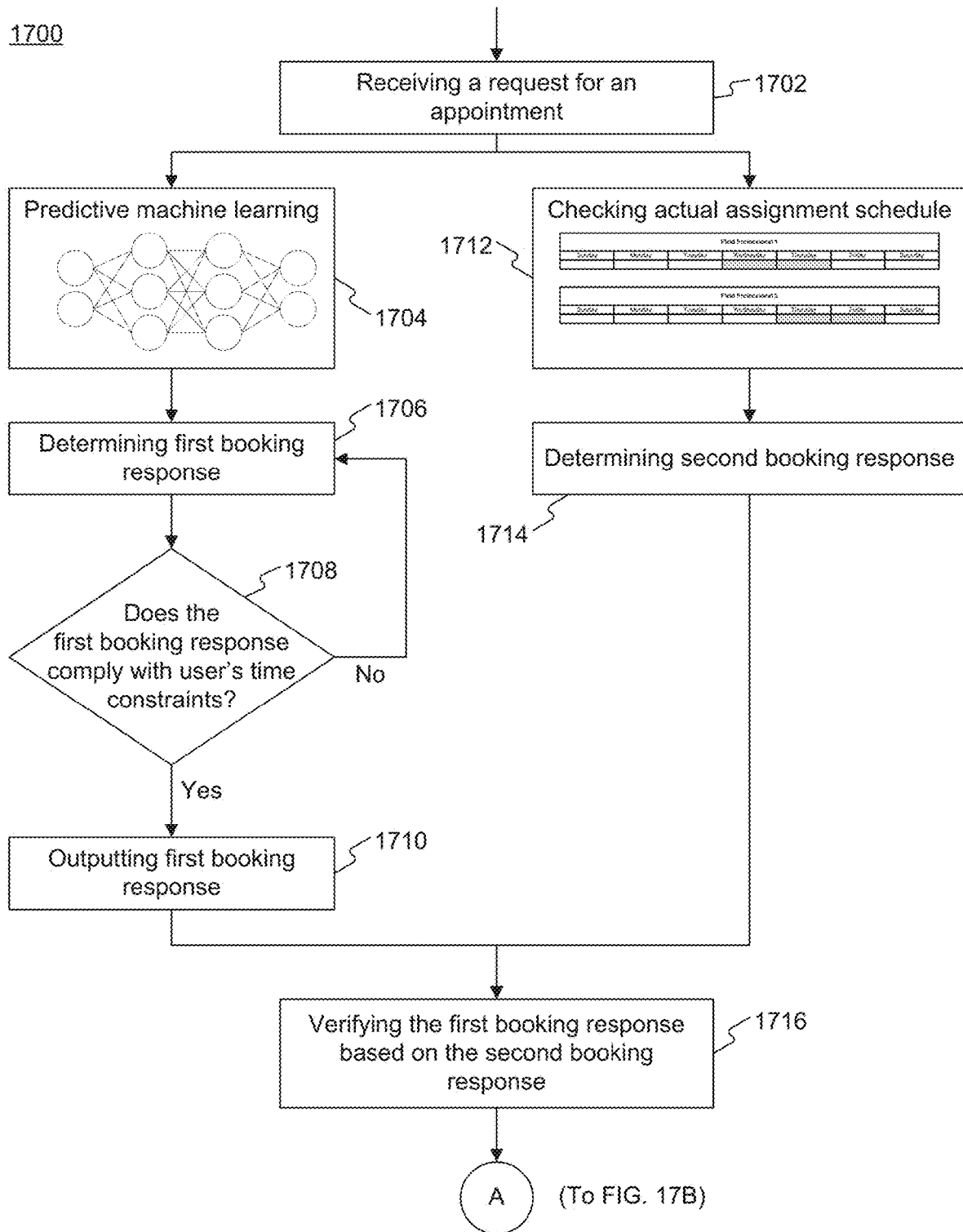
FIG. 17A and FIG. 17B show an example flowchart for determining booking responses and initiating actions in response, consistent with the present disclosure.
Figure 17B:
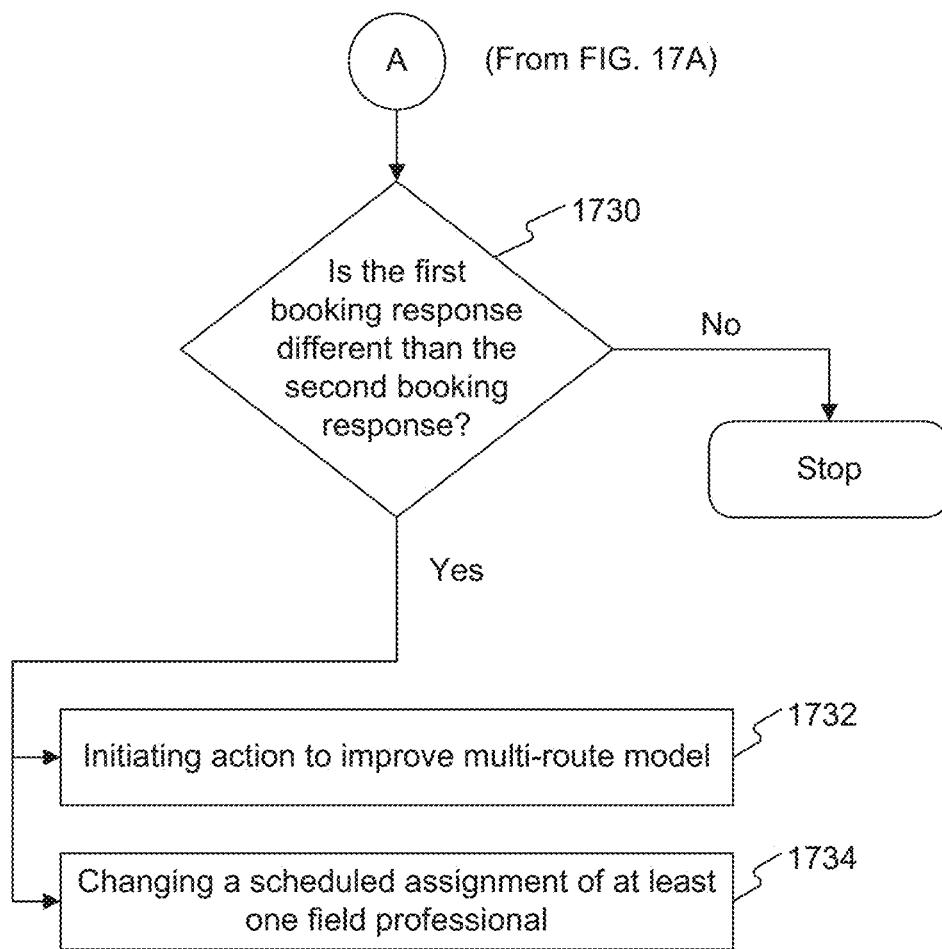

Further illustration of the steps of process 1600 may be understood with reference to the steps of process 1700 in FIG. 17A and FIG. 17B. Process 1700 begins by receiving a request to book a new appointment for a service at step 1702. After the request is received, a multi-route model is executed. For example, at step 1704, a predictive machine learning algorithm may be executed to determine a first booking response. The predictive machine learning algorithm may be implemented through any machine learning technique. In some embodiments, the first scheduling model may use previous proposed times to determine the first proposed time. For example, if previous cable installations occurred at 2:00 on Tuesdays and internet installations occurred at 1:00 on Wednesdays, the first scheduling model may use this information when determining a first booking response for a new request for cable installation. Thus, at step 1706, the predictive machine learning algorithm may determine a first booking response corresponding to the initial request for an appointment.

Subsequently, the first booking response is checked at step 1708 to ensure that the booking response complies with user-related time constraints before outputting the first booking response. In other words, if the user identifies a period of unavailability when requesting an appointment, the first booking response is compared to the unavailable times. For example, a user may request, at step 1702, an appointment for installation of new solar panels. Furthermore, if the user works or travels every Monday and Tuesday, the user may indicate that Mondays and Tuesdays are unavailable. If the first booking response is determined for Monday or Tuesday, the booking is rejected, and another first booking response is determined. If the first booking response complies with the user-related time restraints (or if there are no time constraints) the first booking response may be outputted at step 1710. The output may be promptly displayed to a user or customer service agent, or it may be output for further processing before being displayed to a user.

In addition to submitting time constraints, a user may also submit a user-related time preference. The first and second booking responses may be determined based on the user-related time preference. A time preference may be, for example, a desire to have service completed before the 15th of the month. The user may submit time constraints and time preferences, or time constraints only, or time preferences only, or no time constraints or time preferences at all. Furthermore, the user may submit any number of time constraints or time preferences. Time constraints or time preferences may comprise any unit of time measurement, such as, for example, Mondays only, or before 10:00 AM, or during the last week of a month, or during December.

Returning to step 1702, after a request for an appointment is received, a second model of the multi-route model is also initiated. The second model may be initiated at the same time as, before, or after the first model. As shown in step 1712, the second model may include checking an actual assignment schedule of a plurality of field professionals to determine the second booking response. For instance, the second model may step through each workday and appointment time sequentially until an open appointment time is determined. If there are many different field professionals, the schedule for the entire field professional work force may be very complicated and take a significant amount of time to determine a second booking response that meets the user's service requirement. For instance, the first model of the multi-route model may be more than twenty times faster the second model of the multi-route model, such that the first model takes one second and the second model takes twenty seconds or more. In some embodiments, the first model may be 5 times, 10 times, 50 times, 100 times or more faster than the second model. At step 1714, the second booking response is determined. The second model may require enough time that the second booking response may be determined after the first booking response is outputted. In one embodiment, the input for the first model may include a representation of the current state of the tasks Gantt and previous appointments offers determined by the second model.

At step 1716, the first booking response is verified based on the second booking response. Because the second booking response is determined by a different and perhaps more thorough process, the second booking response may provide an appointment that meets more of the necessary criteria of the initial request than the first booking response. Thus, the first and second booking responses may include different proposed times for providing the service. For example, the first booking response may be for an appointment at 3:00 on a Thursday. However, the second model may have stepped through each day in the week and found that every field professional is unavailable on Thursday. As a result, the second booking response may have been determined for an appointment at 3:00 on Friday. Thus, the first booking response for 3:00 on Thursday cannot be verified at step 1716. The criteria for verification may, for instance, be that the first and second booking responses are on the same day, within two hours, or on subsequent days.

At step 1730 of FIG. 17B, the first and second booking responses are compared. In some situations, step 1730 may be No, as the first and second booking responses may provide the same result. The process may terminate at this point. However, if the first and second booking responses differ, multiple options may be available. For instance, process 1700 may proceed to initiate an action to improve the multi-route model at step 1732. For example, the system may provide the second booking response, which may include a second proposed time, to the predictive machine learning algorithm. In this way, the second booking response may be an additional training input to retrain the predictive machine learning algorithm, thereby updating the predictive machine learning algorithm with the second booking response. Furthermore, the predictive machine learning algorithm may be retrained even if the first and second responses are identical, so as to reinforce a correct result in the algorithm. Alternatively, a scheduled assignment of at least one field professional may be changed when the first booking response is different than the second booking response at step 1734. In this way, the first booking response may be retained, providing greater consistency to users such that the first booking response is retained despite initially being invalid. In some embodiments, both step 1732 and step 1734 may be performed, such that both the multi-route model is improved and a schedule assignment is changed.

Figure 18:
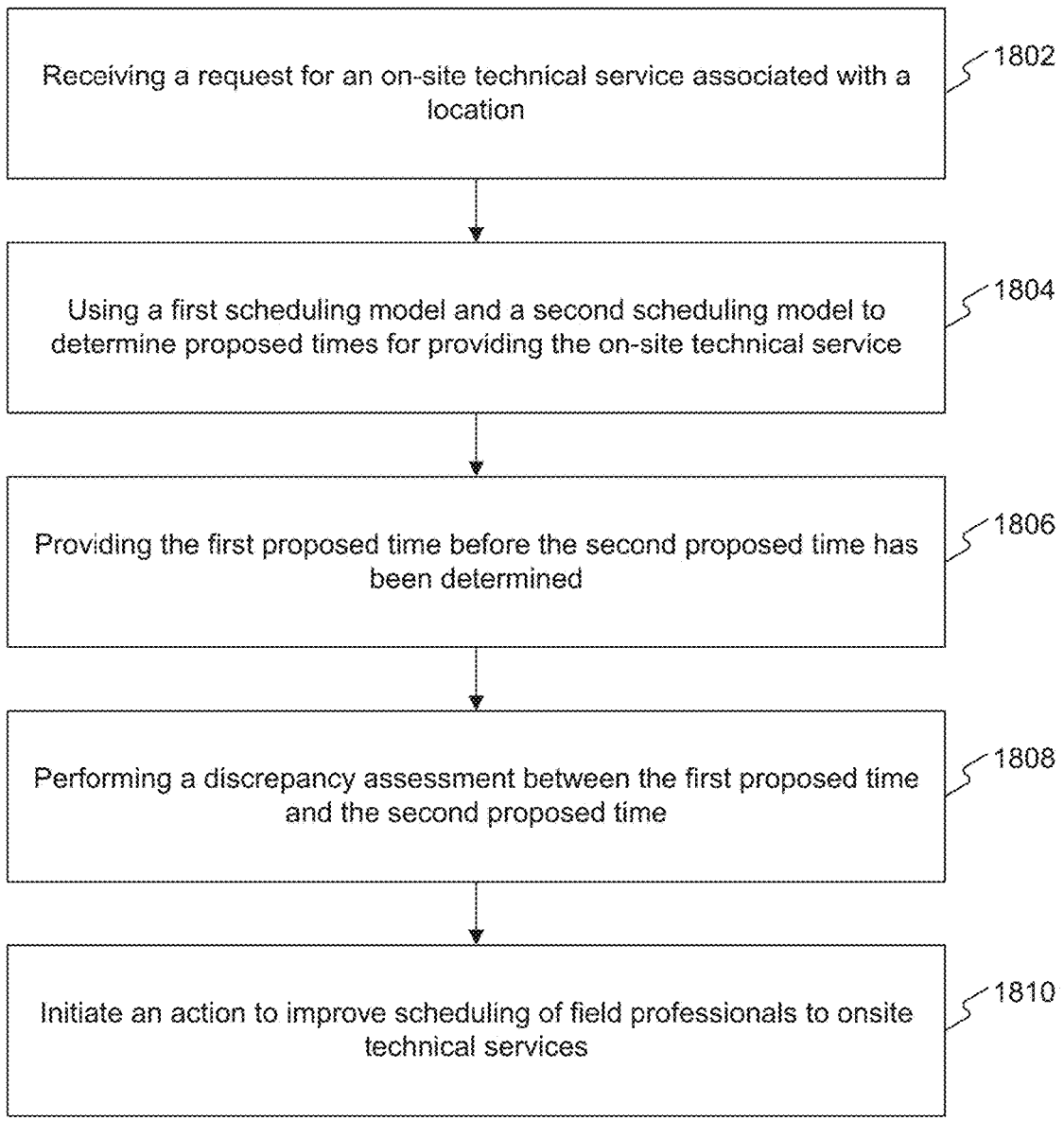
FIG. 18 is a flowchart showing another exemplary process for a multi-route model for appointment booking, consistent with the present disclosure.

In some embodiments, process 1800 shown in FIG. 18 may be used to schedule field professionals to on-site technical services. At step 1802, a request for an on-site technical service associated with a location is received. At step 1804, a first scheduling model and a second scheduling model are used to determine proposed times for providing the on-site technical service, wherein a first proposed time determined using the first scheduling model is determined faster than a second proposed time determined using the second scheduling mode. The first scheduling model may also be used to determine a first alternative proposed time and the second scheduling model may also be used to determine a second alternative proposed time. The first and second alternative proposed times may be determined synchronously or asynchronously with the first and second proposed times. At step 1806, the first proposed time is provided before the second proposed time has been determined. The first proposed time may be provided directly to the user, or by an intermediary, such as a customer service representative. At step 1808, after the first proposed time is provided, a discrepancy assessment is performed between the first proposed time and the second proposed time. This discrepancy assessment may return as a result the amount of time between the first and second proposed times. At step 1810, based on results of the discrepancy assessment, an action is initiated to improve scheduling of field professionals to on-site technical services.

Figure 19A:
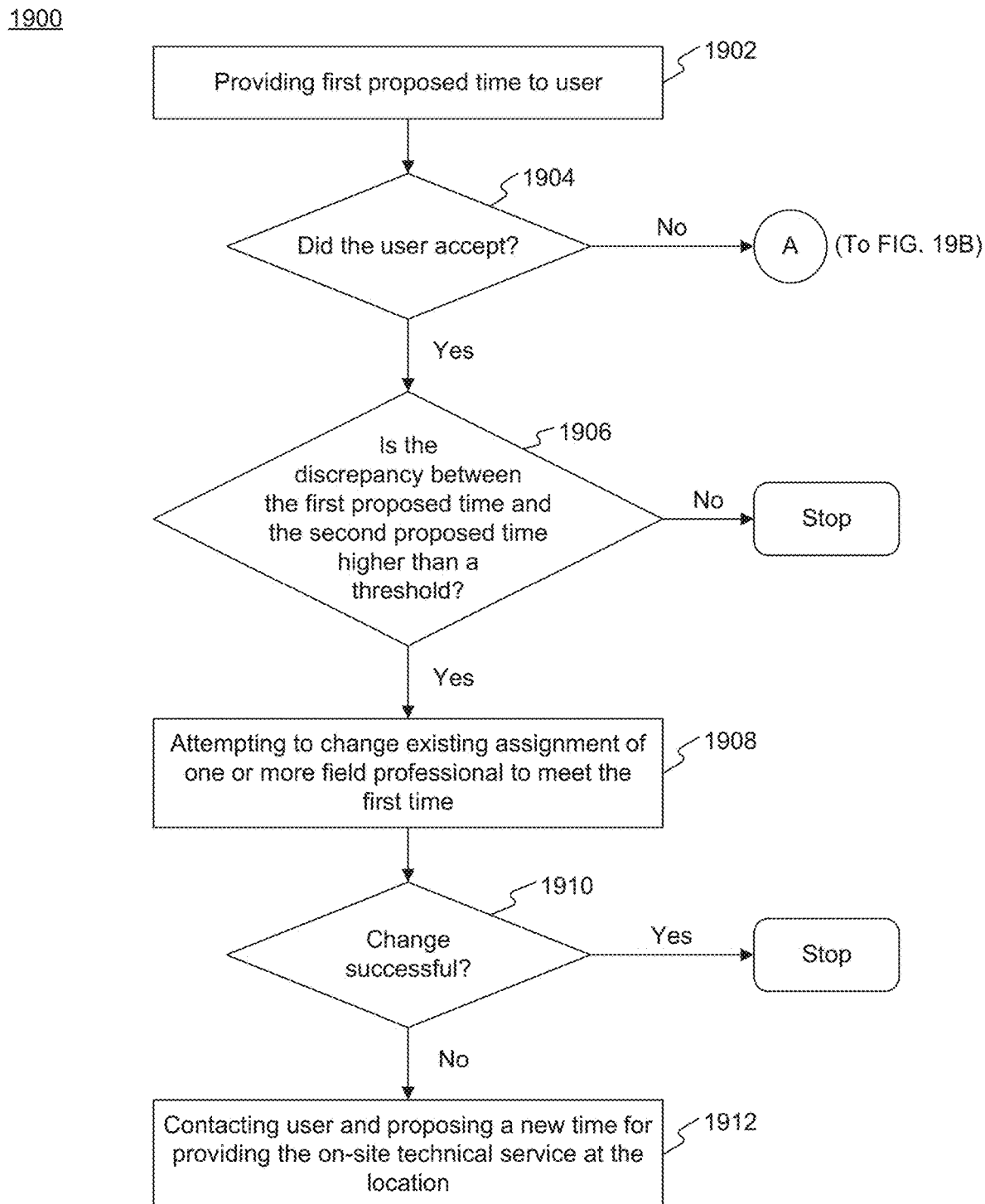
FIG. 19A and FIG. 19B show an example flowchart for offering appointment times to a user, consistent with the present disclosure.
Figure 19B:
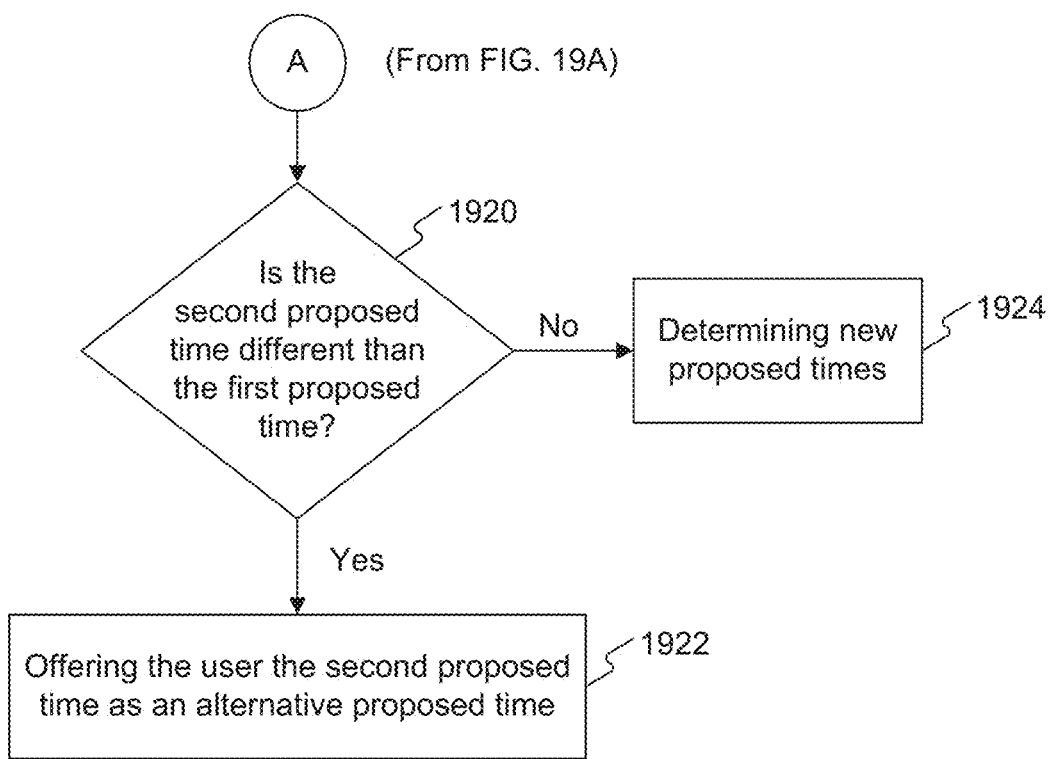

Further illustration of the steps of process 1800 may be understood by reference to the steps of process 1900 in FIG. 19A and FIG. 19B. At step 1902, a first proposed time is provided to a user. This may be done immediately once a proposed time is determined, or after a delay. The proposed time may also be provided to a user by any means of communication, including mail, email, text, automated phone call, or personal phone call from a customer service representative. The user may be given an opportunity to accept or reject the first proposed time. If the user accepts the first proposed time at step 1904, the discrepancy between the first proposed time and the second proposed time is compared to a threshold at step 1906. If the discrepancy is higher than a threshold, with step 1906 being Yes, an existing assignment of a field professional may be attempted to be changed to meet the first proposed time at step 1908. If the discrepancy is lower than a threshold, with step 1906 being No, no further action may be necessary. For example, a user may accept a first proposed time for lawn service of 1:30 on Wednesday. The second proposed time, which may be completed after the user accepts the first proposed time, may reveal that 1:30 on Wednesday is not actually possible by analyzing existing scheduled of field professionals. If the second proposed time is at 2:00 on Wednesday, and the threshold is a four hour difference, the first proposed time that was accepted by the user may be maintained as an appointment, or the second proposed time that was not offered to the user may be set as an appointment, and the process stopped. If, however, the second proposed time is for 3:00 on Thursday, step 1906 would be Yes, because the discrepancy is greater than the example threshold of four hours. An attempt would be made to reschedule an existing assignment of one or more field professional to meet the first proposed time at step 1908.

If the attempt at step 1908 is successful, step 1910 would be Yes. In this case, the process stops. However, if the attempt were unsuccessful, for instance, if all field professionals were already obliged for the entire week, step 1910 would be No. In this case, the user may be contacted at step 1912 to propose a new time for providing the on-site technical service at the location. The contact may occur after any amount of delay, including, for instance, before a user has left a booking website or ended a call with customer service.

Returning to step 1904, if the user does not accept the first proposed time, step 1904 would be No. As shown in FIG. 19b, it may next be determined if the second proposed time is different than the first proposed time. In this step, the two proposed times may be different if they do not overlap at all, or, in alternative embodiments, they may be different if they do not overlap fully. For example, an appointment from 2:00 to 3:00 on Thursday may be considered to be different from, or the same as, an appointment from 2:30 to 3:30 on Thursday. The amount of difference required for step 1920 to be Yes may therefore vary according to the needs of users, managers, and field professionals. If step 1920 is Yes, the second proposed time may be offered to the user as an alternative proposed time. If step 1920 is no, new proposed times may be determined at step 1924. For example, if the first proposed time is 10:30 on Tuesday, and the second proposed time is 10:30 on Tuesday, and the user refuses this appointment, new proposed times may be determined. If, however, the second proposed time were 12:00 on Tuesday, this second proposed time may be offered as an alternative proposed time to the user at step 1922.

In alternate embodiments, a first alternative proposed time may be determined using the first scheduling model, in addition to the first proposed time. Furthermore, a second alternative proposed time may be determined using the second scheduling model. If a user refuses the first proposed time, and the refusal is received before the second alternative proposed time was determined, the first alternative proposed time may be offered to the user. Alternatively, if the refusal is received after the second alternative proposed time was determined, the second alternative proposed time may be offered to the user. For example, the first scheduling model may identify the first proposed time and the first alternative proposed time after a few milliseconds and may be even seconds before the second scheduling model. For instance, the first proposed time may be 8:00 on Monday and the first alternative proposed time may be 9:00 on Tuesday. If the user rejects the 8:00 Monday appointment before the second scheduling model is complete, the 9:00 on Tuesday appointment may be offered. On the other hand, if the second scheduling model determines a second alternative proposed time of 3:00 on Monday before the refusal is received, the 3:00 on Monday appointment may be offered. In this way, the user is given the benefit of quick, responsive appointment scheduling, while also being provided more robust results if the user is slow to respond and the results are available.

H. Offering Times for Service

When scheduling tasks to field professionals, users ordinarily desire the earliest possible appointment time. Field professional companies may also desire to schedule appointments as early as possible in order to provide services responsive to user needs. However, simply providing the earliest possible appointment may ignore other factors that are important to field professionals, such as added cost necessary to schedule the first available appointment. Furthermore, users may prefer lower cost appointments and services over having the first available appointment for every requested service. The following disclosure describes automated methods and systems that enable offering a later appointment time when the cost of an earlier appointment time is too high. Customer may be incentivized to accept an alternative that is more cost effective for the field professional scheduler. For example, if a first possible appointment time is associated with a cost that is much higher than a second possible appointment time, the system may offer the user the second possible appointment time. Alternatively, the system may determine that neither of the appointment times are cost effective, and indicate to the user that there are no available appointment times. The system includes a memory, a network interface, and a processor connectable to the network interface. The system may therefore provide an appointment that optimizes cost and wait times according to user and company needs. In some embodiments, the system may be implemented as task scheduling unit 150.

Figure 20:
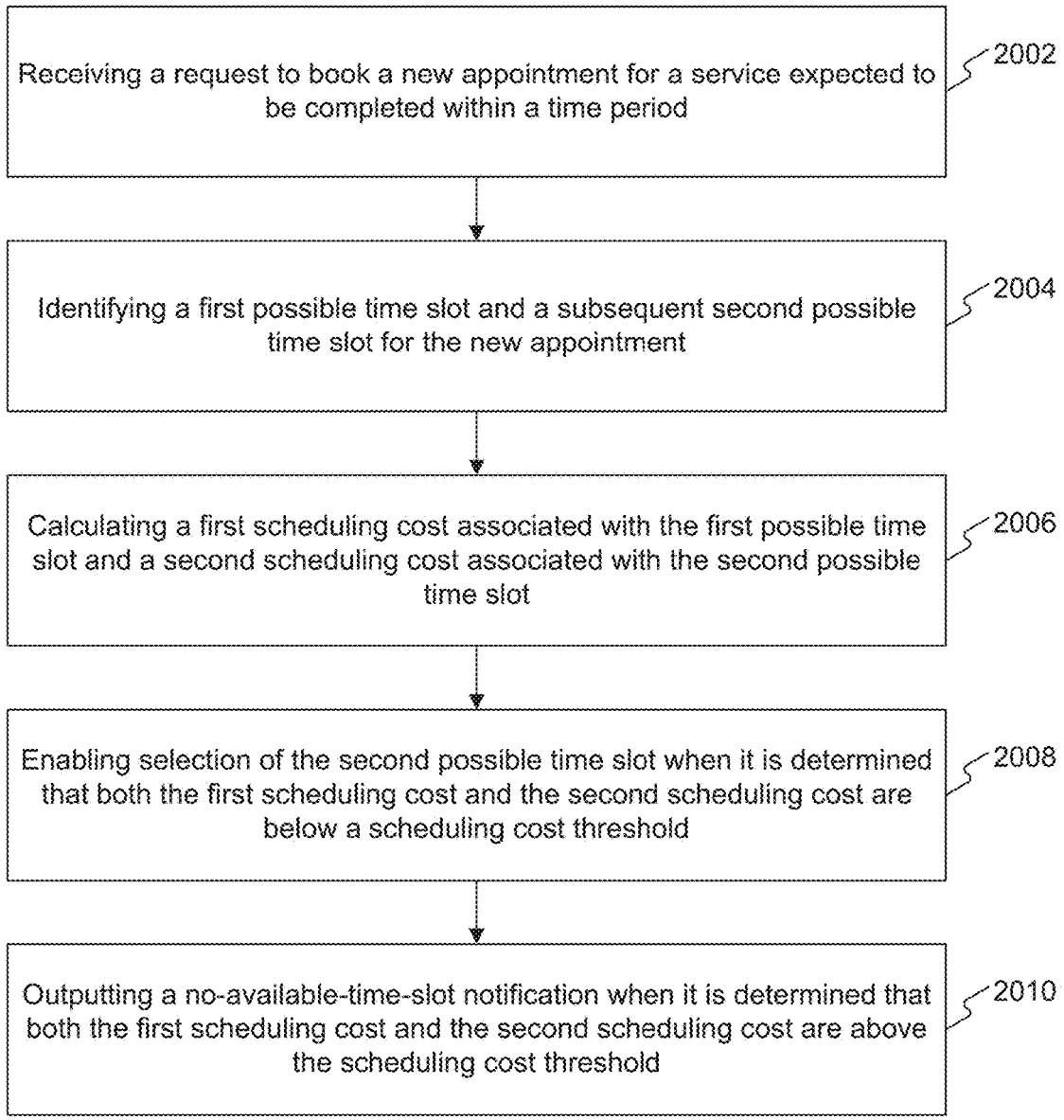
FIG. 20 is a flowchart showing an exemplary process for offering times for service based on system considerations, consistent with the present disclosure.

FIG. 20 is a flowchart of an example process 2000 for a scheduling method for field professionals, consistent with the present disclosure. In some embodiments, server 152 may implement process 2000. For example, processing device 202 may receive data from I/O system 210 or network interface 206, and then execute instructions or program code stored in memory interface 204 or database 154, in which the instructions or program code implement algorithms of process 2000. The algorithms of process 2000 may be implemented as one or more of analysis module 441, forecasting module 442, planning module 443, or scheduling module 444. Process 2000 includes the following steps.

At step 2002, a request to book a new appointment for a service expected to be completed within a time period is received. The request may be received directly from a user, for example, via a website. Alternatively, the request may be entered by a member of the customer service unit 120, or by a manager. The request may be for an on-site, location-based service by a field professional, such as, for example, performing veterinary procedures on a farm, or installing internet equipment at a house. The request may also be for performance of remote, location-agnostic services, such as configuring an internet connection, that may be performed at any location. The request may contain information about when the service should be performed. This could include user availability, such as after 5:00 on Tuesdays, or user urgency, such as within 24 hours. Alternatively, a company may specify a required time period for different types of services, such as requiring that all requests for vaccination services should be completed within one week of request.

At step 2004, a first possible time slot and a subsequent second possible time slot for the new appointment within the time period are identified. The time slots may be identified by any method. For example, each time slot in the time period may be examined sequentially to see if an appointment could occur in each time slot. The first possible time slot and the subsequent second possible time slot time within the time period for the new appointment may be identified based on predicted user availability data. Predicted user availability data may be derived from, for instance, social media, work hours, and historical appointment time preferences provided by the user. A time slot that is possible because no field professionals are scheduled during the time may nonetheless not be identified if the user is predicted to be unavailable during the time.

At step 2006, a first scheduling cost associated with the first possible time slot and a second scheduling cost associated with the second possible time slot are calculated. Different factors may be considered when calculating the cost, because travel may require travel expenses, including for example tolls, gasoline, air or rail fares, per diem, lodging, and wages. A scheduling cost may be associated with a total of driving durations of a set of field professionals. Furthermore, a scheduling cost of possible time slots may be based on details of previously scheduled tasks to a set of field professionals. For example, a cost may be the hourly wage of the field professionals multiplied by the driving duration to the location of the requested service, or the price of gasoline. Driving duration may include information about anticipated traffic, or the distance between the site of an immediately preceding appointment and the requested appointment location. For instance, a first possible time slot may immediately follow an appointment at a location 100 miles away from the requested appointment location, while a second possible time slot may follow an appointment at a location only 5 miles away from the requested appointment location. In this example, the second possible time slot would be associated with a lower cost, both because the set of field professionals would spend less time driving, and because the transportation cost of traveling 100 miles is more than the transportation cost of traveling 5 miles. In other words, driving duration may include both time and distance.

The cost may also be associated with a total number of tasks that can be assigned to a set of field professionals in a predefined period of time. In other words, some time slots may allow a set of field professionals to be assigned to more tasks than other time slots. For example, a user may request refrigerator repair service, expected to take one hour to complete. A first possible time slot may be between an appointment ending at 9:00 and an appointment beginning at 10:00, and a second possible time slot may be between an appointment ending at 10:00 and an appointment starting at 11:30. The second time slot may result in 30 minutes of lost productivity and one fewer task for the shift, because there may be no tasks that a field professional can complete in less than 45 minutes. The cost may then be calculated based on the lost revenue from performing one fewer task in a shift and the cost of wages paid during unproductive employment time.

The cost may also be associated with a total number of field professionals working in a predefined period of time. In this manner, the number of field professionals working each day may better match daily needs. For example, the scheduler may minimize or reduce the number of professionals working each day. Furthermore, the cost may be based on a daily schedule of each of a plurality of field professionals. This may enable greater optimization of scheduling all the field professionals as a whole. For instance, a first possible time slot may occur on a day when three field professionals are scheduled to work. However, the requested service may require a special skill set or be in a location that is far from the other appointments already scheduled for the three field professionals. A fourth field professional may then be needed to perform a service at the first possible time slot. The added cost of assigning the appointment to the fourth field professional, thereby making the fourth field professional work, may therefore be based in overtime pay, or the obligation of the company to pay the field professional a full day wage despite only performing a single task at the first possible time slot. Thus, cost may reflect a management preference to minimize the number of field professionals working each day.

The cost may also be associated with a total of the resources being utilized in a period of time. For instance, a set of field professional nurses may have access to a single inhalator. While a time slot may be possible because one of the nurses is not scheduled during the time, the inhalator may be assigned to a different appointment during the time. Assigning an appointment at the time slot may therefore require rental of a second inhalator. The cost may therefore be based in the rental or purchase cost of additional equipment needed to perform a specific task for an appointment during the time slot.

Returning to FIG. 20, at step 2008, selection of the second possible time slot is enabled when it is determined that both the first scheduling cost and the second scheduling cost are below a scheduling cost threshold. Furthermore, enabling selection of the second possible time slot may include outputting information reflecting the second possible time slot. For example, if the cost of both the first and second possible time slots are acceptable to the company, both may be offered to a user so that the user has multiple options for appointment times. If the second possible time slot has a cost above a scheduling cost threshold, only the first possible time slot may be output. Information reflecting the possible time slots may be output directly to the user or indirectly to the user via a member of the customer service unit 120.

Any combination of total driving duration, total number of tasks, total number of field professionals, and total resources being utilized may be used in determining a scheduling cost. Furthermore, scheduling costs may be computed the same or differently for each of the identified time slots.

Further, at step 2010, a no-available-time-slot notification is output when it is determined that both the first scheduling cost and the second scheduling cost are above the scheduling cost threshold. That is, if all available time slots within a time period are too expensive, the user may receive a notification that there are no available time slots or appointments within the time period. The notification may include offering a time slot at a time after the time period, or a later time slot within the time period, that may be below the scheduling cost threshold. The notification may be provided directly to a user, or to a member of the customer service unit 120.

Figure 21:
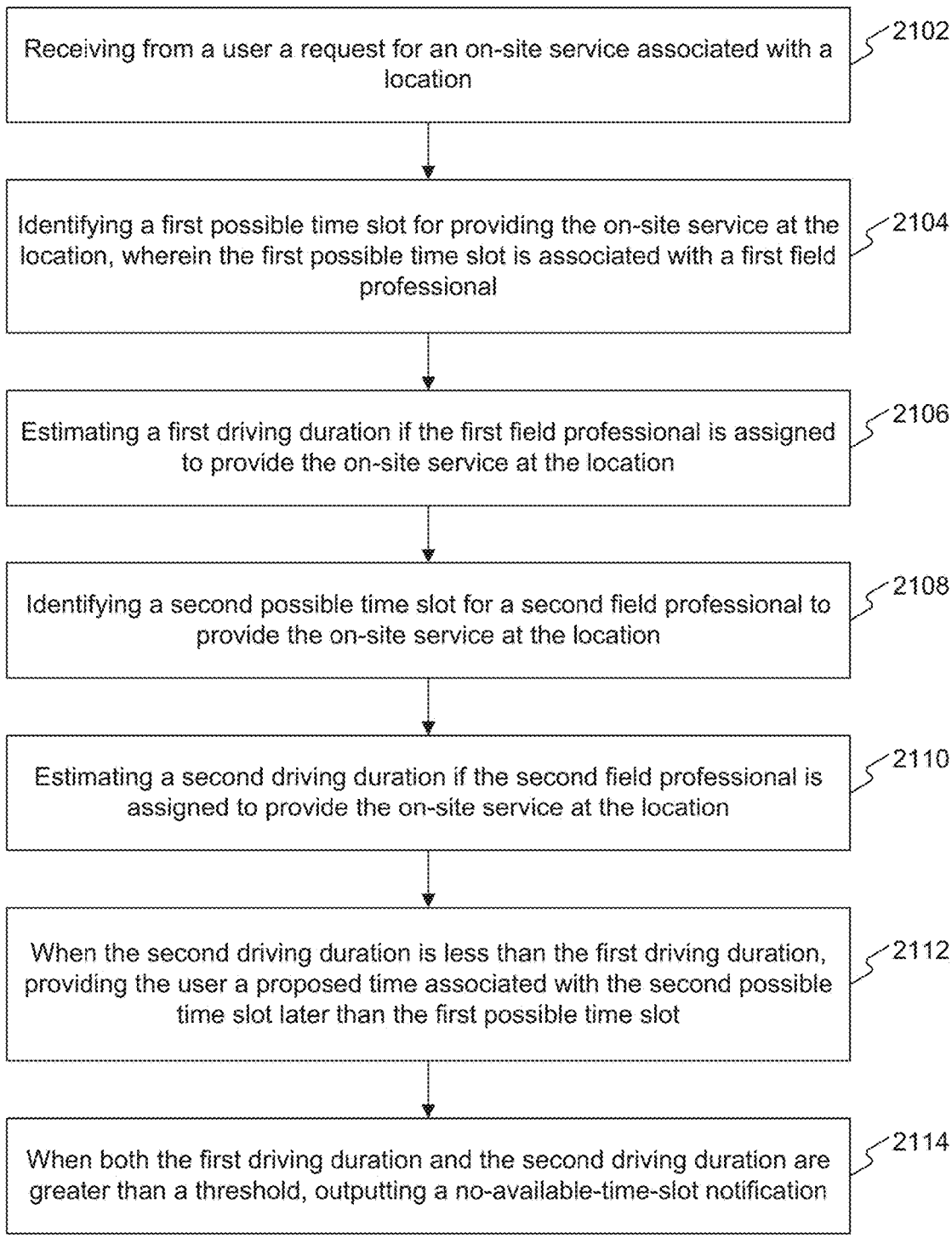
FIG. 21 is a flowchart showing an exemplary process for offering times for service based on driving duration, consistent with the present disclosure.

FIG. 21 is a flowchart of an example process 2100 for a scheduling method for field professionals for on-site services in cases when a scheduling cost reflects driving duration. At step 2102, a user request for an on-site service associated with a location is received. That is, one or more field professionals may need to travel to the location to perform the service.

At step 2104, a first possible time slot for providing the on-site service at the location is identified, wherein the first possible time slot is associated with a first field professional. At step 2106, a first driving duration that would be added to a schedule of the first field professional if the first field professional is assigned to provide the on-site service at the location is estimated based on previously scheduled tasks of the first field professional and traffic conditions. In other words, the driving duration may be determined based on how far a field professional must drive to reach the location from a previous location. The previous location may be the field professional's residence, or a dispatch center, or a location of preceding appointment. The traffic conditions may be predicted, for example, based on knowledge that traffic driving into a city at 8:00 is known to add a thirty-minute delay, or that a particular roadway is planned to undergo construction that will increase traffic delays. Additionally, the traffic conditions may also be real-time, based on live traffic updates on the internet or from field professionals, and may help scheduling of same-day or short notice appointments.

At step 2108, a second possible time slot for a second field professional to provide the on-site service at the location is identified, wherein the second possible time slot is associated with a second field professional. At step 2110, a second driving duration that would be added to a schedule of the second field professional if the second field professional is assigned to provide the on-site service at the location is estimated based on previously scheduled tasks of the second field professional and traffic conditions. The second driving duration may be estimated in the same manner as the first driving duration.

Identification of the first and second possible time slots may be completed in any manner. A schedule showing all field professionals together may be analyzed to identify the first possible time slot among all field professionals. Alternatively, a first possible time slot may be identified for a particular field professional, and a second possible time slot, later than the first possible time slot, may be identified for a different field professional. For example, field professional A may have an available time slot of 10:00 on Wednesday, and field professional B may have available time slots of 9:00 on Tuesday and 9:00 on Friday. The first possible time slot among all field professionals is 9:00 on Tuesday, and the second possible time slot among all field professionals is 10:00 on Wednesday. However, field professional A may be preferred, and so the first possible time slot may be identified as 10:00 on Wednesday with field professional A, and the second possible time slot may be identified as 9:00 on Friday with field professional B.

At step 2112, the user is provided a proposed time associated with the second possible time slot different from (e.g., later than) later than the first possible time slot when the second driving duration is less than the first driving duration. That is, although the first possible time slot may be earlier, a later, second time slot may be preferred because the second time slot required less time lost while driving. This may occur if the distance the second field professional must travel from a preceding appointment to the location of the user request is shorter than the distance the first field professional must travel from a preceding appointment. Alternatively, although a first distance may be shorter than a second distance, the first distance may require driving on a route that requires more time due to speed limits and predicted or observed traffic.

At step 2114, a no-available-time-slot notification is output if both the first driving duration and the second driving duration are greater than a threshold. That is, a company may determine that driving durations greater than one hour result in too much lost productivity, and therefore implement a threshold that appointments are not available for time slots that would require more than one hour of drive time.

Figure 22:
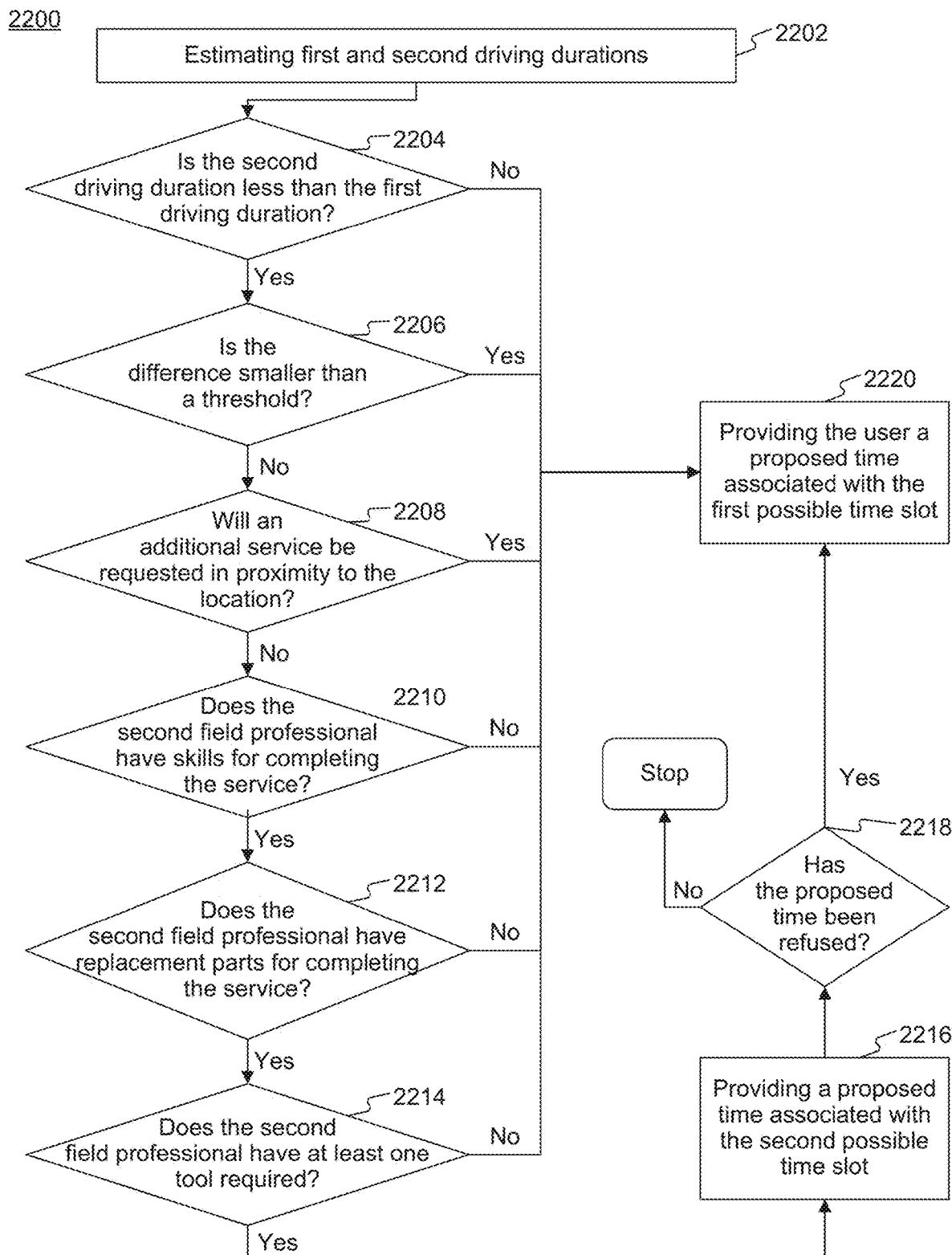
FIG. 22 is a flowchart showing an exemplary process for providing a user a proposed time associated with the second possible time slot or a first possible time slot, consistent with the present disclosure.

Further illustration of the steps of process 2100 may be understood with reference to the steps of process 2200 in FIG. 22. Process 2200 begins at step 2202 by estimating first and second driving durations, for instance, as in steps 2106 and 2110 in FIG. 21. At step 2204, the second driving duration is compared to the first driving duration. If the first driving duration is less than the second driving duration, step 2204 is No, and a proposed time associated with the first possible time slot may be provided to the user. If the second driving duration is less than the first driving duration, step 2204 is Yes, and other steps may occur.

For instance, at step 2206, the time difference between the second driving duration and the first driving duration is compared to a threshold. If the difference is smaller than a threshold, step 2206 is Yes, and a proposed time associated with the first possible time slot is provided to the user. If the difference is larger than the threshold, step 2206 is No, and step 2208 may occur. For example, if second possible time slot would save only a small amount of driving duration time, such as only five minutes, the first possible time slot may be preferred despite it requiring a longer driving duration. In some embodiments, the threshold may be dependent on the difference between the first and second possible time slots. For example, if the first possible time slot is on Monday and the second possible time slot is on Tuesday, the threshold may be set to five minutes, but if the second possible time slot is on Friday, the threshold may be set to two hours. In this way, the inconvenience of a delay between the first and second time slots may be balanced against the benefit of a shorter driving duration.

At step 2208, the process 2200 predicts if an additional service would be requested in proximity to the location. If an additional service is predicted to be requested in proximity to the location, step 2208 is Yes, and a time associated with the first possible time slot is provided to the user. The prediction may be done by any means, such as by comparison to historical patterns of requests for service or weather forecasts. Additionally, the proximity may reflect a threshold distance, such as ten miles, or a driving duration, such as twenty minutes. In this manner, a schedule may be constructed that anticipates user needs and reduces total driving duration for multiple appointments, even if driving duration for a single appointment, taken in isolation, is greater than it could be for second possible time slot.

At step 2210, process 2200 confirms if the second field professional has skills for completing the on-site service before providing the user the proposed time associated with the second possible time slot. The skills may be determined by reference to a database containing skill information of each field professional, or by directly asking a field professional in reference to a particular request for service.

At step 2212, process 2200 confirms if the second field professional has replacement parts for completing the on-site service before providing the user the proposed time associated with the second possible time slot. At step 2214, process 2200 confirms that the second field professional has at least one tool required for completing the on-site service before providing the user the proposed time associated with the second possible time slot.

The replacement parts and at least one tool required for completing the on-site service may be determined by reference to a standard list of parts and tools needed for the type of service requested by a user. Alternatively, the replacement parts and at least one tool may be determined by communicating with a field professional to inform of the requested service and relying on the field professional to determine what replacement parts and tools are needed. A field professional may be considered to have replacement parts if the replacement parts are, for instance, in a vehicle with the field professional, or easily accessed by a field professional, for example at a warehouse within a predetermined distance of the on-site service or accessed by a detour along the route to the location requiring a driving time beneath a threshold. Information concerning the location of replacement parts and tools may be derived from wireless tracking tools, inventory logs, or communication with field professionals or warehouse employees.

If each of steps 2210, 2212, and 2214 are Yes, the process 2200 may proceed to provide a proposed time associated with the second possible time slot at step 2216. The proposed time slot may be provided directly to the user, or to a customer service representative to provide to the user. If the user refuses the proposed time associated with the second possible time slot at step 2218, step 2218 is Yes, and the process 2200 may then provide the user a proposed time associated with the first possible time slot. If the user does not refuse the proposed time, step 2218 is No, and the process stops. If any of steps 2210, 2212, and 2214 are No, the process 2200 may proceed to step 2220 and provide the user a proposed time associated with the first possible time slot.

Any combination of steps 2204, 2206, 2208, 2210, 2212, 2214, 2216, and 2218 may be utilized in process 2200. These steps may be performed in any order, and any of the steps may be omitted.

I. Scheduling Tasks Based on User Profile

When scheduling tasks to field professionals, a company that provides field services may have to keep schedules of each of the field professionals. When a user requests an on-site service, the scheduler may need to find an available time slot in the schedule of the field professionals to accommodate the new request for service. However, a time slot that is available for a field professional may not be available for a user. Identifying time slots that are possible for field professionals as well as possible or even convenient for users increases customer satisfaction.

The following disclosure describes automated methods and systems that enable identifying when a time slot is suitable for the requesting user as well as the field professionals. For example, if a field professional has multiple times slots available, but some of those times are unavailable for a user, the system may offer the user one of the time slots that are available to both the field professional and the user. The system includes a memory, a network interface, and a processor connectable to the network interface. In some embodiments, the system may be implemented as task scheduling unit 150.

Figure 23:
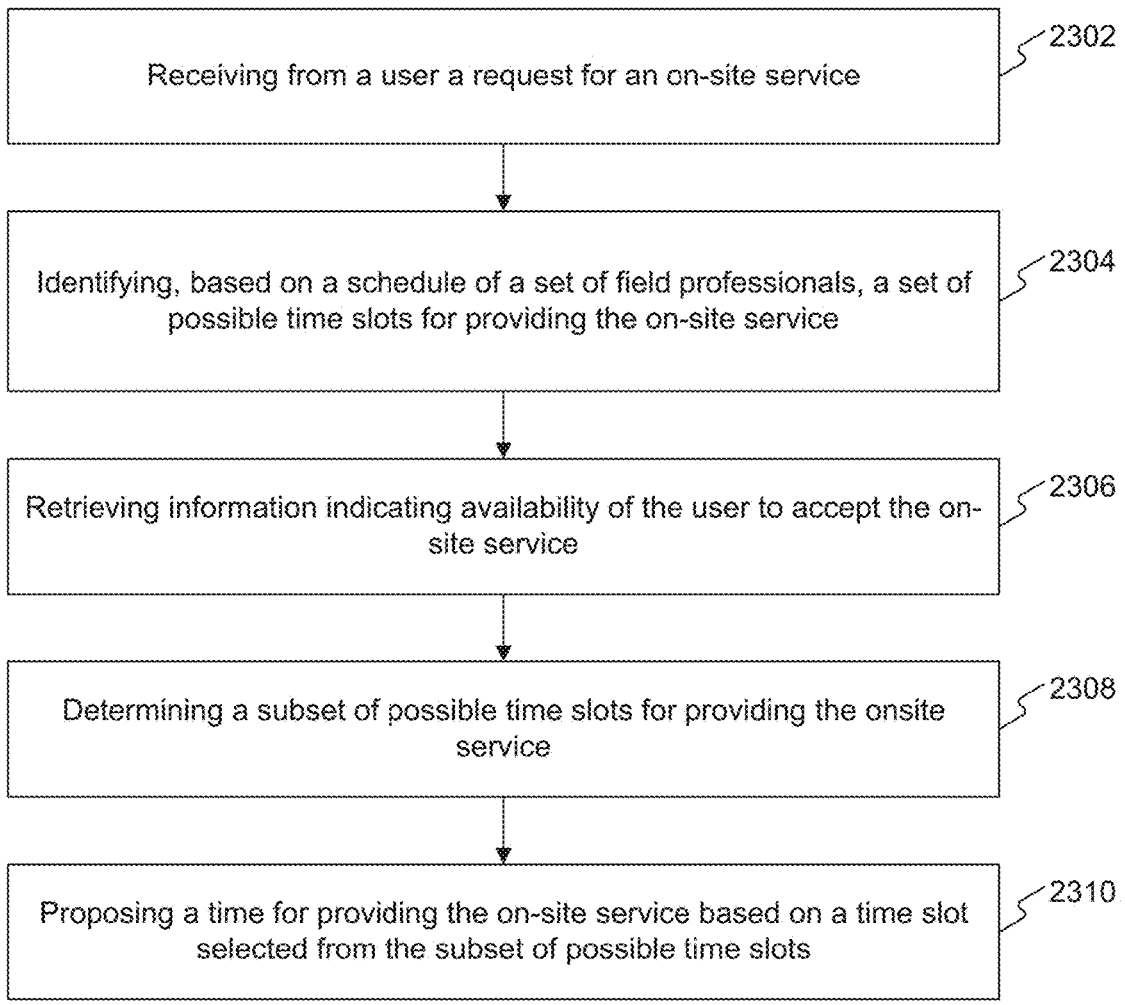
FIG. 23 is a flowchart showing an exemplary process for offering times for service based on user availability, consistent with the present disclosure.

FIG. 23 is a flowchart of an example process 2300 for a scheduling method for field professionals, consistent with the present disclosure. In some embodiments, server 152 may implement process 2300. For example, processing device 202 may receive data from I/O system 210 or network interface 206, and then execute instructions or program code stored in memory interface 204 or database 154, in which the instructions or program code implement algorithms of process 2300. The algorithms of process 2300 may be implemented as one or more of analysis module 441, forecasting module 442, planning module 443, or scheduling module 444. Process 2300 includes the following steps.

At step 2302, a user request for an on-site service is received. The request may be received in a variety of ways, including directly from a user, for example, via a website. Alternatively, the request may be entered by a member of the customer service unit 120, or by a manager. The request may be for an on-site, location-based service by a field professional, such as, for example, performing veterinary procedures on a farm, or installing internet equipment at a house. The request may be accompanied by a time period, provided by the user along with the request or by a company as a standard of service for a type of on-site service.

At step 2304, a set of possible time slots for providing the on-site service is identified based on a schedule of a set of field professionals. The time slot may be identified by any method. For example, time slots in a time period may be examined sequentially to see if an appointment could occur in each time slot.

At step 2306, information indicating an availability of the user to accept the on-site service is retrieved. This information may take on many different forms. For instance, the information may be from at least one online source. The online source may be, for example, social media or a publicly viewable calendar. The information may be direct, such as a user publicly posting their work hours, or the information may be derived from user patterns, such as analysis of a user's social media posting history showing that no posts were made between 8:00 and 9:00 on weekdays, indicating that the user is likely commuting to work during that time. In accessing this information, user permission to crawl the at least one online source may be requested and, if the user approves, the user permission may be accepted as well. In some embodiments, the request may only occur if a search of publicly available information yields insufficient information.

The information may also be retrieved from a profile associated with the user. This profile may be stored in the system's database. The profile may also be an online profile, created by a user when establishing a relationship with the field professional company. The data in the profile may be supplied directly by the user, or the data may be created by the company based on past answers of the user to proposed times for on-site services. For example, if a user always declines time slots before 10:00, a profile may be created for the user that records that appointments before 10:00 should not be offered. Alternatively, the profile may record the user's directly inputted choice that appointments after 12:00 should not be offered. In this manner, the user's profile may or may not be directly viewable or editable by the user.

At step 2308 a subset of possible time slots for providing the on-site service is determined based on the retrieved information indicative of an availability of the user. The subset may be determined by comparing the information from step 2306 to the set of time slots from step 2304. The set of possible time slots for providing the on-site service may include times in which field professionals can arrive to a location associated with the user, and the subset of possible time slots for providing the on-site service may include times in which field professionals can arrive to the location and there is a likelihood that the user will be present at the location. Mutually exclusive times may be ignored, with remaining times forming the sub-set. For example, the set of possible time slots of when a field professional is available from step 2304 may include 8:00 on Monday, Tuesday, and Wednesday. The information from step 2306 may show that the user is only available at 8:00 on Tuesday, Wednesday, and Thursday. Thus, the intersection of the two sets, namely, 8:00 on Tuesday and Wednesday, form the subset of possible time slots. The subset of possible time slots may be less than 25% of the set of possible time slots, either by cumulative time, such as a subset of 1.5 hours of time slots in comparison to a set of 8 hours of time slots, or by total number, such as one time slot, regardless of duration, in a subset and five time slots in a set.

Determining the subset of possible time slots for providing the on-site service may be based on profiles of other users. Behavior analytics may reveal that other users with similar profiles have a pattern of appointment preferences. For example, if a requesting user's profile shares a corporate address with many other users who prefer appointments after 4:00 on weekdays, the subset of appointments may be determined based on appointments after 4:00 on weekdays. This could happen even if the requesting user has not indicated that he prefers appointments after 4:00 on weekdays. Similar analysis of profiles of other users, such as information about demographic data, spending with the company, or types of services requests, may be used to determine the subset as well.

Furthermore, determining the subset of possible time slots for providing the on-site service may be based on information associated with a weather forecast. For example, if the on-site service requires work outside, time slots should not be offered for periods when bad weather is expected. A weather forecast may be near term, such as rain being forecast for Tuesday, or long term, such as snow being expected at a service location between November and March that prevents installation of a large piece of equipment.

Additionally, determining the subset of possible time slots for providing the on-site service may be based on information associated with the request. For example, if a user requests the service at an address known to be for the user's work location, either by self-identification by the user or by looking up the address associated with an incoming call, the subset of times may be determined to be during work hours. Alternatively, if the user requests service using a home phone number rather than a work phone number, the subset of times may be determined to be outside of work hours.

At step 2310, a time is proposed for providing the on-site service based on a time slot selected from the subset of possible time slots. The proposed time may be delivered directly to the user or indirectly to the user via a member of the customer service unit 120. Alternatively, the time may not be delivered to the user at all, but instead may be saved for further processing. In some embodiments, at least one time slot associated with a field professional may be selected based on a location associated with the user and locations of tasks previously assigned to the field professional. That is, if there are many time slots in the sub-set, and some of them are preceded by appointments far from the location associated with the request and others are preceded by appointments close to the location associated with the request, the time slots preceded by appointments closest to the requested location may be preferred. Alternatively, the distances may be in relation to appointments immediately following the time slot. In this way, a company may prefer to suggest a time slot when there is already a field professional scheduled in proximity to the user's location. After the time is proposed, a task may be scheduled for a field professional after the user accepts the proposed time.

Figure 24:
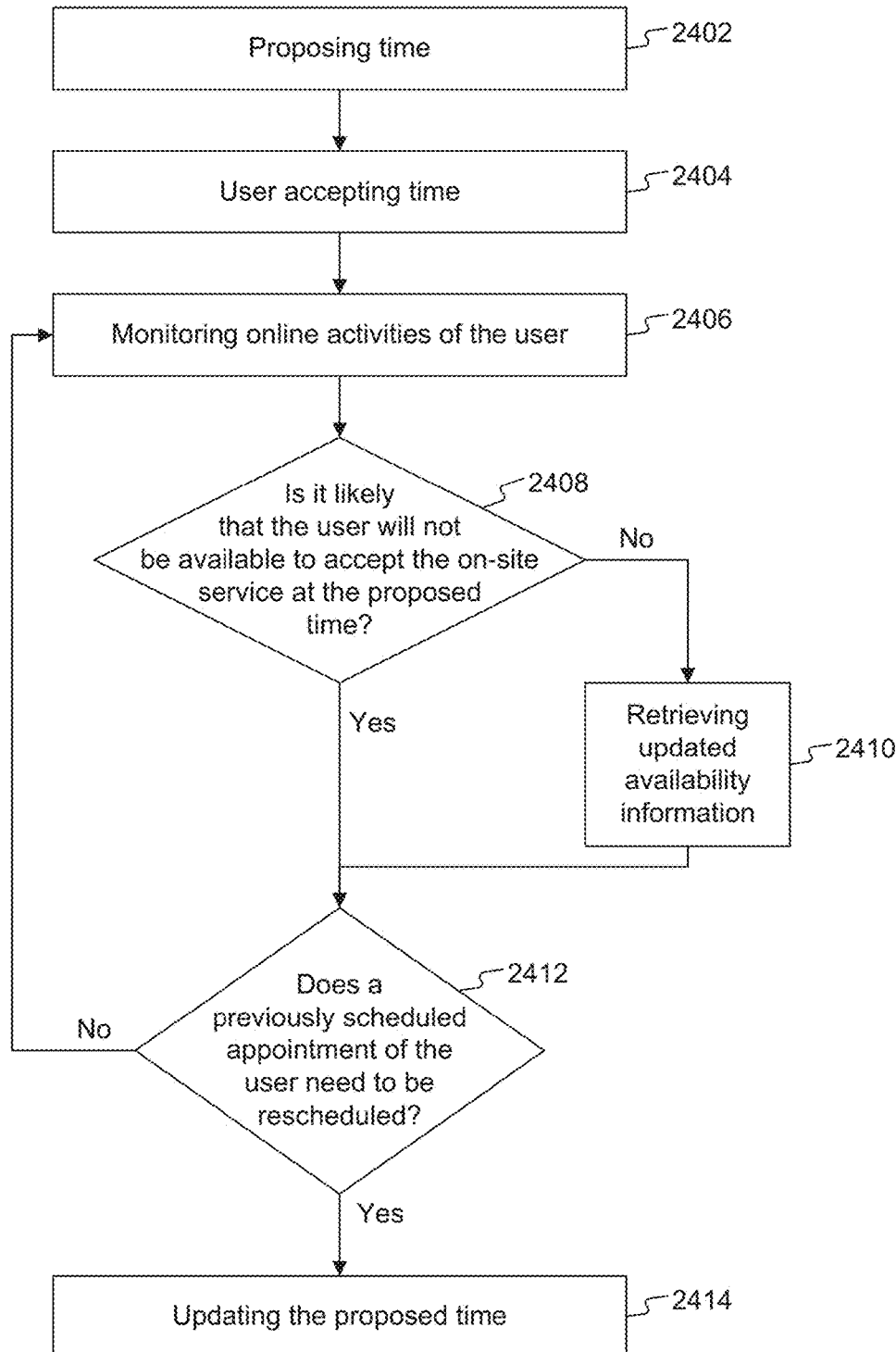
FIG. 24 is a flowchart for checking user availability information and updating a proposed time, consistent with the present disclosure.

FIG. 24 is a flowchart of an example process 2400 for a scheduling method for field professionals for on-site services in cases when a user cannot keep an appointment. At step 2402, a time is proposed to a user and, at step 2404, the user accepts the proposed time and the appointment may be scheduled.

At step 2406, online activities of the user are monitored to determine a likelihood that the user will not be available to accept the on-site service at the proposed time. For example, the user may make a public post on social media about traveling to China on Monday but has an appointment scheduled for Tuesday, or, after granting access to private accounts, the system may find hotel reservations for the same day as an appointment to install equipment. At step 2408, the process may use this information to determine a likelihood that the user will not be available to accept the on-site service at the proposed time. If it is likely that the user will be available still despite the online activities, step 2408 is No and the process proceeds to step 2410.

At step 2410, the process retrieves updated information indicative of the availability of the user to accept the on-site service. This updated information may be information the user provides directly to the field professional company, for instance, by email, website, or phone call. The updated information may also contain updated user availability for a different appointment time.

At step 2412, after receiving any updated information or determining that it is likely the user will not be available with step 2408 being Yes, the system determines if a previously scheduled appointment of the user needs to be rescheduled. This determination may be based on the retrieved updated information, or on the likelihood determination from step 2408, or a combination of both. The determination may include comparing the new unavailability with the previously scheduled appointment. If the user will be unavailable for a small portion of the appointment, or if the appointment does not need the user to be present for the service to be performed, the process may determine that the appointment does not need to be rescheduled, and step 2412 is No. In this case, the process returns to monitoring online activities of the user at step 2406.

However, if step 2412 is Yes, for instance because the user must be home to let a field professional into the house or to supervise the field professional's work, then the proposed time for providing the on-site service may be updated from the previously scheduled appointment at step 2414. In process 2400, any combination of steps 2406, 2408, and 2410 may be omitted. If step 2406 is omitted and a previously scheduled appointment does not need to be rescheduled such that step 2412 is No, the process may return to retrieve updated availability information or may simply stop.

Figure 25:
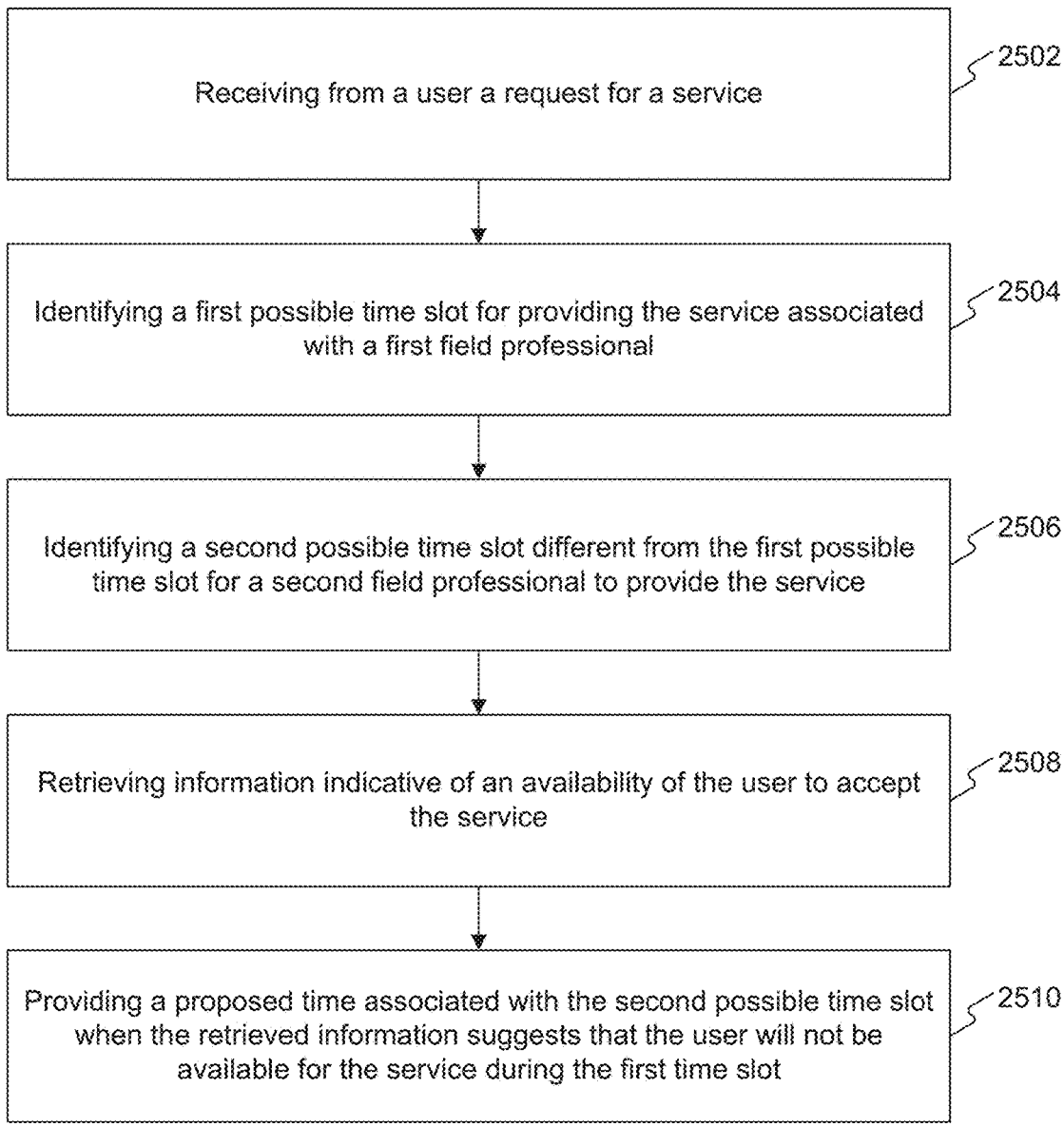
FIG. 25 is a flowchart showing an exemplary process for providing a user alternative possible time slot, consistent with the present disclosure.

FIG. 25 is a flowchart of an example process 2500 for a scheduling method for field professionals, consistent with the present disclosure. At step 2502, a request for a service is received from a user. The request may be received directly from a user, for example, via a website. Alternatively, the request may be entered by a member of the customer service unit 120, or by a manager. The request may be for an on-site, location-based service by a field professional, or the request may be for a remote, location-agnostic service, such as, for example, setting up a virtual private network.

At step 2504, a first possible time slot for providing the service is identified. The first possible time slot may be associated with a first field professional. The first possible time slot may be determined by examining the schedule of a particular field professional, or the first possible time slot may be determined by examining all schedules of all field professionals. In other words, the time slot may be the first time slot because it is associated with a first field professional, or the time slot may be the first time slot because it is the first available slot overall, regardless of which field professional it is associated with. At step 2506, a second possible time slot different from the first possible time slot may be identified for a second field professional to provide the service. The second possible time slot may be associated with a second field professional. The second possible time slot may be identified in the same manner as the first possible time slot. The second possible time slot may be at least one day later than the first possible time slot. Alternatively, the second possible time slot may be in an afternoon and the first possible time slot may be in a morning of a day.

At step 2508, information indicative of an availability of the user to accept the service is retrieved. The information may be from at least one online source. The online source may be social media, or a publicly viewable calendar. The information may be direct or derived from analysis. The information may be retrieved from a profile associated with the user, as well, which may be for instance private data obtained from the user's accounts with the user's permission, public data from social media or governmental records, historical appointment information, demographic data, or profiles of similar users.

At step 2510, a proposed time associated with the second possible time slot may be provided when the retrieved information suggests that the user will not be available for the service during the first time slot. For example, a likelihood may be determined that the user will be unavailable during the first possible time slot based on historical appointment information. If a user has never accepted an appointment offered after 12:00, the user may be likely to be unavailable for a new appointment during a first time slot of 12:30. Additionally, profiles of other users with similar demographic data, such as age, gender, or income, may be used to determine a likelihood that the user will be unavailable during the first possible time slot. For instance, if the user is a 30 year old male with an income greater than some threshold, and other 30 year old males with similar incomes are found to decline appointments during working hours, the user may be likely to be unavailable during a first possible time slot that falls during working hours. The user may be provided the proposed time associated with the second possible time slot based on the likelihood that the user will be unavailable during the first possible time slot. The likelihood may be above some threshold set by the company. The determination of whether to provide a proposed time associated with the second possible time slot may also be based on if the service is location-based, such that the user must be present for the service to occur, or location-agnostic, such that the user does not need to be present for the service to occur.

J. Scheduling Tasks from Customer Location

When a field professional provides a service to a user, sometimes the task assigned to the field professional cannot be completed in one visit. This may occur for a variety of reasons. For example, the field professional may not have the proper tools, supplies, or training on hand to complete a task. Other times, a user may request the incorrect service. For example, a user with a faulty internet connection may assume that a field professional needs to fix a modem, but when the field professional inspects the problem, the field professional may discover that an underground line is broken, requiring an entirely different service to correct the issue. In other cases, additional problems may arise during the service. For example, a field professional servicing an air conditioner may plan on replacing refrigerant in the system, but, while performing this service, the field professional may discover a dangerous ground fault in the air conditioner system that could start a fire. In some situations, inclement weather may prevent the service being performed. These examples illustrate that a field professional may realize, in the course of performing a task in the field, that an additional appointment will be needed to fully address the user's needs.

The following disclosure describes methods and systems that enable scheduling of a repeat, or follow-up, appointment with a user. The system may receive data from a field professional located in the field at a customer's location. The received data may indicate that an additional visit at the customer is needed. The system may take into consideration other requirements and provides the field professional with at least one time slot for offering the customer. The system includes a memory, a network interface, and a processor connectable to the network interface. In some embodiments, the system may be implemented as task scheduling unit 150.

Figure 26:
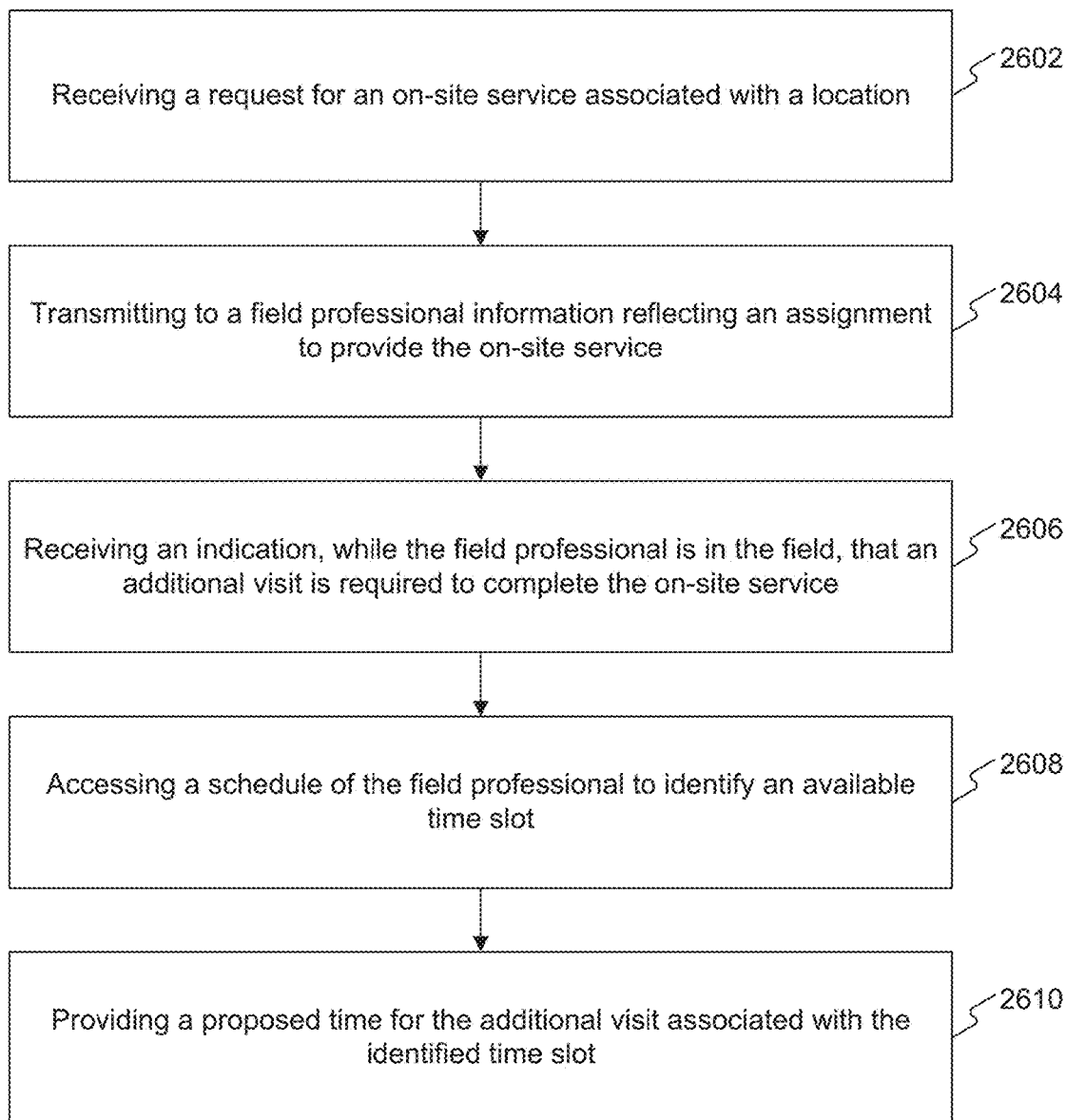
FIG. 26 is a flowchart showing an exemplary process for offering times for an additional visit to a location, consistent with the present disclosure.

FIG. 26 is a flowchart of an example process 2600 for a scheduling method for repeat visits by field professionals, consistent with the present disclosure. In some embodiments, server 152 may implement process 2600. For example, processing device 202 may receive data from I/O system 210 or network interface 206, and then execute instructions or program code stored in memory interface 204 or database 154, in which the instructions or program code implement algorithms of process 2600. The algorithms of process 2600 may be implemented as one or more of analysis module 441, forecasting module 442, planning module 443, or scheduling module 444. Process 2600 includes the following steps.

At step 2602, a user request for an on-site service is received. The request may be received directly from a user, for example, via a website. Alternatively, the request may be entered by a member of the customer service unit 120, or by a manager. The request may be for an on-site, location-based service by a field professional, such as, for example, performing veterinary procedures on a farm, or installing internet equipment at a house. The request may be accompanied by a time period within which the service should be performed, provided by the user along with the request or by a company as a standard of service for a type of on-site service.

At step 2604, information is transmitted to a field professional. The information may reflect an assignment to provide the on-site service requested by the user at step 2602. The information may be transmitted using the network interface. The information may include details about the assignment, such as time, expected duration, required tools and equipment, and location of the service. The information may also include directional instructions to the location associated with the on-site service. The directional instructions may be driving instructions. In some embodiments the directional instructions may also include instructions on navigating a site. For example, if a field professional is needed to install a sensor at a large oil refinery plant, the directional instructions may include a driving route to the entrance of the facility, as well as directions inside the facility to the installation site, such as to install the equipment on tank 3 behind the second berm on the north side of the plant. The directions may be provided by dispatchers or managers at the field professional company, by other field professionals, or by the user requesting the service.

At step 2606, an indication may be received that an additional visit is required to complete the on-site service. The indication may be received from the field professional or the user while the field professional is in the field at the user's location. The indication may be received by an automated system via a network interface 206, by a manager, a member of the customer service unit 120, or another field professional. The indication may be sent from a communication device associated with the user, such as a smart phone app, a phone call to the customer service unit 120, or via a website. Alternatively, the indication may be sent from a communication device associated with the field professional, such as field professional communication device 180A. The indication may also include a time estimation of work required in the additional visit. The time estimation may include the time required on site to perform the service, as well as the travel time required. The indication may include an estimated travel duration derived from navigation software or field professional experience. The indication may be based on a field professional's estimate of the time required, or the indication may be based on known times required for types of services. For example, a field professional may input a type of service needed, such as replacing a valve. An automated system may access a database containing times according to tasks, find that, for instance, valve replacements require an hour, and attach the time to the indication automatically. The indication may also provide information about when the additional visit may occur. For example, if a field professional is installing cabinets and knows that glue must dry for three days before a next step may be completed, the field professional may provide this information in the indication.

Furthermore, the indication may also include details of spare parts required in the additional visit, and task details of the additional visit may be updated to include the spare parts. Similarly, the indication may also include details of what tools are required in the additional visit, and the task details of the additional visit may be updated to include the required tools. The field professional may also indicate that spare parts or tools must be ordered. The indication may also include details of what field professional skills are needed to complete the on-site service of the additional visit. The indication may include at least two of a time estimation of the work required in the additional visit, details of spare parts required in the additional visit, details of tools required in the additional visit, and details of skills of a field professional required in the additional visit.

At step 2608, a schedule of the field professional may be accessed to identify at least one available time slot to schedule an additional visit in the future. The at least one available time slot may be identified within a predefined time period. For example, the predefined time period may cause only time slots within four workdays to be considered. The predefined time period may be determined based on the nature of the task, such that some urgent requests may lead to quicker appointment times.

Furthermore, when identifying an available time slot, the time estimation may be taken into account. For example, if the field professional or a system identifies that a farm veterinarian will require two hours to perform, free time slots in the field professional's schedule that are shorter than two hours may be ignored. Alternatively, identifying the available time slot may include reassigning a task previously assigned to the field professional to clear a time slot associated with the time estimation in a schedule of the field professional. For example, if a septic tank repair is estimated to require five hours and a septic tank repairman has an opening from 8:00 to 12:00, the septic tank repairman's appointment at 12:00 may be reassigned to 1:00 so that the 8:00 to 1:00 time slot is cleared. The additional visit may take place during this time with the time slot associated with the time estimation cleared. Alternatively, previously assigned task may be reassigned to a different field professional to clear the time slot in the original field professional's schedule. In some embodiments, if a schedule of the field professional is full during a predefined time period, the tasks in the schedule of the field professional may be checked to see which tasks may be reassigned to a different field professional.

In some embodiments, the additional visit may be by a different field professional with a different skill set. For example, a cable television installer may know that an electrician is needed to complete installation of a cable box. In this case, the cable installer may send an indication that an additional visit is required by a different field professional, and a future schedule of a different field professional may be accessed to identify a time slot.

If the task requires a field professional with a required skill set, a schedule of a field professional having the required skill set may be accessed to identify an available time slot. In this way, a situation wherein a field professional arrives at a location but cannot complete the required work because he does not have the necessary skills may be avoided, increasing user convenience and satisfaction while also reducing costs from wasted field professional time and travel. When accessing the schedule of a field professional having the required skill set, a next time where the field professional having the required skill set is scheduled to arrive an area proximate to the location may be identified. The proximity may vary according to company and user requirements. For field professional services that span an entire country, for instance, an area proximate to the location may be hundreds of miles away. For companies with smaller service areas, the area proximate may be only a few miles. Alternatively, the area proximate to the location may be measured as a traveling duration rather than a distance.

Furthermore, if spare parts or tools are required in the additional visit, identifying the available time slot may include confirming that the spare parts or tools required in the additional visit are available. For example, if a spare part or tool must be ordered from a manufacturer or transferred from a warehouse, there may be a delay before a field professional is able to complete the additional visit. Thus, appointments that would occur before a shipping delay is over may be ignored so that only time slots that occur after the required parts or tools become available are considered.

At step 2610, at least one proposed time for the additional visit associated with the identified time slot is provided. The proposed time for the additional visit associated with the identified time slot may be provided to the user through a communication device associated with the user while the field professional is at the user's location. Additionally, the proposed time for the additional visit associated with the identified time slot may be provided to the field professional through a communication device associated with the field professional while the field professional is at the user's location. The proposed time may be provided to the same person who provided the indication in step 2606. It may also be provided to the other person who did not provide the indication in step 2606. Furthermore, the indication may be provided to the same or different device type that provided the indication. The indication may also be provided to multiple devices. Furthermore, information reflecting an assignment associated with the additional visit may be transmitted to the field professional while the field professional is at the location. In this way, the user and field professional may have prompt confirmation that the additional visit will occur so that the task may be completed. The information may include the date and time for the additional visit.

Figure 27:
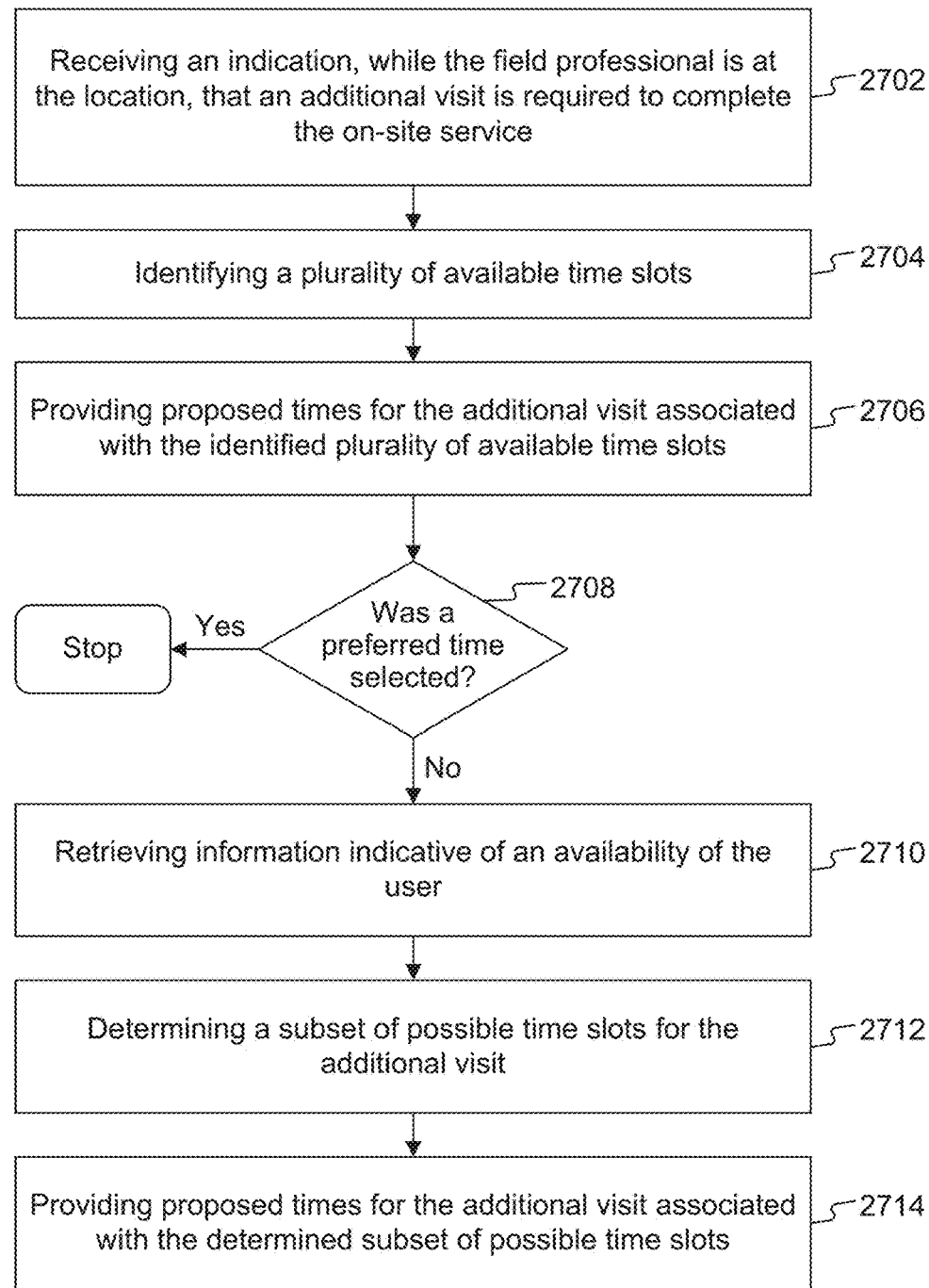
FIG. 27 is a flowchart for providing proposed time slots based on information indicative of an availability of a user, consistent with the present disclosure.

Further illustration of the steps of process 2600 may be understood with reference to the steps of process 2700 in FIG. 27. Process 2700 may occur in conjunction with process 2600. Process 2700 begins at step 2702 with receiving an indication, while the field professional is at a location in the field where a service is being performed, that an additional visit is required to complete the on-site service. At step 2704, a plurality of available time slots is identified. The time slots may be for a single or a plurality of field professionals. The plurality of available time slots may be identified by stepping through the entirety of a set time period. For example, every time slot that does not have an appointment may be identified for every field professional in a one-week period. Alternatively, the plurality may include a set number of available time slots, regardless of the time range the time slots define. For example, three time slots may be required for the plurality, even if sixth months of schedule must be analyzed before finding three available time slots. In some embodiments, the plurality may be set by processor time. For example, the plurality may include all available time slots found in five seconds of analysis, thereby providing a user prompt service.

At step 2706, proposed times for the additional visit associated with the identified plurality of available time slots are provided. The proposed times may be provided to the field professional, the user, or both. Additionally, the proposed times may be provided directly to the field professional or user via a communication device, or the proposed times may be provided to a member of the customer service unit to provide to the field professional or user.

At step 2708, the user selection indictive of a preferred time is received. Alternatively, the field professional may provide an indication of a preferred time as well. The selection may be received by providing a list of the plurality of time slots, or a portion thereof, to the user, for instance by displaying the proposed time slots on a smart phone app or on a website. The user may select which of the proposed time slots he prefers. If a preferred time was selected, step 2708 would by Yes, and the process 2700 stops. However, if the user indicates that none of the proposed times are preferred, step 2708 is No, and process 2700 may proceed to step 2710.

At step 2710, information is retrieved indicative of an availability of the user. This information may be retrieved directly from the user by prompting the user for availability information. For example, the user may indicate that time slots after 3:00 would be acceptable. Alternatively, at step 2710, information about the user may be retrieved from a profile that reflects the user's appointment history and demographics.

At step 2712, a subset of possible time slots for the additional visit is determined, based on the retrieved information indicative of an availability of the user. Mutually exclusive times may be ignored, with remaining times forming the subset. For example, if the plurality of available time slots comprised 3:00 on Tuesday, 4:00 on Wednesday, and 1:00 on Thursday, and the retrieved information showed that the user was unavailable before 3:00 on weekdays, the subset of possible time slots may be 3:00 on Tuesday and 4:00 on Wednesday.

At step 2714, proposed times for the additional visit associated with the determined subset of possible time slots are provided. The proposed times may be provided to the user or the field professional. After providing the proposed times, user acceptance of one of the times may be received, and an appointment may be scheduled for that time.

In some embodiments, steps 2706 and 2708 may be omitted, such that information indicative of an availability of a user is retrieved without first proposing times to the user. Alternatively, steps 2710, 2712, and 2714 may be omitted, and any remaining proposed times from the plurality of available time slots may be proposed to the user. Alternatively, the time period may be expanded or more processing time allowed to find more proposed times to be provided to the user until the user accepts a time.

K. Scheduling Tasks Using Customer Feedback

Field professionals often provide one of the main interactions between a company and a customer. The relationship between the company and the customer is often shaped by the quality of the service provided by a field professional. Understanding a customer's perception of the quality of service provided by the field professional can therefore be used to improve the relationship between the customer and the company by improving future customer satisfaction. For example, if a customer is very pleased with a service provided by a field professional, a company may decide to assign the same field professional to perform future services. Alternatively, if a customer is dissatisfied with a service provided by a field professional, a company may decide to not assign that same field professional to perform future services for the customer. Customer satisfaction may be based on quality of service, professionalism, or personal interactions, for example. By tailoring field professional assignments to past customer satisfaction, a company may maintain good customer satisfaction or improve poor customer satisfaction, thereby retaining and adding users.

The following disclosure describes methods and systems that enable scheduling of a field professional based on data including customer satisfaction associated with prior service. The system may receive data from a customer during or after a service is completed. Based on that data, the system may decide whether to assign the same field professional or a different field professional for future tasks associated with the same customer. The system includes a memory, a network interface, and a processor connectable to the network interface. In some embodiments, the system may be implemented as task scheduling unit 150.

Figure 28:
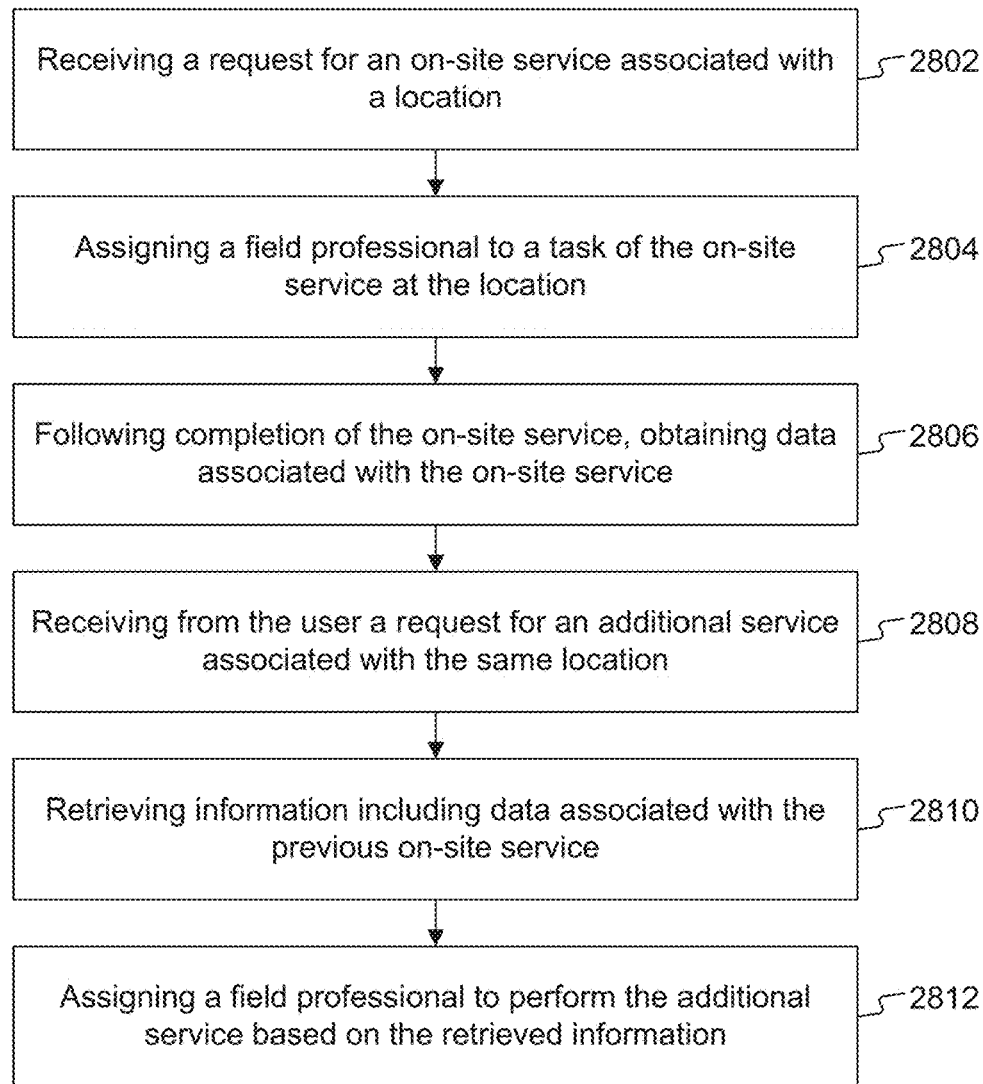
FIG. 28 is a flowchart showing an exemplary process for assigning a field professional to perform additional services after performing at least one on-site service, consistent with the present disclosure.

FIG. 28 is a flowchart of an example process 2800 for a scheduling method for repeat visits by field professionals consistent with the present disclosure. In some embodiments, server 152 may implement process 2800. For example, processing device 202 may receive data from I/O system 210 or network interface 206, and then execute instructions or program code stored in memory interface 204 or database 154, in which the instructions or program code implement algorithms of process 2800. The algorithms of process 2800 may be implemented as one or more of analysis module 441, forecasting module 442, planning module 443, or scheduling module 444. Process 2800 includes the following steps.

At step 2802, a customer request for at least one on-site service associated with a location is received. The request may be for a first on-site service, for example, or one in a series of services. The request may be received directly from a customer via a website. Alternatively, the request may be entered by a member of the customer service unit 120, or by a manager. The request may be for an on-site, location-based service by a field professional, such as, for example, conducting a medical evaluation prior to purchasing life insurance or installing a septic tank. The request may be accompanied by a time period within which the service should be performed, provided by the customer along with the request or by a company as a standard of service for a type of on-site service.

At step 2804, a field professional is assigned to at least one task of providing the at least one on-site service at the location. The assignment may be transmitted to the at least one field professional using the field professional communication device 180A, for example, by email, text message, or phone call. The assignment may include details about the assignment, such as time, expected duration, required tools and equipment, and location of the service. The at least one field professional may be assigned randomly, or based on criteria such as skillset and availability.

Figure 29:
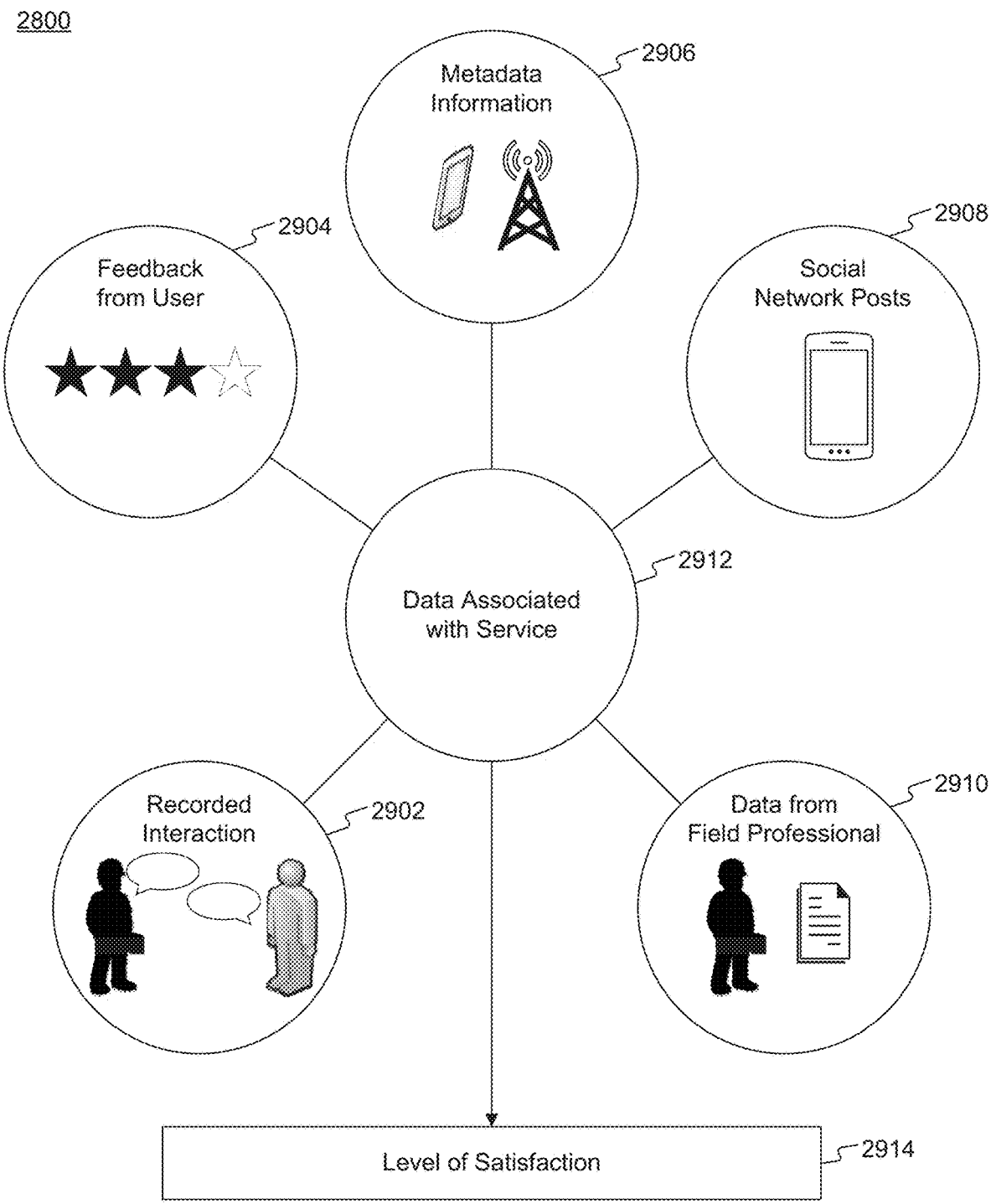
FIG. 29 is a diagram showing types of data associated with a service provided by a field professional, consistent with the present disclosure.

At step 2806, data associated with the on-site service is obtained following completion of the at least one on-site service. The data is further illustrated by reference to FIG. 29, showing that the data associated with service may be based on five types of data sources, discussed below.

Data source 2902 shows that the data associated with the on-site service may be determined based on a sentiment analysis of a recording of an interaction between a field professional and the user during the at least one on-site service. For example, the field professional communication device 180A may record a conversation between a customer and a field professional. The audio recording may be later analyzed to identify key words indicating customer sentiment about the interaction between the field professional and customer during a visit. Alternatively, tone of voice may be analyzed to determine if a customer is showing negative emotions, such as anger or frustration, or positive emotions, such as happiness, during conversations with the field professional. Alternatively, a phone call between a customer an any member of the company, including a field professional or a customer service representative, may be recorded and similarly analyzed. The recording may be made during a visit, but analyzed at the same or a different time. In some embodiments, the information is digitally signed by the customer to ensure authenticity in later processing.

Data source 2904 shows that following completion of the at least one on-site service, feedback may be received from the customer. The data associated with the at least one on-site service may be determined based on the received feedback. The feedback may be solicited from the customer immediately after the service by the field professional, or may be solicited by the company by an email, phone call, or text message after the service completes. Alternatively, the feedback may be unsolicited, and provided by the customer without prompting. The feedback may be, for example, a star rating, such as three out of four stars, or a level of satisfaction, such as options for very satisfied, satisfied, not satisfied, and the like.

Data source 2906 shows that following completion of the at least one on-site service, metadata information associated with the at least one on-site service may be received. Metadata may be information or other indications that are automatically sent without a field professional or customer explicitly deciding to send it. For example, if a field professional has a task to set up an internet connection, the time of the first login from the customer's address may be metadata information showing at least the task is in progress at the time. In the case of an electrician, for example, the times at which electricity is turned off and turned on may be metadata information. Thus, metadata may include time information, and may show that a field professional has arrived, started a task, completed a task, different phases of a task, or left the location. Metadata information may also location information showing where the field professional was at different times. Time and location information may be compared to the appointment time and the expected job duration to show the punctuality and efficiency of a field professional. In some embodiments, metadata information associated with the at least one on-site service may be received from at least one communication device associated with the at least one field professional. For example, the metadata information may include GPS readings of a cell phone carried by a field professional, or cell site location information. Furthermore, the metadata information may also include information about messages sent by the field professional, such as information showing any addresses that sent messages to or received messages from the field professional. Message address information may show how many times a field professional had to contact another person for assistance, or, in some cases, if a field professional was distracted from performing the task due to sending and receiving messages.

Data source 2908 shows that following completion of the on-site service, data associated with the at least one on-site service may be determined from posts that the user published in a social network. For example, a customer may post information on a social networking website indicating satisfaction with the service provided, such as thanking the company for good service. A customer may also post information showing dissatisfaction, such as posting a complaint. The customer's post may be discovered by finding the customer on a social networking site by using known information about the customer, such as email address and name. Alternatively, a customer's post may be found by the customer directing the message to the company, such as tagging a company's profile in a post about the quality of service. A user's post may also appear on a website that hosts reviews of businesses, and a company may link reviews to recently performed service.

Data source 2910 shows after the on-site service was completed, data about the on-site service may be received from the field professional. The data may be submitted by the field professional communication device 180A, or by a form filled out by the field professional, and may include information such as any issues encountered during the service and the field professional's estimation of the customer's satisfaction. It may also include details on what service was performed, for example, recording that the field professional administered a vaccine to all of the calves on a farm over three months old or details on any infrastructure that was installed, so that a future service may have records of past services.

Element 2912 shows that data from any combination of the sources illustrated as data sources 2902, 2904, 2906, 2908, and 2910 may be used in determining data associated with service. Once data has been collected, the data associated with the on-site service may be used to determine a level of satisfaction 2914 from a work of the field professional. For example, algorithms may be used to determine the ratio of positive words to negative words used by the customer, or weight may be given to customer satisfaction or reviews. Different data may have more significance than others. For example, a social network post directed to a company directly complaining of a service may have more impact on the determined level of satisfaction than metadata showing that the field professional arrived at a site on time and completed the service quickly.

Returning to FIG. 28, at step 2808, an additional customer request for an additional service associated with the same location is received. For example, the additional request may be for a second service, after a first service. The task of providing the second service may be a location-agnostic task associated with the first on-site service. For example, if an internet modem was installed during a first task, a second task may require changing connection settings. The second task may be accomplished from any location by logging into a modem and changing the settings, such that the task may be location-agnostic. Alternatively, the task of providing the second service may be a location-based task independent of the first on-site service. For example, a first task may be installing an internet modem, and a second task may be installing a cable television connection, such that the second task is independent of the first on-site service and is performed at a specific location. The additional service may also be location-based and dependent on the prior on-site service, such as completing an installation or correcting an error in earlier work. The request may be made by the same customer or someone with a relationship with the customer, such as a spouse.

After the request is received, information including data associated with the at least one on-site service is retrieved at step 2810. The information may be saved in database 154, for instance. The information may also contain expected durations of different services and field professional availability and skillsets. At step 2812, a field professional is assigned to perform the additional service based on the retrieved information. For example, the same field professional that performed a first task may be assigned to provide a second service based on the retrieved information.

Figure 30:
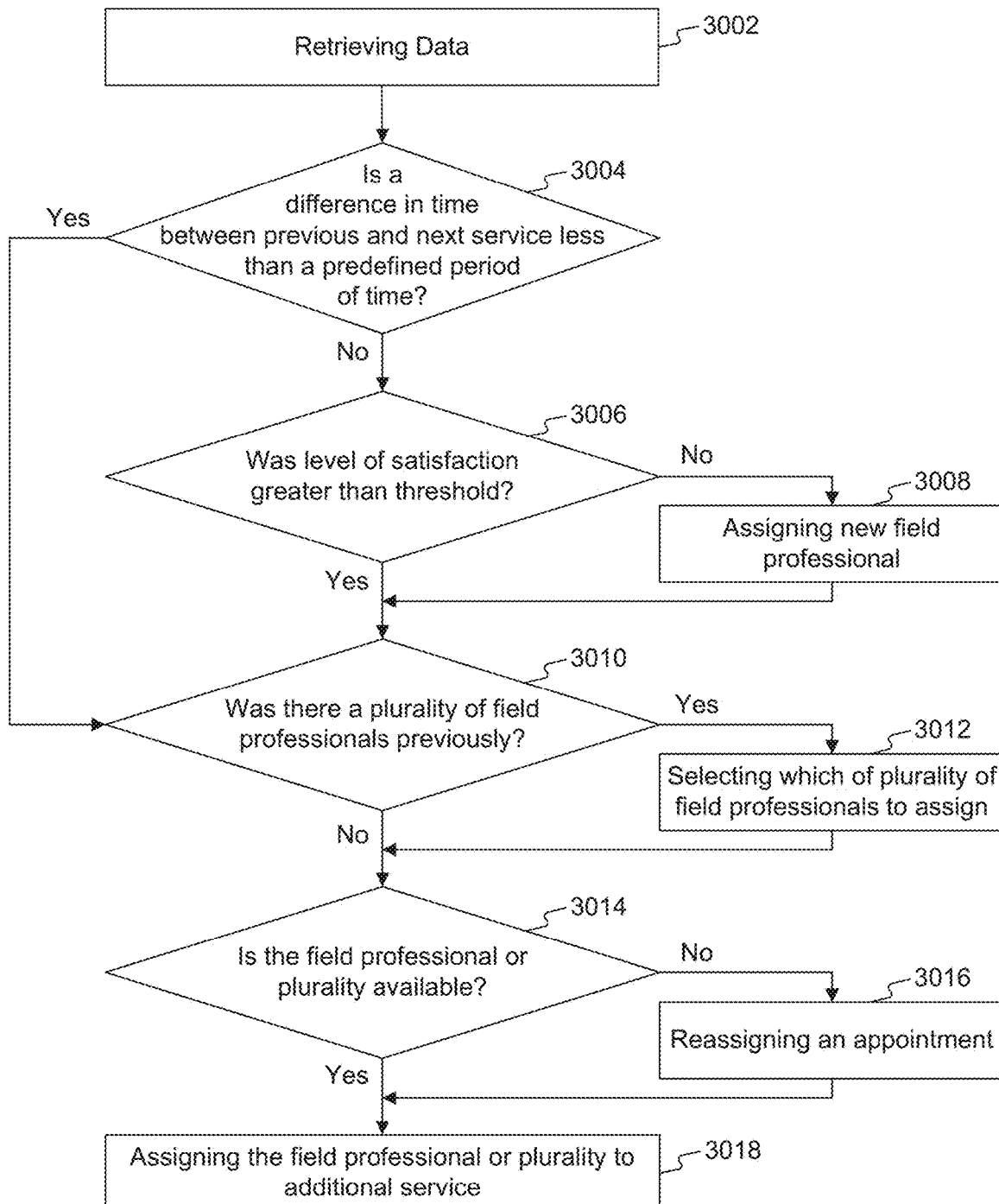
FIG. 30 is a flowchart for assigning a field professional based on satisfaction level and availability of the user, consistent with the present disclosure.

Step 2812 may be further illustrated by reference to FIG. 30. FIG. 30 shows process 3000 for assigning an additional service based on retrieved information. After data is retrieved at step 3002, the process compares the difference in time between the previous service and the next request for service. If a time difference between a first time when the first on-site service was provided and a second time when the second request is received is below a predefined period of time, step 3004 if Yes, and the same field professional may be assigned to accomplish the task. In other words, if step 3004 is Yes, the process may skip step 3006. For example, if a mobile veterinarian administers medicine to a sick cow on a farm and the customer the next day requests additional medical attention because the cow is not recovering, the same veterinarian may be assigned to the task. By assigning the same field professional to subsequent tasks that are requested within a predefined period of time, the field professional may provide better, quicker service and the customer have greater satisfaction because there would be continuity of care and familiarity with the user's issues.

If, however, the difference is greater than a predefined period, such as a month later, the process proceeds to step 3006, because there may be a reduced benefit of familiarity due to the delay between a first and second service.

At step 3006, the level of satisfaction from the work of the field professional is compared to a threshold. The threshold may be a numerical calculation based on the data, or a qualitative determination. Alternatively, the determination may be made by a manager assessing the data. The level of satisfaction may be customer-dependent, such that only the requesting customer's level of satisfaction from prior work with the field professional is compared to the threshold. Alternatively, the threshold may be customer dependent, for instance, premium customers may be sent field professionals with high satisfaction scores across many customers. If the level of satisfaction from the work of the field professional is less than a threshold, step 3006 is No, and a new field professional may be assigned to the task at step 3008. In this way, a company may avoid sending a field professional to the same customer who already was disappointed by the field professional's service. However, if a certain field professional or plurality of field professionals provided the at least one on-site service, and the level of satisfaction from the work of the certain field professional or plurality of field professionals is greater than a threshold, step 3006 is Yes, and the certain field professional or plurality of field professionals may be assigned to perform the additional on-site service. In this way, users may continue having high levels of satisfaction by having the same field professional for each subsequent services.

At step 3010, the on-site service is analyzed to determine if it included a plurality of on-site services provided by a plurality of field professionals. If there were two or more, step 3010 is Yes, and the process selects which of the plurality of field professionals to assign to perform the additional on-site service based on the data associated with the on-site service. The selected group may be a single field professional, or may be a subset of the plurality of field professionals that performed the at least one on-site service. For example, if three electricians worked together to install a hot tub at a hotel, the level of customer satisfaction of one electrician may be higher than the level of customer satisfaction of the other two electricians. If the hotel then requests service for the hot tub, the first electrician may be selected to perform the service because he had a higher level of customer satisfaction. Alternatively, if a plumber and an electrician installed a hot tub at a hotel, and a motor on the hot tub pump failed, the electrician may be selected to perform the service because the data shows that an electrician is needed to service a motor, not a plumber. Once a selection is made, the process then proceeds to step 3014. Alternatively, if only a single field professional performed the at least one on-site service, the process may proceed directly to step 3014 without performing step 3012.

At step 3014, the process determines if the field professional or plurality is available to provide the service. This determination may be based partly on a time period within which the service must or should be performed, determined either by company standards or customer request that the service be provided within some amount of time. If the certain field professional's schedule is full during a predefined time period, a task previously assigned to the certain field professional may be reassigned to enable assigning the certain field professional to the additional on-site service at step 3016. Similarly, if a plurality of field professionals is selected at step 3012, the schedule of the plurality or a schedule of each individual in the plurality may be analyzed and tasks reassigned so each individual of the plurality may be assigned the additional on-site service.

At step 3018, the field professional or the plurality of field professionals may be assigned to perform the additional service. While performing process 3000, any of the steps may be omitted as desired by a company. For example, a company may omit determining if the difference in time between the previous service and the next service is less than a predefined period of time because, for instance, the types of services offered by the company do not benefit from having the same field professional perform subsequent tasks.

Figure 31:
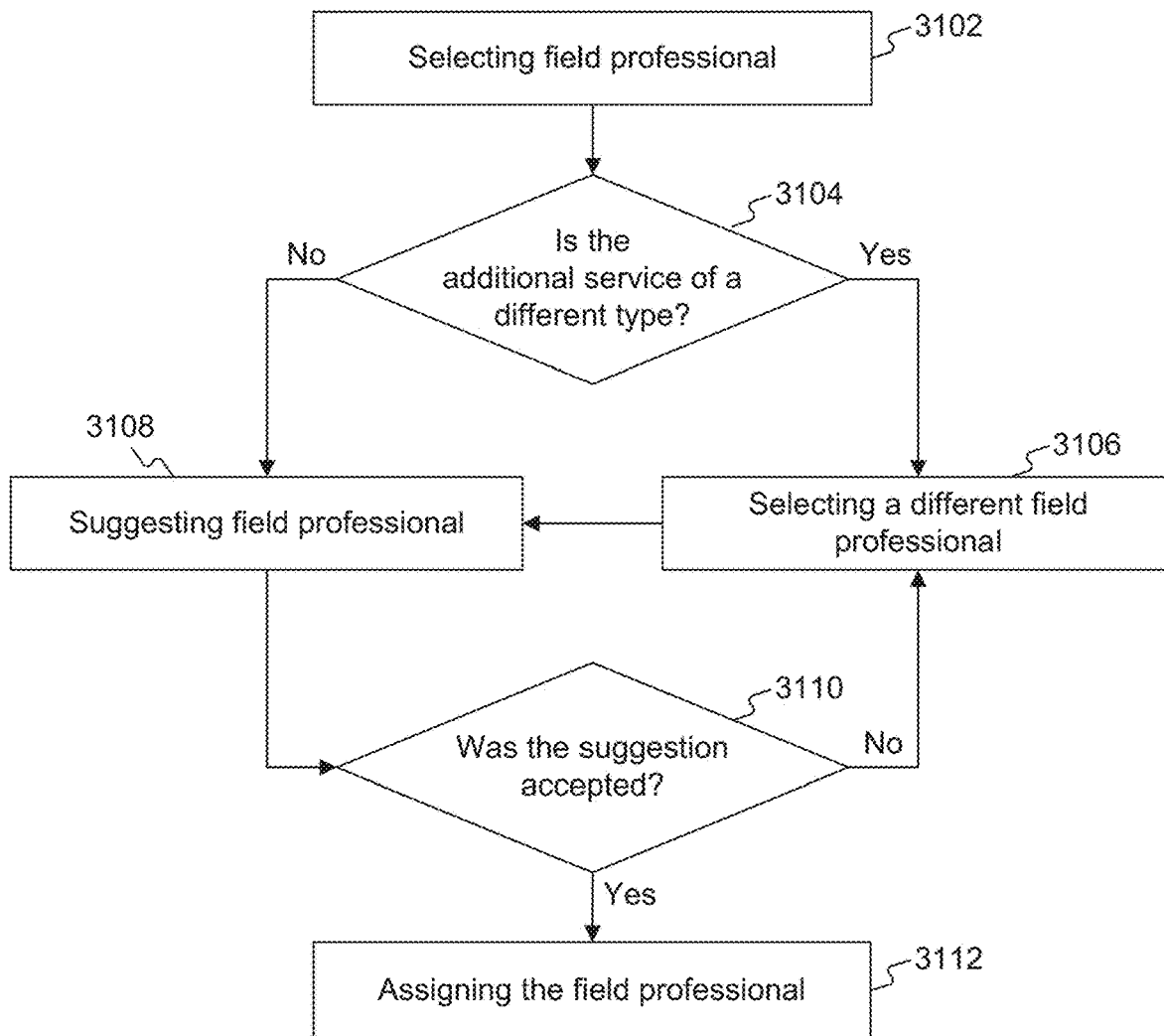
FIG. 31 is a flowchart for suggesting and accepting a suggestion for a field professional, consistent with the present disclosure.

FIG. 31 shows a process 3100 of suggesting a field professional to a user. After selecting a field professional based on the data associated with the at least one on-site service at step 3102, step 3104 determines if the additional service is of a different type than the on-site service already performed. If the additional service is of a different type than the at least one on-site service, step 3104 is Yes, and a different field professional is selected at step 3106. A suggestion of a different field professional for the additional service may then be presented at step 3108. The different field professional may be selected based on a necessary skillset needed to perform the additional service. However, if the additional service is of the same type as the at least one on-site service, step 3104 is No, and, at step 3108, the field professional selected in step 3102 based on the data associated with the at least one on-site service may be suggested for the additional on-site service. The field professional may be suggested to a manager or customer service representative at step 3108, or directly to the user.

For example, if data associated with a first service performed shows that a certain field professional planted apple trees for a customer, and a customer requests a second service to plant more apple trees, the services may be of the same type, and step 3104 is No. The same field professional therefore may be suggested to the customer based on data associated with the first service. However, if the customer requests a second service to cut down other trees to provide more sunlight to the apple trees, the second service may be of a different type from the first service. In this case, step 3104 is Yes, and a different field professional may be suggested to the user. Different types of services may be determined by a company based on the skillset needed to perform a service, such that, for example, all tasks that can be completed by an electrician are the same type.

After a field professional is suggested at step 3108, process 3100 determines if the suggestion was accepted at step 3110. If the suggestion was accepted, step 3110 is Yes, and the field professional is assigned to the task at step 3112. However, if the suggestion was declined, step 3110 is No, and the system may return to step 3106 and determine a different field professional. This cycle may continue until a suggestion is accepted at step 3110. Once a suggestion is accepted, the corresponding field professional may be assigned to perform the service at step 3112. In this manner, a customer may have the same field professional if the customer was satisfied with the field professional's work, or may decline the same field professional if the customer was unsatisfied with the first field professional's work. The customer may also choose between multiple field professionals until a field professional is satisfactory to the customer. Alternatively, a manager may also choose between multiple field professionals to choose the optimal field professional to perform a task.

L. Systems and Methods for Fixing Schedule Using a Remote Optimization Engine Scheduling tasks for field professionals requires a system to predict values of numerous scheduling parameters. One example of these scheduling parameters is the "task duration," the time it takes for a field professional to complete a task at the client's location. Another parameter is the "travel duration," the time it takes for a field professional to travel to the client's location. Allocating a time period for a certain task significantly shorter than the actual task duration (or the actual travel duration) may result in dispatchers having to take immediate action to fix the schedule, postponing tasks, or requiring more field professionals to meet the demand. These implications may attribute to poor customer service. On the other hand, allocating a time period for the certain task significantly longer than the actual task duration (or the actual travel duration) may result in under-utilization of field resources, post revenue, or poor customer service. The following discussion refers to task duration and travel duration; however, a person skilled in the art would recognize that values of other scheduling parameters may be predicted and used by the disclosed system.

Figure 32:
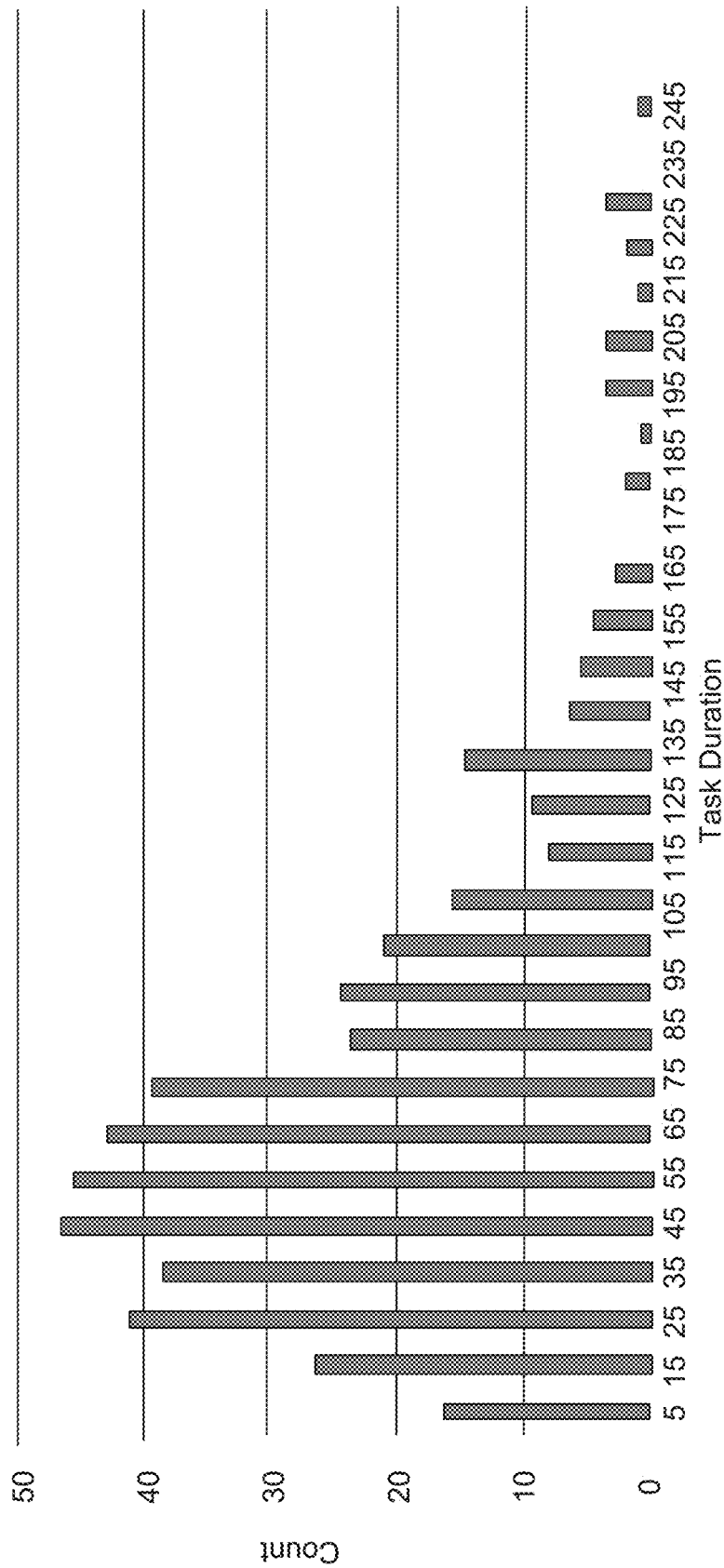
FIG. 32 is a bar graph showing a typical task duration distribution, consistent with the present disclosure.

FIG. 32 shows a bar graph illustrating actual task duration distribution of single task type. As shown, the task duration may vary significantly. Factors that may influence the task duration may include different characteristics of the field professionals (e.g., skills, experience, etc.), the time of day, the weather, the location of the task, the comments from the client at the time of scheduling, and more. When a fixed value of 45 minutes is assigned by default to all tasks from this task type, only about 30% of the tasks are within the margin of error of ten minutes of the default value, about 40% of the tasks takes between 1 to 2.5 hours, and about 25% of the tasks takes less than 30 minutes. Therefore, taking a naive approach of assigning a predetermined value for the scheduling parameter task duration would result in an unoptimized schedule.

The present disclosure discloses a system (e.g., system 100) with a optimization engine that takes into consideration different factors for predicting the task duration and other scheduling parameters for a specific task. Consistent with the present disclosure, the system may constantly or periodically receive information for calculating the scheduling parameters. In one example, the received information may be associated with past task durations (e.g., last month when Bob was assigned to this type of task it took him 70 minutes on average, but this month his average is about 57 minutes). In another example, the information may include traffic data associated with travel duration predictions (e.g., last week it was estimated to take 20 minutes on average to travel from point A to point B between 10:00 and 15:00; this week it is estimated to take 15 minutes to travel from point A to point B between 10:00 and 15:00).

In some embodiments, the system may provide schedule optimization services to different service providers. An example configuration for these embodiments may include a central server with an optimization engine and a plurality of local servers, each with its own native scheduling engine. The central server may be separate or remote from the local server. Namely, different servers may host the optimization engine and the native scheduling engines. In some cases, this separation is important because service providers (associated with the local servers) may not wish to share details on their clients with third party services (such as the schedule optimization service providing the central server). Because the optimization engine may have access to more updated information regarding different scheduling parameters, the optimization engine may provide more precise results than the native scheduling engines. However, the local servers cannot simply use the resources of the central server without sharing confidential or private information. The following disclosure describes a process by which local servers can benefit from the optimization engine without sharing details on their customers. In other words, the present disclosure shows a technical solution that provides an improvement to the functioning of a computerized system with optimization engine by communicating scheduling data between the central server and one or more local servers.

Figure 33:
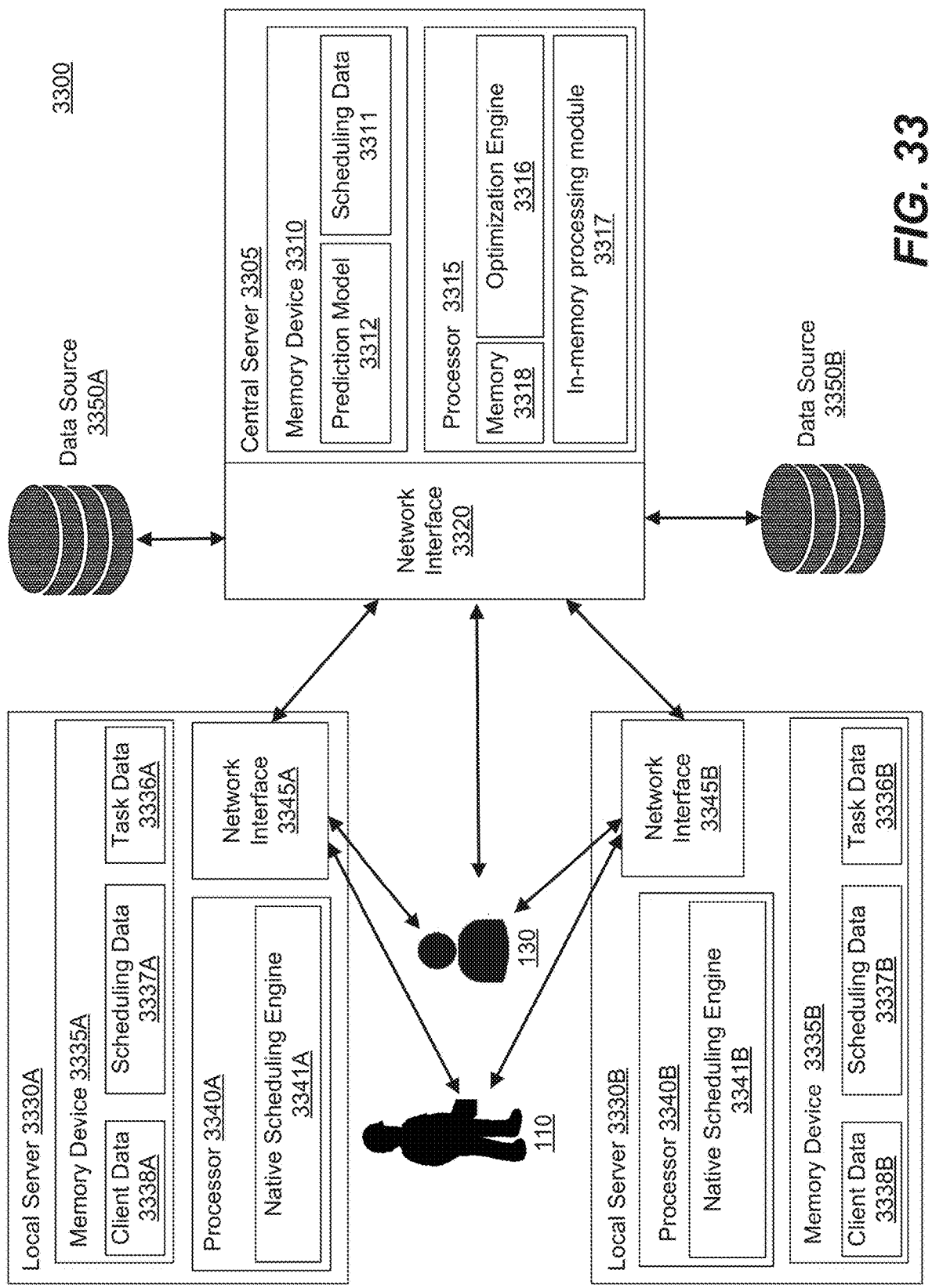
FIG. 33 is a schematic illustration of a scheduling system that includes a central server and local servers, consistent with the present disclosure.

FIG. 33 is a schematic illustration of a system 3300 for scheduling tasks to field professionals. System 3300 may include a central server 3305 and a plurality of local servers 3330 (e.g., a local server 3330A, and a local server 3330B). Central server 3305 may include at least one memory (e.g. a memory device 3310), a communication interface (e.g., a network interface 3320), and at least one processor (e.g., a processor 3315) connectable to the communication interface and the at least one memory. Similarly, each of local servers 3330 may include at least one memory (e.g. a memory device 3335A and memory device 3335B), a communication interface (e.g., a network interface 3345A and a network interface 3345B), and at least one processor (e.g., a processor 3340A and a processor 3340B). In the following discussion, the functionality of the components of local server 3330A are described in detail. Local server 3330B is assumed to have similar components with similar functionalities.

System 3300 may include one or more local servers 3330 for communicating with users and scheduling tasks to field professionals. The memory device of local server 3330A may be configured to store data associated with scheduled tasks. For example, memory device 3335A may be configured to store task data 3336A, scheduling data 3337A, and client data 3338A. In one embodiment, task data 3336A may include information about tasks that were scheduled during a defined period of time, such as dates, times, task type, task location, skills requirement per task, tools requirement per task, spare parts requirement per task, etc. The defined period of time may be more than a week, more than a month, more than a year. Scheduling data 3337A may include a plurality of scheduling parameters associated with the native scheduling engine 3341A. The scheduling parameters may include, for example, estimated tasks duration times for different task types, estimated travel duration times for different rides at different times of the day, and more. Client data 3338A may include details of the clients associated with the scheduled tasks, such as client profiles (e.g., name, age, gender, profile photos, work place), contact details (e.g., contact information, phone number, email address, home address), client history (e.g., details about last services provided, such as service feedbacks, complaints, or comments), and more. Consistent with the present disclosure, task data 3336A may include general information that can be shared with central server 3305 and client data 3338A may include private information about the clients that should not be shared with central server 3305.

The processor of local server 3330A may be configured to schedule tasks to field professionals 110 using a native scheduling engine 3341A. The communication interface of local server 3330A may be configured to communicate with field professionals 110, users 130, and central server 3305. Specifically, network interface 3345A may receive a set of requests for on-site assistance from users 130 and real-time information from a set of field professionals. The term "a set of field professionals" in this disclosure refers to one or more field professionals. The communication interface of local server 3330A may also be configured to transmit task data 3336A and scheduling data 3337A to central server 3305 and to avoid transmitting client data 3338A.

System 3300 illustrated in FIG. 33 also includes central server 3305 for updating a scheduling engine that schedules tasks to field professionals. Central server 3305 may be configured to access data associated with a scheduling engine (e.g., a native scheduling engine 3341A 3316 and/or a native scheduling engine 3341B). For the purpose of the following discussion, a distinction is made between the types of memory associated with central server 3305. Memory 3318 is the primary storage of central server and it is a type of memory which temporarily stores data (also referred to as a volatile memory). The primary storage may be directly associated with processor 3315. Examples of the primary storage may include Random Access Memory (RAM), Dynamic Random-Access Memory (DRAM), Synchronous Dynamic Random-Access Memory (SD RAM). Memory 3318 may also be associated with a memory device that permanently stores a predefined set of instructions for internal operation of the central server 3305. Memory device 3310 is the secondary storage of central server 3305 and it is a type of memory which is non-volatile and persistent in nature. It allows a user to store data that may be instantly and easily retrieved, transported, and used by applications and service. Examples of the secondary storage may be a magnetic hard disk, an optical disk, or another form of storage for large amounts of data. Central server 3305 may be synchronized with a cloud storage service.

In one embodiment, the secondary storage of central server 3305 (i.e., memory device 3310) may store scheduling data 3311 and a prediction model 3312. In one embodiment, scheduling data 3311 may include information associated with previously completed tasks scheduled by at least one scheduling engine other than native scheduling engine 3341A. For example, scheduling data 3311 may include information associated with tasks scheduled by native scheduling engine 3341B. The information may include specific details about the scheduled tasks and/or statistics about the scheduled tasks. In another embodiment, scheduling data 3311 may be associated with traffic predictions. For example, scheduling data 3311 may include estimated travel durations, weather forecasts, details regarding public events that may cause atypical traffic conditions (e.g., parades, marathons, and demonstrations), and more. In another embodiment, scheduling data 3311 may be associated with task duration predictions. In this embodiment, scheduling data 3311 may be associated with a task type, a time of day, a customer type, a task location, skills of field professionals, and more. Scheduling data 3311 may include that collection of data be used for determining a prediction model 3312.

In addition, memory device 33310 of central server 3335 may be configured to store a prediction model (e.g., prediction model 3312). The term "prediction model" refers to a specific model associated with task scheduling derived by applying a prediction method to a collection of data. The prediction method may include a combination of methods from the fields of statistics, machine learning, artificial intelligence, and data mining. Consistent with the present disclosure, central server 3305 can train and update prediction model 3312 based on data received from field professionals 110, users 130, local servers 3330, and/or other data sources 3350A, 3350B. Consistent with the present disclosure, processor 3315 may update prediction model 3312 based on data that periodically received from local server 3330A and/or local server 3330B. A different prediction model may include a different version of prediction model, i.e., different values for the same scheduling parameters.

In some embodiments, the processor of central server 3305 may be configured to utilize an optimization engine 3316 and an in-memory processing module 3317 for checking performances of native scheduling engine 3341A. As used herein, the term "optimization engine" refers to software, firmware, hardware, or a combination thereof for generating a task assignment plan for a set of field professionals. In one embodiment, the optimization engine may be associated with software instructions and a prediction model that may be stored in the secondary storage. When the software instructions are executed, at least some of the data stored in the secondary storage is loaded by processor 3315 into the primary storage. Thereafter, processor 3315 may be configured to execute the software instructions associated with the optimization engine in the primary storage.

The term "in-memory processing module" refers to software, firmware, hardware, or a combination thereof for processing in a stateless manner at least part of the data received from local server 3330A. In-memory processing module 3317 enables directly loading the data received from local server 3330A into the primary storage (e.g., memory 3318) without passing into the secondary storage. Although in-memory processing requires implementation of a large primary storage, it eliminates the need for retrieving data from the secondary storage (e.g., memory device 3310). Accordingly, the term "processing in a stateless manner" refers to a type of data processing that does not keep track of configuration settings, transaction information, or any other historical information about the processed data. When processor 3315 processes data received from local server 3330A, at least some of the data is stateless (i.e., it does not maintain state). Specificity, central server 3305 prevents at least part of the data received from local server 3330A from maintaining state. In other words, central server 3305 prevents at least part of the data received from local server 3330A from being saved in the secondary storage.

The communication interface of central server 3305 may be configured to communicate with one or more local servers 3330, field professionals 110, users 130, and data source 3350. Data source 3350 may be associated with a volatile or non-volatile, magnetic, semiconductor, tape, optical, removable, non-removable, or other type of storage device or tangible or non-transitory computer-readable medium. In one embodiment, data source 3350 may provide traffic data, map data, and toll road information, which may be used for task scheduling. The traffic data may include historical traffic data and real-time traffic data regarding a certain geographical region. In one embodiment, the traffic data may be used to, for example, calculate estimate travel durations and determine an optimal route for a particular field professional. Real-time traffic data may be received from a real-time traffic monitoring system, which may be integrated in or independent from data source 3350. The map data may include map information used for navigation purposes, for example, for calculating potential routes and guiding professionals to locations associated with the tasks. The toll road information may include toll charges regarding certain roads and any change or updates thereof. Toll road information may be used to calculate optimal routes for the field professionals to locations associated with the tasks.

Figure 34:
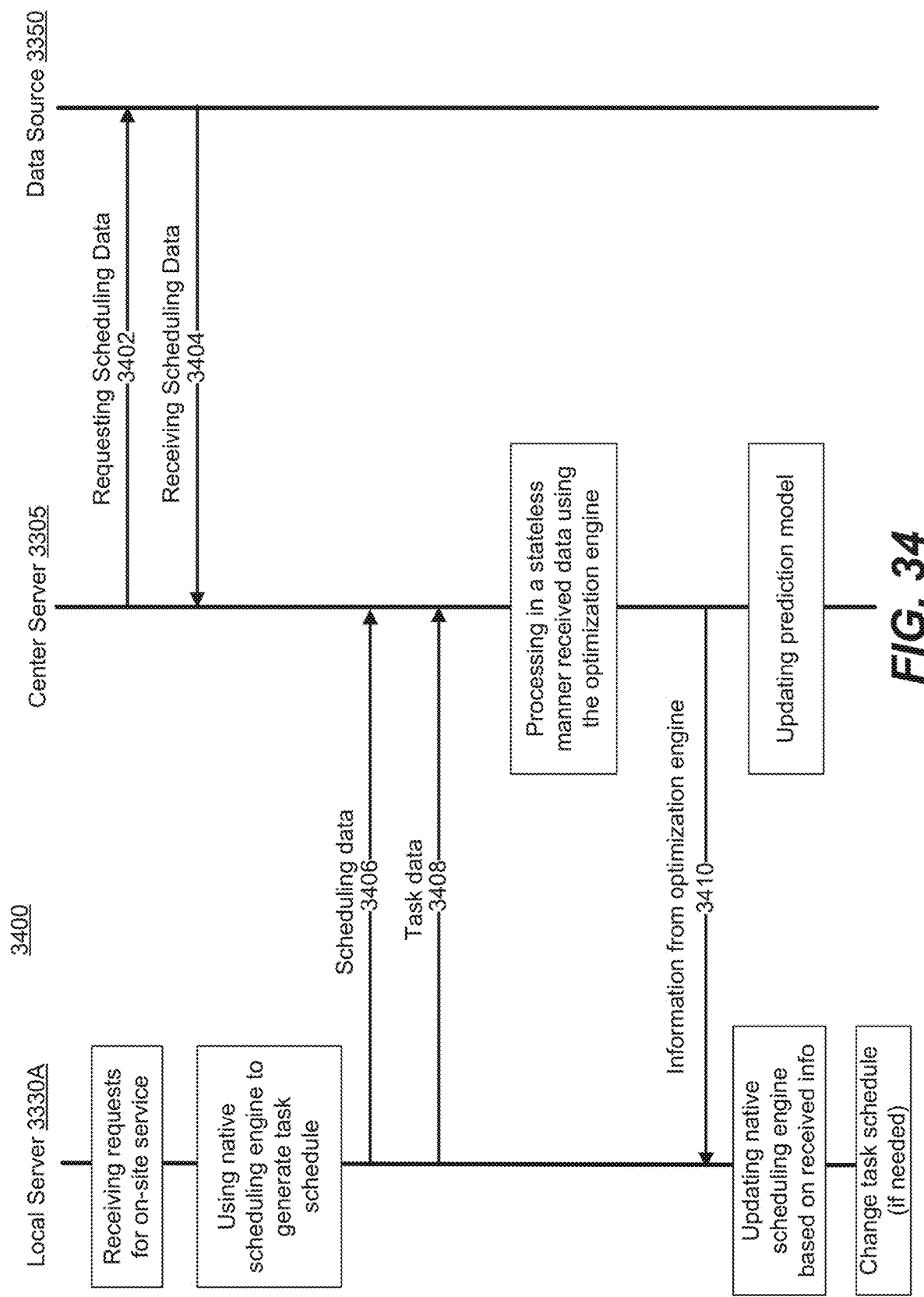
FIG. 34 is a message flow diagram showing example messages exchanged between different elements of the scheduling system of FIG. 33.

FIG. 34 is a message flow diagram showing example communications between different elements of a scheduling system in accordance with a process 3400. In the following description, reference is made to certain components of system 3300 for purposes of illustration. It will be appreciated, however, that other implementations are possible and that other components may be utilized to implement methods disclosed herein.

Process 3400 starts when central server 3305 requests scheduling data from data source 3350 (message 3402). Thereafter, central server 3305 may receive scheduling data from data source 3350 (message 3404). The scheduling data may be used to update the optimization engine. For example, a certain road may be under maintenance and travel duration is expected to be longer. Independently to actions performed by central server 3305, local server 3330A may receive requests for on-site services from a plurality of users 130. In one embodiment, each of the requests may require a field professional to travel to different locations associated with a corresponding user. Local server 3330A may use its native scheduling engine to generate task schedule. Thereafter, local server 3330A may send the scheduling data associated with its native scheduling engine and/or task data to central server 3305 (message 3406 and message 3408).

Central server 3305 may process in a stateless manner the received task data using the optimization engine. In one embodiment, processor 3315 may detect at least one task that local server 3330A, using its native scheduling engine, had scheduled in an unoptimized manner. In one example, a task scheduled in an unoptimized manner may be a task in which the estimated task duration is determined to be longer (or shorter) than the task duration currently allocated in the schedule. In another example, a task scheduled in an unoptimized manner may be a task in which the estimated travel duration to the task is determined to be longer (or shorter) than the travel duration currently allocated in the schedule. Thereafter, processor 3315 may identify a factor that causes the native scheduling engine of local server 3330A to schedule tasks in the unoptimized manner, provide to the local server 3330A information such as the identified factor (message 3410). After processing in a stateless manner, the task data from local server 3330A, processor 3315 may update its prediction model (prediction model 3312). In one embodiment, updating the prediction model may take into account the identified factor that caused the native scheduling engine of local server 3330A to schedule tasks in the unoptimized manner.

In some embodiments, local server 3330A may use the information received from central server 3305 to update its native scheduling engine. Local server 3330A may also review the previously scheduled set of tasks to identify at least one task scheduled in an unoptimized manner. Alternatively, central server 3305 may also transmit details of at least one task determined to be scheduled in an unoptimized manner. Consistent with the present disclosure, the scheduling system prefers not to make schedule changes that require contacting clients that had already scheduled a service and change their appointment times. Accordingly, local server 3330A may determine a likelihood that the task scheduled in an unoptimized manner will require dispatchers to take immediate action for fixing the schedule. And in some cases, local server 3330A may cause a schedule change associated with the identified task. FIG. 35 illustrates an example of the schedule change and FIG. 36 illustrates an example of decision tree for changing the schedule.

FIG. 35 is a schematic illustration of two daily schedules 3500A, 3500B according to a disclosed embodiment. Each daily schedule shows the times and durations of tasks assigned by local server 3330A to four field professionals (Arnold, Bruce, Chuck, and Donald) between 8:00 and 16:00 of a workday. A person skilled in the art would recognize that an actual scheduling system can manage the daily schedules of more than 10 field professionals, more than 50 field professionals, and/or more than 100 field professionals. The upper schedule 3500A shows details of tasks that local server 3330A had assigned to each of the field professionals using the native scheduling engine. The lower schedule 3500B shows details of tasks that local server 3330A assigned to each of the field professionals using an updated version of native scheduling engine. In this disclosure, the term "updated version of native scheduling engine" may refer to different scheduling engines, different versions of a same scheduling engine, or a scheduling engine with different values of scheduling parameters. Originally, as shown in the upper schedule 3500A, Arnold was assigned to tasks 3501, 3502, and 3503; Bruce was assigned to tasks 3511, 3512, 3513, and 3514; Chuck was assigned to tasks 3521, 3522, 3523, 3524, and 3525; and Donald was assigned to tasks 3531, 3532, 3533, 3534, and 3535.

Local server 3330A may use the updated native scheduling engine on the previously scheduled set of tasks to identify one or more tasks scheduled in an unoptimized manner. For example, local server 3330A may determine that 1) in Arnold's schedule, task 3502 was originally assigned with a longer task duration than a time it is estimated to take; 2) in Bruce's schedule, tasks 3513 and 3514 were originally assigned with a shorter task duration than the times they are estimated to take; 3) in Chuck's schedule, task 3524 was originally assigned with a shorter task duration than a time it is estimated to take; and 4) in Donald's schedule, task 3532 was originally assigned with a shorter task duration than a time it is estimated to take. In view of the new estimations of the task durations (determined using the updated native scheduling engine), local server 3330A may change the schedule to prevent a situation in which dispatchers have to take immediate action to fix the schedule. Specifically, as shown in the lower schedule 3500B, local server 3330A had updated the estimated task durations, reassigned task 3524 from Chuck to Arnold, reassigned task 3532 from Donald to Bruce, and rescheduled task 3514 to a different day.

Figure 36:
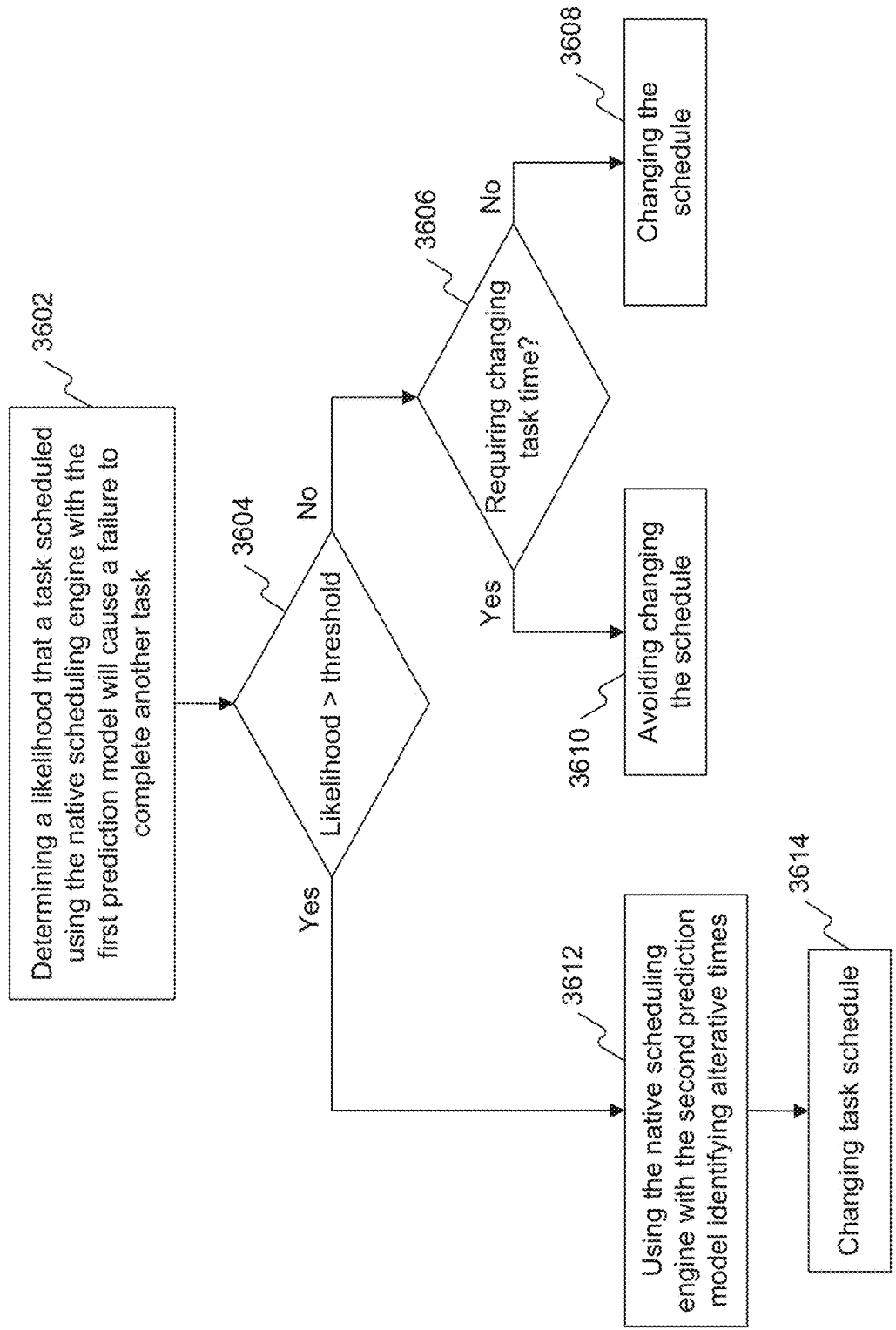
FIG. 36 is a flowchart showing an exemplary process for changing the schedule, consistent with the present disclosure.

FIG. 36 is a flowchart of an example process 3600 used by a processing device of local server 3330A (e.g., processor 3340), according to embodiments of the present disclosure. Process 3600 begins when the processing device determines a likelihood that a task scheduled using the native scheduling engine will result in a failure to complete another task (block 3602). Thereafter, the processing device may determine whether the likelihood is greater than a threshold (decision block 3604). If the likelihood is less than the threshold (i.e., changing the schedule is not necessary but may improve utilization of field resources), the processing device may determine if changing the schedule would require changing task time (decision block 3606). Typically changing a task time would require contacting a client and may lead to negative costumer experience. When changing the schedule does not require changing the task time, the processing device is configured to cause the schedule change associated with the task (block 3608). For example, this type of schedule change may include reassigning tasks to different field professionals and does not require changing the task time. When changing the schedule requires changing the task time, the processing device is configured to avoid causing the schedule change associated with the task (block 3610). If the likelihood that a task previously scheduled will cause a failure to complete another task is greater than the threshold, the processing device may use the updated native scheduling engine to identify alternative task times (block 3612). The alternative task times may be offered to the client. Thereafter, the processing device is configured to cause the schedule change associated with the task (block 3614).

Figure 37:
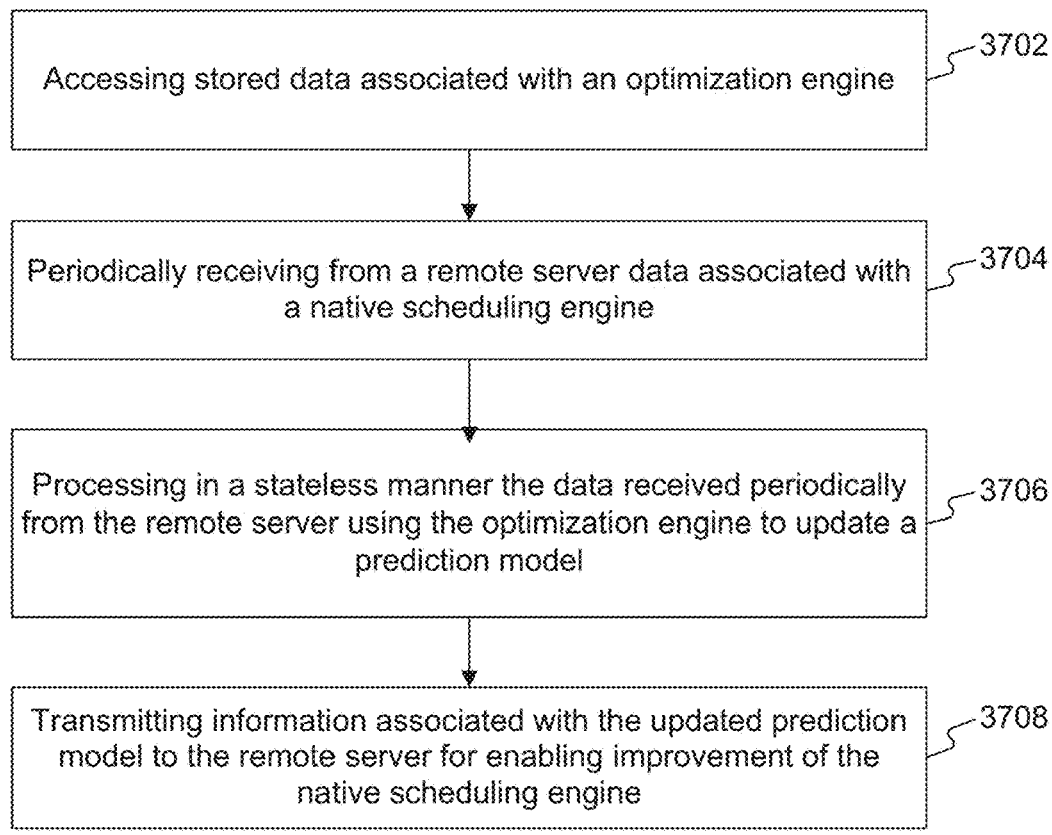
FIG. 37 is a flowchart showing an exemplary process for updating a native scheduling engine of a local server, consistent with the present disclosure.

FIG. 37 depicts an example method 3700 in accordance with an embodiment from the perspective of a central server (e.g., central server 3305). Method 3700 may be used for updating a scheduling engine of a local server (e.g., local server 3330B) that schedules tasks to field professionals. For purposes of illustration, in the following description reference is made to certain components of system 3300. It will be appreciated, however, that other implementations are possible and that other components may be utilized to implement the exemplary method. It will also be readily appreciated that the illustrated method can be altered to modify the order of steps, delete steps, or further include additional steps.

At step 3702, a processing device (e.g., processor 3315) may access stored data (e.g., scheduling data 3311) associated with an optimization engine (e.g., optimization engine 3316). At step 3704, the processing device may periodically receive from a remote server (e.g., local server 3330B) a data associated with a native scheduling engine (e.g., native scheduling engine 3341B) (e.g., task data 3336B and/or scheduling data 3337B). In one embodiment, the processing device may receive from the remote server data associated with tasks that were scheduled during a defined period of time. The period of time associated with the scheduled tasks may be defined by the processing device, by the remote server, or by an operator of system 3300. In some examples, the processing device may periodically receive from the remote server data associated with tasks that were scheduled during a period of less than a month, a period of less than two months, a period of less than three months, a period of more than two days, a period of more than ten days, and a period of more than twenty days.

At step 3706, the processing device may process in a stateless manner the data periodically received from the remote server using optimization engine to update a prediction model. Consistent with the present disclosure, processing the data associated with the scheduled tasks in a stateless manner may be done by avoiding storing in memory device 3310 the data associated with scheduled tasks. Alternatively, processing the data associated with the scheduled tasks in a stateless manner may be done by avoiding storing in memory device 3310 personal details included in the data associated with scheduled tasks. In one embodiment, the method may include detecting that the native scheduling engine scheduled a task in an unoptimized manner by determining that a field professional assigned to the task is estimated to arrive at a location associated with the task before or after a time estimated by the native scheduling engine. For example, the native scheduling engine scheduled a first task to start at 11:00 AM, but the optimization engine determines that a first field professional assigned to the first task will not arrive to the location associated with the first task before 11:25 AM. In another embodiment, detecting that the native scheduling engine scheduled a task in an unoptimized manner may include determining that a field professional assigned to the task is estimated to complete the task before or after a time estimated by the native scheduling engine. For example, the native scheduling engine reserved in the schedule 2.5 hours for completing a second task, but the optimization engine determines that a second field professional assigned to the second task will complete the second task in less than an hour and may be available for an additional task. In yet another embodiment, detecting that the native scheduling engine scheduled a task in an unoptimized manner may include determining that a field professional assigned to the task does not have a skill set required to complete the task on time. In one example, a third field professional may be assigned to a third task of installing a certain product, but the optimization engine determines that the third field professional did not complete the training for installing that certain product. In a further embodiment, detecting that the native scheduling engine scheduled a task in an unoptimized manner may include determining that other field professionals may compete the task faster than the field professional currently assigned to the task. In one example, this type of task takes a fourth field professional 35 minutes more than the average time of other field professionals, and it is better to assign the third field professional to other types of tasks. In some embodiments, the processing device may identify at least one factor that causes the native scheduling engine to schedule tasks in the unoptimized manner. With reference to the three examples above, the at least one factor that caused the native scheduling engine to schedule tasks in an unoptimized manner may include inaccurate estimations of travel durations, inaccurate estimations of task durations, inaccurate skill requirements per task, and/or inaccurate statistics on field professionals. In one embodiment, the processing device may identify a combination of factors that causes the native scheduling engine to schedule tasks in the unoptimized manner.

At step 3708, the processing device may transmit information associated with the updated prediction model to the remote server for enabling improvement of the native scheduling engine. Improving the native scheduling engine may include updating the native scheduling engine based on the identified at least one factor. Consistent with the present disclosure, the information transmitted to the remote server may be associated with a plurality of scheduling parameters. For example, the information transmitted to the remote server may include indications of inaccurate estimations driving durations native scheduling engine, indications of inaccurate estimations of task durations, and indications of inaccurate skill requirements per task. The native scheduling engine may assign different task durations for a plurality of task types, different task durations for a plurality of field professionals, different task durations for a plurality of customer types, different task durations for time of day, different task durations for a plurality of areas of task locations, different task durations for a plurality of skills of the field professional, and more. In one embodiment, the local server may update the native scheduling engine by changing at least one value of the plurality of scheduling parameters. For example, originally the native scheduling engine of local server 3330B assumed it will take Bob 68 minutes to complete a certain task type. But using the updated native scheduling engine the local server may determines that there is 80% likelihood that it will take Bob 50 minutes to complete the task and 20% likelihood that it will take Bob 60 minutes to complete the task.

In addition, the processing device may transmit to the remote server details about the at least one task that the native scheduling engine had scheduled in an unoptimized manner. The details about the at least one task may include, for example, the task reference number, the time and date of the task, the field professional assigned to the task, the location of the task, the customer associated with the task, and more. According to embodiments of the present disclosure, the processing device may also transmit to the remote server at least one recommendation for optimizing scheduling of tasks by the native scheduling engine. In one example, the at least one recommendation may include a suggestion to reassign the task that the native scheduling engine had scheduled in an unoptimized manner to a different field professional. In another example, the at least one recommendation may include a suggestion to reschedule the task that the native scheduling engine had scheduled in an unoptimized manner to a different time or a different date. In another example, the at least one recommendation may include a warning. Specifically, the processing device may determine a likelihood that the at least one task that the native scheduling engine had scheduled in an unoptimized manner will result in a failure to complete a task, and when the likelihood is greater than the threshold, the processing device may transmit a warning to the remote server.

Consistent with some embodiments, the processing device may obtain data about at least one environmental condition. The processing device may obtain the data about at least one environmental condition from a data source (e.g., data source 3350A). The term "environmental condition" refers to a condition that may have a physical effect on a daily schedule of a field professional. The environmental condition may include natural or man-made conditions. The natural environmental conditions may include, for example, flood, hurricane, thunderstorm, earthquake, and more. The man-made environmental conditions may include, for example, atypical traffic conditions, construction, fires, and more. The processing device may determine a likelihood that the at least one environmental condition was not accounted for by a current version of the native scheduling engine and transmit an update to a remote server (e.g., local server 3330A). In one example, the processing device may transmit information for updating a current version of the native scheduling engine.

Consistent with other embodiments, the processing device may periodically receive data associated with tasks scheduled by the native scheduling engine. The term "periodically" in this context refers to the transmission of data from the remote server being performed more than once or in successive instances and does not necessarily imply regular or uniform interval. For example, the processing device may receive first data associated with tasks scheduled by the native scheduling engine during a first time period (e.g., a week), and receive second data associated with tasks scheduled by the native scheduling engine during a second time period (e.g., 10 days) subsequent the first time period. The first and the second time period may or may not overlap. In one example, the first time period and the second time period may be between one day and one hundred days. In some embodiments, a duration of the first time period may be selected such that a size of the first data is lower than a threshold associated with an ability of the at least one processor to process in stateless manner. Specifically, the threshold may be determined based on a size of a RAM memory associated with the at least one processor. For example, the size of the data received may be less than 100% of the size of the memory 3318, less than 90% of the size of the memory 3318, less than 75% of the size of the memory 3318, or less than 50% of the size of the memory 3318.

Figure 38:
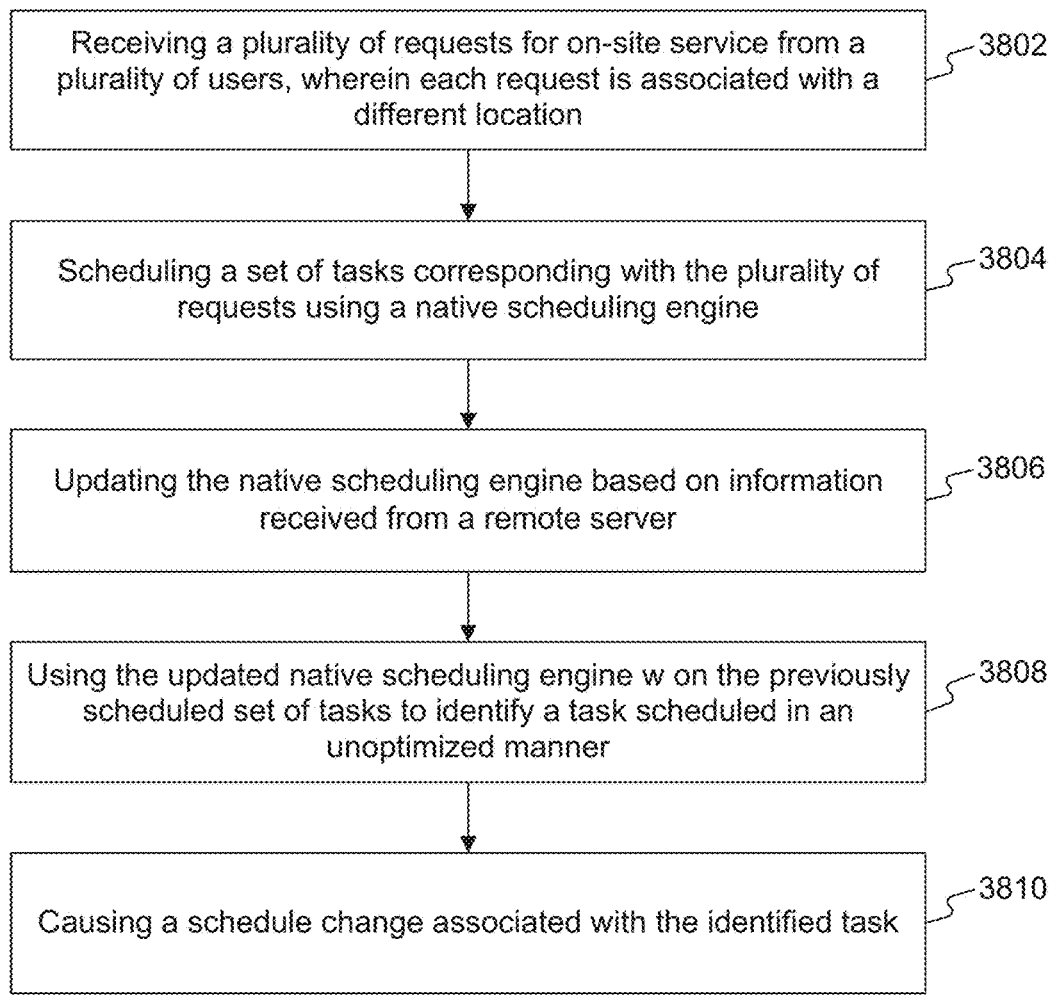
FIG. 38 is a flowchart showing an exemplary process for scheduling tasks using a data from a central server, consistent with the present disclosure.

FIG. 38 depicts an exemplary method 3800 in accordance with an embodiment from the perspective of a local server (e.g., local server 3330A). Method 3800 is used for scheduling tasks to field professionals. For purposes of illustration, the in the description of also this method, reference is made to certain components of system 3300. It will be appreciated, however, that other implementations are possible and that other components may be utilized to implement the exemplary method. It will also be readily appreciated that the illustrated method can be altered to modify the order of steps, delete steps, or further include additional steps.

At step 3802, a processing device (e.g., processor 3340A) may receive a plurality of requests for on-site service from a plurality of users (e.g., users 130), wherein each request is associated with a different location. At step 3804, the processing device may schedule a set of tasks from the plurality of requests using a native scheduling engine (e.g., native scheduling engine 3341A)). In one embodiment, the processing device may estimate travel durations between locations associated with the set of tasks. The travel durations of the field professionals may depend on accurate estimates of prevailing and emerging traffic conditions. As such, the processing device may utilize advanced traffic models to analyze traffic data, including real-time traffic data and historical traffic data to estimate the travel durations. Consistent with the present disclosure, different versions of native scheduling engine may use different scheduling data. When different versions of native scheduling engine are being used different estimations of travel durations may be determined. For example, when using first scheduling data, native scheduling engine 3341A may estimate that a specific ride will take 37 minutes, but when using second scheduling data, native scheduling engine 3341A may estimate that a specific ride will take 52 minutes.

In another embodiment, the processing device may estimate task durations associated with the set of tasks. As mentioned above, the task durations may be determined based on at least one of: the task type, the field professional, the customer type, the time of day, and the task area. Consistent with the present disclosure, when the native scheduling engine uses different scheduling data, different estimations of task durations may be determined. For example, a first version of native scheduling engine 3341A may estimate that a specific task will be completed in 25 minutes, but an updated second version of native scheduling engine 3341A may estimate that the specific task will be completed in 38 minutes. In other embodiments, the processing device may determine the requirements to complete each of the set of tasks and assign field professionals accordingly. The requirements may include the skills required to complete a task, the list of tools required to complete, and/or a list of parts required to complete. The requirements may also change when the native scheduling engine uses different scheduling data.

At step 3806, the processing device may update the native scheduling engine based on information received from a remote server (e.g., central server 3805). In one embodiment, the information from a remote server I may be received in response to sending the remote server data associated with the set of scheduled tasks (e.g., task data 3336A). This embodiment is described in detail with reference to steps 3704 to 3712 of FIG. 37. Alternatively, the information from a remote server may be received periodically from the remote server. Alternatively, the information from a remote server may be received from the remote server after detecting a trigger: for example, after the remote server identifies an environmental condition that requires a change in the native scheduling engine. In addition, the processing device may receive from the remote server at least one recommendation for optimizing scheduling of future tasks. In one example, the at least one recommendation may include a suggestion to reassign a task to a different field professional. In another example, the at least one recommendation may include a suggestion to reschedule a task to a different time or a different date. In another example, the at least one recommendation may include a suggestion associated with a desired scheduling weight. The desired scheduling weight may be a value (e.g., a numeric, textual, alphabetic, or symbolic value) that indicates a level of desirability of scheduling certain task types by local server 3330A.

At step 3808, the processing device may use the updated native scheduling engine on the previously scheduled set of tasks to identify a task scheduled in an unoptimized manner. In a first embodiment, the processing device may use the updated native scheduling engine to determine that a field professional assigned to a task is estimated to arrive at a location associated with the task before or after a time previously estimated by the processing device. For example, originally the native scheduling engine had scheduled a first task to start at 11:00 AM, but later the updated native scheduling engine determines that the first field professional assigned to the first task will not arrive to the location associated with the first task before 11:40 AM. In a second embodiment, the processing device may use the updated native scheduling engine to determine that a field professional assigned to a task is estimated to complete the task before or after a time previously estimated by the processing device. For example, originally the native scheduling engine had reserved in the schedule 2.5 hours for completing a second task, but later the updated native scheduling engine determines that a second field professional assigned to the second task will complete the second task in less than an hour and may be available for an additional task. In a third embodiment, the processing device may use the updated native scheduling engine to determine that a field professional assigned to a task does not have a skill set required to complete the task. For example, originally the native scheduling engine I had assigned a third field professional to a third task of installing a certain product, but later the updated native scheduling engine determines that the third field professional did not complete the training for installing that certain product.

At step 3810, the processing device may cause a schedule change associated with the identified task. In one embodiment, the identified task was previously assigned to a first field professional and causing the schedule change may include reassigning the identified task to a second field professional. For example, with reference to the lower schedule in FIG. 35, the task identified as being scheduled in an unoptimized manner was task 3532 and the schedule change may include reassigning task 3532 from Donald to Bruce. In another embodiment, the identified task was previously assigned to a first field professional and causing the schedule change may include reassigning a different task previously assigned to the first field professional to a second field professional thereby enabling the first field professional to complete the identified task. For example, with reference to the lower schedule in FIG. 35, the task identified as being scheduled in an unoptimized manner was task 3523 and the schedule change may include reassigning task 3524 from Chuck to Arnold. In another embodiment, the identified task is scheduled at a certain time and causing the schedule change may require rescheduling the identified task to a different time. For example, with reference to the lower schedule in FIG. 35, the task identified as being scheduled in an unoptimized manner was task 3514 and the schedule change may include rescheduling task 3514 to a different time. In a related embodiment, rescheduling the identified task to a different time may include suggesting a user one or more alternative times selected by the updated native scheduling engine.

Consistent with the present disclosure, the processing device may periodically transmit to the remote server (e.g., central server 3805) data associated with a plurality of scheduled tasks. As mentioned above, this data is used by an optimization engine to determine the information that may be used for updating the native scheduling engine. In some embodiments, the size of the periodically transmitted data may be less than a threshold to enable processing the data in stateless manner. Specifically, the threshold may be determined based on a size of a RAM memory associated with the at least one processor of the remote server. For example, the size of the data received may be less than 100% of the size of the memory 3318, less than 90% of the size of the memory 3318, less than 75% of the size of the memory 3318, or less than 50% of the size of the memory 3318.

M. Assigning Tasks Based on Real-Time Conditions

Figure 40B:
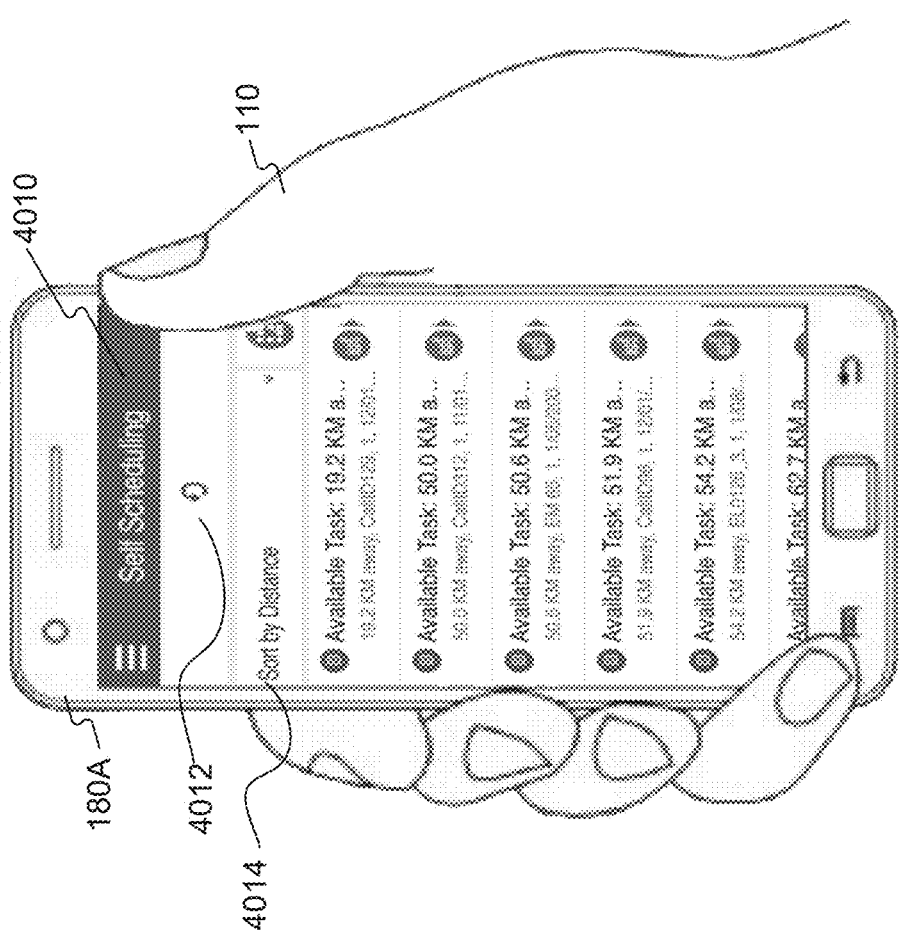
FIG. 40A and FIG. 40B are schematic diagram showing two graphical user interfaces for a field professional, consistent with the present disclosure.
Figure 40A:
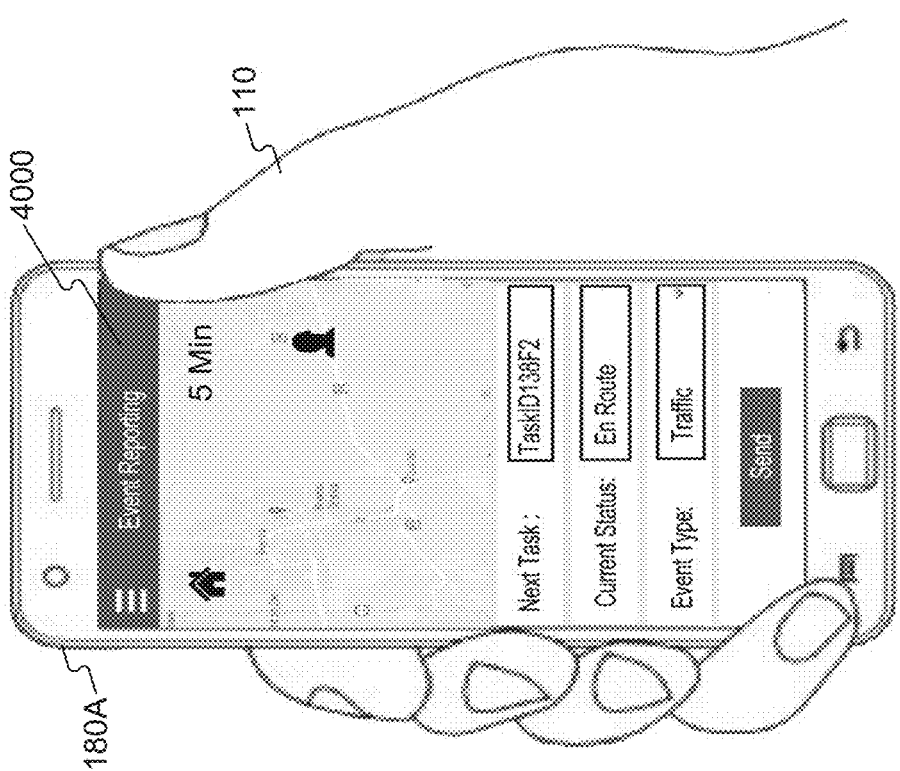
Figure 41:
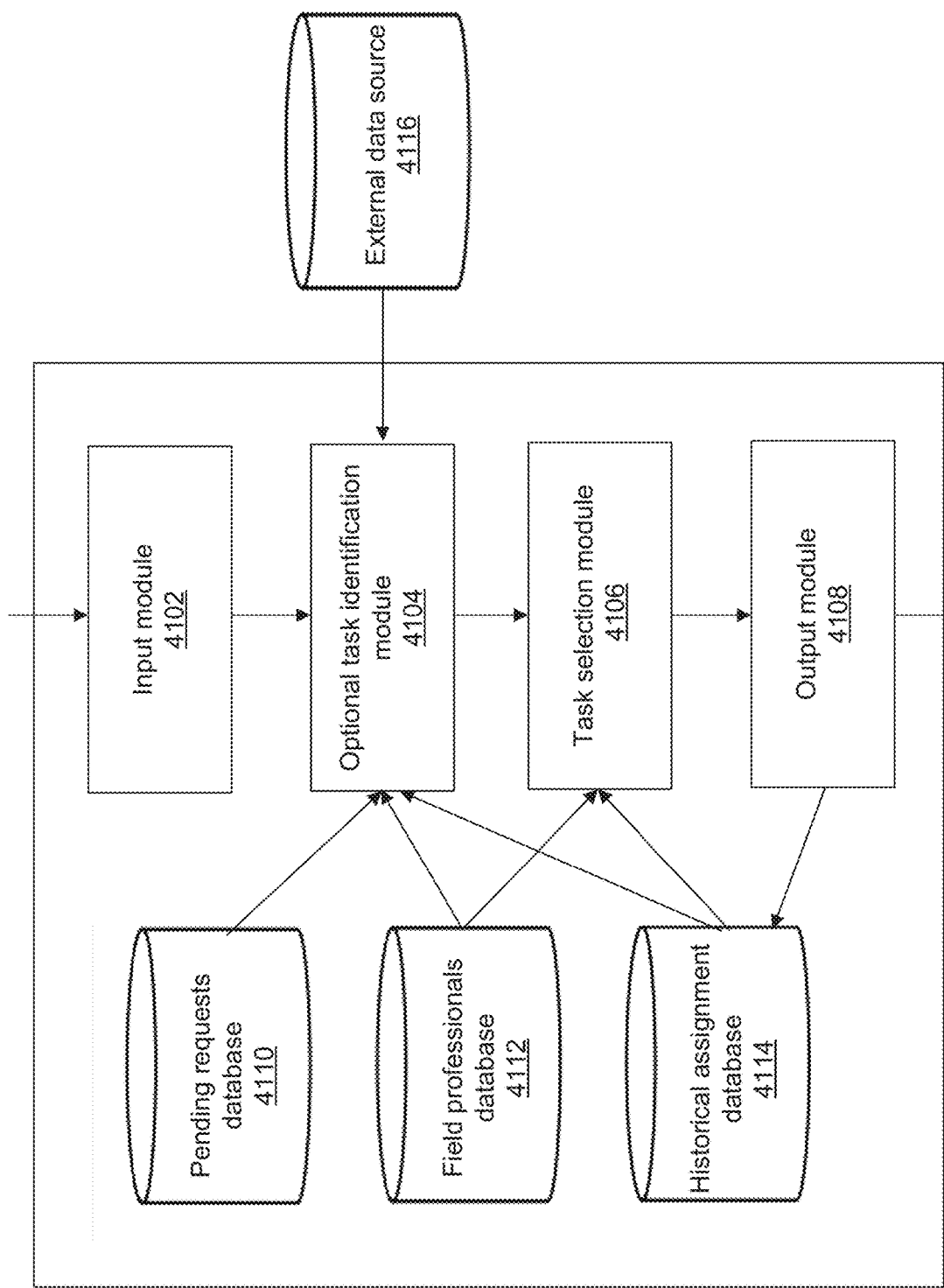
FIG. 41 is a is a block chart illustrating an exemplary embodiment of a memory containing software modules, consistent with the present disclosure.

A scheduling system should take into consideration real-time conditions that affect a schedule for a field professional. These real-time conditions may include an unplanned event likely to interfere with the field professional completing a task (e.g., user cancellation of an appointment, malfunction of a tool, traffic, etc.), and a window of opportunity for scheduling additional tasks to the field professional (e.g., shorter-than-estimated travel durations, shorter-than-estimated task durations, user cancellation of an appointment, etc.). Upon considering the real-time conditions, the disclosed system may identify several optional tasks that may be assigned to the field professional. In a first embodiment, the system may present the optional tasks to the field professional and assign a task based on the field professional's selection. FIGS. 40A and 40B illustrate user interfaces associated with the first embodiment. In a second embodiment, the system may use an artificial intelligence technology on historical data that may be indicative of dispatchers' preferences to identify possible tasks to assign to the field professional, to identify a group of field professionals as candidates for doing certain tasks, or to learn details (e.g., skills) on the field professionals. FIG. 41 illustrates software modules associated with the second embodiment.

The following disclosure describes how system 100 dynamically changes the schedule of field professionals based on real-time information. As used herein, the term real-time information may refer to information or data collected at the time an event occurs or soon after the event occurs. The real-time information may include data relevant to determining the capability or the progress of a field professional's in arriving at a location associated with a task at a scheduled time and/or in completing on-site services associated with scheduled tasks. The real-time information may be collected from at least one source, such as, but not limited to, a mobile device (e.g., a mobile telephone, a personal digital assistant (PDA), a laptop computer, a tablet computer), an IoT device (e.g., including at least one of: a temperature sensor, a barometer, an altimeter, a visible light sensor), a global positioning system (GPS), a radio beacon, a wireless local area network (WLAN) station, a vehicle information and communication system (VICS), a traffic information broadcast system, a vehicle tracking and telemetry system, a weather monitoring system (WMS), social network and news websites, and more. In one embodiment, the real-time information may reflect location information associated with the field professional. Based on the location information, system 100 (alone or with reference to other internal or external systems) may determine if a field professional is at a location associated with one of the tasks in the schedule or en route to a scheduled task. In another embodiment, the real-time information may reflect task updates (e.g., field professional 110 may use a dedicated communication device or a dedicated application to provides real-time updates, such as "arrived at destination" and "5 minutes delay in completing the task"). In yet another embodiment, the real-time information may include updates from different data sources outside system 100 that may affect the progress of field professional 110 (e.g., traffic updates, weather updates, user's social profiles, etc.).

Consistent with the present disclosure, the real-time information may reflect required changes to a schedule of a field professional. As discussed below with reference to FIG. 39A, system 100 may determine, from the real-time information, existence of an unplanned event likely to interfere with the field professional completing at least one task from the daily schedule. In addition, as discussed below with reference to FIG. 39B, system 100 may determine, from the real-time information, a window of opportunity to assign an additional task to the field professional.

Figure 39A:
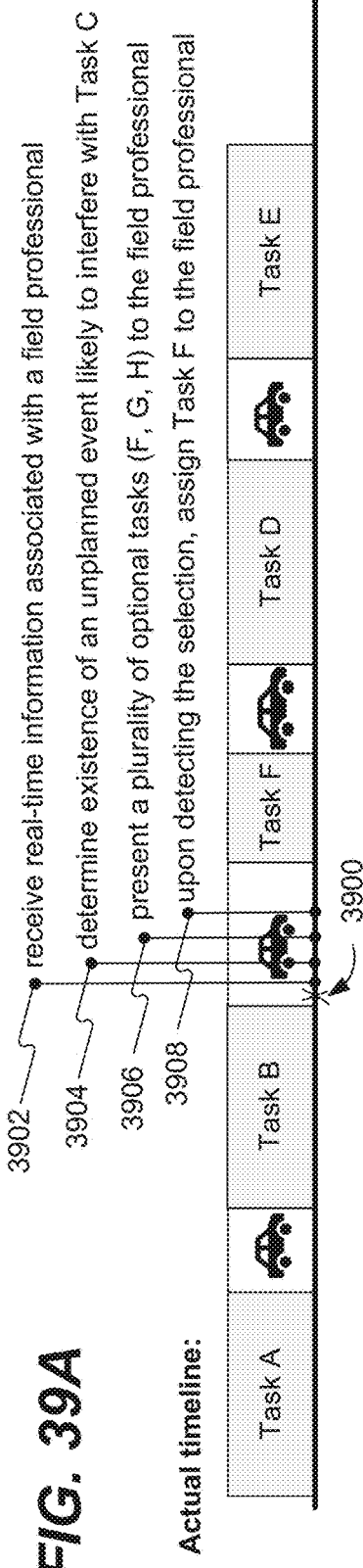
FIG. 39A and FIG. 39B are diagrams showing of planned timelines of a field professional and actual timelines of the field professional, consistent with the present disclosure.

FIG. 39A depicts a planned timeline and an actual timeline of a first field professional 110 (e.g., Bart). Originally, as illustrated in the planned timeline, Bart was assigned with five tasks: task A (scheduled to start at 8:30 AM and estimated to end at 9:30 AM), task B (scheduled to start at 10:00 AM and estimated to end at 11:00 AM), task C (scheduled to start at 11:30 AM and estimated to end at 12:30 PM) task D (scheduled to start at 1:00 PM and estimated to end at 2:00 PM), and task E (scheduled to start at 2:30 PM and estimated to end at 3:00 PM). In FIG. 39A, each of the tasks that Bart was assigned to is associated with a different location, and the planned timeline includes periods of time between the tasks that correspond to the estimated travel duration times.

In the actual timeline, it is shown that Bart had completed tasks A and B according to the planned schedule, and encountered an unplanned event 3900 on the way to a location associated with task C. In the following example, unplanned event 3900 is a flat tire, but a person skilled in the art would recognize that there may be nearly unlimited different types of unplanned events that may interfere with the field professional's work and may prevent completion of one or more scheduled tasks. Steps 3902 to 3908 may be implemented by system 100 after Bart had encountered unplanned event 3900. At step 3902, system 100 may receive real-time information associated with Bart. In this example, the real-time information may include a message from Bart that he had a flat tire. At step 3904, system 100 may determine existence of an unplanned event likely to interfere with task C. For example, system 100 may estimate that it will take Bart 20 minutes to fix the flat tire, and based on the current traffic conditions, he is expected to arrive to the location associated with task C around 11:50 AM. Thus, the flat tire event is likely to interfere with task C scheduled to start at 11:30 AM. Accordingly, system 100 may reassign task C to a different field professional or reschedule task C to a different date. System 100 may identify a group of optional tasks (e.g., task F, task G, task H, task I, and task J). The optional tasks may include repair and maintenance services of IoT devices or different location-agnostic tasks. At step 3906, system 100 may present Bart some of the identified tasks (e.g., task F, task G, task H) as alternatives to task C. At step 3908, upon detecting Bart's selection, system 100 may assign Bart with task F. After Bart has completed task F, he can continue with his planned schedule and complete tasks D and E.

Figure 39B:
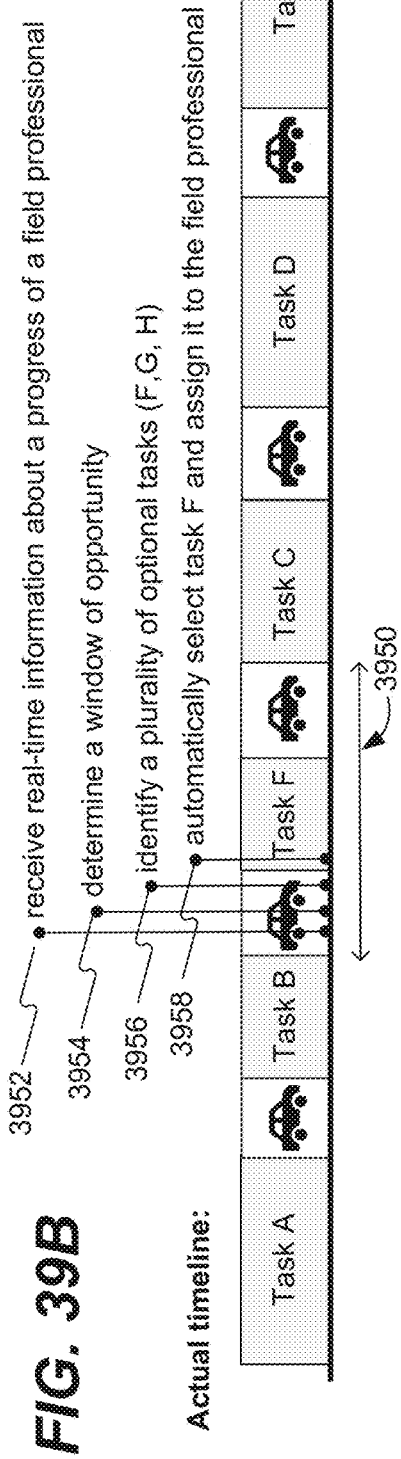

FIG. 39B depicts a planned timeline and an actual timeline of a second field professional 110 (e.g., Lisa). Originally, as illustrated in the planned timeline, Lisa was assigned with five tasks: task A (scheduled to start at 8:30 AM and estimated to end at 9:30 AM), task B (scheduled to start at 10:00 AM and estimated to end at 11:45 AM), task C (scheduled to start at 12:45 PM and estimated to end at 1:30 PM) task D (scheduled to start at 2:00 PM and estimated to end at 3:00 PM), and task E (scheduled to start at 3:30 PM and estimated to end at 4:30 PM). In FIG. 39, each of the tasks that Lisa was assigned to is associated with a different location, and the planned timeline includes periods of time between the tasks that correspond to the estimated travel duration times.

In the actual timeline, it is shown Lisa had completed task A according to the planned schedule and completed task B much earlier than estimated. Consequently, a window of opportunity 3950 had opened. In the following example, window of opportunity 3950 was instigated when Lisa completed task B earlier than estimated, but a person skilled in the art would recognize that there may be other causes and/or combination of causes responsible for windows of opportunity. For example, a customer may cancel an appointment, the travel duration takes less time than estimated, and more. Steps 3952 to 3958 may be implemented by system 100 after Lisa has completed task B. At step 3952, system 100 may receive real-time information about Lisa's progress. For example, Lisa may use a dedicated application on her smartphone to provide a real-time update "task completed." At step 3954, system 100 may determine a window of opportunity. Determining the window of opportunity may include determining a duration of the window of opportunity. At step 3956, system 100 may identify a plurality of optional tasks (e.g., task F, task G, and task H). At step 3908, system 100 may automatically select task F and assign it to Lisa. After Lisa has completed task F, she can continue with her planned schedule and complete tasks D and E.

FIGS. 40A and 40B depict two graphical user interfaces (GUIs) according to embodiments of the present disclosure. The GUIs may be part of a dedicated app installed in field professional communication device 180A. Specifically, FIG. 40A depicts a GUI 4000 that enables field professional 110 to provide real-time information to system 100; and FIG. 40B depicts a GUI 4010 that enables field professional 110 to select an optional task from a list of optional tasks identified by system 100.

GUI 4000 in FIG. 40A may include a map area displaying a current location of field professional 110 relative to the location associated with a next task in the daily schedule. GUI 4000 may also present the estimated time of arrival for the next task's location. Below the map area, GUI 4000 displays the fields "Next Task," "Current Status," and "Event Type." The field "Next Task" may present the next task's ID number. Field professional 110 may obtain additional details on the next task by pressing the ID number. For example, the additional details that GUI 4000 may present to field professional 110 may include: information about the customer (e.g., name, address, phone number, etc.), information about the scheduled on-site service (type of service, required parts, etc.), and more. The field "Current Status" may be automatically completed by the system, for example, based on location data received from communication devices 180A. Alternatively, the field "Current Status" may be manually completed by field professional 110 by entering updates such as: "arrived at location," "task completed," and more. The field "Event Type" may include details on an unplanned event likely to interfere with at least one task from the daily schedule. In one embodiment, the details may include a time estimation of the expected delay due to the unplanned event. GUI 4000 may also include a "send" button for transmitting the event reporting to system 100.

GUI 4100 in FIG. 40B may present to field professional 110 a list of optional tasks identified by system 100. In one embodiment, field professional 110 may be prompt to select an optional task from the list when system 100 determines existence of an unplanned event likely to interfere with a task from the daily schedule. In another embodiment, field professional 110 may be prompt to select an optional task from the list when system 100 determines a window of opportunity to assign an additional task to the field professional. GUI 4010 may include a feature 4012 to refresh the list, as some of the optional tasks may be concurrently scheduled by the system, by dispatchers, or by other field professionals. Field professional 110 may change the presentation parameters of the list of optional tasks identified by system 100. For example, GUI 4010 may include a feature 4014 for sorting the plurality of optional tasks. In FIG. 40B the optional tasks are sorted based on their distance, i.e., the distance of a location of an optional task from a current location of field professional 110. A person skilled in the art would recognize that field professional 110 may be able to sort the plurality of optional tasks according to other parameters, for example, based on task type (e.g., location-agnostic tasks or location-based tasks), based on client type (e.g., private customers or industrial customers), based on estimated task duration, based on due date, and more.

FIG. 41 illustrates a memory 4100 containing software modules and databases consistent with the present disclosure. In some embodiments, memory 4100 may be part of server 152. Alternatively, memory 4100 may be stored in an external storage communicatively coupled with server 152, such as one or more databases or memories accessible over network 170. Further, in other embodiments, the components of memory 4100 may be distributed in more than one server. As shown, memory 4100 may include an input module 4102, an optional task identification module 4104, a task selection module 4106, and an output module 4108. Modules 4102, 4104, 4106, and 4108 may contain software instructions for execution by at least one processing device (e.g., processor 202). Memory 4100 may also include or be connected to a plurality of databases, such as a pending requests database 4110 which may store details on requests for on-site services (e.g., requests that were not yet scheduled); a field professionals database 4112 which may store data on each field professional (e.g., skills, qualifications, experience, shifts times, ranking); and a historical assignment database 4114 which may store data associated with assignments of tasks for a plurality of field professionals when windows of opportunity are identified. For example, historical assignment database 4114 may store data indicative of past dispatchers' preferences regarding assignments of additional tasks.

Consistent with the present disclosure, input module 4102, optional task identification 4104, task selection module 4106, and output module 4108 may cooperate to perform multiple operations. For example, input module 4102 may provide to optional task identification 4104 an identification of a window of opportunity associated with a specific field professional. Optional task identification 4104 can interact with pending requests database 4110, field professionals database 4112, and an external data source 4116 configured to store updated information, such as traffic conditions, weather conditions, etc. In one implementation, optional task identification 4104 can process the accessed data and forward to task selection module 4106 details of plurality of optional tasks that the specific field professional can complete during the window of opportunity. Task selection module 4106 can interact with field professionals database 4112 and historical assignment database 4114, and select which task assign to the specific field professional. Output module 4108 may receive an identification of the selected task from task selection module 4106 and may change the daily schedule of the specific field professional accordingly.

Input module 4102 can receive a set of requests for on-site service from a plurality of users and receive real-time information about a progress of a field professional assigned to a set of tasks associated with a subset of requests. The requests for the on-site services may be associated with different locations. In a case where input module 4102 is part of server 152, input module 4102 can receive the real-time information via network interface 206 transmitted from one or more communication devices (e.g., field professional communication device 180A, customer service communication device 1808, or user communication device 180C). In some embodiments, the real-time information about the progress of a specific field professional may reflect the likelihood that the specific field professional will complete the daily schedule of assigned tasks. Based on the real-time information, input module 4102 may determine existence of an unplanned event likely to interfere with the specific field professional completing at least one task from the daily schedule. In addition, input module 4102 may determine existence of a window of opportunity to assign an additional task to the specific field professional. The window of opportunity may (or may not) be associated with the unplanned event. Input module 4102 can then transmit data identifying the determined window of opportunity associated with a specific field professional to optional task identification module 4104 for processing.

Optional task identification module 4104 may receive the data identifying the determined window of opportunity from input module 4102 and detect a plurality of optional tasks for the specific field professional. Optional task identification module 4104 may access pending requests database 4110 to learn which tasks are available for scheduling. The tasks available for scheduling may include tasks associated with unassigned requests and tasks that were scheduled to deferred dates due to lack of field professionals' availability. Thereafter, optional task identification module 4104 may apply one or more criteria for determining a plurality of optional tasks relevant for the specific field professional. In one embodiment, the one or more criteria may include distance of a task's location to a current location of the specific field professional. In another embodiment, the one or more criteria may include the current traffic conditions along a route to a task's location. In another embodiment, the one or more criteria may include the current weather conditions at a task's location. In another embodiment, the one or more criteria may include skills of the specific field professional. In another embodiment, the one or more criteria may include a scheduling weight indicating a desired ratio between the types of scheduled tasks. In another embodiment, the one or more criteria may include details associated with the tasks and/or details associated with the customer (e.g., only IoT device customers). In another embodiment, the one or more criteria may include a predicted task duration. The predicted task duration may be used by the system to determine if a task should be offered to a field professional. For example, the system may determine that a first field professional may be assigned to a certain task since the predicted duration for him would be 60 minutes while a second field professional may not be assigned to the certain task as the system estimates the predicted duration for him would be 75 minutes.

Task selection module 4106 may receive the data identifying the plurality of optional tasks from optional task identification module 4104 and select at least one of the plurality of optional tasks for assignment. Task selection module 4106 may select the at least one optional task by processing of information using artificial intelligence (AI) technology and Machine learning (ML) technology. Specifically, task selection module 4106 may include AI software instructions that enable a processing device to perform at least one of learning of information, inference of information, and perception of information. Moreover, task selection module 4106 may include ML software instructions that enable a processing device to process a large amount of information (big data), such as information stored in an associated database (e.g., historical assignment database 4114). Using the AI and ML technologies, task selection module 4106 can process a large amount of information to select at least one of the plurality of optional tasks for assignment. The processing of information is an operation that grasps characteristics, rules, and judgment criteria of information, quantifies relationship between information and information, and predicts new data using a quantified information. Task selection module 4106 may identify at least one optional task that the field professional may be able to complete during the window of opportunity, based on the patterns learned by processing the information. For example, task selection module 4106 may determine a pattern associated with past dispatchers' preferences regarding assignment of additional tasks and may select the at least one optional task based on the determined pattern. In one embodiment, task selection module 4106 may also rank the plurality of optional tasks that the field professional can complete during the window of opportunity according to a likelihood that a human dispatcher would select each task. Task selection module 4106 can then transmit data identifying the at least one optional task to output module 4108 for processing.

Output module 4108 can determine whether to automatically assign the specific field professional to the at least one task selected by task selection module 4106. In case task selection module 4106 had identified a group of optional tasks that meet the selection criteria, output module 4108 can determine to present the group of optional tasks to the specific field professional and to prompt the specific field professional to choose an optional task. Upon assigning an additional task to the specific field professional, output module 4108 may update historical assignment database 4114 to reflect the selected task assignment.

Figure 42:
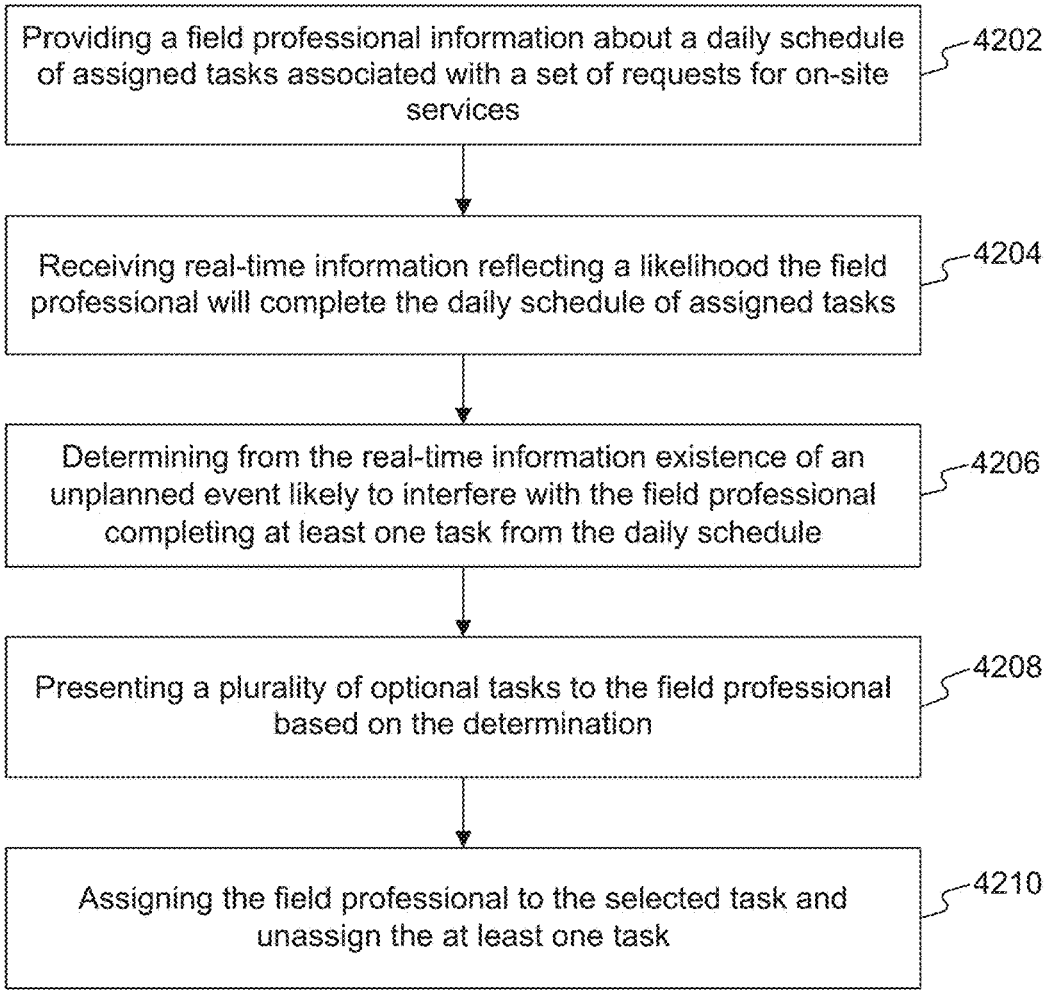
FIG. 42 is a flowchart showing a first exemplary process for assigning tasks based on real-time information, consistent with the present disclosure.

FIG. 42 is a flowchart of an example process 4200 for scheduling tasks to field professionals executed by a processing device of system 100, according to embodiments of the present disclosure. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4202, a processing device (e.g., processing device 202) provides a field professional information about a daily schedule of assigned tasks associated with a set of requests for on-site services. At step 4204, the processing device receives real-time information reflecting a likelihood the field professional will complete the daily schedule of assigned tasks. Consistent with the present disclosure, the processing device may receive the real-time information from a customer service unit (e.g., customer service unit 120), from a user device (e.g., the customer's communication device 180C), or from a field professional device (e.g., communication device 180A). For example, when the real-time information is associated with an event of a user's cancellation of an appointment, the real-time information may be received from any of the communication devices mentioned above. Specifically, users may call to the customer service unit and inform that they need to cancel the appointment; users may interact with system 100 directly via a website that has a feature to cancel appointments (e.g., a link to the website may be provided to the users by system 100); users may interact with system 100 by responding to a message (e.g., a verification SMS, email or Interactive voice response (IVR) message with a cancellation request; and the field professional may call the user and learn that the user forgot about the appointment. Thereafter, the field professional may use a dedicated app to cancel this appointment.

At step 4206, the processing device determines from the real-time information existence of an unplanned event likely to interfere with the field professional completing at least one task from the daily schedule. The unplanned event may have been resulted from a situation associated with the user, from a situation associated with the field professional, or from environmental conditions. In one embodiment, the unplanned event may include user cancellation of an appointment associated with a task in the daily schedule of the field professional. For example, when the user is stuck at work and cannot make it home in time for the appointment with the field professional. In another embodiment, the unplanned event may include a significant delay of the field professional to the appointment with the user. For example, when the field professional had a flat tire on the way to a location associated with a next task and expected to be 30 minutes late. In another embodiment, the unplanned event may include atypical traffic conditions associated with a driving route to a location of a task in the daily schedule of the field professional. For example, when the driving route had a road blocked for repair and the field professional or the user will not be able to get in time to the location associated with the appointment. In this embodiment, the real-time information associated with the atypical traffic conditions may be received from traffic control services or directly from the field professional. In another embodiment, the unplanned event may include atypical weather conditions at a location associated with a task in the daily schedule of the field professional. Examples for atypical weather conditions may include heavy rain, heat wave, a hurricane, flooding, and more. The atypical weather conditions may prevent the field professional from getting to the location associated with the appointment or prevent the field professional from completing the task. In another embodiment, the unplanned event may include lack of parts associated with a task in the daily schedule of the field professional. For example, when the field professional had used unexpectedly a replacement part that was planned to be used in a future task, and now a scheduled task cannot be completed. In another embodiment, the unplanned event may include a malfunction of a tool needed for completion of a task in the daily schedule of the field professional. For example, when a tool needed in a scheduled task unexpectedly broke in a previous task.

At step 4208, the processing device identifies and present a plurality of optional tasks to the field professional based on the determination at step 4206. In identifying the plurality of optional tasks, the processing device may access at least one database of unscheduled tasks (e.g., tasks associated with recent requests) or scheduled tasks that may be rescheduled on-the-fly (e.g., repair and maintenance services for IoT devices). The plurality of optional tasks may include at least one location-agnostic task that includes a remote communication session with a customer (e.g., remote support session) and at least one location-agnostic task that does not involve communicating with customers (e.g., completing reports of past tasks). In order to present the field professional with the most relevant available tasks, the processing device may filter one or more irrelevant tasks. In one embodiment, the processing device may identify the plurality of optional tasks by taking into account a specific skill set of the field professional and confirming that the field professional is capable to perform each assignment of the plurality of optional tasks. In another embodiment, the processing device may identify the plurality of optional tasks by taking into account a current location of the field professional and confirm that each location associated with the plurality of optional tasks is within a predefined distance from the current location of the field professional (e.g., less than five miles). In another embodiment, the processing device may identify the plurality of optional tasks by considering traffic conditions (e.g., current and predicted traffic conditions) and estimate how much each assignment of the plurality of optional tasks would affect the rest of the daily schedule of the field professional. In addition, the processing device may rank the plurality of optional tasks based on the different considerations discussed above, and present only a part of the plurality of optional tasks based on their ranking. For example, a task associated with a closer location may have a higher ranking.

At step 4210, the processing device assigns the field professional to a selected task and unassign the at least one task. In a first embodiment, unassigning the at least one task may include rescheduling the at least one task to a different time. Consistent with the first embodiment, the processing device may determine existence of an unplanned event likely to interfere with the field professional completing a single task from the daily schedule and reschedule the single task to a different time. For example, the single task may be scheduled to a different day based on the field professional's availability and/or the customer's availability. In a second embodiment, unassigning the at least one task may include assigning the at least one task to a different field professional. Consistent with the second embodiment, the processing device may determine existence of an unplanned event likely to interfere with the field professional completing a single task from the daily schedule and reassign the single task to another field professional. For example, the on-site service associated with the at least one task may be provided to the user at the scheduled time, but by a different field professional. In some cases, the processing device may determine existence of an unplanned event likely to interfere with the field professional completing a plurality of tasks from the daily schedule. For example, the field professional may be involved in a car accident on the way to a first task of the day. In these cases, the processing device may reschedule at least some of the plurality of task to different dates and/or reassign at least some of the plurality of tasks to different field professionals.

Figure 43:
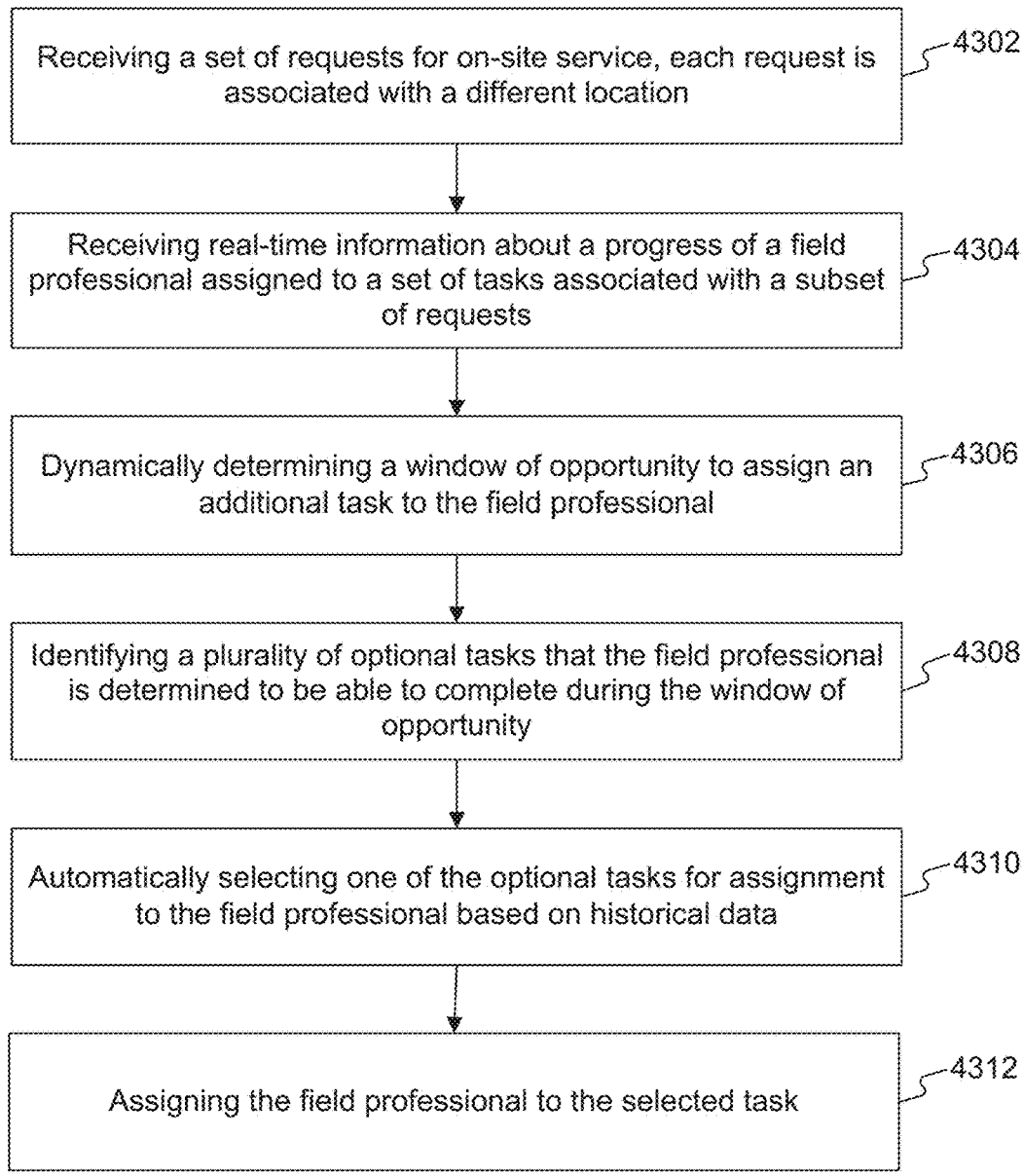
FIG. 43 is a flowchart showing a second exemplary process for assigning tasks based on real-time information, consistent with the present disclosure.

FIG. 43 depicts an example method 4300 for scheduling tasks to field professionals executed by a processing device of system 100, according to embodiments of the present disclosure. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4302, a processing device (e.g., processing device 202) receives a set of requests for on-site service, each request may be associated with a different location. The set of requests for on-site service may include at least one request received from a user (e.g., user 130) and at least one request received from an IoT device (e.g., IoT device 140) without any user intervention. At step 4304, the processing device may receive real-time information about a progress of a field professional assigned to a set of tasks associated with a subset of requests. In one embodiment, the processing device may receive real-time information from a communication device associated with the field professional. For example, the field professional may use a dedicated application or a dedicated communication device to provide real-time updates, such as "arrived location," "task completed," and more. In another embodiment, the processing device may receive real-time information from a device associated with the on-site service. For example, the processing device may receive updates directly from an IoT device being repaired.

At step 4306, the processing device dynamically determines a window of opportunity to assign an additional task to the field professional. Consistent with the present disclosure, the processing device may determine the window of opportunity from real-time information that includes traffic conditions in a geographic area associated with a current location of the field professional. The traffic conditions may include real-time traffic conditions and predicted traffic conditions. In another embodiment, the processing device may determine the window of opportunity from real-time information that includes task status updates transmitted from a communication device of the field professional. In another embodiment, the processing device may determine the window of opportunity from real-time information that includes current location information derived at least partially from a location circuit communication device of the field professional. In another embodiment, the processing device may determine the window of opportunity from real-time changes in the daily schedule of the field professional. In another embodiment, the processing device may determine the window of opportunity from a user cancellation of a task in a daily schedule of the field professional. In another embodiment, the processing device may determine the window of opportunity from a completion of a task in a daily schedule of the field professional faster than estimated. This embodiment is illustrated in FIG. 39. In another embodiment, the processing device may determine the window of opportunity from arriving at a location associated with a task in a daily schedule faster than estimated. In another embodiment, the processing device may determine the window of opportunity from reassignment of a task in a daily schedule of the field professional to a different field professional.

In order to identify windows of opportunity, the processing may periodically check if there are differences between estimated conditions (e.g., traffic conditions, work progress, etc.) and the current conditions. For example, when the daily schedule of a field professional was determined, the estimated task duration of task A was estimated to be 30 minutes, and the travel duration between the location associated with task A and the location associated with task B was estimated to be 45 minutes. Upon arriving at the location associated with task A, the field professional updates the processing device that the on-site service associated with task A would be completed in 10 minutes. Thereafter, the processing device may determine, based on the real-time traffic conditions and the current location of the field professional, that the travel duration from the location associated with task A and the location associated with task B would take only 20 minutes. Thus, the field professional will have a window of 45 minutes before task B starts.

At step 4308, the processing device identifies a plurality of optional tasks that the field professional is determined to be able to complete during the window of opportunity. In some embodiments, to identify the plurality of optional tasks, the processing device may check if the field professional can start one of the tasks associated with the subset of requests earlier than a scheduled time. Checking if the field professional can start a task earlier may include asking a customer associated with the task or identifying that completing the task does not require a presence of a user (e.g., repairing an IoT device that is not located within a user's property). With reference to the example above, the processing device may receive a confirmation from customer associated with task B that the field professional can start task B earlier. In other embodiments, the real-time information may include a current location of the field professional and traffic conditions in the geographic area. The processing device may use the traffic conditions in the geographic area and the current location of the field professional to identify the plurality of optional tasks. For example, the processing device may follow rules for identifying optional tasks, such as only location-agnostic tasks, tasks within five miles radius from the current location of the field professional, or tasks within 15 minutes' drive from the current location of the field professional. The rules may be associated with the duration of the window of opportunity. For example, when the window of opportunity is more than 60 minutes, allow up to 15 minutes' drive, but when the window of opportunity is less than 45 minutes, allow up to 10 minutes' drive.

At step 4310, the processing device automatically selects one of the optional tasks for assignment to the field professional based on historical data. Consistent with the present disclosure, the processing device may be associated with a memory device (e.g., database 154) configured to store historical data indicative of past dispatchers' preferences regarding assignment of additional tasks. The memory device may also store historical data indicative of past field professionals' preferences regarding assignment of additional tasks. For example, the received selection of the field professional as described in step 4210 above. In some embodiments, the historical data may include details on a plurality of past windows of opportunity, and the at least one processor is configured to identify a past window of opportunity similar to a current window of opportunity, and to select the task based on the past dispatchers' preferences regarding assignment of a task associated with the past window of opportunity. The details on the plurality of past windows of opportunity may include times, durations, information about the field professionals associated with the plurality of past windows of opportunity (e.g., skills, experience, working hours, etc.), and information about the optional tasks that each of the field professionals could have completed during a corresponding past window of opportunity. In additional embodiments, the processing device may determine a pattern associated with the past dispatchers' preferences regarding assignment of additional tasks, and select the task based on the determined pattern. For example, the processing device may determine that an hour before shift ends, a human dispatcher always selects a location-agnostic task. In addition, the processing device may rank the plurality of optional tasks that the field professional can complete during the window of opportunity according to a likelihood that a human dispatcher would select each task. The ranking of the plurality of optional tasks may also be based on other parameters to enable greater optimization of scheduling of tasks for all the field professionals.

At step 4312, the processing device assigns the field professional to the selected task. In one embodiment, the selected additional task may be a location-agnostic task associated with a request for remote assistance received before the window of opportunity. Specifically, the selected additional task may be being available to provide at least one location-agnostic service for requests received during the window of opportunity. In another embodiment, the selected additional task may be a location-based task associated with a location in proximity to a current location of the field professional (e.g., less than a mile). In addition, the selected additional task may be one that is estimated to end before the field professional is required to start driving towards a location of a next scheduled task. For example, with reference to the example illustrated in FIG. 39, task F is estimated to end before Lisa needs to start driving towards a location associated with task C.

N. Tasks Scheduling Using Connected Devices

The Internet of Things (IoT) has grown well beyond smart watches and security cameras. In fact, the IoT trend is changing the future of business with its now billions of "things." Some of these things have sensors for monitoring other things. While many IoT devices have the functionality of alerting users when a malfunction occurs or is predicted to occur, they still rely on their users to repair them or repair the things they monitor. The following disclosure provides a solution that will enable IoT devices to autonomously schedule on-site service, for example, without any user intervention.

Consistent with the present disclosure, a system that schedules tasks to field professionals (e.g., system 100) may receive a request from a connected device that includes an indication of an urgency level. The system may take into consideration other requests (e.g., from human customers) and schedules a visit of a field professional within a time period that corresponds with the urgency level. The urgency level can be determined from information derived from the connected device and the scheduled visit (e.g., for repair or maintenance) may be given a precedence in the task schedule relative to other previously scheduled tasks. In one example, the connected device may periodically send performance data to a server, the server may analyze the performance data, determine that maintenance service is in needed, and cause scheduling of an on-site service (the server may or may not be part of the system that assigns tasks to field professionals). In another example, the connected device may monitor a living being (e.g., elderly people, livestock), and may cause scheduling of a visit of a health care provider without an approval of the monitored being.

As used herein, terms like "connected device" or "IoT device" refer to any device (e.g., an appliance, a sensor, etc.) that has an addressable interface (e.g., an Internet protocol (IP) address, a Bluetooth identifier (ID), a near-field communication (NFC) ID, etc.) that can transmit information, for example, to a processing device (e.g., processing device 202) using a network such as a local ad-hoc network or the Internet. A connected device may have a passive communication interface, such as a quick response (QR) code, a radio-frequency identification (RFID) tag, an NFC tag, or the like, or an active communication interface, such as a modem, a transceiver, a transmitter-receiver, or the like. The connected device may have a particular set of attributes (e.g., a device state or status, such as whether the connected device is on or off, open or closed, idle or active, available for task execution or busy, a cooling or heating function, an environmental monitoring or recording function, a light-emitting function, a sound-emitting function, etc.) that can be embedded in and/or controlled/monitored by a central processing unit (CPU), microprocessor, or the like. Consistent with the present disclosure, a connected device can encompass the range from the simplest IoT devices to the most robust legacy Internet accessible devices. For example, connected devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, thermometers, humidity sensors, soil sensors, security cameras, motion detection lights, traffic sensors, wearable devices, fitness bracelets, continuous glucose monitor devices, connected inhalers, an ingestible sensors, coagulation testing devices, asthma monitor devices, cell phones, desktop computers, laptop computers, tablet computers, personal digital assistants (PDAs), etc.

Figure 44:
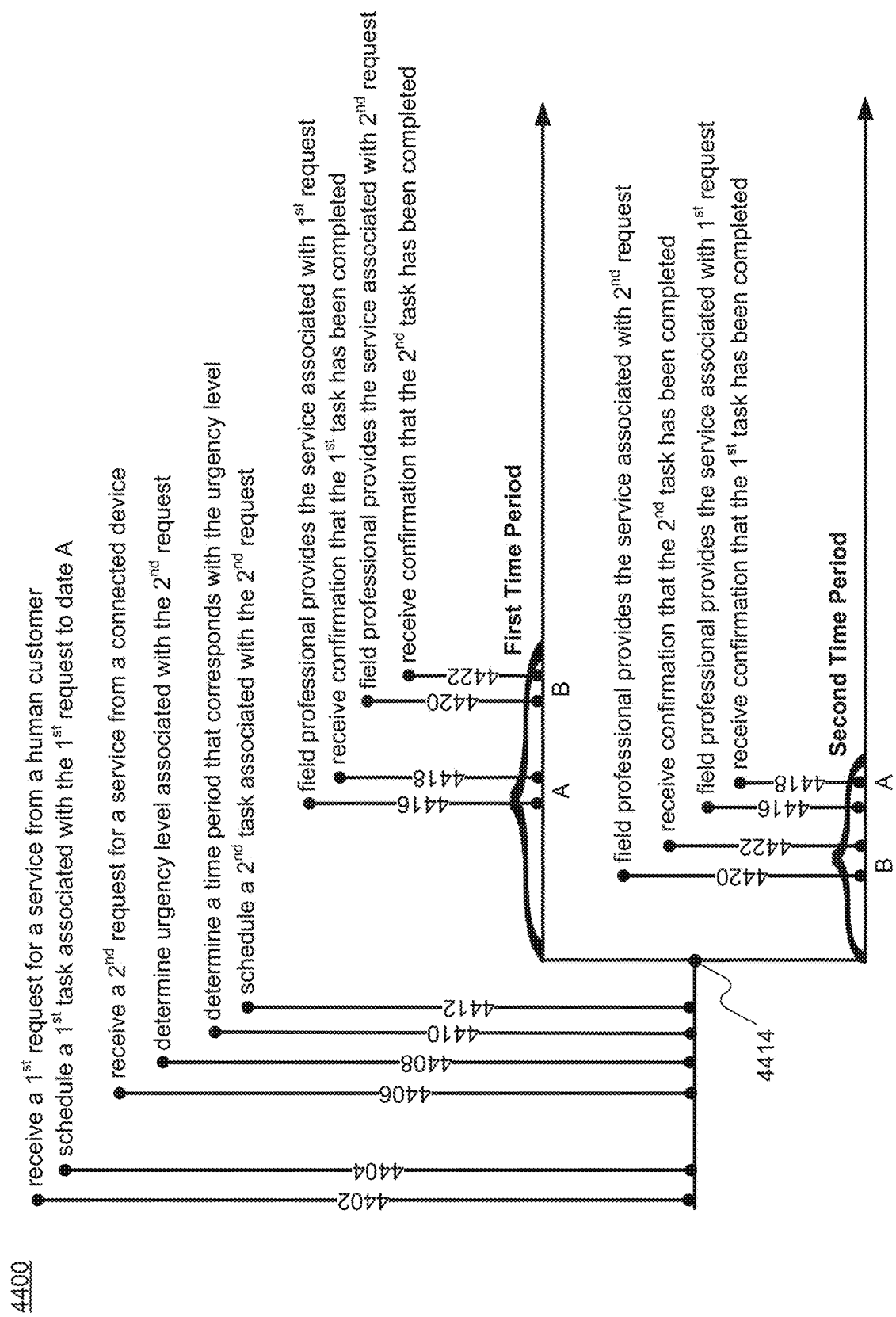
FIG. 44 is a timeline showing an exemplary process for scheduling on-site services to connected devices, consistent with the present disclosure.

FIG. 44 is a diagram showing a timeline 4400 illustrating the chronological events that happen when a processing device (e.g., processing device 202) schedules a first request from a human customer and a second request from a connected device to at least one field professional, according to disclosed embodiments. As illustrated, timeline 4400 includes a splitting point 4414 to two optional timelines (First Time Period and Second Time Period) that correspond with the urgency level of the second request of the connected device. The manner and order in which events are shown in timeline 4400 are chosen for convenience and clarity of presentation and is not intended to limit the disclosed embodiments.

Initially, at step 4402, a processing device may receive a first request for a service. The requested service may be a location-based service (e.g., it may include a repair of a device in a customer's house) or a location-agnostic service (e.g., it may include remote accessing a customer's device). According to some embodiments of the present disclosure, the first request may be autonomously received from a connected device; but in the example illustrated in FIG. 44, the first request is received from a human customer. Thereafter, at step 4404, the processing device may schedule a first task for providing the requested service to the human customer. In the illustrated example the processing device scheduled the task associated with the first request on date "A."

At step 4406, the processing device may receive a second request for a service. The service autonomously requested by the connected device may also be a location-based service (e.g., it may include a repair of the connected device or a repair of a device monitored by the connected device) or a location-agnostic service (e.g., it may include updating a software or fixing a bug). In cases where the first request is also from a connected device, the connected devices associated with the first and second requests may be from different types or associated with different owners. At step 4408, the processing device may determine an urgency level associated with the second request. The term "urgency level" as used herein refers to a determination of the need of the connected device for the service so that the connected device can continue functioning without sacrificing performance. In some cases, the connected device may include in the request an indicator of the urgency level. In other cases, the connected device may include data (e.g., measurements, reports, etc.) in the request and the processing device will derive from the received data the urgency level. At step 4410, the processing device may determine a time period that corresponds with the urgency level. In the figure, the first optional time line illustrates a case where the determined time period ends after date "A," and the second optional time line illustrates a case where the determined time period ends before date "A." At step 4412, the processing device may schedule a second task associated with the second request from the connected device to date "B." In the illustrated example date "B" may be before date "A," after date "A," or on the same day.

In one embodiment, illustrated in the first optional timeline after splitting point 4414, the processing device may schedule a task associated with the second request at the second scheduled date (date "B") being after the first scheduled date (date "A"). This optional timeline describes a case when the time period that corresponds with the associated urgency level ends after the first scheduled date (date "A). In another embodiment, illustrated in the second optional timeline after splitting point 4414, the processing device may schedule a task associated with the second request at the second scheduled date (date "B") being before the first scheduled date (date "A). This optional timeline describes a case when the time period that corresponds with the associated urgency level ends before the first scheduled date (date "A). In yet another embodiment, not shown in the figure, the processing device may schedule the task associated with the second request at the first scheduled date, for example, the task associated with the second request may be scheduled instead of the task associated with the first request. This scenario may occurred when the urgency level associated with the request of the connected device is higher than a threshold. In this scenario, the processing device may reschedule the task associated with the first request to a different date. In some embodiments, the processing device may prefer to reschedule tasks of connected devices (rather than rescheduling tasks of human customers) to a different date within their corresponding determined time periods.

At step 4416, which takes place on date "A," a field professional may provide the service associated with first request, and at step 4418, the processing device may receive a confirmation that the first task has been completed. Similarly, at step 4420, which takes place on date "B," a field professional may provide the service associated with the second request, and at step 4422, the processing device may receive a confirmation that the second task has been completed. The decision whether the second task should be scheduled for a date before or after date "A," may be based on the determined time period that is associated with the urgency level of the connected device.

FIG. 45 shows five locations (4500, 4502, 4504, 4506, 4508) associated with tasks that were previously scheduled in response to a first set of requests. Each of these task is associated with different task details (request date, task estimated duration, task scheduled date assigned to field professional, and customer type). On June 6, the system received a second request from a connected device for an on-site service at another location (4510) in proximity to the first five locations (4500, 4502, 4504, 4506, 4508). In one example, the determined time period associated with the second request is five days. For efficiency reasons, the system may aim to schedule nearby tasks on the same date and to the same field professional. Accordingly, the processing device may identify optional pending tasks associated with a location in proximity to the location associated with the second request. For example, the on-site service associated with the second request may be scheduled on the same date as the on-site services scheduled for locations 4500, 4504, and 4506. The on-site services for locations 4502 and 4508 are scheduled on dates later than the determined time period.

Consistent with the present disclosure, the processing device may determine, based on the time period, that the on-site service for the connected device can be scheduled on a particular day when a first request is scheduled. Thereafter, the processing device may assign a single field professional to provide the on-site services at first location 4506 and at the second location 4510 on the (same) particular day. In one embodiment, the processing device may determine that the second location is in proximity to the first location when an estimated driving duration between the second location and the first location is less than 60 minutes, less than 45 minutes, less than 30 minutes, or less than 15 minutes. In another embodiment, the processing device may determine that the on-site service for the connected device can be scheduled on the (same) particular day by comparing the estimated driving duration to a threshold associated with the urgency level. For example, for urgent services the threshold may be 2 hours, for less urgent services the threshold may be 1 hour. The term "threshold" is used here to denote a reference value, a level, a point, or a range of values, for which, when the driving duration is below it, the processing device may allow the on-site service for the connected device to be scheduled on the certain date.

With reference to the example illustrated in FIG. 45, prior to scheduling the on-site service for the connected device at location 4510, the processing device may confirm that Bruce and Chuck have the skills required to complete the on-site service. In this example both Bruce and Chuck have the required skills. Therefore, the processing device may check if Bruce and Chuck have time availability in their daily schedule. Assuming Bruce's schedule is full, the processing device may schedule the on-site service associated with the second request to Chuck on June $9^{th}$. In some cases, the processing device may determine that the connected device in location 4510 may be accessed without the presence of its owner. If this is the case, the processing device may use real-time data from field professionals to reschedule the on-site service for the connected device. For example, on June 8 the processing device may reschedule the on-site service after learning that Bruce had completed the on-site service in location 4504 after 20 minutes instead of the estimated 55 minutes. The processing device may identify a window of opportunity for Bruce to complete the on-site service for the connected device in location 4510 and reschedule the on-site service associated with the second request to Bruce on June 8.

Figure 46:
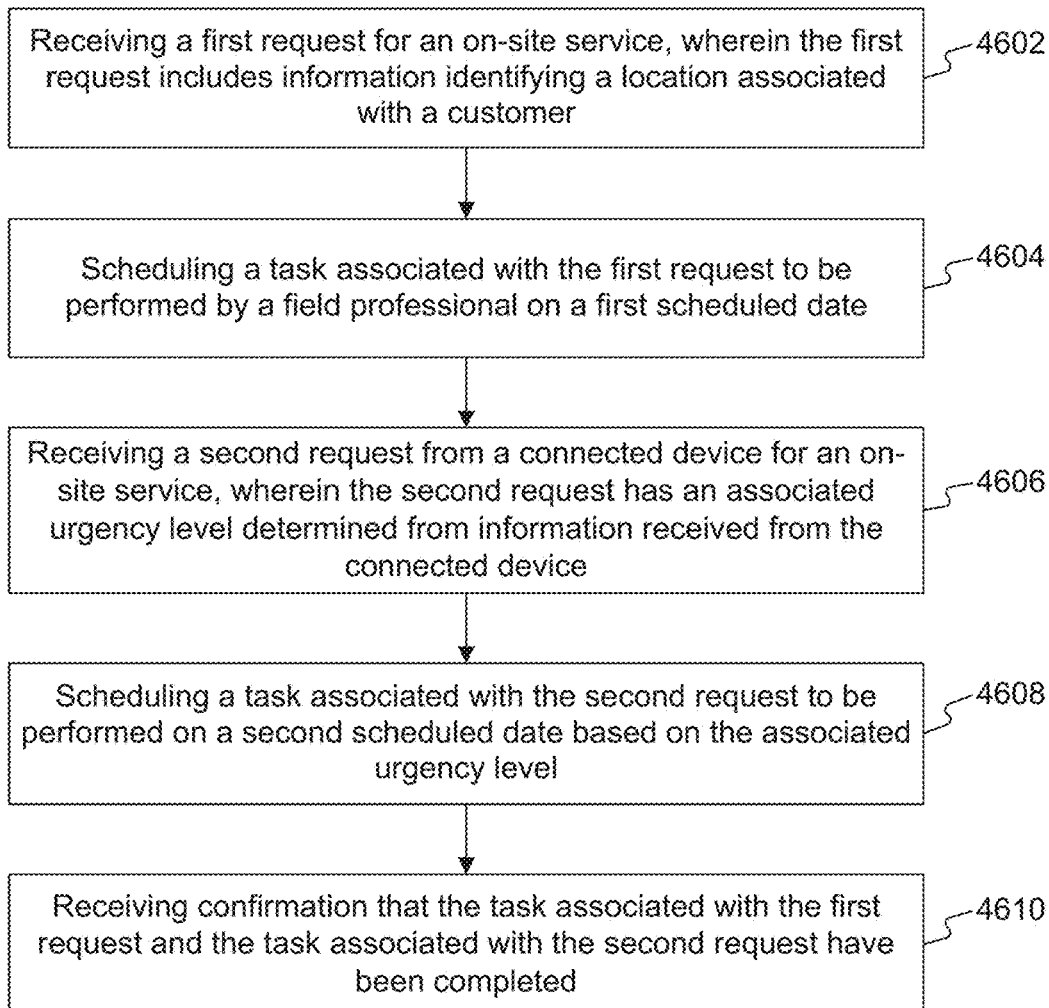
FIG. 46 is a flowchart showing an exemplary process for scheduling on-site services for connected devices and human customers, consistent with the present disclosure.

FIG. 46 is a flowchart of an example method 4600 for scheduling tasks to field professionals executed by a processing device of system 100, according to embodiments of the present disclosure. For purposes of illustration, in the following description reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4602, a processing device (e.g., processing device 202) receives a first request for an on-site service, wherein the first request includes information identifying a location associated with a customer. In one embodiment, the first request for the on-site service may be received directly from a human customer. In another embodiment, the first request for the on-site service may be received from a connected device associated with a human customer.

At step 4604, the processing device schedules a task associated with the first request to be performed by a field professional on a first scheduled date. The term "scheduled date" is meant to include date and/or time, as appropriate. In one example, the scheduled date may include a time range (e.g., between 1:00 PM to 5:00 PM). In another example, the scheduled date may include an exact time (e.g., 11:15 AM). In one embodiment, the processing device may schedule the task associated with the first request on the first scheduled date based on the information identifying the location associated with the customer. For example, when the location associated with the customer is next to a public school, the processing device may avoid scheduling services at the times when school ends. In addition, the location may provide details for selecting the most fitting field professional. For example, one of the field professionals may have more experience completing on-site services in the type housings found at the location identified in the request. In another embodiment, the processing device may determine the first scheduled date based on an availability (and/or predicated availability) of the human customer. For example, the processing device may retrieve information indicative of an availability of the human customer at the location for accepting the on-site service (e.g., from social network, online source, past answers), and propose at least one time slot for providing the on-site service based on retrieved information.

At step 4606, the processing device receives a second request from a connected device for an on-site service. The request may include a wide range of data formats, such as messages, reports, measurements, and other feedback generated by the connected device. In one embodiment, the request from the connected device may include a data stream with values of a plurality of parameters associated with a plurality of software-driven components of the connected device or of a device monitored by the connected device. In this embodiment, the processing device may process the data stream to determine that the connected device is in need of an on-site service. In another embodiment, the request from the connected device may include identification of a condition of a software-driven component that requires an on-site service. The second request may be associated with a repair service or a maintenance service for the connected device. For example, the data stream from the connected device may be indicative of a failure of one of the components of the connected device. Alternatively, the second request may be associated with a repair service or a maintenance service for a device monitored by the connected device. For example, a single connected device may monitor a plurality of devices and the data steam from the connected device may be indicative of a failure of one of the monitored devices.

Consistent with the present disclosure, the second request may have an associated urgency level determined by information received from the connected device. In one embodiment, the connected device may determine the urgency level by itself and may include the associated urgency level in the request for on-site service. In another embodiment, the processing device may determine the urgency level from the information received from the connected device. For example, the request from the connected device may include information indicative of a condition of at least one component (or a group of components) of the connected device or a condition of at least one device (or a group of devices) monitored by the connected device. In addition, the processing device may determine the urgency level from the information received from the connected device and historical data associated with the connected device. For example, database 154 may include historical data associated with a plurality of connected devices, such as past status updates; the processing device may use the historical data to predict an upcoming malfunction of one of the components of the connected device or of a device monitored by the connected device. In this example, the determined urgency level corresponds to the predicated upcoming malfunction.

In some embodiments, the processing device may determine a time period that corresponds with the associated urgency level of the on-site service for the connected device. For example, assuming the urgency level is a value on a scale of one to ten where "ten" is very urgent and "one" is not urgent, a length of time period may be inversely proportionate to the urgency level, e.g., when the urgency level is "three" the time period may be thirty days and when the urgency level is "nine" the time period may be two days. Thus, as urgency level increases the time period may decrease. Furthermore, the processing device may also determine the time period based on the urgency level and based on the type of the connected device. The type of the connected device may be associated with the manufacture of the connected device, the owner of the connected device, the category of the connected device, the location of the connected device, and the pending tasks of the connected device. For example, a connected device of a municipality may receive a higher priority than a connected device of an individual. In other words, two connected devices with a same urgency level may be assigned with two different time periods. In another embodiment, the processing device may receive one or more updates associated with the urgency level from the connected device, and may change the time period based on the received updates. For example, the updates from a connected device may indicate a change in status of at least one component of the connected device (or change in status of at least one device monitored by the connected device), which may require rescheduling the on-site service to an earlier date. Therefore, after receiving the updates, the processing device may determine again the urgency level and/or the time period. In one embodiment, the processing device may confirm that the scheduled date for the on-site service associated with the connected device is within the determined time period (e.g., within a second time period determined based on the received updates).

At step 4608, the processing device schedules a task associated with the second request to be performed on a second scheduled date based on the associated urgency level. The second scheduled date may be before the first scheduled date, after the first scheduled date, or on the same date. In some embodiments, the processing device may schedule the task associated with the second request to a field professional other than the field professional scheduled for the task associated with the first request. Alternatively, the processing device may assign the same field professional to provide on-site services associated with the first and second requests. In some instances, a single field professional may be assigned where the first request is from a human customer and the second request is from a connected device. For example, when a field professional completes a first task associated with a human customer earlier than estimated and he/she has time before departing to a next task, the processing device may assign the field professional a second task associated with a connected device in its proximity (e.g., within 10 minutes' drive). In additional embodiments, the processing device may determine accessibility of the connected device and schedule the task associated with the second request based on the accessibility of the connected device. The accessibility of the connected device may be for time periods in which the field professional can complete the on-site service to the connected device. For example, when the connected device is located outdoors, the task can be scheduled as early as 6:00 AM. But when the connected device is located within a company premises, the task can be scheduled only during the opening hours.

At step 4610, the processing device receives confirmation that the task associated with the first request and the task associated with the second request have been completed. A confirmation in this context may refer to a message sent to the processing device after an on-site service is completed. In some non-limiting examples, the confirmation may be received from the at least one field professional assigned to the task associated with the first request and to the task associated with the second request. Alternatively, the confirmation may be received from the connected device and/or the customer.

O. Scheduling Parts Delivery

Some on-site services provided by field professionals require specific parts for completion. Every so often, while in the field, field professionals discover that they need a certain part to complete an on-site service. The following disclosure describes methods and systems for scheduling delivery of parts to field professionals currently in the field. In the context of this disclosure, "parts" may refer to any type of component or hardware utilized in connection with an on-site service by a field professional. In a first embodiment, the delivered parts may include replacement parts; for example, technicians scheduled to repair electrical devices may require different components for repairing the devices, such as, cables, fuses, switches, circuits, and more. In a second embodiment, the delivered parts may include disposables; for example, a medical service provider scheduled to visit patients may use a variety of disposables parts, such as syringes, needles, sutures, staples, packaging, tubing, catheters, medical gloves, gowns, masks, adhesives, and more. In a third embodiment, the delivered parts may include tools; for example, some on-site services require the field professionals to use certain tools not part of the default inventory, such as a driller for reinforced concrete or a dialysis machine. Field professionals assigned to provide on-site services may start their day with an inventory of parts that is configured to enable completion of the tasks scheduled for that day. Yet, it is not uncommon that during the day some parts are unexpectedly needed. In one case, a field professional arrives at a location associated with a scheduled task and learns that a specific part not found in her inventory (e.g., a tool) is needed to complete the on-site service. In another case, a field professional may unexpectedly be required to use parts in one task (e.g., replacement parts or disposables) meaning that the field professional may not be able to compete a later task.

FIG. 47 is a schematic illustration to explain a field professional's use of parts throughout a workday. FIG. 47 depicts a daily schedule 4700 that shows the times and durations of each of tasks A, B, C, and D assigned to a field professional by server 152 between 8:00 and 16:00 of a workday. In the illustrated example the field professional may be a computer technician and each task in daily schedule 4700 includes an indication of the one or more parts expected to be used in each task. In one embodiment, server 152 may predict which parts the field professional will need to use in each task based on details derivable from a request for the on-site service. For example, server 152 may predict that task A would require replacing a motherboard; task B would require replacing a hard disk drive; task C would require replacing a Graphics Processing Unit (GPU); and task D would require replacing a different motherboard. A person skilled in the art would recognize that the above example is simplified, and an actual repair service may involve substantially more parts (e.g., more replacement parts, specific tools, etc.).

Based on the prediction of parts that the field professional will need to use in each task, an inventory of parts 4710 may be assigned to the field professional. In the illustrated example, inventory 4710 includes GPU 4712, motherboards 4714A, 4714B, and 4716, and hard disk drive 4718A and 4718B. As shown in daily schedule 4700, the field professional had to unexpectedly use GPU 4712 for completing task A, although GPU 4712 was intended to be used in task C. In order to be able to complete task C, server 152 may schedule a delivery of GPU 4720 to the field professional. The different alternatives for delivering GPU 4720 to the field professional are described below with reference to FIG. 48.

Figure 48:
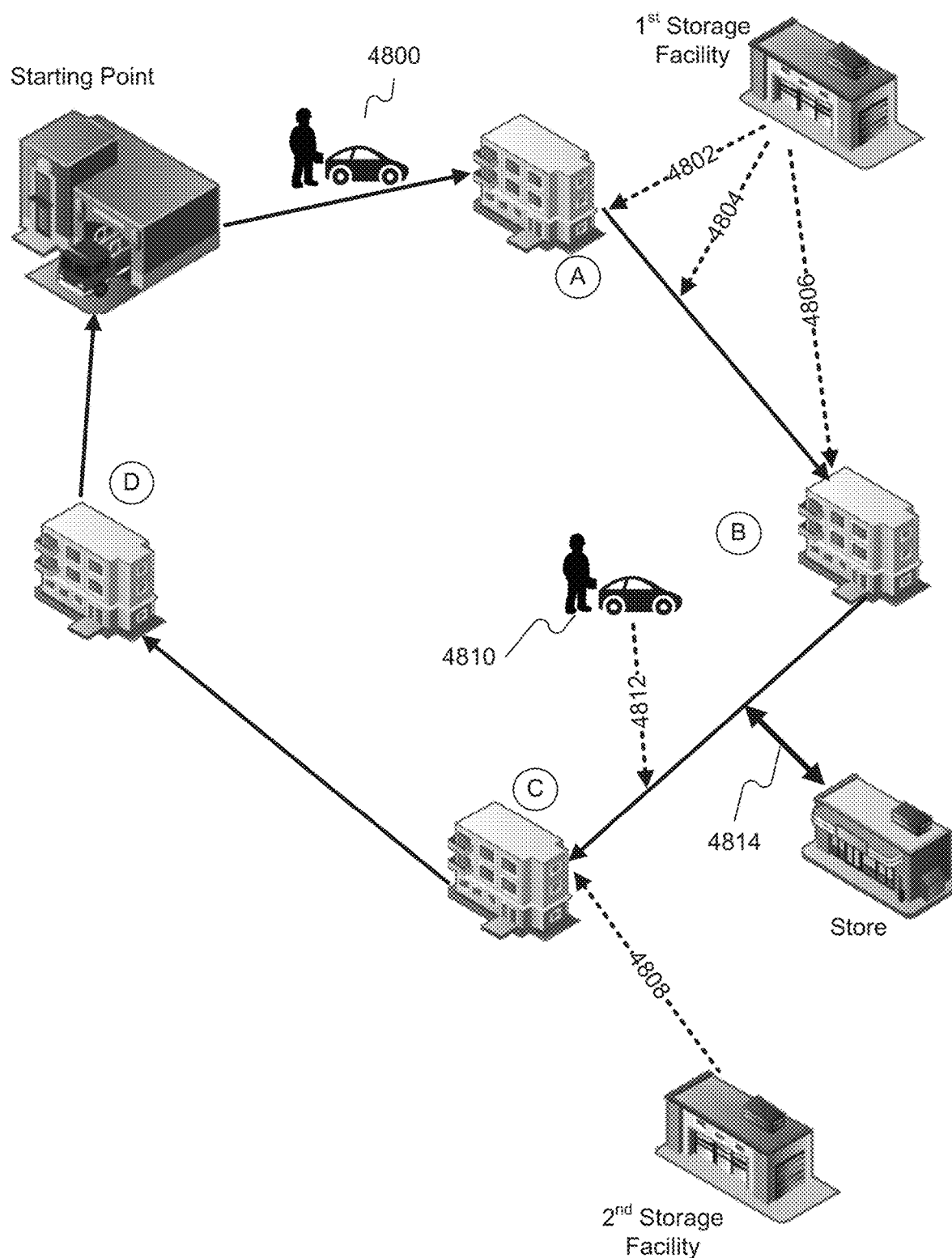
FIG. 48 is a schematic map showing possible parts delivery points along a travel path of a field professional, consistent with the present disclosure.

FIG. 48 is a schematic map that illustrates possible parts delivery points along a travel path of a field professional. With reference to FIG. 47, field professional 4800 may be assigned to tasks A, B, C, D for providing technical service at locations A, B, C, and D. The route of field professional 4800 is schematically illustrated in a solid line and the different parts-delivery options are illustrated in dashed lines. Consistent with the present disclosure, server 152 may determine that field professional 4800 needs an additional part (e.g., a GPU) not currently in its assigned inventory to complete one of the scheduled tasks. For example, when field professional 4800 completed the on-site service associated task A, server 152 may receive in real-time an indication of the updated inventory of parts currently available to field professional 4800. From the received indication, server 152 may determine that in completing task A field professional 4800 unexpectedly used a certain part (e.g., GPU 4712) needed to complete task C. Accordingly, server 152 may schedule a task for delivery of the at least one additional part (e.g., GPU 4720) to field professional 4800. In the illustrated example, the at least one additional part can be delivered from two storage locations; namely, the first storage facility and the second storage facility.

Consistent with embodiments of the present disclosure, server 152 may determine a location for delivering at least one part to the field professional based on locations of scheduled tasks in a daily schedule of the field professional and/or based on a current location of field professional 4800 determined from a GPS receiver integrated with communication devices 180A. In addition, the determined location may include a location between a current location of field professional 4800 and a location of the task where the part is needed. For example, server 152 may determine that the part needed for task C may be delivered to location A (option 4802), to a point between location A and location B (option 4804), or to location B (option 4806). In one embodiment, server 152 may instruct field professional 4800 to wait before departing to a next task when the at least one part is scheduled to be delivered to the field professional at the location associated with the current task. For example, with regards to option 4806, server 152 may instruct field professional 4800 to wait at location B before departing to location C.

In some cases, server 152 may select which storage facility will provide the at least one additional part to field professional 4800. The determination may be based on the current location of field professional 4800, the traffic conditions (current and predicted), the parts inventory in each storage facility, and other scheduling costs associated with the part delivery. For example, server 152 may determine that the at least one additional part (e.g. GPU 4720) will be delivered to location C from the second storage facility (option 4808) based on traffic conditions. In one embodiment, server 152 may also identify another field professional has the at least one additional part (e.g. GPU 4720) currently available in his/her inventory of parts, and organize a meet-up between the two field professionals. For example, a field professional 4810 may receive a task of meeting with field professional 4800 at a point between location B and location C (option 4812). In an alternative embodiment, the task for delivering the at least one additional part to field professional 4800 may include instructing field professional 4800 to purchase the least one additional part (e.g. GPU 4720) at a specific store that may be located next to field professional 4800 (option 4814).

FIG. 49A is a flowchart of an example method 4900 for scheduling parts delivery executed by a processing device of system 100, according to embodiments of the present disclosure. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4902, a processing device (e.g., processing device 202) may receive a set of requests for on-site services. The on-site services associated with at least some of the requests require parts. As mentioned above, the term "parts" may refer to any type hardware being utilized during an on-site service by a field professional. For example, the parts may include replacement parts, disposables, or tools. At step 4904, the processing device may schedule a set of tasks corresponding to the set of requests for a field professional. The scheduling of the tasks may be based on the skills of the field professional and the expected availability of the parts. In one embodiment, the processing device may determine the expected availability of parts based on data associated with previously scheduled tasks and offer time slots for users for the on-site services based on the expected availability of the parts. In one example, where the parts include a certain component of an electric device, the processing device may predict that the certain component may be out-of-stock by Tuesday. Accordingly, the processing device may offer a user requesting the service time slots on Wednesday. In another example, where the parts include a certain tool, the processing device may determine that the certain tool is already scheduled to be used on Tuesday at a location far from the location associated with a current request. Accordingly, the processing device may offer a user requesting the service time slots on Wednesday.

At step 4906, the processing device may determine a set of parts that the field professional is likely to require to complete the set of tasks. In one embodiment, the processing device may determine which parts the field professional would need for completion of the set of tasks based on details of the requests for the on-site services. Consistent with the present disclosure, the processing device may determine information indicative of the types of parts required to complete the task from the requests for the on-site service. The information may include the type of task, the location of the task, the weather predicted at the time of the task, and more. For example, installing Internet connection may require different replacement parts when the location is a private property or an apartment house. In another embodiment, the processing device may determine which parts the field professional would need for completion of the set of tasks based on historical data indicative of the previous parts used in tasks similar to the scheduled set of tasks. For example, a certain neighborhood may experience poor infrastructure and completing some services in that neighborhood requires certain parts.

In another embodiment, the processing device may determine the set of parts that the field professional is likely to require using a task-to-parts database. The task-to-parts database (e.g., part of database 154) may correlate different types of tasks with one or more parts. In one example, the data structure of records in the task-to-parts database may include a set of tuples. Some tuples may contain information related to tasks and any specific work related to performing each task, and some tuples may contain information related to any components or parts related to each specific work item. In this way, the data structure can be accessed to quickly identify the parts for each task to support identification of parts not currently on hand in a field professional's available inventory when on-site. In yet another embodiment, the processing device may determine the set of parts that the field professional is likely to require using a customer database that may be stored locally by the customer or stored in database 154. The processing device may access the customer database to determine if the customer has some parts that the field professional may need during the on-site service. For example, the processing device may determine that for a certain patient the field professional does not need to bring a dialysis machine because the patient has his own dialysis machine.

At step 4908, the processing device may determine that the field professional needs an additional part not currently in the field professional's assigned inventory to complete the set of tasks. The field professional's assigned inventory or individual inventory refers to a group of parts readily available to a field professional while the field professional is traveling between different locations associated with different tasks. In one embodiment, more applicable when the parts are disposables or replacement parts, the processing device may receive in real time an indication of an inventory of parts currently available to the field professional. The inventory of parts may be updated after each task in a daily schedule of tasks is completed. For example, the processing device may determine the individual inventory from updates from the field professional or from sensors (e.g., weight sensors, image sensors) that monitor the inventory of parts. In another embodiment, the processing device may receive from the field professional, while the field professional is at a location associated with a current task, a request for a specific part needed for completion of the current task. Upon receiving the request, the processing device may schedule a task for delivery in the field of the requested part to the location associated with a current task to enable the field professional to complete the current task. For example, when the field professional is a medical professional, a nurse may determine that a certain tool (e.g., an inhalator) is needed during a check-up with a patient.

At step 4910, the processing device may schedule a task for delivery in the field of the at least one additional part to the field professional. In one embodiment, the processing device may schedule the delivery task to ensure timely arrival of the additional part at a location associated with the task determined to require the additional part to complete that task. As illustrated in FIG. 48, the additional part may be delivered before or after the field professional arrives at the location associated with the task determined to require the additional to complete that task. In another embodiment also illustrated in FIG. 48, the processing device may schedule the delivery task of the at least one additional part to arrive at a location along a route assigned to the field professional. Consistent with the present disclosure, the scheduling delivery of the at least one additional part may include booking or assigning an autonomous vehicle (e.g., a drone or an autonomous car) for delivering the at least one additional part. The autonomous vehicle may be part of a transportation service, such as Uber™, Lyft™ and Via™.

FIG. 49B depicts a related method 4950 for scheduling parts delivery used by a processing device of system 100, according to embodiments of the present disclosure. For purposes of illustration, in the following description reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4952, a processing device (e.g., processing device 202) may receive a set of requests for on-site services, wherein the on-site services of at least some of the requests require parts. At step 4954, the processing device may schedule a set of tasks corresponding to the set of requests for a field professional. In one embodiment, a task associated with a certain request may be associated with a set of parts needed for completion of the set of tasks. The set of parts may include parts from a first type of parts and a second type of parts (e.g., replacement parts and tools). In one example the field professional may be a technician and the set of parts may include communication hardware (e.g., cables, switches) and a concrete drilling tool (e.g., concrete demolition hammer). The system may cause a delivery of either the first type of parts, the second type of parts, or both. In another example, the field professional may be a nurse and the set of parts may include a disposable medical product (e.g., drugs, stoma bags) and a medical device (e.g., a dialysis machine).

At step 4956, the processing device may provide data indicative of expected parts that the field professional would need for completion of the set of tasks. The data indicative of expected parts may include at least one list of parts; for example, a list of tools needed for completion of the set of tasks, a list of replacement parts needed for completion of the set of tasks, and a list of disposables needed for completion of the set of tasks. In some cases, the processor may determine the data indicative of expected parts based on historical data about parts used in previous tasks similar to the scheduled set of tasks. In one embodiment, the data indicative of expected parts may be associated with tasks for that day and may be provided before the field professional departs to the field.

At step 4958, the processing device may receive from the field professional, while the field professional is at a location associated with a current task, a request for at least one additional part. The request may be indicative of a specific part needed for completion of the current task or a specific part needed for completion of a future task. Consistent with the present disclosure, the request may be initiated by the field professional or by an electronic device associated with the field professional (e.g., communication devices 180A). In some embodiments, the request may include an explicit identification of the at least one additional part or data indicative of the current status of the individual inventory of the field professional. For example, the request may include data indicative of parts that were unexpectedly used in at least one earlier task. In another embodiment, the processing device may determine that the at least one additional part is associated with a future task and it cannot be delivered in time to the field professional. Accordingly, the processing device may reassign that future task to another field professional having the at least one additional part. In some cases, even if a part may be delivered to the field professional before the future task, it may still be beneficial to reassign the future task to another field professional instead of scheduling the part delivery. The processing device may decide whether to schedule a delivery of the at least one additional part or reassign the future delivery based on real-time data, such as other field professionals current location and their pending tasks.

At step 4960, the processing device may schedule a task for delivery in the field of the requested at least one additional part to the field professional. In one embodiment the at least one additional part can be delivered from a plurality of storage locations (e.g., the first and second storage facilities depicted by FIG. 48). The processing device may select one of the plurality of storage locations for providing the at least one additional part. In addition, the selection of the storage location for providing the at least one additional part may be based on a predicted demand for parts and/or real-time information about the current demand for said parts. For example, the first storage facility may be closer to a current location of the field professional and has eight pieces of the required parts, whereas the second storage facility has only five pieces. Nevertheless, the processing device may select the second storage facility because all the eight pieces from the first storage facility are predicted to be used tomorrow, and the next supply of the pieces to the first storage facility is scheduled for the next week.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method, comprising:
   processing, by one or more servers, a request for a first service associated with a first location, the request being received from a first client device;
   obtaining, by the one or more servers from one or more database records of a database, historical information pertaining to one or more services that have been completed, the historical information indicating, for at least one service, a corresponding location, a completion time, and an identity of a field professional that performed the service;
   generating or updating, by the one or more servers, a machine learning model based, at least in part, on the historical information;
   generating, by the one or more servers using the machine learning model, a first likelihood value indicating a first likelihood that a first field professional will complete the first service at the first location in a single on-site visit based, at least in part, on a set of attributes of the first service;
   generating, by the one or more servers using the machine learning model, a second likelihood value indicating a second likelihood that a second field professional will complete the first service at the first location in a single on-site visit based, at least in part, on the set of attributes of the first service;
   comparing the first likelihood value and the second likelihood value;
   determining whether the first likelihood value is greater than the second likelihood value
   assigning, by the one or more servers, the first field professional or the second professional to perform the first service based, at least in part, on a result of determining whether the first likelihood value is greater than the second likelihood value; and
   updating, by the one or more servers, the machine learning model based, at least in part, on information pertaining to the first service after assigning the first field professional to perform the first service.

2. The method of claim 1, wherein the historical information in at least some of the database records is derived, at least in part, from feedback from at least one field professional, the feedback indicating whether the at least one field professional completed the service in a single on-site visit.

3. The method of claim 1, the historical information in at least some of the database records indicating at least one of: a specific tool, a spare part, or a qualification of the field professional.

4. The method of claim 1, the information pertaining to the first service indicating, for the first service, the first location of the first service, the completion time, the identity of the first field professional, and the first likelihood that the first field professional will complete the first service at the first location in a single on-site visit.

5. The method of claim 1, the information indicating whether the first field professional completed the first service in a single on-site visit.

6. The method of claim 1, the historical information including an average completion time for a type of the first service.

7. The method of claim 1, the historical information indicating a likelihood that the field professional will complete the service in a single on-site visit.

8. The method of claim 1, the information pertaining to the first service indicating the likelihood the first field professional will complete the first service in a single on-site visit and indicating whether the first service was completed in a single on-site visit.

9. The method of claim 1, the machine learning model having a plurality of variables, at least a subset of the variables representing, for a location, a time, and an identity of a field professional that performed the service.

10. The method of claim 1, information pertaining to the first service indicating whether the first field professional completed the first service in a single on-site visit.

11. A system, the system comprising:
a database system implemented using a server system including at least one processor, the database system configurable to cause:
processing a request for a first service associated with a first location, the request being received from a first client device;
obtaining, from one or more database records of a database, historical information pertaining to one or more services that have been completed, the historical information indicating, for at least one service, a corresponding location, a completion time, and an identity of a field professional that performed the service;
generating or updating a machine learning model based, at least in part, on the historical information;
generating, using the machine learning model, a first likelihood value indicating a first likelihood that a first field professional will complete the first service at the first location in a single on-site visit based, at least in part, on a set of attributes of the first service;
generating, by the one or more servers using the machine learning model, a second likelihood value indicating a second likelihood that a second field professional will complete the first service at the first location in a single on-site visit based, at least in part, on the set of attributes of the first service;
comparing the first likelihood value and the second likelihood value;
determining whether the first likelihood value is greater than the second likelihood value;
assigning the first field professional or the second field professional to perform the first service based, at least in part, on a result of determining whether the first likelihood value is greater than the second likelihood value; and
updating the machine learning model based, at least in part, on information pertaining to the first service after assigning the first field professional to perform the first service.

12. The system of claim 11, the database system further configurable to cause:
determining the set of attributes based, at least in part, on the first location associated with the first service.

13. The system of claim 11, the database system further configurable to cause:
determining the set of attributes based, at least in part, on a type of first service.

14. The system of claim 13, wherein the set of attributes includes information about tools and spare parts needed to perform the type of the first service.

15. The system of claim 11, the database system further configurable to cause:
determining the set of attributes based, at least in part, on environmental data associated with the first service.

16. The system of claim 11, wherein the set of attributes includes information about predicted weather conditions at the time of providing the first service.

17. The system of claim 15, wherein the set of attributes includes information about predicted light conditions at the time of providing the first service.

18. The system of claim 11, the set of attributes including characteristics of the first location.

19. The system of claim 11, the historical information indicating a likelihood that the field professional will complete the service in a single on-site visit and indicating whether the service was completed in a single on-site visit.

20. A computer program product comprising computer-readable program code capable of being executed by one or more processors when retrieved from a non-transitory computer-readable medium, the program code comprising computer-readable instructions configurable to cause:
processing a request for a first service associated with a first location, the request being received from a first client device;
obtaining, from one or more database records of a database, historical information pertaining to one or more services that have been completed, the historical information indicating, for at least one service, a corresponding location, a completion time, and an identity of a field professional that performed the service;
generating or updating a machine learning model based, at least in part, on the historical information;
generating, using the machine learning model, a first likelihood value indicating a first likelihood that a first field professional will complete the first service at the first location in a single on-site visit based, at least in part, on a set of attributes of the first service;
generating, by the one or more servers using the machine learning model, a second likelihood value indicating a second likelihood that a second field professional will complete the first service at the first location in a single on-site visit based, at least in part, on the set of attributes of the first service;
comparing the first likelihood value and the second likelihood value;
determining whether the first likelihood value is greater than the second likelihood value;
assigning the first field professional or the second field professional to perform the first service based, at least in part, on a result of determining whether the first likelihood value is greater than the second likelihood value; and updating the machine learning model based, at least in part, on information pertaining to the first service after assigning the first field professional to perform the first service.

\* \* \* \* \*